United States Patent [19]
Nakamura et al.

[11] Patent Number: 5,992,335
[45] Date of Patent: Nov. 30, 1999

[54] METHOD OF BLOWING SYNTHETIC RESIN INTO FURNACE AND APPARATUS THEREFOR

[75] Inventors: Hiromi Nakamura, Tokyo; Iwao Okochi, Fukuyama; Mitsuhiro Fujii; Atsushi Yamaguchi, both of Yokohama; Minoru Asanuma, Fukuyama; Tatsuro Ariyama, Yokohama; Michitaka Sato; Ryota Murai, both of Fukuyama; Tsuneo Nagaoka, Yokohama; Tetsuo Akashi, Yokohama; Kenichi Tezuka, Yokohama; Yukihiko Asakawa; Koichi Tomioka, both of Kawasaki; Hiroki Ishiguro; Yutuka Yamada, both of Yokohama; Kazumasa Wakimoto, Tokyo; Hideaki Tsukiji, Yokohama, all of Japan

[73] Assignee: NKK Corporation, Tokyo, Japan

[21] Appl. No.: 08/814,878
[22] Filed: Mar. 13, 1997

[30] Foreign Application Priority Data

| Sep. 13, 1996 | [JP] | Japan | 8-243921 |
| Sep. 13, 1996 | [JP] | Japan | 8-243923 |
| Sep. 13, 1996 | [JP] | Japan | 8-243924 |
| Sep. 13, 1996 | [JP] | Japan | 8-265139 |
| Dec. 17, 1996 | [JP] | Japan | 8-337023 |
| Feb. 12, 1997 | [JP] | Japan | 9-027581 |

[51] Int. Cl.$^6$ .............................. F23B 7/00; C21B 5/00; B02C 7/00
[52] U.S. Cl. .................. 110/342; 110/346; 110/347; 75/459; 75/469; 75/477; 266/137; 241/24.1; 241/24.12; 241/24.18
[58] Field of Search ................................. 110/341, 342, 110/346, 347; 75/459, 460, 461, 462, 469, 477, 479, 487, 498, 500, 503, 506, 519, 525, 526, 527, 531, 532, 533, 536; 266/137; 241/24.1, 24.12, 24.18

[56] References Cited

U.S. PATENT DOCUMENTS 3,995,816  12/1976  Motek.
4,400,206  8/1983  Kondo ........................................ 75/469
4,417,529  11/1983  Fujimoto et al. ........................ 110/346
4,428,769  1/1984  Limpach et al. ......................... 75/460
4,963,186  10/1990  Shimizu et al. .......................... 75/378

(List continued on next page.)

FOREIGN PATENT DOCUMENTS

| 0 442 113 A2 | 8/1991 | European Pat. Off. ............... 110/347 |
| 0 622 465 | 11/1994 | European Pat. Off. . |
| 2681418 | 3/1993 | France ..................................... 75/460 |
| 2935103 A1 | 3/1981 | Germany . |
| 4238935 A1 | 5/1994 | Germany . |
| 43 01 814 A1 | 7/1994 | Germany .............................. 110/346 |
| 4402025 A1 | 7/1995 | Germany . |
| 4403746 A1 | 7/1995 | Germany . |
| 51-033493 | 9/1976 | Japan . |
| 3-178390 | 8/1991 | Japan .................................... 110/346 |
| 91/14552 | 10/1991 | WIPO .................................... 110/342 |
| WO 95/17527 | 6/1995 | WIPO . |

OTHER PUBLICATIONS

Huffman et al., "Feasibility Study for a Demonstration Plant for Liquefaction and Coprocessing of Waste Plastic and Tires", The Proceedings of the 23rd International Technical Conference on Coal Utilization & Fuel Systems, pp. 171–177, Mar. 1998.

Hans–Ulrich Lindenberg: "Rohstoffliches Recycling von Kunststoffen als Reduktionsmittel im Hochofen", *Stahl Und Eisen*, vol. 116, No. 8, Aug. 19, 1996, Dusseldorf, De, pp. 89–93.

*Primary Examiner*—James C. Yeung
*Assistant Examiner*—Ljiljana V. Ciric
*Attorney, Agent, or Firm*—Frishauf, Holtz, Goodman, Langer & Chick, P.C.

[57] ABSTRACT

A method for blowing a synthetic resin material into a furnace which comprises processing film-shaped synthetic resins into a first granular resin material; crushing non-film-shaped synthetic resins into a second granular resin material; pneumatically feeding the first granular resin material and the second granular resin material to a furnace; and blowing the first and second granular resin material into the furnace.

25 Claims, 42 Drawing Sheets

U.S. PATENT DOCUMENTS

| | | | |
|---|---|---|---|
| 5,069,145 | 12/1991 | Croke | 11/244 |
| 5,183,212 | 2/1993 | Boo et al. | |
| 5,244,490 | 9/1993 | Agarwal | 75/500 |
| 5,323,971 | 6/1994 | Nishibori et al. | |
| 5,513,807 | 5/1996 | Stricker | |
| 5,522,554 | 6/1996 | Blank et al. | |
| 5,772,727 | 6/1998 | De Haas et al. | 75/378 |

METHOD OF BLOWING SYNTHETIC RESIN INTO FURNACE AND APPARATUS THEREFOR

BACKGROUND OF THE INVENTION

1. Field of the Invention

The present invention relates to a method of blowing a synthetic resin into a furnace and an apparatus therefor.

2. Description of the Related Art

The quantity of waste synthetic resins such as plastics as industrial waste and general garbage has recently been increasing, and disposal thereof has become an important social issue. Particularly, plastics, which is a macromolecular hydrocarbon compound, produces a high calorific value during combustion, and cannot be disposed of in a large quantity because of damage to an incinerator upon incineration, so that it is the current practice to dump most of waste plastics onto a reclamation site for waste. However, the dumping of plastics is not desirable from the environmental point of view, and there is an increasing demand for development of a quantity disposing method thereof.

Under such circumstances, methods using synthetic resins such as plastics as an auxiliary fuel for blast furnace are disclosed in European Unexamined Patent Publication No. 0622465A1 and Japanese Patent Publication No. S51-33493. These methods comprise blowing milled synthetic resins as a fuel into a blast furnace through tuyeres: the former method, for example, sets forth substantial conditions of the milled synthetic resin to be blown into the furnace including a particle diameter within a range of from 1 to 10 mm and a bulk density of at least 0.35.

As a result of repeated experiments and studies, however, the present inventors found the existence of the following problems involved in the use of synthetic resins such as plastics (hereinafter the description will be based on "plastics" as a typical example) as a blown fuel for a blast furnace.

Plastics rejected as industrial waste or general garbage, when viewed in terms of form, are broadly divided into lumpy plastics taking a plate shape in general and film-shaped ones. The latter ones, film-shaped plastics, account for a considerable part among rejected plastics. However, because of very low transferability and fluidity of milled film-shaped plastics, there is a serious problem in handling when using them as a fuel. More specifically, when blowing plastics into a blast furnace as a fuel, it is the usual practice to cut plastics stored in a storage silo and pneumatically feed cut plastics into the blast furnace. Because of a very low fluidity of film-shaped plastics, milled plastics containing much film-shaped plastics easily produce bridges (scaffolding) in the storage silo, and troubles involving inability to cut out milled plastics in a constant quantity from the storage silo occur frequently. Further, film-shaped plastics clog the cutting port of the storage silo or the interior of a pneumatic feed pipe (particularly at bends and proximity of valves), leading to a serious problem of frequent occurrence of troubles preventing pneumatic feed to the blast furnace.

Unless these problems are overcome, therefore, it is practically impossible to use film-shaped plastics as a fuel to be blown into a blast furnace or the like. In view of the present circumstances of film-shaped plastics accounting for a major portion of waste plastics as a whole, it is clear that advantages of quantity disposal and effective utilization of waste plastics would be lost unless it is made possible to use film-shaped plastics.

In order to blow plastics as a fuel into the blast furnace, furthermore, it is necessary to use milled plastics to ensure a sufficient combustion property. There is however a limitation on the particle diameter acceptable for milling in terms of treatment cost. A particle diameter within a range of from about 1 to 10 mm is therefore a limit for granulation as is shown in the conventional art. When using lumpy plastics milled to this particle diameter, a sufficient combustion property may be unavailable within the blast furnace. As a result, unburned plastics adhere to each other in the bed coke, thus seriously impairing permeability through the furnace, and may cause trouble in the blast furnace operation.

Milled lumpy plastics take an irregular and angular shape. Ones having a particle diameter of from 1 to 10 mm are therefore low in discharge property upon cutting out from a storage silo and in fluidity and transferability when pneumatically feeding to the blast furnace, leading to easy occurrence of clogging at the cutting port of silo or in the middle of the pneumatic feed pipe system.

It is therefore very difficult to use waste plastics as a fuel to be blown into a blast furnace in an industrial scale by any of the methods proposed by the conventional arts: simply milling plastics into a particle diameter of from 1 to 10 mm processing the same into granules having a high bulk density and blowing the same into the blast furnace.

SUMMARY OF THE INVENTION

The present invention has an object to provide a method of blowing synthetic resins, which permits supply of waste synthetic resins as a blown fuel into a furnace, irrespective of the form thereof, and allows improvement of transferability and combustion property of synthetic resins supplied to the furnace, and an apparatus therefore.

To achieve the above-mentioned object, the present invention provides a method of blowing a synthetic resin material into a furnace, comprising:

(a) a step of classifying synthetic resins into film-shaped synthetic resins and other non-film-shaped synthetic resins;

(b) a step of processing classified film-shaped synthetic resins into a first granular resin material;

(c) a step of crushing non-film-shaped synthetic resins and processing the same into a second granular synthetic resin material;

(d) a step of pneumatically feeding the first granular synthetic resin material and the second granular synthetic material; and (e) a step of blowing the pneumatically fed first granular synthetic material and second granular resin material into a furnace.

The foregoing process of processing the film-shaped synthetic resins into the granular synthetic resin materials may comprise:

a step of melting or semi-melting the film-shaped synthetic resins by heat; and a step of solidifying the film-shaped synthetic resins in a molten or semi-molten state.

The method of blowing the synthetic resin material into the furnace of the present invention may further comprise:

a step of separating and removing a chlorine-containing macromolecular resin material from the film-shaped synthetic resins, the film-shaped synthetic resins after separation and removal of the chlorine-containing macromolecular resin material being processed into a granular synthetic resin material in step (b); and a step of separating and removing the chlorine-containing macromolecular resin material from the non-film-shaped synthetic resins, the separation and removal step being carried out after step (c).

In the method of the present invention, the classifying step, the step of processing the film-shaped synthetic resins and the step of processing the non-film-shaped synthetic resins may be as follows:

the classifying step may comprise classifying the synthetic resins into a film-shaped synthetic resin material, a solid synthetic resin material and a sheet-shaped synthetic resin material, the sheet-shaped resin material being an intermediate form between the film-shaped synthetic resin material and the solid synthetic resin material;

the step of processing the film-shaped synthetic resins may comprise: a step of crushing the film-shaped synthetic resin material into small film pieces; and a step of applying a melting and solidification/granulating treatment to the small film pieces, thereby preparing first synthetic resin particles;

the step of processing the non-film-shaped synthetic resins may comprise:
  a step of crushing the solid synthetic resin material, thereby preparing second synthetic resin particles;
  a step of crushing the sheet-shaped synthetic resin material,
    thereby preparing small sheet pieces having a maximum size smaller than the maximum size of the small film pieces; and
  a step of supplying a melting and solidification/granulating treatment to the small sheet pieces, thereby preparing third synthetic particles.

Further, the process of processing the non-film-shaped synthetic resins may comprise:
  a step of supplying shredder dust produced during rejection of an automobile or a home electrical appliance;
  a step of cutting or crushing the shredder dust;
  a step of heating the crushed shredder dust to semi-melt or melt the same; and
  a step of causing the semi-molten or molten shredder dust to contract and solidify into a granular form.

Blowing of the granular synthetic resin material into the furnace should preferably be accomplished by blowing the granular synthetic resin material having such a particle diameter as giving a terminal velocity higher than the flow velocity of gases discharged from the combustion zone formed at the tuyere nose in the lower part of the furnace.

The present invention further provides an apparatus for blowing a synthetic resin material into a furnace, comprising:
  a first processing line for processing film-shaped synthetic resins into a granular synthetic resin material;
  the first processing line comprising a granulating/solidifying unit for processing the film-shaped synthetic resins into the granular synthetic resin material through solidification after melting or semi-melting the same with heat;
  a second processing line for processing non-film-shaped synthetic resins into the granular synthetic resin material;
  the second processing line comprising a crushing unit crushing the non-film-shaped synthetic resins;
  a primary storage silo for storing the granular synthetic resin material obtained in the first processing line and the second processing line;
  a blowing station for pneumatically supplying the granular synthetic resin material supplied from the primary storage silo into the furnace; and
  the blowing station comprising:
    a secondary storage silo for storing the granular synthetic resin material supplied from the primary storage silo;
    a blowing tank for receiving the granular synthetic resin material supplied from the secondary storage silo,
      and pneumatically feeding the same to the furnace; and
  means for continuously supplying the granular synthetic resin material from the blowing tank into a blowing port of the furnace.

Further, the apparatus of the present invention should preferably have the following components:
  a separating unit for separating and removing chlorine-containing macromolecular resin materials from the film-shaped synthetic resins, arranged in the upstream of the granulating/solidifying unit in the first processing line; and
  a separating unit for separating and removing chlorine-containing macromolecular resin materials from the non-film-shaped synthetic resins, arranged in the downstream of the crushing unit in the second processing line.

The present invention further provides a method of blowing synthetic resin material into a furnace, comprising:
  a step of preparing a synthetic resin material having an average specific surface area of at least $50 \text{ m}^2/\text{kg}$; and
  a step of blowing the synthetic resin material from tuyeres of a shaft furnace for ironmaking.

It suffices for the synthetic resin material to contain at least 5 wt. % particles having a particle diameter of up to 1 mm and having an average specific surface area of at least $25 \text{ m}^2/\text{kg}$.

The synthetic resin material may contain at least 3 wt. % particles of a foaming substance and having an average specific surface area of at least $20 \text{ m}^2/\text{kg}$.

The present invention furthermore provides a method of blowing a synthetic resin material into a furnace, comprising:

(a) a step of determining the heat value of a synthetic resin material from the result of quality determination of the material when it is possible to determine quality of the synthetic resin material and mixing of impurities is not observed;

(b) a step of determining the heat value of a synthetic resin material by measuring by an usual measuring method when it is possible to determine quality of the synthetic resin material and mixing of impurities is observed;

(c) a step of determining the heat value of a synthetic resin material by measuring by an usual measuring method when it is impossible to determine quality of the synthetic resin material;

(d) a step of blending two or more kinds of synthetic resin materials with the use of heat values for these two or more kinds of synthetic resin materials as determined in steps (a) to (c) so as to give a prescribed heat value of a mixture comprising the two or more kinds of synthetic resin materials; and (e) a step of blowing the blended synthetic resin materials from tuyeres of the furnace.

The method of charging a synthetic resin material into a furnace of the present invention comprises:

(a) a step of preparing a synthetic resin material as a blast furnace burden raw material;

(b) a step of preparing a granular sinter as a blast furnace burden raw material;

(c) a step of preparing a mixture of the synthetic resin material and the granular sinter; and (d) a step of charging the mixture into an intermediate zone between the center and the wall of the blast furnace.

DESCRIPTION OF THE EMBODIMENTS

Embodiment 1

Based on the preceding knowledge that the presence of film-shaped synthetic resin materials mixed in waste synthetic resins makes it substantially impossible to make use of synthetic resins as furnace fuel, the fuel blowing method of the present invention is characterized fundamentally by accepting synthetic resins to be used for fuel into a processing facility in the state that the synthetic resins are classified into synthetic resins comprising principally film-shaped synthetic resins and other synthetic resins, processing them respectively into granular matters suited to pneumatically feeding solid fuel by different steps and pneumatically feeding these processed granular synthetic resins into a furnace.

In particular, with respect to film-shaped synthetic resins, it has been found that, when processed by a specific method, granular synthetic resin materials which are very excellent in fluidity, carrying property and combustibility are obtained and that blending such granular synthetic resin materials with pulverized matters such as massive synthetic resin materials can enhance notably the fluidity, the carrying property and the combustibility of the whole synthetic resin materials, and a fuel blowing method constituted on the basis of this knowledge is another characteristic of the present invention.

Further, particularly from the viewpoint of securing the dischargeability of granular synthetic resin materials from a storage silo and the carrying property thereof in a pneumatically feeding pipe at high levels, it has been found that it is essential to cause the repose angle of the granular synthetic resin materials to fall in a range of a specific value, and a fuel-blowing method constituted on the basis of such knowledge is still another characteristic of the present invention.

Figure 1:
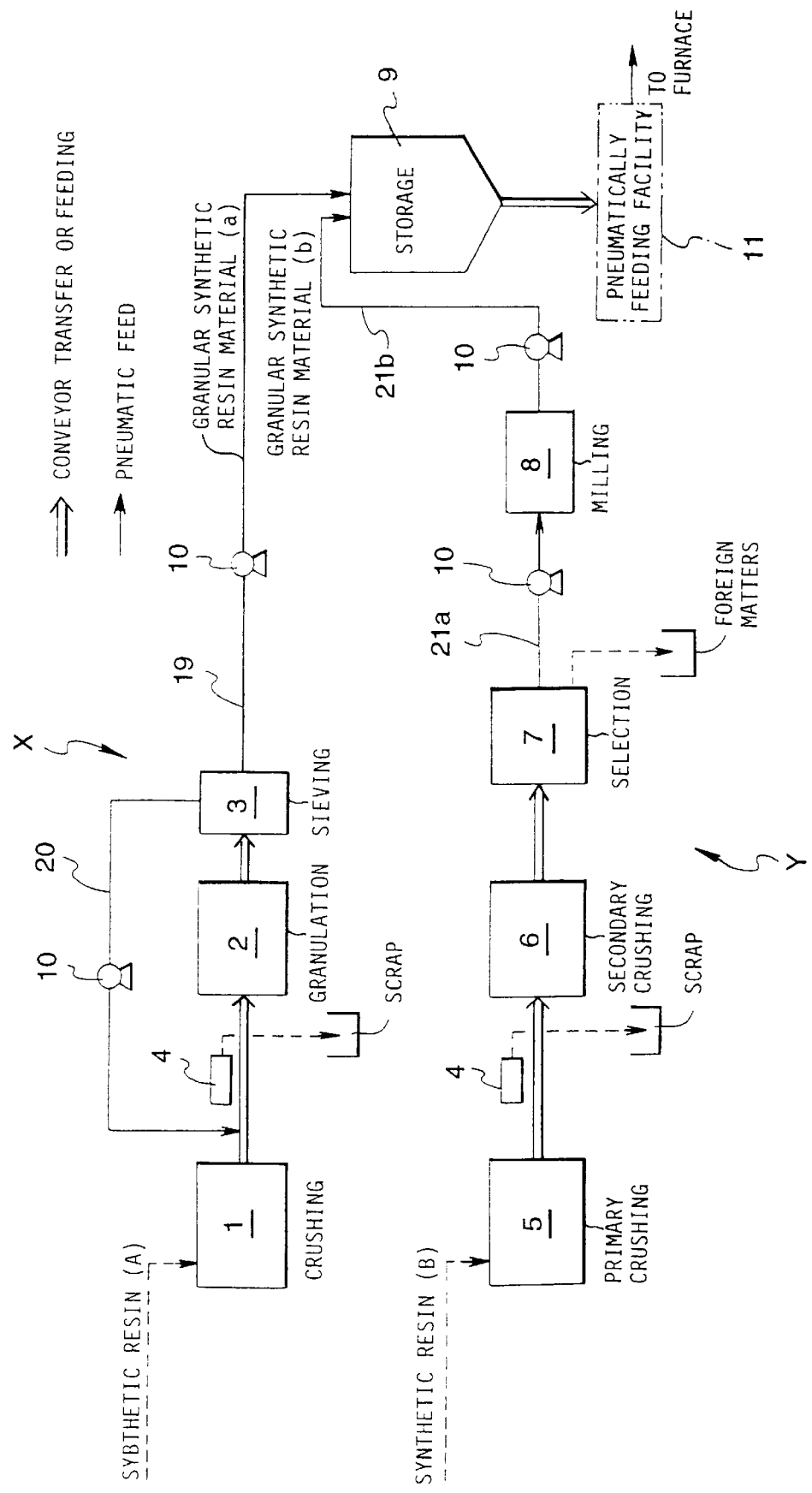
FIG. 1 is a flowchart illustrating an embodiment of the fuel blowing method of the present invention.

FIG. 1 is a flow chart showing one example of the fuel blowing method of the present invention, and the present invention shall be explained below based on this flow chart.

In the present invention, synthetic resins to be used for fuel are accepted into a processing facility in the state that the synthetic resins are classified into synthetic resins (A) comprising principally film-shaped synthetic resins and other synthetic resins (B) (that is, comprising principally massive synthetic resin materials). In this connection, synthetic resin materials of other forms which are inferior in fluidity and carrying property, for example, foamed plastics, as well as the film-shaped synthetic resin materials can be contained in the synthetic resins (A).

The film-shaped synthetic resin materials shall not specifically be restricted, but according to what have been confirmed by the present inventors through experiments, synthetic resin films having a thickness of 100 $\mu$m or less are particularly inferior in fluidity and carrying property, and therefore the synthetic resin films having a thickness of 100 $\mu$m or less are classified preferably into the synthetic resins (A) in a classifiable limit. It is a matter of course, however, that they shall not necessarily be restricted to such classification standard. Further, such relatively thick synthetic resins as used for so-called PET bottles as well as very thin films such as polyethylene films can be contained in the synthetic resins (A). Whether or not they are classified into the synthetic resins (A) is determined according to factors such as the compositions, materials (for example, the materials other than synthetic resins are contained or not contained as composite materials) and the forms of the synthetic resins as well as the thicknesses thereof.

On the other hand, the synthetic resins (B) comprise principally massive synthetic resin materials such as plates, but it is a matter of course that they shall not be restricted thereto.

In short, considering the fluidity and the carrying property of synthetic resins collected, synthetic resins which are extremely inferior in fluidity and carrying property in the state that they are crushed, such as at least polyethylene films can be classified into the synthetic resins (A), and synthetic resins such as massive plastics having better fluidity and carrying property than those of the above resins can be classified into the synthetic resins (B). The other synthetic resins can be classified into either of the synthetic resins (A) and (B) considering the fluidity and the carrying property.

From the viewpoint of the whole conversion-to-fuel system, there is no need to strictly classify, all of the film-shaped synthetic resin materials out of the synthetic resins to be supplied as fuel into the synthetic resins (A), and all of the massive synthetic resins into the synthetic resins (B), respectively. Considering the quality thereof as waste, such strict classification is practically difficult. Accordingly, it is allowable that there are contained to some extent, massive synthetic resin materials in the synthetic resins (A), and film-shaped synthetic resin materials in the synthetic resins (B).

In FIG. 1, X represents a processing line for the synthetic resins (A) comprising principally the film-shaped synthetic resin materials, and Y represents a processing line for the synthetic resins (B) comprising principally the massive synthetic resin materials. In the processing line X, the synthetic resins (A) are molten or semi-molten by heat and then solidified, whereby they are processed into a volume-reduced and solidified (volume-reduced=reduced in volume) granular synthetic resin material (a). Meanwhile, in the processing line Y, the synthetic resins (B) are pulverized and processed into a granular synthetic resin material (b).

In the processing line X, the synthetic resins (A) are crushed (or roughly crushed), if necessary, by means of a crusher 1 and then charged into a granulation and solidification equipment 2 by means of a conveyor carrier, in which they are processed into the volume-reduced and solidified granular synthetic resin material (a). Iron scraps mixed in the synthetic resins are removed by means of a magnetic separator (an apparatus in which iron scraps are adsorbed on a magnet to remove them) in the middle of the conveyor carrier described above. If the synthetic resins (A) are crushed by means of the granulation and solidification equipment 2 described later, crushing by means of the crusher 1 described above is not necessarily required. Accordingly, in such case, the crusher 1 may not be installed.

In the granulation and solidification equipment 2, the volume-reduced solidification-granulation of the synthetic resins (A) is carried out by any of the following methods [1] to [3] to obtain the granular synthetic resin material (a):

[1] a method in which after melting the synthetic resins (A) by heating, they are cooled down and solidified, and this solidified synthetic resin material is cut or pulverized,

[2] a method in which the synthetic resins (A) are cut or crushed (this cutting or crushing may be carried out by means of the crusher 1 described above instead of the granulation and solidification equipment); this cut or crushed synthetic resin material is semi-molten by heating or frictional heat generated by the cutting or crushing described above; the semi-molten synthetic resin material is contracted and solidified by rapidly cooling, wherein the synthetic resin material is contracted and solidified into a granular form, or the contracted and solidified synthetic resin material is pulverized, to thereby obtain the granular synthetic resin material (a), and

[3] a method as one embodiment of the method [2] described above, in which the synthetic resins (A) are cut or crushed by means of rotary blades which are rotated at a high speed, and the synthetic resins are semi-molten by frictional heat generated by the above cutting or crushing; then, this semi-molten synthetic resin material is contracted and solidified by rapidly cooling by spraying water, wherein the synthetic resin material is contracted and solidified into a granular form or contracted and solidified and immediately crushed by means of the rotary blades described above to thereby obtain the granular synthetic resin material (a).

Among these methods, a typical example of the method [1] is a method in which after completely molting the synthetic resins (A) and molding this into strings by extruding with an extruding machine, they are cut into a granular form, whereby the granular synthetic resin material (a) is obtained. In addition to the above methods, various processing methods can be employed.

In contrast with this, the methods [2] and [3] are methods in which the synthetic resins (A) are contracted and solidified by semi-melting without completely melting and then rapidly cooling by spraying water, wherein the synthetic resins (A) are contracted and solidified into a granular form, or the contracted and solidified synthetic resins (A) are pulverized into a granular form, whereby the granular synthetic resin material (a) is obtained. The present inventors have found that the granular synthetic resin material (a) obtained by the methods [2] and [3] (particularly the method [3]) shows very excellent fluidity and carrying property as compared with not only those of the pulverized matters of the film-shaped synthetic resin materials but also those of the pulverized matters of the massive synthetic resin materials and is very excellent as well in combustibility and that the carrying property and the combustibility of the whole synthetic resins can notably be raised by using them in a mixture with the pulverized matters of the massive synthetic resin materials. Accordingly, in the fuel blowing method of the present invention, granular contraction and solidification or contraction and solidification-granulation of the synthetic resins (A) is most preferably carried out by the method [2] or [3] in the granulation and solidification equipment 2 to obtain the granular synthetic resin material (a).

Figure 2:
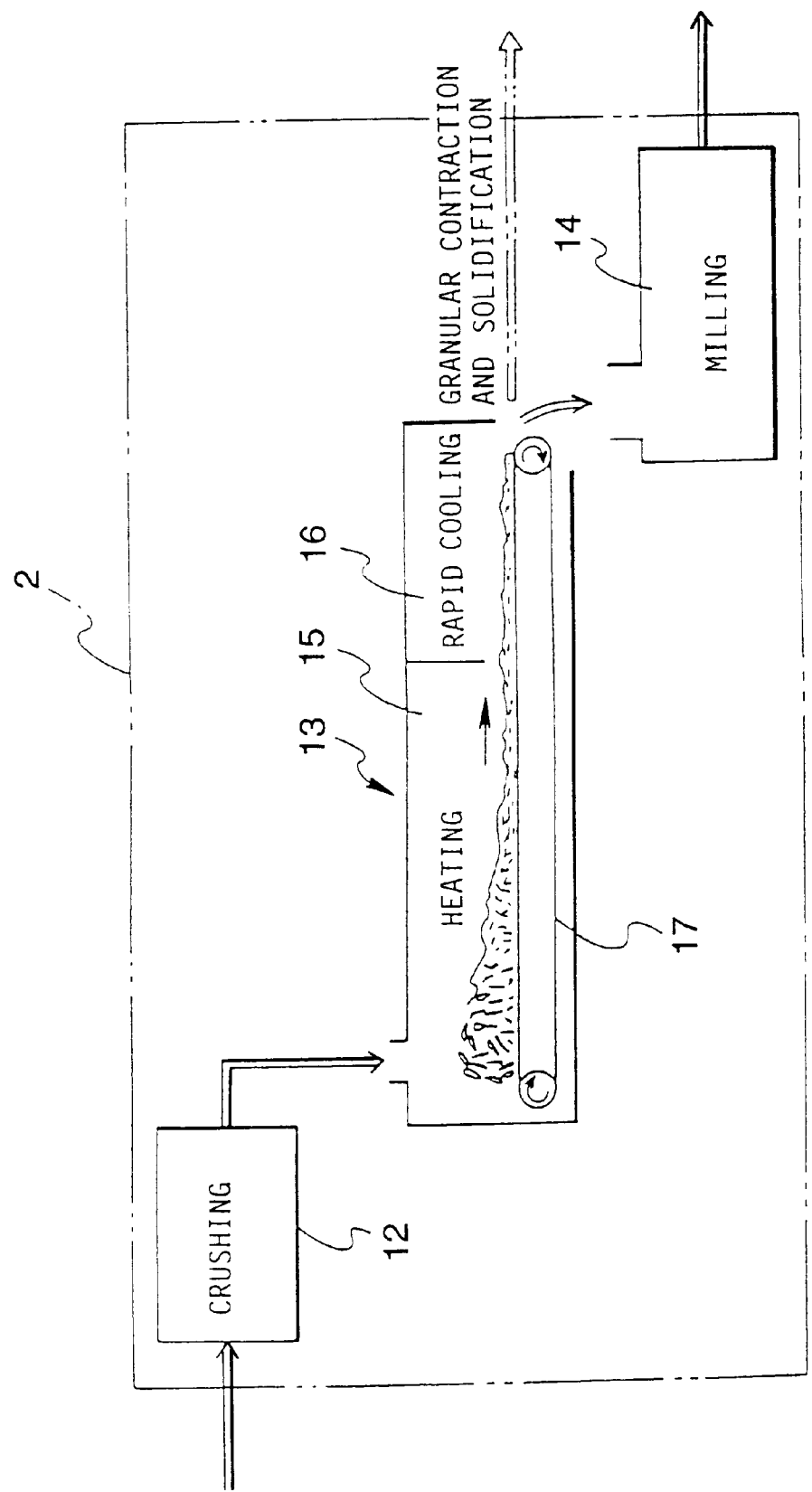
FIG. 2 is schematic diagram view illustrating a configuration of a method for causing contraction, solidification and granulation of synthetic resins (A)

FIG. 2 shows one structural example for continuously carrying out granular contraction and solidificaion or contraction and solidification-granulation by the method [2] described above. The synthetic resins (A) charged into the granulation and solidification equipment 2 are crushed by means of a crushing equipment 12 and then charged into a volume-reduction and solidification equipment 13. In this volume-reduction and solidification equipment 13, the synthetic resins (A) are carried into a heating chamber 15 and subsequently a cooling chamber 16 by means of a carrying device (carrier belt and the like). In the heating chamber 15, the synthetic resins become semi-molten by heating (gas heating, indirect gas heating or electric heating) and then rapidly cooled down in the cooling chamber 16 by spraying water to be contracted and solidified. In this case, the synthetic resins (A) can be contracted and solidified into a granular form by suitably selecting the crushing form of the synthetic resins (A) and the charging state thereof into the heating chamber, and therefore according to this method, the granular synthetic resin material (a) is obtained by contraction and solidification.

On the other hand, in a method in which a part or all of the synthetic resins is not contracted and solidified into a granular form, the contracted and solidified synthetic resins are charged into a milling equipment 14 from the volume-reduction solidification equipment 13 and milled into a granular form by means of this milling equipment, whereby the granular synthetic resin material (a) is obtained.

The granular synthetic resin material (a) obtained in the manners described above has been obtained by contracting and solidifying the crushed film-shaped synthetic resin materials into a granular in a semi-molten state, or milling the synthetic resin materials after contracting and solidifying them. Accordingly, it has a relatively porous property as compared with the crushed matters of the massive synthetic resin materials and has a large specific surface area. In addition, it does not have an angular form as is the case with the crushed matters of the massive synthetic resin materials and has a roundish form on the whole. Accordingly, it shows excellent combustibility and fluidity.

Figure 3:
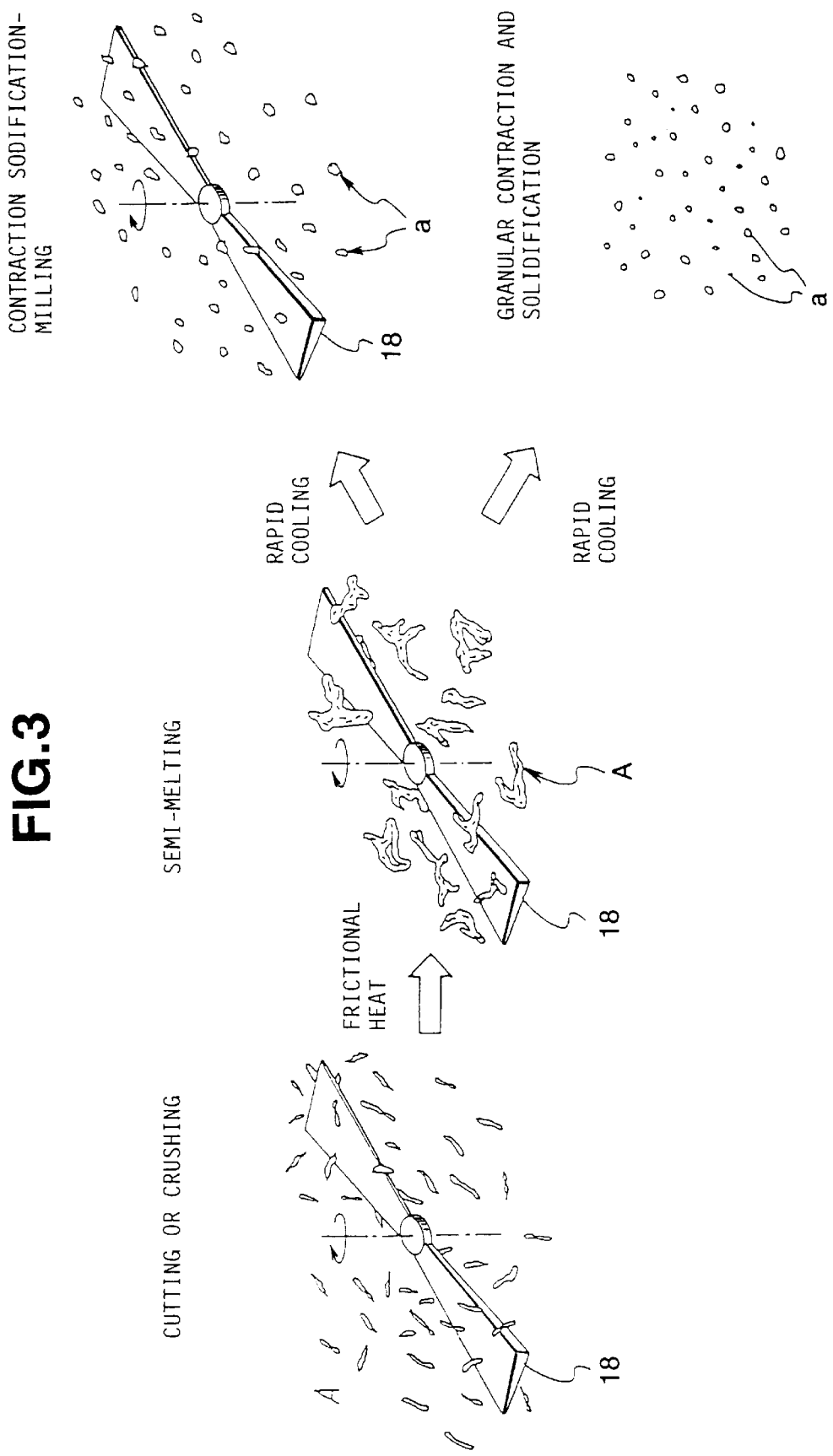
FIG. 3 is a schematic diagram view schematically illustrating the principle of another method for causing contraction, solidification and granulation of the synthetic resins (A)

FIG. 3 shows schematically the principle of granular contraction and solidification or contraction and solidification-granulation carried out by the method (3), wherein the synthetic resins (A) are cut or crushed by means of a rotary blade 18 which is rotated at a high rate, and the synthetic resin material is semi-molten by frictional heat generated by this cutting or crushing; then, this semi-molten synthetic resin material is contracted and solidified by rapidly cooling down from the temperatures described above by spraying water, wherein the semi-molten synthetic resin material is contracted and solidified into a granular form, or contracted and solidified and immediately crushed by means of the rotary blade 18 described above to thereby obtain the granular synthetic resin material (a). In this method, all of crushing (or cutting) of the synthetic resin materials, semi-melting and milling thereof (provided that milling is not required when the synthetic resin materials are contracted and solidified into a granular form by cooling) after contraction and solidification are carried out in a batch system by means of the rotary blade 18 rotating at a high rate. Accordingly, a series of processing steps of "crushing (or cutting)→semi-melting→granular contracting and solidifying by rapidly cooling" or "crushing (or cutting)→semi-melting→granular contracting and solidifying by rapidly cooling→milling" is quickly carried out for short time. In addition, the synthetic resin materials are semi-molten during crushing (cutting) by the rotary blade 18 and stirring at a high rate, and rapid cooling from such state is quickly carried out. Accordingly, the granular synthetic resin material (a) which is more preferred in terms of a specific surface area and a grain form is obtained. Further, crushing (or cutting), semi-melting and milling after contracting and solidifying are carried out only by the action of the rotary blade 18, and therefore this system is advantageous in terms of facility cost and operation cost.

Also in the method (3) described above, the synthetic resins (A) can be contracted and solidified into a granular form by suitably selecting the crushing form of the synthetic resins and the form of charging them against the rotary blade, and therefore according to this method, the granular synthetic resin material (a) which has been contracted and solidified can be obtained substantially without milling by means of the rotary blade after contraction and solidification. On the other hand, in a method in which apart or all of the synthetic resin material is not contracted and solidified into a granular form, the granular synthetic resin material (a) is obtained by milling by means of the rotary blade as described previously.

In the methods [2] and [3], temperatures for semi-melting the synthetic resins (A) are varied to some extent according to the kinds and the forms of the synthetic resins. From the viewpoint only of, for example, the materials, the temperatures reside in a level of 105 to 115° C. in the case of low density polyethylene and are about 128° C. in the case of medium low density polyethylene. Accordingly, the temperatures for semi-solidifying the synthetic resins (A) are suitably selected according to the kinds, the proportion and the forms of synthetic resin materials contained in the synthetic resins (A).

The granular synthetic resin material (a) thus obtained is sieved by means of a sieving equipment 3, and only grains having a prescribed grain diameter (for example, −6 mm) or less are sent to a storage silo 9 via a path 19. In this constitutional example, the path 19 is constituted by a pneumatically feeding pipe (in the drawing, 10 is an air blower), and the granular synthetic resin material (a) is pneumatically fed (pneumatic transportation, hereinafter the same shall apply) to the storage silo 9. On the other hand, the granular synthetic resin material having a grain diameter exceeding the prescribed grain diameter is returned to a carrying line present at the inlet side of the granulation and solidification equipment 2 via a path 20 (in the drawing, 10 is an air blower) which is a pneumatic feeding pipe and recharged into the granulation and solidification equipment 2 together with the synthetic resins (A). A position to which this coarsely granulated synthetic resin material is sent back is optional, and it can be sent back to respective positions (usually, a transporting line) such as, for example, between the granulation and solidification equipment 2 and the magnetic separator 4, and the inlet side of a crusher 1. In some case, it can be supplied as well to the processing line Y. When it is supplied to this processing line Y, it can be supplied to respective positions (usually, a transporting line) such as, for example, the inlet side of a primary crusher 5, between the primary crusher 5 and a secondary crusher 6, between the secondary crusher 6 and a classifier 7 and between the classifier 7 and a crusher 8. In addition to the above, the coarsely granulated synthetic resin material may be taken out of the system and charged directly into other steps (for example, charged into the tops of a blast furnace and a scrap melting furnace or charged directly into a coke oven and a sintering furnace).

On the other hand, in the processing line Y, the synthetic resins (B) are coarsely crushed (for example, crushed to a grain diameter of about 50 mm) by means of the primary crusher 5 and then charged into the secondary crusher 6 by conveyor carrying to be secondarily crushed (for example, crushed to a grain diameter of about 20 mm). The primarily crushed synthetic resins (B) are subjected to removal of iron scraps mixed therein by means of the magnetic separator 4 (an equipment for adsorbing iron scraps on a magnet to remove them) in the middle of the conveyor carrying described above.

The secondarily crushed synthetic resins (B) are charged into the classifier 7 by conveyor carrying, wherein foreign matters such as metals, earth and sand, and stones are separated and removed by a method such as wind classification. Then, they are sent to the crusher 8 (tertiary crusher) via a path 21a and crushed into a prescribed diameter (for example, −6 mm) or less, whereby the granular synthetic resin material (b) is obtained. This granular synthetic resin material (b) is sent to a storage silo 9 via a path 21b. In this constitutional example, the paths 21a, 21b are constituted by pneumatically feeding pipes (in the drawing, 10 is an air blower), and the granular synthetic resin material (b) is pneumatically fed into the storage silo 9.

The mixture of the granular synthetic resin materials (a) and (b) stored in the storage silo 9 is carried by a conveyor or pneumatically fed into a pneumatically feeding facility 11 comprising a blowing tank and the like and pneumatically fed into a furnace such as a blast furnace via this pneumatically feeding facility 11. Then, the mixture is blown into the furnace through the tuyere thereof.

In the constitutional example shown in FIG. 1, the magnetic separator 4 is provided each at one portion in the processing lines X and Y, respectively, but the magnetic separators 5 maybe disposed at plural portions in the respective processing lines X and Y.

The crushing systems of various crushing equipments (including the milling equipment 8) disposed in the processing lines X and Y are optional. In addition to a crushing system carried out only by conventional mechanical means, there can be applied as well, for example, a so-called freeze-crushing system in which matters to be processed are crushed in a frozen state.

Usually, auxiliary facilities such as a yard drying facility for synthetic resins carried in are provided at the inlet side of the processing facilities shown in FIG. 1.

As described previously, the amounts of the synthetic resins (A) comprising principally the film-shaped synthetic resin materials and the other synthetic resins (B) which are fed to the processing facilities are dispersed to some extent according to the lapse of time in certain cases due to the properties of wastes. In the case of limiting the time to a relatively short period (for example, several hours to some ten hours), only either one kind of the synthetic resins is supplied, and therefore it is possible that the synthetic resins processed and pneumatically fed into a furnace is tentatively limited only to either one of the synthetic resins (A)—the granular synthetic resin material (a) and the synthetic resins (B)—the granular synthetic resin material (b). Also, it is possible that only either one of the granular synthetic resin material (a) and the granular synthetic resin material (b) is pneumatically fed tentatively into the furnace because of reasons other than the above one. Further, the granular synthetic resin materials (a) and (b) can be stored in different silos to be pneumatically fed into the furnace via separate paths.

As described previously, the granular synthetic resin material (a) obtained by carrying out granular contraction and solidification or contraction and solidification-granulation has a relatively porous property and a large specific surface area. In addition thereto, since the granular synthetic resin material (a) has a roundish form on the whole, it shows excellent combustibility and fluidity, and the combustibility, the fluidity and the carrying property of the whole granular synthetic resin materials supplied to a furnace can effectively be raised by mixing the granular synthetic resin material (a) with the granular synthetic resin material (b). That is, with respect to the combustibility, when the mixture of the granular synthetic resin material (a) and the granular synthetic resin material (b) is blown into the furnace, the granular synthetic resin material (a) having a good combustibility burns rapidly to ignite quickly the granular synthetic resin material (b), and this increases markedly the combustibility of the whole granular synthetic resin materials blown into the furnace.

Further, also with respect to the fluidity and the carrying property, a lubricant function which enhances the fluidity of the whole granular synthetic resin materials is displayed by causing the granular synthetic resin material (a) which has a roundish form and is excellent in fluidity and carrying property to be contained in the granular synthetic resin materials. As a result thereof, the fluidity and the carrying property of the whole granular resin materials are improved to a large extent.

Figure 5:
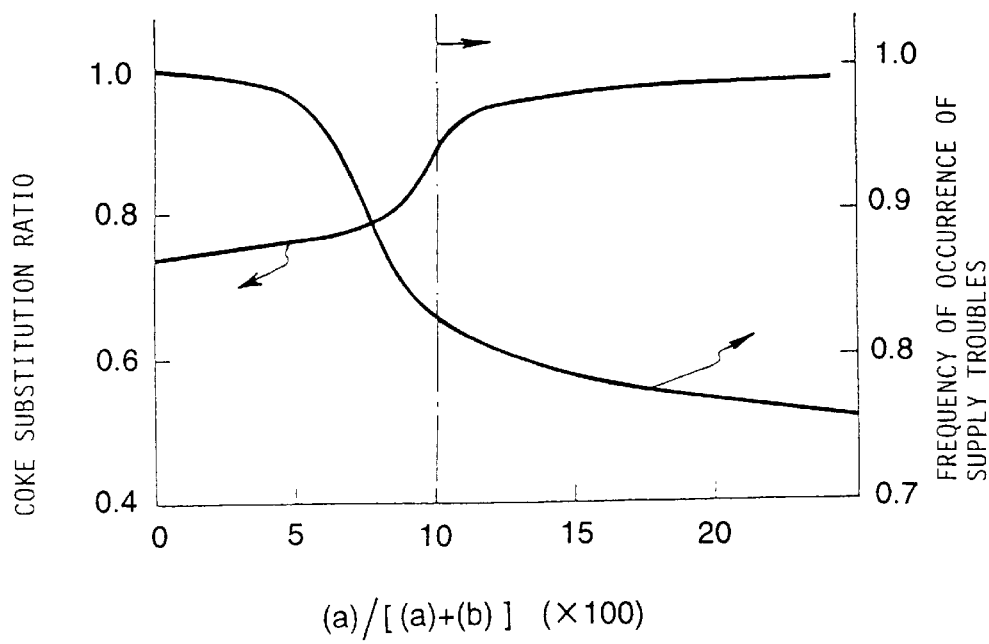
FIG. 5 is a graph comparing a granular synthetic resin material (a) obtained through contraction, solidification and granulation of a film-shaped synthetic resin material by a specific method and a granular synthetic resin material (b) obtained through a milling treatment of a lumpy synthetic resin a material, in terms of the mixing ratio, coke substitution ratio and frequency of occurrence of supply troubles.

In order to obtain the function described above, the granular synthetic resin material (a) is preferably mixed with the granular synthetic resin material (b) in a proportion (a)/[(a)+(b)] of 0.10 or more in terms of a weight ratio. FIG. 5 shows the relation of the weight ratio (a)/[(a)+(b)] with the carrying property (feeding trouble-generating frequency) and the combustibility (rate of substituting coke with blown fuel) of the mixture, wherein the granular synthetic resin material (a) having a grain diameter of 6 mm or less obtained by subjecting the film-shaped synthetic resin material to contraction and solidification-granulation processing by the method [3] is mixed with the granular synthetic resin material (b) (repose angle of both granular synthetic resin materials: 40°) having a grain diameter of 6 mm or less obtained by subjecting the massive synthetic resin material to milling processing in various ratios, and this mixture is pneumatically fed into the tuyere of a blast furnace and blown into the furnace. The feeding trouble-generating frequency and the rate of substituting coke with blown fuel have been determined in the following manners:

(i) Feeding Trouble-generating Frequency

A feeding trouble-generating frequency index observed when only the granular synthetic resin material (b) (repose angle: 40°) having a grain diameter of 6 mm or less obtained by subjecting the massive synthetic resin materials to milling processing is fed alone into the furnace is set at "1", and a feeding trouble-generating frequency compared with this case has been shown by an index. With respect to the presence of feeding trouble generation, a change in the weight of the granular resin materials in a storage silo is always watched, and when a state of no change in weight has been continued for prescribed time (for example, about 10 minutes), troubles (clogging caused at the exit of a silo and in the middle of a pneumatically feeding pipe) have been judged to be caused.

(ii) Coke Substitution Rate

Coke substitution rate=(ratio of coke reduced by blowing granular synthetic resin material)/(blown ratio of granular synthetic resin material)

wherein:

the ratio of coke reduced by blowing granular synthetic resin material: kg/t.pig, blown ratio of granular synthetic resin material: kg/t.pig.

It can be found from FIG. 5 that the excellent combustibility and carrying property are obtained in an area where the ratio (a)/[(a)+(b)] is 0.10 or more.

Figure 4:
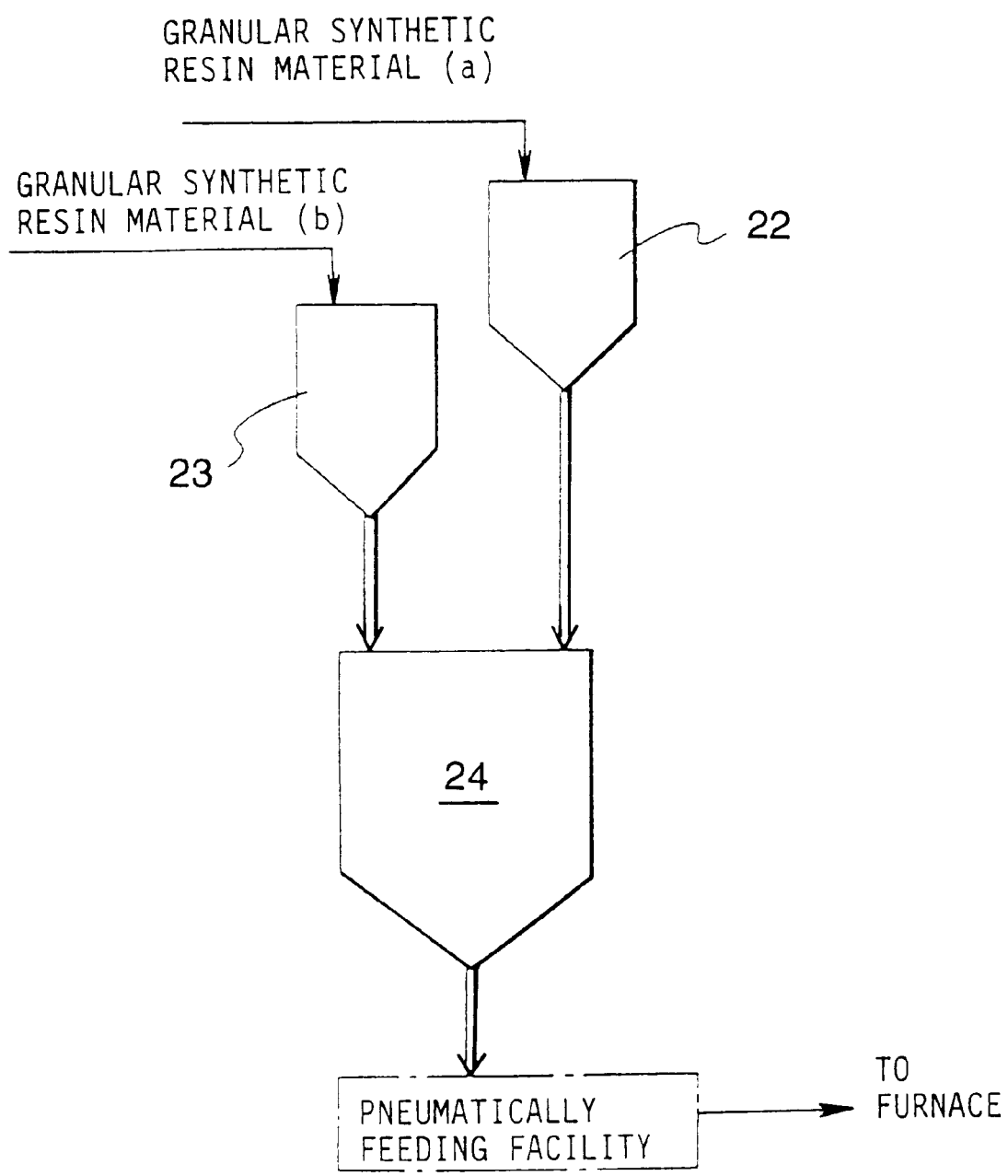
FIG. 4 is a schematic diagram view illustrating another configuration of the storage method of a granular synthetic resin material in the flowchart shown in FIG. 1.

As described above, in order to control the ratio (a)/[(a)+(b)] in a prescribed range, it is preferred to once store the granular synthetic resin material (a) and the granular synthetic resin material (b) in the respective storage silos and then blend them. A constitutional example of the storage silo therefor is shown in FIG. 4, wherein the granular synthetic resin material (a) and the granular synthetic resin material (b) are stored in respective primary storage silos 22, 23; and the granular synthetic resin material (a) and the granular synthetic resin material (b) are suitably delivered from these primary storage silos 22, 23 to a secondary storage silo 24 (corresponding to the storage silo 9 shown in FIG. 1) to store the granular synthetic resin materials having the controlled ratio (a)/[(a)+(b)] in the secondary storage silo 24.

In addition to the constitution described above, there may be taken a constitution in which the granular synthetic resin material (a) and the granular synthetic resin material (b) each stored in the primary storage silos 22, 23 are blended directly in the pneumatically feeding pipe line.

Further, the granular synthetic resin materials (a) and (b) are preferably processed into the resin materials having a bulk density of 0.30 or more and a repose angle of 40° or more. As described previously, it has been proposed in conventional techniques to set the bulk density of milled synthetic resin materials to 0.35 or more. In particular, there is the problem that an increase in the bulk density of milled massive synthetic resin materials increases (shortens the life of a crushing blade) a load in a crusher, and therefore some crushers give only crushed resin materials having a bulk density of less than 0.35. On the other hand, investigations made by the present inventors have made it clear that if the synthetic resin materials have a bulk density of 0.30 or more, problems including pressure loss shall not be caused in pneumatically feeding the granular synthetic resin materials, and the generation of troubles such as bridging (hanging) of the synthetic resin materials in the storage silos and clogging at a bent pipe part in a pneumatically feeding pipe line and in the circumference of valves is scarcely related to the bulk density of the granular synthetic resin materials and depends largely on the grain form of the granular synthetic resin materials and that an effect for suppressing the generation of the troubles described above based on this grain form is explainable by the repose angle of the granular synthetic resin materials.

Figure 6:
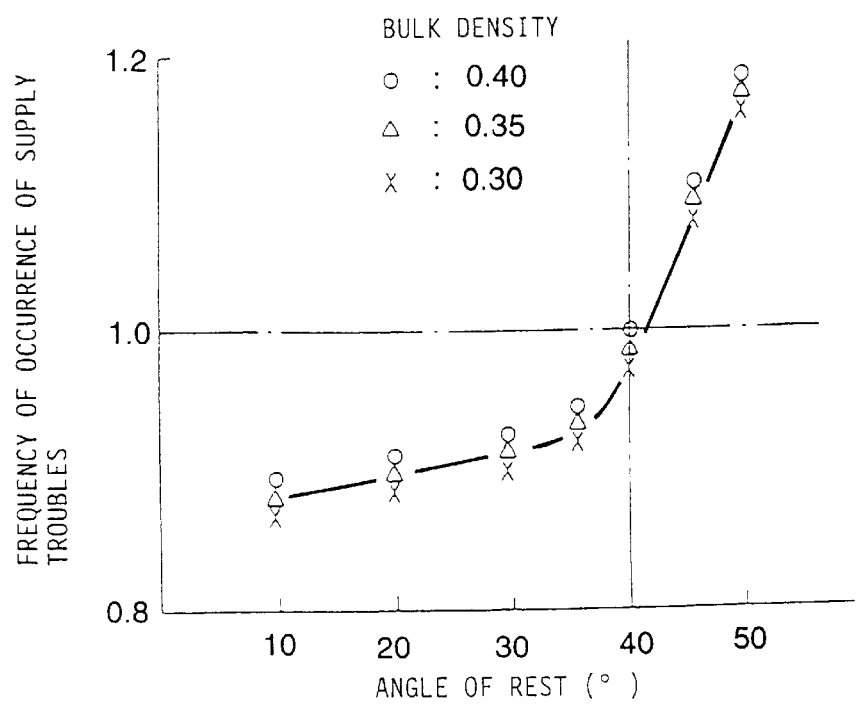
FIG. 6 is a graph the relationship between the angle of rest (repose angle) and the frequency of occurrence of supply troubles for a granular synthetic resin material obtained through a milling treatment of a lumpy synthetic resin material by different values of bulk density.

FIG. 6 shows the relation of the repose angles of the granular synthetic resin materials having grain diameters of 6 mm or less obtained by subjecting the massive synthetic resin materials to milling processing with a generating frequency of feeding troubles such as bridging (hanging) in the storage silos and clogging in the pneumatically feeding pipes by granular synthetic resin materials each having a different bulk density. The feeding trouble-generating frequency was evaluated in the same manner as in FIG. 5.

It can be found from FIG. 6 that such feeding troubles as described above can suitably be prevented by setting the repose angles to 40° C. or less regardless of the bulk density of the granular synthetic resin materials.

Further, it has been found that with respect to the granular synthetic resin materials obtained by carrying out granular contraction and solidification or contraction and solidification-granulation by the methods [2] and [3] out of the granular synthetic resin materials (a), the granular synthetic resin materials having a repose angle of 40° or less can be obtained only by carrying out granular contraction and solidification or contraction and solidification-granulation by the above methods. On the other hand, with respect to the granular synthetic resin material (a) obtained by carrying out volume-reduction and solidification-granulation by the method [1] described previously or the granular synthetic resin material (a) obtained by carrying out contraction and solidification-granulation by a method other than the methods [1] to [3] described previously, and the granular synthetic resin material (b) obtained by subjecting the synthetic resins (B) to crushing processing, crushing systems and the like are suitably selected in order to achieve the repose angle of 40° or less.

The grain diameters of the granular synthetic resin materials (a) and (b) obtained by processing in the present invention are set preferably to 10 mm or less, more preferably 4 to 8 mm from the viewpoint of the combustibility.

The fuel blowing method of the present invention can be applied to various furnaces including a blast furnace and a rotary kiln.

Targets for processing in the present invention are synthetic resins which are essentially wastes (including wastes as so-called dusts, and scraps and defectives coming out of factories in manufacturing and processing). Accordingly, synthetic resins which foreign matters (metals, paper, and other inorganic and organic matters) other than synthetic resins are adhered to or mixed in can be targeted. Specific examples of such waste synthetic resins include plastic bottles, plastic bags, plastic packagings, plastic films, plastic trays, plastic cups, magnetic cards, magnetic tapes, IC cards, flexible containers, printed circuit boards, printed sheets, cable-covering materials, bodies and frames for business equipment or home electric appliances, cosmetic plywoods, pipes, hoses, synthetic fibers and clothings, plastic molding pellets, urethane materials, packaging sheets, packaging bands, packaging cushion materials, electric parts, toys, stationeries, toners, car parts, (for example, interior products and bumpers), shredder dusts coming from automobiles and home electric appliances, ion exchange resins, synthetic papers, synthetic resin adhesives, synthetic resin paints, and solidified fuels (waste plastic volume-reduced matters).

It is a matter of course that among synthetic resins carried into processing facilities as wastes, synthetic resins which are already granular and therefore can pneumatically be fed into a furnace as they are (for example, ion exchange resins which are granular, synthetic resin pellets for molding, synthetic resin spheres for toys and the like) can be fed into a furnace in such a manner as charging into a storage silo as they are.

EXAMPLES

Example 1

The synthetic resins (A) comprising principally film-shaped synthetic resin materials and the synthetic resins (B) comprising principally massive synthetic resin materials were fed into a processing and blowing facility for synthetic resins shown in the flow chart of FIG. 1 in the proportions of 2.5 t/hr and 5 t/hr respectively to process them into the granular synthetic resin materials (a) and (b). After blending them in a storage silo, they were pneumatically fed into a blast furnace via a pneumatically feeding pipe line and blown into the furnace from the tuyere together with powdered coal. The processing and feeding conditions of the synthetic resins and the operating conditions of the blast furnace are shown below.

(i) Processing Conditions of the Synthetic Resins
(i-1) Synthetic Resins (A)

The synthetic resins were roughly crushed according to the flow chart of FIG. 1 and then subjected to contraction and solidification-granulation processing by the method [3] described previously to process them into the granular synthetic resin material (a) having a grain diameter of 6 mm or less, and this was transferred into a storage silo.

(i-2) Synthetic Resins (B)

The synthetic resins were subjected to primary crushing, secondary crushing and milling processing according to the flow chart of FIG. 1 to process them into the granular synthetic resin material (b) having a grain diameter of 6 mm or less, and this was transferred into the storage silo.

(ii) Conditions for Pneumatically Feeding the Granular Synthetic Resin Materials The mixture of the granular synthetic resin materials (a) and (b) charged into the storage silo was quantitatively delivered from the silo and transported to a pneumatically feeding facility. Then, the granular synthetic resin materials were pneumatically fed from the pneumatically feeding facility to the tuyere of a blast furnace in the following conditions and blown into the furnace.

| | |
|---|---|
| Pneumatically feeding gas: | air |
| Flow amount of pneumatically feeding gas blown: | 1300 Nm$^3$/hr |
| Blown amount of granular synthetic resin material: | 7.5 t/hr |
| Solid-gas ratio: | 4.5 kg/kg |
| (iii) Operating conditions of blast furnace | |
| Iron running amount: | 9000 t/day |
| Coke ratio: | 447 kg/t · pig |
| Tuyere: | |
| blown amount of granular synthetic resin materials: | 20 kg/t · pig |
| blown amount of powdered coal: | 100 kg/t · pig |
| blast amount: | 7260 Nm$^3$/minute |
| oxygen addition rate: | 4% |
| blast temperature: | 1000° C. |

The granular synthetic resin materials thus obtained were continued to be blown into the furnace for 7 days. As a result thereof, the blast furnace operation itself did not have any problems, and feeding problems such as clogging at the delivering part of the storage silo and in the pneumatically feeding pipe line were scarcely caused.

Example 2

Figure 7:
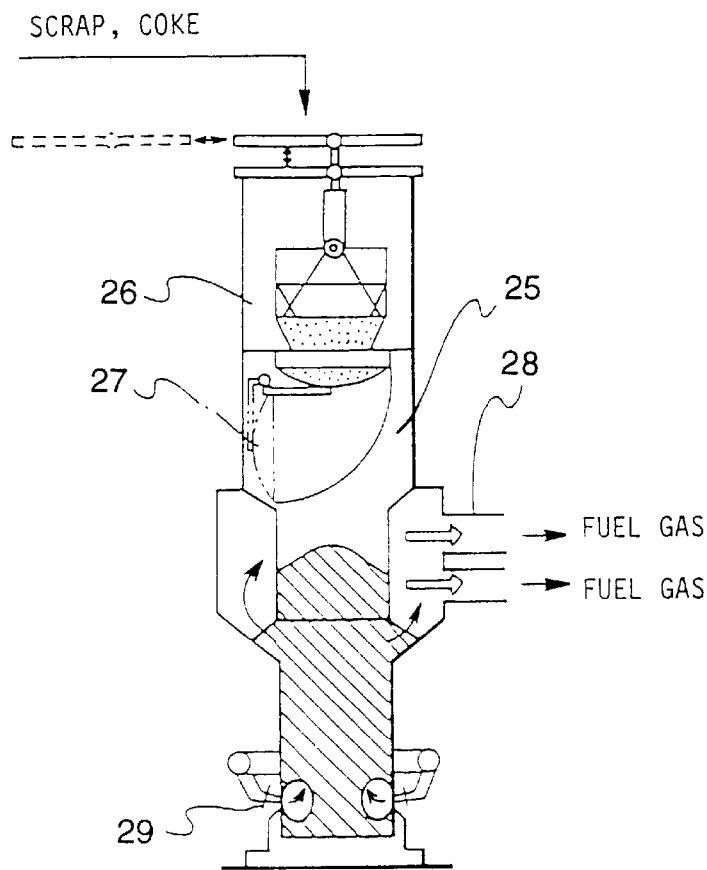
FIG. 7 is a schematic diagram view illustrating the construction of a scrap melting experimental furnace used in embodiments.
Figure 8:
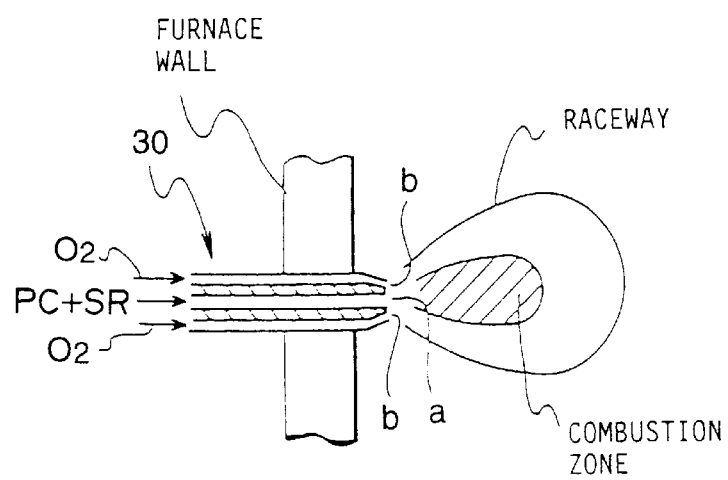
FIG. 8 is a schematic diagram view illustrating the construction of a combustion burner provided at a tuyere portion of the scrap melting experimental furnace of FIG. 7.
Figure 25:
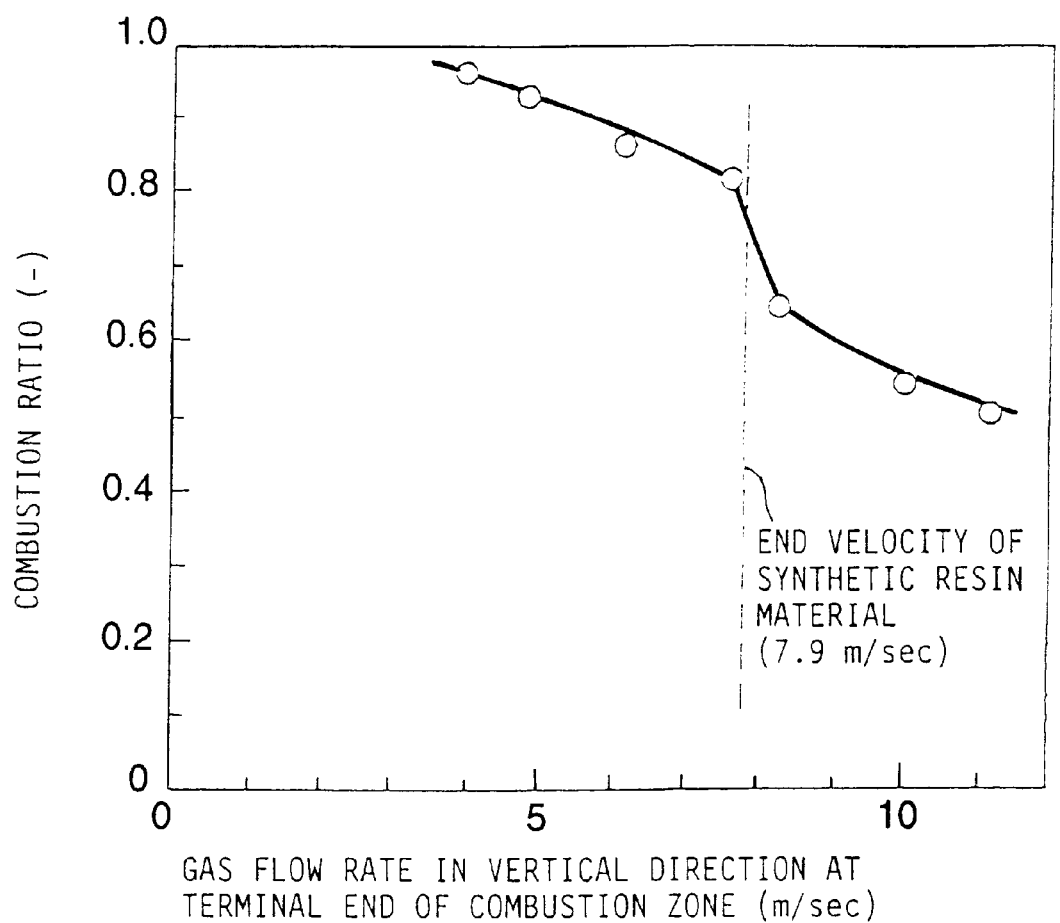
FIG. 25 is a graph illustrating the relationship between the vertical gas flow velocity at the terminal of the combustion zone and the degree of burn-up of the synthetic resin material in the case where the combustion experimental equipment shown in FIG. 23 is used.

The synthetic resins (A) comprising principally film-shaped synthetic resin materials and the synthetic resins (B) comprising principally massive synthetic resin materials were fed into a processing and blowing test facility for synthetic resins shown in the flow chart of FIG. 1 in the proportions of 14.6 kg/hr and 29.2 kg/hr respectively to process them into the granular synthetic resin materials (a) and (b). After blending them in the storage silo, they were pneumatically fed into a scrap-melting test furnace (vertical furnace) via the pneumatically feeding pipe line and blown into the furnace from the tuyere together with powdered coal. Used in this example was the scrap-melting test furnace (content volume: 2.5 m$^3$, pig iron production: 10 t/day) having combustion burners having a structure shown in FIG. 8 at plural tuyeres of the furnace casing shown in FIG. 7. In the furnace shown in FIG. 7 and FIG. 8, 25 is a top; 26 is a material-charging equipment; 27 is a shut-off equipment for the top; 28 is an exhaust gas duct; 29 is a tuyere part; and 30 is a combustion burner disposed at the tuyere part. Powdered coal PC and the granular synthetic resin materials SR were blown into the furnace from a solid fuel-blowing part a in the center of a burner diameter direction or the circumference thereof at the tuyere part 30, and oxygen of room temperatures was blown into the furnace from an oxygen-blowing part b in the circumference thereof. Steam was blown together as a coolant for controlling combustion temperatures.

The processing and feeding conditions of the synthetic resins and the operating conditions of the scrap-melting test furnace are shown below.
(i) Processing Conditions of the Synthetic Resins Same as in Example 1.
(ii) Conditions for Pneumatically Feeding the Granular Synthetic Resin Materials The mixture of the granular synthetic resin materials (a) and (b) charged into the storage silo was quantitatively delivered from the silo and transported to the pneumatically feeding facility. Then, the granular synthetic resin materials were pneumatically fed from the pneumatically feeding facility to the tuyere of the blast furnace in the following conditions and blown into the furnace.

| | |
|---|---|
| Pneumatically feeding gas: | air |
| Flow amount of pneumatically feeding gas blown: | 7.6 Nm$^3$/hr |
| Blown amount of granular synthetic resin material: | 43.8 kg/hr |
| Solid-gas ratio: | 4.5 kg/kg |
| (iii) Operating conditions of scrap-melting test furnace | |
| Iron running amount: | 10 t/day |
| Coke ratio: | 265 kg/t · pig |
| Converter slag ratio: | 121 kg/t · pig |
| Silica rock ratio: | 5 kg/t · pig |
| Tuyere: | |
| blown amount of granular synthetic resin materials: | 105 kg/t · pig |
| blown amount of powdered coal: | 175 kg/t · pig |
| blast oxygen amount: | 206 Nm$^3$/t · pig |
| steam amount: | 7 Nm$^3$/t · pig |

The granular synthetic resin materials thus obtained were continued to be blown into the furnace for 7 days. As a result thereof, the operation itself of the scrap-melting test furnace did not have any problems, and feeding problems such as clogging at the delivering part of the storage silo and in the pneumatically feeding pipe line were scarcely caused.

Example 3

The synthetic resins (A) comprising principally film-shaped synthetic resin materials and the synthetic resins (B) comprising principally massive synthetic resin materials were fed respectively into the processing and blowing facility for synthetic resins shown in the flow chart of FIG. 1 in the conditions of Operational examples 1 to 10 shown in Table 1, Table 3 and Table 5 to process them into the granular synthetic resin materials (a) and (b), respectively. As shown in Table 1, Table 3 and Table 5, contained in the processed synthetic resin materials were polyethylene terephthalate (PET), ABS resins and vinyl chloride resins (PVC) in addition to thermoplastic resins such as polyethylene and polypropylene. Further contained therein as other resins were urethane resins, thermosetting resins such as phenol resins, resins containing plasticizers such as diethyl phthalate, flame retardants such as trimethyl phosphate and 2,3-dibromopropyl, glass fibers, calcium carbonate, alumina and clay, and other various additives. Further, earth and sand adhered to the synthetic resins were contained therein as inorganic matters. The processing conditions of the synthetic resins are the same as in Example 1.

After the granular synthetic resin materials (a) and (b) obtained after processing were mixed in the storage silo, they were pneumatically fed to the tuyere part of the blast furnace through the pneumatically feeding pipe line and blown into the furnace through a waste plastic-blowing lance (25 mm Φ). The pneumatically feeding conditions of the granular synthetic resin materials are shown below. The properties of the synthetic resins processed and fed into the furnace in respective Operational examples 1 to 10 are shown in Table 1, Table 3 and Table 5.

| | |
|---|---|
| Pneumatically feeding gas: | air |
| Flow amount of pneumatically feeding gas blown: | 650 to 2600 Nm$^3$/hr |
| Blown amount of granular synthetic resin materials: | 3.75 to 15.0 t/hr |
| Solid-gas ratio: | 4.5 kg/kg |

Operational Examples 1 to 4

The synthetic resins (A) comprising principally film-shaped synthetic resin materials and the synthetic resins (B) comprising principally massive synthetic resin materials were fed into the processing and blowing facility for synthetic resins in the proportions of 2.5 t/hr and 5.0 t/hr respectively in the conditions shown in Table 1 to process them into the granular synthetic resin materials (a) and (b). After blending them in a reservoir silo, they were pneumatically fed into the blast furnace and blown into the furnace (pneumatically feeding gas-blown amount: 1300 Nm$^3$/hr). The operating conditions of the blast furnace are shown in Table 2.

The granular synthetic resin materials thus obtained were continued to be blown into the furnace for 7 days. As a result thereof, blast furnace operation itself did not have any problems, and feeding problems such as clogging at the delivering part of the storage silo and in the pneumatically feeding pipe line were scarcely caused.

Operational Example 5

The synthetic resins (A) comprising principally film-shaped synthetic resin materials and the synthetic resins (B) comprising principally massive synthetic resin materials were fed into the processing and blowing facility for synthetic resins in the proportions of 1.5 t/hr and 6.0 t/hr respectively in the conditions shown in Table 3 to process them into the granular synthetic resin materials (a) and (b). After blending them in the storage silo, they were pneumatically fed into the blast furnace and blown into the furnace (pneumatically feeding gas-blown amount: 1300 Nm$^3$/hr). The operating conditions of the blast furnace are shown in Table 4.

The granular synthetic resin materials thus obtained were continued to be blown into the furnace for 7 days. As a result thereof, blast furnace operation itself did not have any problems, and feeding problems such as clogging at the delivering part of the storage silo and in the pneumatically feeding pipe line were scarcely caused.

Operational Example 6

The synthetic resins (A) comprising principally film-shaped synthetic resin materials and the synthetic resins (B) comprising principally massive synthetic resin materials were fed into the processing and blowing facility for synthetic resins in the proportions of 3.0 t/hr and 4.5 t/hr respectively in the conditions shown in Table 3 to process them into the granular synthetic resin materials (a) and (b). After blending them in the storage silo, they were pneumatically fed into the blast furnace and blown into the furnace (pneumatically feeding gas-blown amount: 1300 Nm$^3$/hr). The operating conditions of the blast furnace are shown in Table 4.

The granular synthetic resin materials thus obtained were continued to be blown into the furnace for 7 days. As a result thereof, blast furnace operation itself did not have problems at all, and feeding troubles such as clogging at the delivering part of the storage silo and in the pneumatically feeding pipe line were scarcely caused.

Operational Example 7

The synthetic resins (A) comprising principally film-shaped synthetic resin materials and the synthetic resins (B) comprising principally massive synthetic resin materials were fed into the processing and blowing facility for synthetic resins in the proportions of 5.0 t/hr and 2.5 t/hr respectively in the conditions shown in Table 3 to process them into the granular synthetic resin materials (a) and (b). Afterblending them in the storage silo, they were pneumatically fed into a blast furnace and blown into the furnace (pneumatically feeding gas-blown amount: 1300 Nm$^3$/hr). The operating conditions of the blast furnace are shown in Table 4.

The granular synthetic resin materials thus obtained were continued to be blown into the furnace for 7 days. As a result thereof, blast furnace operation itself did not have any problems, and feeding troubles such as clogging at the delivering part of the storage silo and in the pneumatically feeding pipe line were scarcely caused.

Operational Example 8

The synthetic resins (A) comprising principally film-shaped synthetic resin materials and the synthetic resins (B) comprising principally massive synthetic resin materials were fed into the processing and blowing facility for synthetic resins in the proportions of 1.50 t/hr and 2.25 t/hr respectively in the conditions shown in Table 5 to process them into the granular synthetic resin materials (a) and (b). After blending them in the storage silo, they were pneumatically fed into the blast furnace and blown into the furnace (pneumatically feeding gas-blown amount: 650 Nm$^3$/hr). The operating conditions of the blast furnace are shown in Table 6.

The granular synthetic resin materials thus obtained were continued to be blown into the furnace for 7 days. As a result thereof, blast furnace operation itself did not have any problems, and feeding problems such as clogging at the delivering part of the storage silo and in the pneumatically feeding pipe line were scarcely caused.

Operational Example 9

The synthetic resins (A) comprising principally film-shaped synthetic resin materials and the synthetic resins (B) comprising principally massive synthetic resin materials were fed into the processing and blowing facility for synthetic resins in the proportions of 4.50 t/hr and 6.75 t/hr respectively in the conditions shown in Table 5 to process them into the granular synthetic resin materials (a) and (b). After blending them in the storage silo, they were pneumatically fed into the blast furnace and blown into the furnace (pneumatically feeding gas-blown amount: 1930 Nm$^3$/hr). The operating conditions of the blast furnace are shown in Table 6.

The granular synthetic resin materials thus obtained were continued to be blown into the furnace for 7 days. As a result thereof, blast furnace operation itself did not have troubles at all, and feeding troubles such as clogging at the delivering part of the storage silo and in the pneumatically feeding pipe line were scarcely caused.

Operational Example 10

The synthetic resins (A) comprising principally film-shaped synthetic resin materials and the synthetic resins (B) comprising principally massive synthetic resin materials were fed into the processing and blowing facility for synthetic resins in the proportions of 5.5 t/hr and 9.5 t/hr respectively in the conditions shown in Table 5 to process them into the granular synthetic resin materials (a) and (b). After blending them in the storage silo, they were pneumatically fed into a blast furnace and blown into the furnace (pneumatically feeding gas-blown amount: 2600 Nm$^3$/hr). The operating conditions of the blast furnace are shown in Table 6.

The granular synthetic resin materials thus obtained were continued to be blown into the furnace for 7 days. As a result thereof, blast furnace operation itself did not have problems, and feeding problems such as clogging at the delivering part of the storage silo and in the pneumatically feeding pipe line were scarcely caused.

TABLE 1

| | OPERATIONAL EXAMPLE 1 | | OPERATIONAL EXAMPLE 2 | | OPERATIONAL EXAMPLE 3 | | OPERATIONAL EXAMPLE 4 | |
|---|---|---|---|---|---|---|---|---|
| | FILM-SHAPED *1 | LUMPY *2 | FILM-SHAPED *1 | LUMPY *2 | FILM-SHAPED *1 | LUMPY *2 | FILM-SHAPED *1 | LUMPY *2 |
| Properties (%) | | | | | | | | |
| Polyethylene | 71.00 | 92.00 | 76.00 | 53.50 | 65.00 | 29.00 | 51.00 | 33.00 |
| Polypropylene | 24.00 | 4.50 | 11.00 | 26.00 | 28.00 | 28.00 | 32.00 | 23.00 |
| Polystyrene | 5.00 | 0.50 | 7.00 | 13.00 | 3.00 | 31.50 | 11.00 | 23.00 |
| PET | 0.00 | 0.00 | 2.00 | 2.00 | 3.00 | 1.50 | 0.00 | 1.50 |
| ABS | 0.00 | 0.00 | 1.00 | 1.00 | 0.00 | 0.00 | 0.00 | 1.50 |
| PVC | 0.00 | 0.00 | 3.00 | 0.00 | 0.00 | 1.50 | 1.00 | 2.50 |
| Other resins | 0.00 | 0.00 | 0.00 | 0.00 | 1.00 | 4.00 | 2.00 | 9.50 |
| Inorganic | 0.00 | 3.00 | 0.00 | 4.50 | 0.00 | 4.50 | 3.00 | 6.00 |
| Heat value of synthetic resin material charged into furnace (kcal/kg) | 10697 | | 10215 | | 9924 | | 9565 | |

*1 Synthetic resins mainly comprising film-shaped synthetic resins supplied (A)
*2 Synthetic resins mainly comprising lumpy synthetic resins supplied (B)

TABLE 2

| | Operational ex. 1 | Operational ex. 2 | Operational ex. 3 | Operational ex. 4 |
|---|---|---|---|---|
| Iron production (t/day) | 9000 | 9000 | 9000 | 9000 |
| Blast temp. (° C.) | 1000 | 1000 | 1000 | 1000 |
| Blast volume (Nm³/t · pig) | 1075 | 1075 | 1075 | 1074 |
| Coke rate (kg/t · pig) | 395 | 396 | 396 | 399 |
| Grained coal ratio (kg/t · pig) | 100 | 100 | 100 | 100 |
| Synthetic resin ratio (kg/t · pig) | 20 | 20 | 20 | 20 |

TABLE 3

| | OPERATIONAL EXAMPLE 5 | | OPERATIONAL EXAMPLE 6 | | OPERATIONAL EXAMPLE 7 | |
|---|---|---|---|---|---|---|
| | FILM-SHAPED *1 | LUMPY *2 | FILM-SHAPED *1 | LUMPY *2 | FILM-SHAPED *1 | LUMPY *2 |
| Properties (%) | | | | | | |
| Polyethylene | 71.00 | 71.00 | 66.50 | 45.67 | 47.00 | 48.50 |
| Polypropylene | 24.00 | 14.00 | 13.00 | 29.67 | 28.00 | 23.50 |
| Polystyrene | 5.00 | 5.00 | 8.00 | 13.00 | 18.00 | 16.50 |
| PET | 0.00 | 0.00 | 1.00 | 3.67 | 3.00 | 1.50 |
| ABS | 0.00 | 0.00 | 1.00 | 1.00 | 0.00 | 0.00 |
| PVC | 0.00 | 2.50 | 2.50 | 0.00 | 1.00 | 2.50 |
| Other resins | 0.00 | 2.50 | 5.00 | 3.33 | 3.00 | 3.00 |
| Inorganic | 0.00 | 5.00 | 2.00 | 3.67 | 0.00 | 4.50 |
| Heat Value of synthetic resin material charged into furnace (kcal/kg) | 10194 | | 9990 | | 9941 | |

*1: Synthetic resins mainly comprising film-shaped synthetic resins supplied (A)
*2: Synthetic resins mainly comprising lumpy synthetic resins supplied (B)

TABLE 4

| | Operational ex. 5 | Operational ex. 6 | Operational ex. 7 |
|---|---|---|---|
| Iron production (t/day) | 9000 | 9000 | 9000 |
| Blast temp. (° C.) | 950 | 950 | 925 |
| Blast volume (Nm³/t · pig) | 1104 | 1104 | 1120 |
| Coke rate (kg/t · pig) | 403 | 405 | 409 |
| Grained coal ratio (kg/t · pig) | 100 | 100 | 100 |
| Synthetic resin ratio (kg/t · pig) | 20 | 20 | 20 |

TABLE 5

|  | OPERATIONAL EXAMPLE 8 | | OPERATIONAL EXAMPLE 9 | | OPERATIONAL EXAMPLE 10 | |
| --- | --- | --- | --- | --- | --- | --- |
|  | FILM-SHAPED *1 | LUMPY *2 | FILM-SHAPED *1 | LUMPY *2 | FILM-SHAPED *1 | LUMPY *2 |
| Properties (%) | | | | | | |
| Polyethylene | 66.00 | 71.00 | 62.00 | 43.67 | 41.50 | 45.45 |
| Polypropylene | 24.00 | 14.00 | 13.00 | 26.33 | 26.50 | 19.39 |
| Polystyrene | 8.00 | 4.67 | 8.00 | 13.00 | 18.00 | 16.42 |
| PET | 0.00 | 0.00 | 4.20 | 2.20 | 3.60 | 4.23 |
| ABS | 0.00 | 0.00 | 1.00 | 1.00 | 0.00 | 3.16 |
| PVC | 1.00 | 1.00 | 2.50 | 3.33 | 2.50 | 1.71 |
| Other resins | 1.00 | 2.67 | 7.30 | 5.13 | 6.40 | 1.03 |
| Inorganic | 0.00 | 6.67 | 2.00 | 5.33 | 1.50 | 8.61 |
| Heat value of synthetic resin material charged into furnace (kcal/kg) | 10238 | | 9674 | | 9480 | |

*1: Synthetic resins mainly comprising film-shaped synthetic resins supplied (A)
*2: Synthetic resins mainly comprising lumpy synthetic resins supplied (B)

TABLE 6

|  | Operational ex. 8 | Operational ex. 9 | Operational ex. 10 |
| --- | --- | --- | --- |
| Iron production (t/day) | 9000 | 9000 | 9000 |
| Blast temp. (° C.) | 1000 | 1000 | 1000 |
| Blast volume (Nm³/t pig) | 1071 | 1077 | 1080 |
| Coke rate (kg/t · pig) | 408 | 388 | 378 |
| Grained coal ratio (kg/t · pig) | 100 | 100 | 100 |
| Synthetic resin ratio (kg/t · pig) | 10 | 30 | 40 |

Example 4

Magnetic cards (including cards using paper as a laminated material and cards having a built-in IC) were fed into the processing and blowing facility for synthetic resins shown in the flow chart of FIG. 1 and processed. Then, they were pneumatically supplied to a blast furnace and blown into the furnace.

Magnetic cards are used for various purposes and classified roughly into the following two kinds depending on the thicknesses:

(1) thickness of 0.5 mm or more: cash cards, various certification cards and the like, and (2) thickness of less than 0.5 mm: telephone cards, tickets, various pre-paid cards and the like.

After investigation by advance tests, it was found that with respect to the magnetic cards described above, since the mere crushing of the cards having a thickness of less than 0.5 mm produces scale-shaped small flakes, and the small flakes are adhered so closely that vacancy gets lost when pressurized in a tank of a pneumatically feeding pipe line, lubrication between the crushed flakes is lost and that aeration is deteriorated, and therefore feeding problems such as hanging are liable to be caused. Accordingly, in the present invention, the preceding cards (2) having a thickness of less than 0.5 mm were classified into the synthetic resins (A) comprising principally film-shaped synthetic resin materials, and the preceding cards (1) having a thickness of 0.5 mm or more were classified into the synthetic resins (B) comprising principally massive synthetic resin materials, respectively. Then, they were processed into the granular synthetic resin materials (a) and (b) respectively in the processing and blowing facility for synthetic resins shown in the flow chart of FIG. 1.

After the granular synthetic resin materials (a) and (b) obtained after processing were mixed in the storage silo, they were pneumatically fed to the tuyere part of the blast furnace through the pneumatically feeding pipe line and blown into the furnace through the waste plastic-blowing lance (25 mm Φ).

The processing and pneumatically feeding conditions of the synthetic resins and the operating conditions of the blast furnace are shown below.

(i) Processing Conditions of the Synthetic Resins Same as in Example 1.

(ii) Conditions for Pneumatically Feeding the Granular Synthetic Resin Materials The mixture of the granular synthetic resin materials (a) and (b) charged into the storage silo was quantitatively delivered from the silo and transported to the pneumatically feeding facility. Then, the granular synthetic resin materials were pneumatically fed from the pneumatically feeding facility to the tuyere of the blast furnace in the following conditions and blown into the furnace.

| | |
| --- | --- |
| Pneumatically feeding gas: | air |
| Flow amount of pneumatically feeding gas blown: | 1200 Nm³/hr |
| Blown amount of granular synthetic resin material: | 62.5 kg/min |
| Solid-gas ratio: | 2.4 kg/kg |
| (iii) Operating conditions of blast furnace | |
| Iron running amount: | 9000 t/day |
| Blast amount: | 7260 Nm³/minute |
| Oxygen addition rate: | 4% |
| Blast temperature: | 1200° C. |
| Coke ratio: | 447 kg/t · pig |
| Blown amount of powdered coal: | 100 kg/t · pig |
| Blown amount of granular synthetic resin materials: | 10 kg/t · pig |

The granular synthetic resin materials thus obtained were continued to be blown into the furnace for 2 days. As a result thereof, blast furnace operation itself did not have any problems, and feeding problems such as clogging at the delivering part of the storage silo and in the pneumatically feeding pipe line were scarcely caused.

Example 5

Only polyethylene terephthalate resin (PET) bottle containers were selected from plastic bottle containers recovered as wastes. They were processed and pneumatically fed to the blast furnace to be blown into the furnace. The PET bottles were selected by means of a commercial material discriminating apparatus (manufactured by Toa Denpa Ind. Co., Ltd.) or manual operation.

In Operational example 1, PET bottles were fed only to the processing line Y of the processing and blowing facility for synthetic resins shown in the flow chart of FIG. 1, and all of them were crushed into granular synthetic resins having a diameter of 6 mm or less as caps and labels were adhered (metal caps were removed by means of a magnetic separator after crushing). Then, the granular resins were pneumatically fed to the blast furnace and blown into the furnace.

In Operational example 2, PET bottles were fed only to the processing line X of the processing and blowing facility for synthetic resins shown in the flow chart of FIG. 1 and processed into granular synthetic resin materials having a diameter of 6 mm or less as caps and labels were adhered (metal caps were removed by means of a magnetic separator after roughly crushing). Then, the granular resin materials were pneumatically fed to the blast furnace and blown into the furnace.

The processing and pneumatically feeding conditions of the synthetic resins in Operational example 1 and Operational example 2 described above and the operating conditions of the blast furnace are shown below.

(i) Processing Conditions of the Synthetic Resins

Operational example 1: same as (i-2) in Example 1

Operational example 2: same as (i-2) in Example 1

(ii) Conditions for Pneumatically Feeding the Granular Synthetic Resin Materials In each of Operational example 1 and Operational example 2, the granular synthetic resin materials charged into the storage silo were quantitatively delivered from the silo and transported to the pneumatically feeding facility. Then, the granular synthetic resin materials were pneumatically fed from the pneumatically feeding facility to the tuyere of a blast furnace in the following conditions and blown into the furnace.

| | |
|---|---|
| Pneumatically feeding gas: | air |
| Blown amount of pneumatically feeding gas: | 1200 Nm³/hr |
| Blown amount of granular synthetic resin materials: | 62.5 kg/hr |
| Solid-gas ratio: | 2.4 kg/kg |
| (iii) Operating conditions of blast furnace | |
| Iron running amount: | 9000 t/day |
| Blast amount: | 7260 Nm³/minute |
| Oxygen addition rate: | 4% |
| Blast temperature: | 1200° C. |
| Coke ratio: | 447 kg/t · pig |
| Blown amount of powdered coal: | 100 kg/t · pig |
| Blown amount of granular synthetic resin materials: | 10 kg/t · pig |

The operation described above was continued for 2 days. As a result thereof, the amount of the granular synthetic resin materials blown into the blast furnace was not stabilized (the blown amount was pulsed) in Operational example 1, and the stopping time of blowing the granular synthetic resin materials into the blast furnace reached up to 4.6 hr/day. As a result of investigations, it became clear that the inferior delivery of the granular synthetic resin materials from the tank in the pneumatically feeding pipe line caused this instabilization of the blown amount, to be specific, since the crushed pieces (scale-shaped small flakes) themselves of the granular synthetic resin materials were adhered closely to cause vacancy to get lost when applying pressure in the tank of the pneumatically feeding pipe line, lubrication between the crushed pieces got lost, and aeration was deteriorated as well and that this brought about feeding problems such as hanging.

On the other hand, feeding problems of the granular synthetic resin materials were not caused at all in Operational example 2 as was the case with Operational example 1, and the operation itself of the blast furnace did not have any problems.

According to the fuel blowing method of the present invention described above, synthetic resins such as plastics can be fed as fuel blown into furnaces such as a blast furnace and a scrap-melting furnace regardless of the forms thereof, and therefore synthetic resins which are wastes can be disposed in large quantities and utilized effectively. The fuel cost of furnaces such as a blast furnace can be reduced as well to a large extent. Further, the fluidity, the carrying property and the combustibility of the synthetic resins fed into furnaces can effectively be enhanced, and the synthetic resin materials can suitably be fed into furnaces as fuels without bringing about troubles on the operation of the furnaces in a blast furnace and a scrap-melting furnace.

Embodiment 2

Based on the preceding knowledge that the presence of film-shaped synthetic resin materials mixed in waste synthetic resins makes it substantially impossible to make use of synthetic resins as furnace fuel, the fuel blowing method of the present invention is characterized fundamentally by accepting synthetic resins to be used for fuel into the respective processing lines in the state that the synthetic resins are classified into synthetic resins comprising principally film-shaped synthetic resins and other synthetic resins, processing them into granular matters suited to pneumatically feeding solid fuel by each different step and pneumatically feeding these processed granular synthetic resins into a furnace.

In particular, with respect to film-shaped synthetic resins, there have been obtained the knowledges that when they are processed by a specific method, granular synthetic resin materials which are very excellent in fluidity, carrying property and combustibility are obtained and that blending such granular synthetic resin materials with pulverized matters such as massive synthetic resin materials can enhance notably the fluidity, the carrying property and the combustibility of the whole synthetic resin materials, and a fuel blowing method constituted on the basis of these knowledges is another characteristic of the present invention.

Further, particularly from the viewpoint of securing the dischargeability of granular synthetic resin materials from a storage silo and the carrying property thereof in a pneumatically feeding pipe at high levels, it has been found that it is essential to cause the repose angle of the granular synthetic resin materials to fall in a range of a specific value, and a fuel blowing method constituted on the basis of such knowledge is still another characteristic of the present invention.

Figure 9:
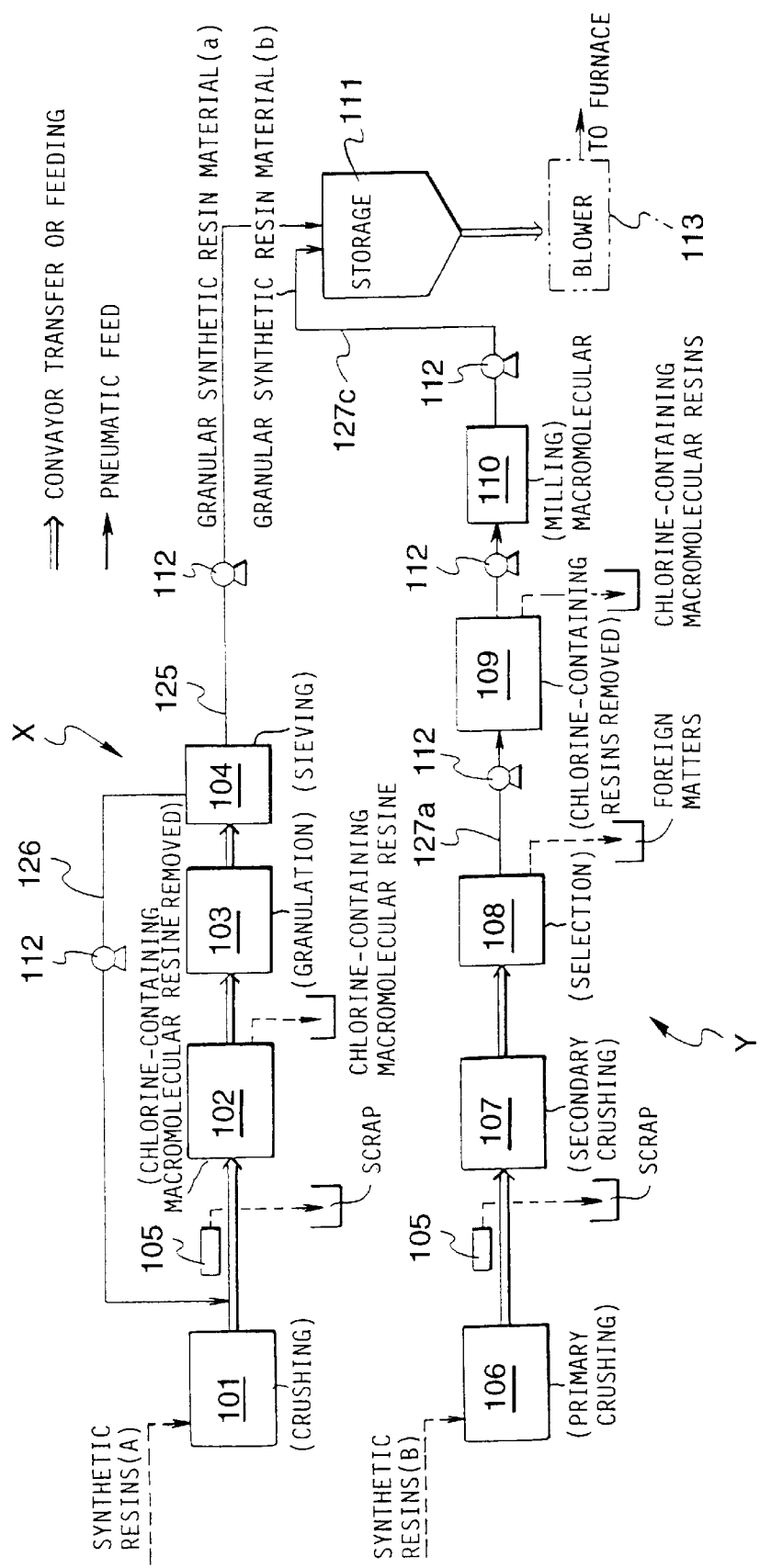
FIG. 9 is a flowchart illustrating an embodiment of the fuel blowing method of the present invention.

FIG. 9 is a flow chart showing one example of the fuel blowing method of the present invention, and the present invention shall be explained below based on this flow chart.

In the present invention, synthetic resins to be used for fuel are accepted into the respective processing lines in the state that the synthetic resins are classified into synthetic resins (A) comprising principally film-shaped synthetic resins and other synthetic resins (B) (that is, comprising principally massive synthetic resin materials). In this connection, synthetic resin materials of other forms which are inferior in fluidity and carrying property, for example, foamed plastics, as well as the film-shaped synthetic resin materials can be contained in the synthetic resins (A).

The film-shaped synthetic resin materials shall not specifically be restricted, but according to what have been confirmed by the present inventors through experiments, synthetic resin films having a thickness of 100 μm or less are particularly inferior in fluidity and carrying property, and therefore the synthetic resin films having a thickness of 100 μm or less are classified preferably into the synthetic resins (A) in a classifiable limit. It is a matter of course, however, that they shall not necessarily be restricted to such classification standard. Further, such relatively thick synthetic resins as used for so-called PET bottles as well as very thin films such as polyethylene films can be contained in the synthetic resins (A). Whether or not they are classified into the synthetic resins (A) is determined according to factors such as the compositions, the materials (for example, materials other than synthetic resins are contained or not contained as composite materials) and the forms of the synthetic resins as well as the thicknesses thereof.

On the other hand, the synthetic resins (B) comprise principally massive synthetic resin materials such as plates, but it is a matter of course that they shall not be restricted thereto.

In short, considering the fluidity and the carrying property of synthetic resins collected, synthetic resins which are extremely inferior in fluidity and carrying property in the state that they are crushed, such as at least polyethylene films can be classified into the synthetic resins (A), and synthetic resins such as massive plastics having better fluidity and carrying property than those of the above resins can be classified into the synthetic resins (B). The other resins can be classified into either of the synthetic resins (A) and (B) considering the fluidity and the carrying property.

When seen from the viewpoint of the whole conversion-to-fuel system, there do not necessarily have to be strictly classified, all of the film-shaped synthetic resin materials out of the synthetic resins to be supplied as fuel into the synthetic resins (A), and all of the massive synthetic resins into the synthetic resins (B), respectively. Considering the quality thereof as waste, such strict classification is practically difficult. Accordingly, it is allowable that there are contained to some extent, massive synthetic resin materials in the synthetic resins (A), and film-shaped synthetic resin materials in the synthetic resins (B).

In FIG. 9, X represents a processing line for the synthetic resins (A) comprising principally the film synthetic resin materials, and Y represents a processing line for the synthetic resins (B) comprising principally the massive synthetic resin materials. In the processing line X, the synthetic resins (A) are molten or semi-molten by heat and then solidified, whereby they are processed into a volume-reduced and solidified (volume-reduced=reduced in volume) granular synthetic resin material (a). Meanwhile, in the processing line Y, the synthetic resins (B) are pulverized and processed into a granular synthetic resin material (b).

In the processing line X, the synthetic resins (A) are crushed (or roughly crushed), if necessary, by means of a crushing equipment 101 and then charged into a separating equipment 102 by means of a conveyor carrier to separate and remove only chlorine-containing macromolecular resin materials such as polyvinyl chloride and polyvinylidene chloride from the synthetic resins (A). Since the chlorine-containing macromolecular resin materials such as polyvinyl chloride have a large specific gravity as compared with those of other synthetic resins (the specific gravity of polyvinyl chloride is 1.16 to 1.55 while that of polyethylene is 0.91 to 0.96, and that of polypropylene is 0.89 to 0.91), the chlorine-containing macromolecular resin materials are usually separated from the synthetic resins (A) by a gravity separation system making use of liquid such as water or a centrifugal separation system in the separating equipment 102. Iron scraps mixed in the synthetic resins are removed by means of a magnetic separator 105 (an equipment in which iron scraps are adsorbed on a magnet to remove them) in the middle of the conveyor carrier described above. When the synthetic resins (A) are crushed by means of a granulation and solidification equipment 103 described later, crushing by means of the crushing equipment 101 described above is not necessarily required. Accordingly, in such case, the crushing equipment 101 may not be installed.

The preceding separating equipment 102 in the processing line X can be arranged in an optional position in an upstream than the granulation and solidification equipment 103.

Figure 10:
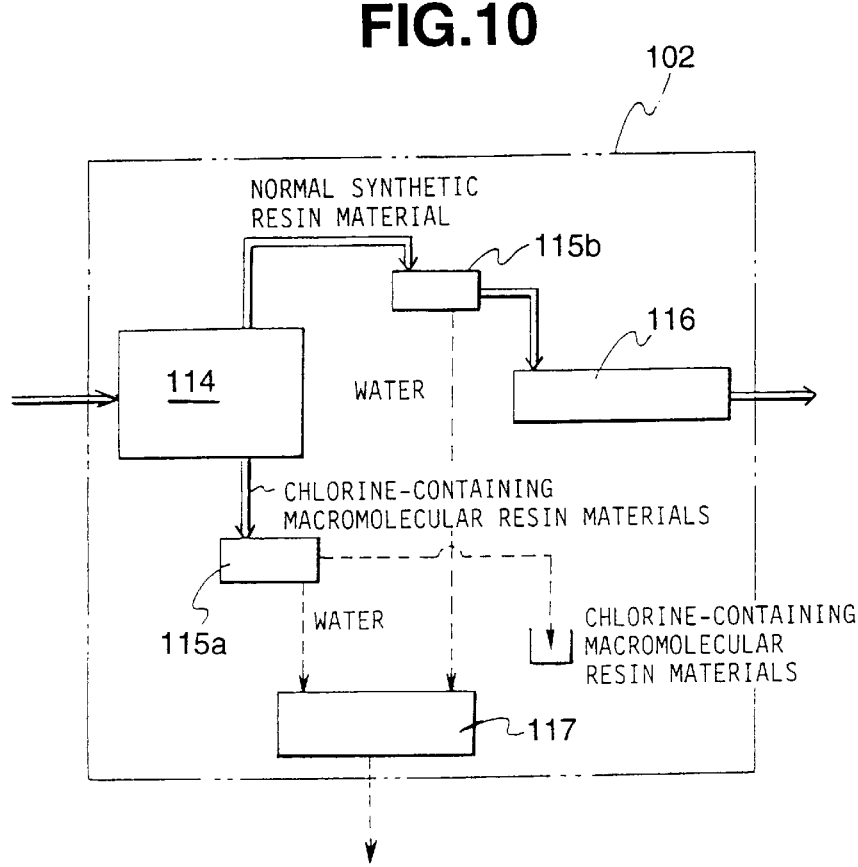
FIG. 10 is a schematic diagram view illustrating a typical construction of a separator of a chlorine-containing macromolecular resin material.

FIG. 10 shows one constitutional example of the separating equipment 102 based on the gravity separation system. The synthetic resins (A) are charged into a separating bath 114 containing water and separated into chlorine-containing macromolecular resin materials such as polyvinyl chloride settling down in the bath and other synthetic resin materials floating in the bath. The settled down and separated chlorine-containing macromolecular resin materials are discharged out of the bath by a suitable discharging means and separated from water via a screen 115a. Then, they are discharged out of the system. On the other hand, the synthetic resin materials other than the chlorine-containing macromolecular resin materials, which have floated in the bath are discharged out of the bath by a suitable discharging means and separated from water via a screen 115b. Then, they are dried in a drier 116 and sent to the following step. In FIG. 10, 117 is a drainage tank for discharging water separated by the screens 115a, 115b.

Figure 11:
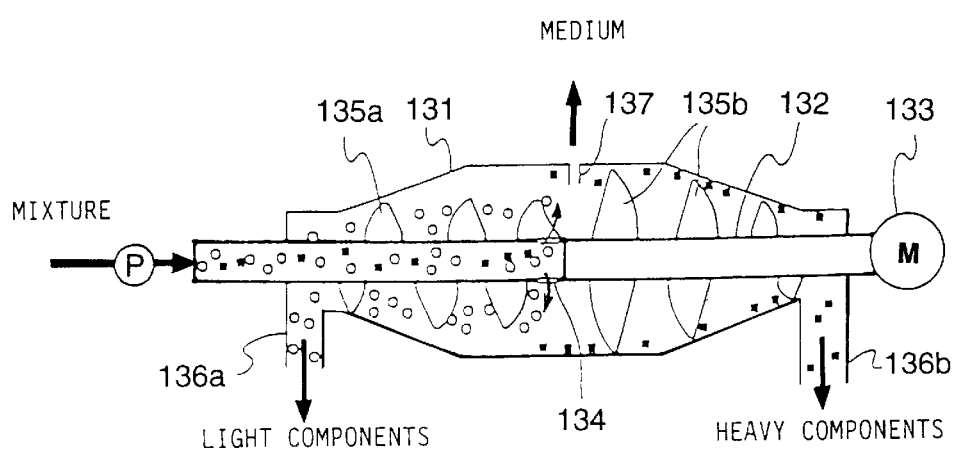
FIG. 11 is a schematic diagram view illustrating another typical construction of the separator of a chlorine-containing macromolecular resin material.

FIG. 11 shows one constitutional example of the separating equipment 102 based on the centrifugal separation system. This equipment comprises a tubulous or spindle body 131 which is hollow in an inside thereof, an inner cylindrical body 132 equipped with a screw rotatably disposed in a longitudinal direction in the inside of this body 131, and a motor 133 for rotary drive of this inner cylindrical body. In this equipment, the mixture of the synthetic resin materials and a medium such as water is fed into the inside thereof from one end of the inner cylindrical body 132 rotating at a high rate. The mixture is discharged into the inner space of the body 131 from an opening provided almost in the center in the longitudinal direction of the inner cylindrical body 132 by the action of a centrifugal force and separated into heavy components (chlorine-containing macromolecular resins) having a larger specific gravity than that of the medium and light components (synthetic resins other than the chlorine-containing macromolecular resins) having a smaller specific gravity with the specific gravity of the medium being the boundary. That is, only the heavy components out of the synthetic resin materials are collected on the inner wall surface side of the body 131, and as a result thereof, the light components are separated from the heavy components in the radial direction of the body 131.

Provided in the inner cylindrical body 132 are a screw 135a for carrying the light components at a half part thereof in the longitudinal direction and a screw 135b for carrying the heavy componentss at the other half part thereof in the longitudinal direction with the opening 134 described above being the approximate boundary. These screws 135a, 135b have helical directions which are reverse to each other, and the screws 135*a*, 135*b* carry the synthetic resin materials to the end directions of the body on the respective sides by rotating the inner cylindrical body 132. That is, the synthetic resin materials of the light components are carried to one end of the body 131 by means of the screw 135*a* having relatively short blades and discharged from a discharging port 136*a*. Meanwhile, the synthetic resin materials of the heavy components collected at the inner wall face side of the body 131 are carried to the other end of the body 131 by means of the screw 135*b* having blades extended up to the vicinity of the inner wall face of the body 131 and discharged from a discharging port 136*b*. On the hand, the medium such as water is discharged out of the equipment from a discharging port 137 provided approximately at the central part of the body 131.

According to such equipment, the synthetic resin materials separated into the light components and the heavy components respectively can be discharged out of the equipment in the condition that the water content is very small.

As described above, the synthetic resins (A) from which the chlorine-containing macromolecular resin materials have been separated by means of the separating equipment 102 are charged into the granulation and solidification equipment 103 and processed into the granular synthetic resin material (a) which is volume-reduced and solidified.

In the granulation and solidification equipment 103, the volume-reduced solidification-granulation of the synthetic resins (A) is carried out by any of the following methods [1] to [3] to obtain the granular synthetic resin material (a):

[1] a method in which after melting the synthetic resins (A) by heating, they are cooled down and solidified, and this solidified synthetic resin material is cut and pulverized,

[2] a method in which the synthetic resins (A) are cut or crushed (this cutting or crushing may be carried out by means of the crushing equipment 101 described above instead of the granulation and solidification equipment 103); this cut or crushed synthetic resin material is semi-molten by heating or frictional heat generated by the cutting or crushing described above; a semi-molten synthetic resin material is contracted and solidified by rapidly cooling, wherein the synthetic resin material is contracted and solidified into a granular form or the contracted and solidified synthetic resin material is pulverized, to thereby obtain the granular synthetic resin material (a), and

[3] a method as one embodiment of the method [2] described above, in which the synthetic resins (A) are cut or crushed by means of rotary blades which are rotated at a high speed, and the synthetic resins are semi-molten by frictional heat generated by the above cutting or crushing; then, this semi-molten synthetic resin material is contracted and solidified by rapidly cooling by spraying water, wherein the synthetic resin material is contracted and solidified into a granular form, or contracted and solidified and immediately crushed by means of the rotary blades described above to thereby obtain the granular synthetic resin material (a).

Among these methods, a typical example of the method [1] is a method in which after completely molting the synthetic resins (A) and molding this into strings by extruding with an extruding machine, they are cut into a granular form, whereby the granular synthetic resin material (a) is obtained. In addition to the above methods, various processing methods can be employed.

In contrast with this, the methods [2] and [3] are methods in which the synthetic resins (A) are contracted and solidified by semi-melting them without completely melting and then rapidly cooling by spraying water, wherein the synthetic resins (A) are contracted and solidified into a granular form, or the contracted and solidified synthetic resins (A) are pulverized into a granular form, whereby the granular synthetic resin material (a) is obtained. The present inventors have found that the granular synthetic resin material (a) obtained by the methods [2] and [3] (particularly the method [3]) shows very excellent fluidity and carrying property as compared with not only those of the pulverized matters of the film-shaped synthetic resin materials but also those of the pulverized matters of the massive synthetic resin materials and is very excellent as well in combustibility and that the carrying property and the combustibility of the whole synthetic resins can notably be raised by using them in a mixture with the pulverized matters of the massive synthetic resin materials. Accordingly, in the fuel blowing method of the present invention, granular contraction and solidification or contraction and solidification-granulation of the synthetic resins (A) is most preferably carried out by the method [2] or [3] in the granulation and solidification equipment 2 to obtain the granular synthetic resin material (a).

The granular synthetic resin material (a) thus obtained is sieved by means of a sieving equipment 104, and only grains having a prescribed grain diameter (for example, −6 mm) or less are sent to a storage silo 111 via a path 125. In this constitutional example, the path 125 is constituted by a pneumatically feeding pipe (in the drawing, 112 is an air blower), and the granular synthetic resin material (a) is pneumatically fed (pneumatic transportation, hereinafter the same shall apply) to the storage silo 111. On the other hand, the granular synthetic resin material having a grain diameter exceeding the prescribed grain diameter is returned to a carrying line present at the inlet side of a granulation and solidification equipment 103 via a path 126 (in the drawing, 112 is an air blower) which is a pneumatically feeding pipe and recharged into the granulation and solidification equipment 103 together with the synthetic resins (A). A position to which this coarsely granulated synthetic resin material is sent back is optional, and it can be sent back to respective positions (usually, a transporting line) such as, for example, between the separating equipment 102 and the granulation and solidification equipment 103, between the magnetic separator 105 and the separating equipment 102, and the inlet side of the crushing equipment 101. In some case, it can be supplied as well to the processing line Y. When it is supplied to this processing line Y, it can be supplied to respective positions (usually, a transporting line) such as, for example, the inlet side of a primary crushing equipment 106, between the primary crushing equipment 106 and a secondary crushing equipment 107, between the secondary crushing equipment 107 and a classifier 108 and between the classifier 108 and a milling equipment 110. In addition to the above, the coarsely granulated synthetic resin material may be taken out of the system and charged directly into other steps (for example, charged into the tops of a blast furnace and a scrap melting furnace or charged directly into a coke oven and a sintering furnace).

On the other hand, in the processing line Y, the synthetic resins (B) are coarsely crushed (for example, crushed to a grain diameter of about 50 mm) by means of the primary crushing equipment 106 and then charged into the secondary crushing equipment 107 by conveyor carrying to be secondarily crushed (for example, crushed to a grain diameter of about 20 mm). The primarily crushed synthetic resins (B) are subjected to removal of iron scraps mixed therein by means of the magnetic separator 105 (an equipment for adsorbing iron scraps on a magnet to remove them) in the middle of the conveyor carrying described above.

The secondarily crushed synthetic resins (B) are charged into the classifier 108 by conveyor carrying, wherein foreign matters such as metals, earth and sand, and stones are separated by a method such as wind classification. Then, they are sent to the separating equipment 109 via a path 127a, and only the chlorine-containing macromolecular resin materials are separated and removed from the synthetic resins (B). The PVC separating method and the constitutional example of this separating equipment 109 are the same as those of the separating equipment 102 described previously, and therefore the explanation thereof shall be omitted. The arrangement of the separating equipment 109 in the processing line Y shall not be restricted to the examples of the invention, and it can be arranged in optional positions at an upstream side or a downstream side than a milling equipment 110, for example, between the primary crushing equipment 106 and the secondary crushing equipment 107, between the secondary crushing equipment 107 and the classifier 108, and the exit side of the milling equipment 110.

The synthetic resins (B) from which the chlorine-containing macromolecular resin materials have been separated and removed are sent to the crushing equipment 110 (tertiary crushing equipment) and crushed to a prescribed diameter (for example, −6 mm) or less, whereby the granular synthetic resin material (b) is obtained. This granular synthetic resin material (b) is sent to the storage silo 111 via a path 127c. In this constitutional example, the paths 127a to 127c are constituted by pneumatic feeding pipes (in the drawing, 112 is an air blower), and the granular synthetic resin material (b) is pneumatically fed into the storage silo 111.

The mixture of the granular synthetic resin materials (a) and (b) stored in the storage silo 111 is carried by a conveyor or pneumatically fed into a blowing means 113 and pneumatically fed into a furnace such as a blast furnace via this blowing means 113. Then, the mixture is blown into the furnace from the tuyere thereof through this blowing means 113.

In the constitutional example shown in FIG. 9, the magnetic separator 105 is provided each at one portion in the processing lines X and Y, respectively, but the magnetic separators 105 may be disposed at plural portions in the respective processing lines X and Y.

The crushing systems of various crushing equipments (including as well the milling equipment 110) disposed in the processing lines X and Y are optional. In addition to a crushing system carried out only by conventional mechanical means, there can be applied as well, for example, a so-called freeze-crushing system in which matters to be processed are crushed in a frozen state.

Usually, auxiliary facilities such as a yard drying facility for synthetic resins carried in are provided at the inlet side of the processing facility shown in FIG. 9.

As described previously, the amounts of the synthetic resins (A) comprising principally the film-shaped synthetic resin materials and the other synthetic resins (B) which are fed to the respective processing lines are dispersed to some extent according to the lapse of time in certain cases due to the properties of wastes. In the case of limiting the time to a relatively short period (for example, several hours to some ten hours), only either one kind of the synthetic resins is supplied, and therefore it is possible that the synthetic resins processed and pneumatically fed into a furnace is tentatively limited only to either one of the synthetic resins (A)—the granular synthetic resin material (a) and the synthetic resins (B)—the granular synthetic resin material (b). Also, it is possible that only either one of the granular synthetic resin material (a) and the granular synthetic resin material (b) is pneumatically fed tentatively into the furnace because of reasons other than the above one. Further, the granular synthetic resin materials (a) and (b) can be stored in different silos to be pneumatically fed into the furnace via separate paths.

As described previously, the granular synthetic resin material (a) obtained by carrying out granular contraction and solidification or contraction and solidification-granulation has a relatively porous property and a large specific surface area. In addition thereto, since the granular synthetic resin material (a) has a roundish form on the whole, it shows excellent combustibility and fluidity, and the combustibility, the fluidity and the carrying property of the whole granular synthetic resin materials supplied to a furnace can effectively be raised by mixing the granular synthetic resin material (a) with the granular synthetic resin material (b). That is, with respect to the combustibility, when the mixture of the granular synthetic resin material (a) and the granular synthetic resin material (b) is blown into the furnace, the granular synthetic resin material (a) having a good combustibility burns rapidly to ignite quickly the granular synthetic resin material (b), and this increases markedly the combustibility of the whole granular synthetic resin materials blown into the furnace.

Further, also with respect to the fluidity and the carrying property, a lubricant function which enhances the fluidity of the whole granular synthetic resin materials is displayed by causing the granular synthetic resin material (a) which has a roundish form and is excellent in fluidity and carrying property to be contained in the granular synthetic resin materials. As a result thereof, the fluidity and the carrying property of the whole granular resin materials are improved to a large extent.

EXAMPLES

Example 1

The synthetic resins (A) comprising principally film-shaped synthetic resin materials and the synthetic resins (B) comprising principally massive synthetic resin materials were fed into a test processing and blowing facility for synthetic resins shown in the flow chart of FIG. 9 in the proportions of 2.8 kg/hr and 5.6 kg/hr respectively to process them into the granular synthetic resin materials (a) and (b). After blending them in a storage silo, they were pneumatically fed into a test blast furnace through a pneumatically feeding pipe line and blown into the furnace from the tuyere together with powdered coal. The processing and feeding conditions of the synthetic resins and the operating conditions of the test blast furnace are shown below.

(i) Processing Conditions of the Synthetic Resins (i-1) Synthetic Resins (A)

After roughly crushing the synthetic resins and separating polyvinyl chloride materials therefrom according to the flow chart of FIG. 9, they were subjected to contraction and solidification-granulation processing by the method [3] described previously to process them into the granular synthetic resin material (a) having a grain diameter of 6 mm or less. Then, this was transferred into a storage silo.

(i-2) Synthetic Resins (B)

The synthetic resins were subjected to primary crushing, secondary crushing, separation and removal of polyvinyl chloride materials and milling processing according to the flow chart of FIG. 9 to process them into the granular synthetic resin material (b) having a grain diameter of 6 mm or less, and then this was transferred into the storage silo.
(ii) Conditions for Pneumatically Feeding the Granular Synthetic Resin Materials The mixture of the granular synthetic resin materials (a) and (b) charged into the storage silo was quantitatively delivered from the silo and transported to a pneumatically feeding facility. Then, the granular synthetic resin materials were pneumatically fed from the pneumatically feeding facility to the tuyere of a blast furnace in the following conditions and blown into the furnace.

| | |
|---|---|
| Pneumatically feeding gas: | air |
| Flow amount of pneumatically feeding gas blown: | 2.6 Nm$^3$/hr |
| Blown amount of granular synthetic resin materials: | 8.4 kg/hr |
| Solid-gas ratio: | 2.5 kg/kg |
| (iii) Operating conditions of blast furnace | |
| Iron running amount: | 10 t/day |
| Coke ratio: | 485 kg/t · pig |
| Tuyere: | |
| blown amount of granular synthetic resin materials: | 20 kg/t · pig |
| blown amount of powdered coal: | 100 kg/t · pig |
| blast amount: | 610 Nm$^3$/minute |
| oxygen addition rate: | 4% |
| blast temperature: | 1000° C. |

The granular synthetic resin materials thus obtained were continued to be blown into the furnace for 7 days. As a result thereof, blast furnace operation itself did not have any problems, and feeding problems such as clogging at the delivering part of the storage silo and in the pneumatic feeding pipe line were scarcely caused.

In this operational example, a polyvinyl chloride material accounted for about 3% of the synthetic resins fed into the processing lines X and Y, and about 99% of this polyvinyl chloride material could be separated and recovered by means of the separating equipment. Further, the furnace gas was sampled during the whole operation to analyze the gas composition thereof, and the result showed that HCl was scarcely detected.

Example 2

The synthetic resins (A) comprising principally film-shaped synthetic resin materials and the synthetic resins (B) comprising principally massive synthetic resin materials were fed into the test processing and blowing facility for synthetic resins shown in the flow chart of FIG. 9 in the proportions of 2.8 kg/hr and 5.6 kg/hr respectively to process them into the granular synthetic resin materials (a) and (b). After blending them in the storage silo, they were pneumatically fed into the test blast furnace via the pneumatically feeding pipe line and blown into the furnace from the tuyere together with powdered coal. The processing and feeding conditions of the synthetic resins and the operating conditions of the test blast furnace are shown below.

| | | |
|---|---|---|
| (i) | Processing conditions of the synthetic resins Same as in Example 1. | |
| (ii) | Conditions for pneumatically feeding the granular synthetic resin materials Same as in Example 1. | |
| (iii) | Operating conditions of blast furnace | |
| | Iron running amount: | 10 t/day |
| | Coke ratio: | 547 kg/t · pig |

-continued

| | |
|---|---|
| Tuyere: | |
| blown amount of granular synthetic resin materials: | 20 kg/t · pig |
| blown amount of powdered coal: | 100 kg/t · pig |
| blast amount: | 1714 Nm$^3$/minute |
| oxygen addition rate: | 4% |
| blast temperature: | 1000° C. |

The granular synthetic resin materials thus obtained were continued to be blown into the furnace for 7 days. As a result thereof, blast furnace operation itself did not have problems, and feeding problems such as clogging at the delivering part of the reservoir silo and in the pneumatic feeding pipe line were scarcely caused.

In this operational example, a polyvinyl chloride material accounted for about 3% of the synthetic resins fed into the processing lines X and Y, and about 99% of this polyvinyl chloride material could be separated and recovered by means of the separating equipment. Further, the furnace gas was sampled during the whole operation to analyze the gas composition thereof, and the result showed that HCl was scarcely detected.

Example 3

The synthetic resins (A) comprising principally film-shaped synthetic resin materials and the synthetic resins (B) comprising principally massive synthetic resin materials were fed into the processing and blowing facility for synthetic resins shown in the flow chart of FIG. 9 in the proportions of 2.50 t/hr and 5.23 t/hr respectively to process them into the granular synthetic resin materials (a) and (b). After blending them in a storage silo, they were pneumatically fed into a blast furnace via the pneumatically feeding pipe line and blown into the furnace from the tuyere together with powdered coal. The processing and feeding conditions of the synthetic resins and the operating conditions of the blast furnace are shown below.
(i) Processing Conditions of the Synthetic Resins Same as in Example 1.
(ii) Conditions for Pneumatically Feeding the Granular Synthetic Resin Materials The mixture of the granular synthetic resin materials (a) and (b) charged into the storage silo was quantitatively delivered from the silo and transported to the pneumatically feeding facility. Then, the granular synthetic resin materials were pneumatically fed from the pneumatically feeding facility to the tuyere of the blast furnace in the following conditions and blown into the furnace.

| | |
|---|---|
| Pneumatically feeding gas: | air |
| Flow amount of pneumatically feeding gas blown: | 1300 Nm$^3$/hr |
| Solid-gas ratio: | 4.5 kg/kg |
| (iii) Operating conditions of blast furnace | |
| Iron running amount: | 9000 t/day |
| Coke ratio: | 447 kg/t · pig |
| Tuyere: | |
| blown amount of granular synthetic resin materials: | 20 kg/t · pig |
| blown amount of powdered coal: | 100 kg/t · pig |
| blast amount: | 7260 Nm$^3$/minute |
| oxygen addition rate: | 4% |
| blast temperature: | 1000° C. |

The granular synthetic resin materials thus obtained were continued to be blown into the furnace for 7 days. As a result thereof, blast furnace operation itself did not have any problems, and feeding problems such as clogging at the delivering part of the storage silo and in the pneumatically feeding pipe line were scarcely caused.

In this operational example, the chlorine-containing resin material such as polyvinyl chloride accounted for about 3% of the synthetic resins fed into the processing lines X and Y, and about 99% of this chlorine-containing macromolecular resin material could be separated and recovered by means of the separating equipment. Further, the furnace gas was sampled during the whole operation to analyze the gas composition thereof, and the result showed that HCl was scarcely detected.

Example 4

The synthetic resins (A) comprising principally film-shaped synthetic resin materials and the synthetic resins (B) comprising principally massive synthetic resin materials were fed into the processing and blowing test facility for synthetic resins shown in the flow chart of FIG. 9 in the proportions of 14.6 kg/hr and 29.2 kg/hr respectively to process them into the granular synthetic resin materials (a) and (b). After blending them in the storage silo, they were pneumatically fed into a scrap-melting test furnace (vertical furnace) via a pneumatically feeding pipe line and blown into the furnace from the tuyere together with powdered coal. Used in this example was the scrap-melting test furnace (content volume: 2.5 m$^3$, pig iron production: 10 t/day) having combustion burners at plural tuyeres of the furnace casing.

The processing and feeding conditions of the synthetic resins and the operating conditions of the scrap-melting test furnace are shown below.
(i) Processing Conditions of the Synthetic Resins Same as in Example 1.
(ii) Conditions for Pneumatically Feeding the Granular Synthetic Resin Materials The mixture of the granular synthetic resin materials (a) and (b) charged into the storage silo was quantitatively delivered from the silo and transported to the pneumatically feeding facility. Then, the granular synthetic resin materials were pneumatically fed from the pneumatically feeding facility to the tuyere of a blast furnace in the following conditions and blown into the furnace.

| | |
|---|---|
| Pneumatically feeding gas: | air |
| Flow amount of pneumatically feeding gas blown: | 7.6 Nm$^3$/hr |
| Blown amount of granular synthetic resin material: | 43.8 kg/hr |
| Solid-gas ratio: | 4.5 kg/kg |
| (iii) Operating conditions of scrap-melting test furnace | |
| Iron running amount: | 10 t/day |
| Coke ratio: | 265 kg/t · pig |
| Converter slag ratio: | 121 kg/t · pig |
| Silica rock ratio: | 5 kg/t · pig |
| Tuyere: | |
| blown amount of granular synthetic resin materials: | 105 kg/t · pig |
| blown amount of powdered coal: | 175 kg/t · pig |
| blast oxygen amount: | 206 Nm$^3$/minute |
| steam amount: | 7 Nm$^3$/minute |

The granular synthetic resin materials thus obtained were continued to be blown into the furnace for 7 days. As a result thereof, the operation itself of the scrap-melting test furnace did not have any problems, and feed problems such as clogging at the delivering part of the storage silo and in the pneumatically feeding pipe line were scarcely caused.

In this operational example, the polyvinyl chloride material accounted for about 3% of the synthetic resins fed into the processing lines X and Y, and about 99% of this polyvinyl chloride material could be separated and recovered by means of the separating equipment. Further, the furnace gas was sampled during the whole operation to analyze the gas composition thereof, and the result showed that HCl was scarcely detected.

Example 5

The synthetic resins (A) comprising principally film-shaped synthetic resin materials and the synthetic resins (B) comprising principally massive synthetic resin materials were fed respectively into the processing and blowing facility for synthetic resins shown in the flow chart of FIG. 9 in the conditions of Operational examples 1 to 4 shown in Table 7 and Table 8 to process them into the granular synthetic resin materials (a) and (b), respectively. As shown in Table 7 and Table 8, contained in the processed synthetic resin materials were polyethylene terephthalate (PET), ABS resins and polyvinyl chloride resins (PVC) in addition to thermoplastic resins such as polyethylene and polypropylene. Further contained therein as other resins were urethane resins, thermosetting resins such as phenol resins, resins containing plasticizers such as diethyl phthalate, flame retardants such as trimethyl phosphate and 2,3-dibromopropyl, glass fibers, calcium carbonate, alumina and clay, and other various additives. Further, earth and sand adhered to the synthetic resins were contained therein as inorganic matters. The processing conditions of the synthetic resins are the same as in Example 1.

After the granular synthetic resin materials (a) and (b) obtained after processing were mixed in the storage silo, they were pneumatically fed to the tuyere part of a blast furnace through a pneumatically feeding pipe line and blown into the furnace through a waste plastic-blowing lance (25 mm Φ). The pneumatically feeding conditions of the granular synthetic resin materials are shown below. The properties of the synthetic resins processed and fed into the furnace in respective Operational examples 1 to 4 are shown in Table 7 and Table 8, and the operating conditions of the blast furnace are shown in Table 9.

| | |
|---|---|
| Pneumatically feeding gas: | air |
| Flow amount of pneumatically feeding gas blown: | 1300 Nm$^3$/hr |
| Blown amount of granular synthetic resin material: | 7.5 t/hr |
| Solid-gas ratio: | 4.5 kg/kg |

The granular synthetic resin materials thus obtained were continued to be blown into the furnace. As a result thereof, blast furnace operation itself did not have any problems, and feeding problems such as clogging at the delivering part of the storage silo and in the pneumatic feeding pipe line were scarcely caused.

Further, the furnace gas was sampled during the whole operation to analyze the gas composition thereof, and the result showed that HCl was scarcely detected.

TABLE 7

| | OPERATIONAL EXAMPLE 1 | | | OPERATIONAL EXAMPLE 2 | | |
|---|---|---|---|---|---|---|
| | Supplied synthetic resins | | | Supplied synthetic resins | | |
| | FILM-SHAPED *1 | LUMPY *2 | Total after treatment | FILM-SHAPED *1 | LUMPY *2 | Total after treatment |
| Quantity supplied (t/hr) | 2.89 | 5.57 | 7.50 | 3.21 | 5.21 | 7.50 |
| Properties (%) | | | | | | |
| Polyethylene | 71.00 | 66.00 | 75.86 | 51.00 | 46.20 | 53.52 |
| Polypropylene | 11.00 | 14.00 | 14.45 | 27.50 | 29.50 | 32.12 |
| Polystyrene | 2.00 | 4.00 | 3.59 | 2.00 | 6.80 | 5.47 |
| PET | 0.00 | 0.00 | 0.00 | 1.50 | 1.00 | 1.34 |
| ABS | 0.00 | 0.00 | 0.00 | 2.00 | 0.00 | 0.86 |
| PVC | 11.00 | 11.00 | 1.04 | 8.60 | 11.50 | 0.95 |
| Other resins | 0.00 | 2.00 | 1.49 | 2.40 | 2.00 | 2.42 |
| Inorganic | 5.00 | 3.00 | 3.57 | 5.00 | 3.00 | 3.43 |
| Heat value of synthetic resin material charged into furnace (kcal/kg) | | 10354 | | | 10146 | |

*1: Synthetic resins mainly comprising film-shaped synthetic resin (A)
*2: Synthetic resins mainly comprising lumpy synthetic resin (B)

TABLE 8

| | OPERATIONAL EXAMPLE 3 | | | OPERATIONAL EXAMPLE 4 | | |
|---|---|---|---|---|---|---|
| | Supplied synthetic resins | | | Supplied synthetic resins | | |
| | FILM-SHAPED *1 | LUMPY *2 | Total after treatment | FILM-SHAPED *1 | LUMPY *2 | Total after treatment |
| Quantity supplied (t/hr) | 3.15 | 5.21 | 7.49 | 4.20 | 4.70 | 7.50 |
| Properties (%) | | | | | | |
| Polyethylene | 43.20 | 41.30 | 46.47 | 39.50 | 33.00 | 42.06 |
| Polypropylene | 23.40 | 27.60 | 28.87 | 22.40 | 28.50 | 30.07 |
| Polystyrene | 9.50 | 11.20 | 11.67 | 9.10 | 11.20 | 11.83 |
| PET | 1.50 | 1.00 | 1.33 | 1.50 | 1.00 | 1.47 |
| ABS | 3.40 | 0.00 | 1.39 | 3.40 | 1.20 | 2.34 |
| PVC | 8.60 | 9.80 | 0.77 | 12.40 | 14.80 | 1.20 |
| Other resins | 4.80 | 6.10 | 5.98 | 6.10 | 7.30 | 7.55 |
| Inorganic | 5.60 | 3.00 | 3.52 | 5.60 | 3.00 | 3.47 |
| Heat value of synthetic resin material charged into furnace (kcal/kg) | | 9915 | | | 9795 | |

*1: Synthetic resins mainly comprising film-shaped synthetic resin (A)
*2: Synthetic resins mainly comprising lumpy synthetic resin (B)

TABLE 9

| | Operational ex. 1 | Operational ex. 2 | Operational ex. 3 | Operational ex. 4 |
|---|---|---|---|---|
| Iron production (t/day) | 9000 | 9000 | 9000 | 9000 |
| Blast temp. (° C.) | 1000 | 1000 | 1000 | 1000 |
| Blast volume (Nm$^3$/t · pig) | 1074 | 1076 | 1077 | 1077 |
| Coke rate (kg/t · pig) | 395 | 395 | 396 | 398 |
| Grained coal ratio (kg/t · pig) | 100 | 100 | 100 | 100 |
| Synthetic resin ratio (kg/t · pig) | 20 | 20 | 20 | 20 |

According to the fuel blowing method of the present invention described above, synthetic resins such as plastics can be fed as fuel blown into furnaces such as a blast furnace and a scrap-melting furnace regardless of the forms thereof and without causing problems by chlorine-containing macromolecular resins such as polyvinyl chloride and the like contained in synthetic resins, and therefore synthetic resins which are wastes can be disposed in large quantities and utilized effectively. Fuel cost of furnaces such as a blast furnace can be reduced as well to a large extent. Further, the fluidity, the carrying property and the combustibility of synthetic resins fed into furnaces can effectively be enhanced, and synthetic resin materials can suitably be fed into furnaces as fuels without bringing about troubles on the operation of furnaces in a blast furnace and a scrap-melting furnace.

Embodiment 3

The present inventors continued intensively investigations in order to solve the problems described above.

First of all, it has been found that crushing sheet-shaped synthetic resins merely into small sheet-shaped pieces having a prescribed grain diameter as is the case with usual solid synthetic resin materials causes lubrication between the small synthetic resin material pieces to get lost and therefore makes it impossible to deliver well the small resin material pieces from a tank or causes clogging in a pipe line during pneumatic feeding because the small resin material pieces are adhered closely to each other to cause a gap between the small sheet-shaped pieces to get lost when applying pressure in the tank, and therefore a space for causing gas to blow through gets lost.

Accordingly, the small sheet-shaped pieces have to be prevented from being adhered closely to each other in the tank or during pneumatically feeding. That is, the close adhesion described above can be prevented by making the small sheet-shaped pieces themselves roundish, that is, granulating the small pieces by semi-melting or melting them to form a gap between the grains, or as another method, interposing granular synthetic resin materials having a different shape between the small sheet-shaped pieces to thereby form a gap between the small sheet-shaped pieces. Thus, it has been found that a gap through which air is blown can be formed between the small sheet-shaped pieces and therefore the fluidity and the carrying property are improved.

The present embodiment relates to a process for granulating waste synthetic resin materials as pre-processing of the waste synthetic resin materials in prior to blowing them into a vertical metallurgical furnace, characterized by comprising the steps of:

(P) classifying the waste synthetic resin materials, according to the shapes thereof, into film-shaped synthetic resin materials, solid synthetic resin materials and sheet-shaped synthetic resin materials having an intermediate shape between the film-shaped synthetic resin materials and the solid synthetic resin materials, (A) subjecting the film-shaped synthetic resin materials to crushing processing into small film pieces and subjecting the resulting small film pieces to melting·solidification and granulation processing to thereby prepare a synthetic resin grain (a), (B) subjecting the solid synthetic resin materials to crushing processing to thereby prepare a synthetic resin grain (b), (C) subjecting the sheet-shaped synthetic resin material described above to crushing processing into small sheet pieces ($C_0$) having a smaller maximum size than the maximum size of the small film pieces described above and subjecting the resulting small sheet pieces to melting·solidification and granulation processing to thereby prepare a synthetic resin grain (C).

Next, the embodiment of the present invention shall be explained with reference to the drawings.

Figure 12:
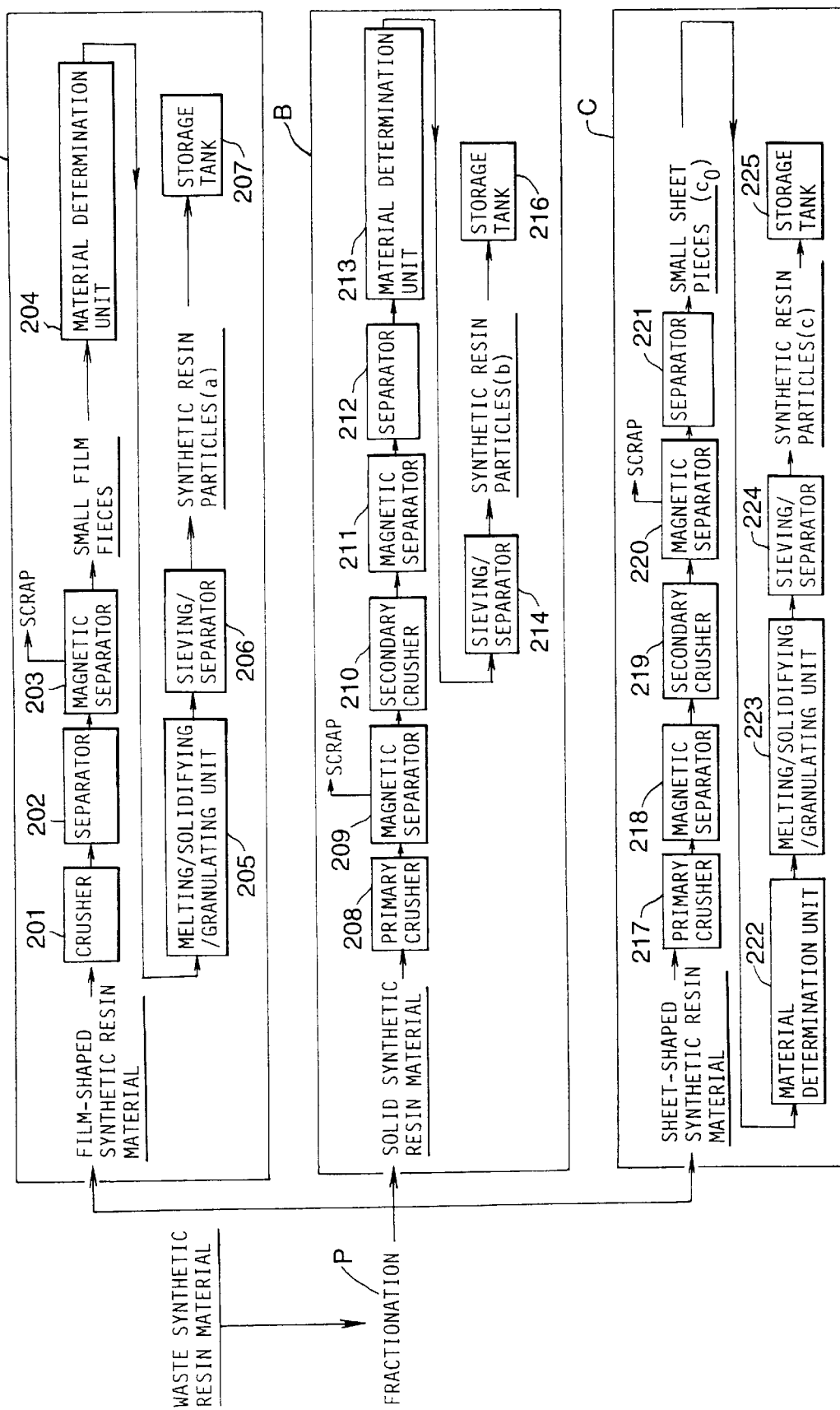
FIG. 12 is a flow sheet illustrating an embodiment of the present invention.

FIG. 12 is a flow sheet showing one example of the embodiment of the present invention. Waste synthetic resin materials generated in the market are classified into film-shaped synthetic resin materials, solid synthetic resin materials and sheet-shaped synthetic resin materials in the classifying step (P). The classification can be effectuated by conventional methods. In order to carry out effectively the granulation in the step (C), the thickness of the sheet-shaped synthetic resin material falls preferably in a range of 100$\mu$m to 3 mm.

After cutting the film-shaped synthetic resin materials into a prescribed shape by means of a crushing equipment 201, they are tentatively adhered into piled up small pieces of the film-shaped synthetic resin by cutting frictional heat, and therefore they are dispersed by means of a separator 202. The small film pieces obtained by processing the dispersed small synthetic resin pieces by means of a magnetic separator 203 to remove iron scraps are suitably passed through a material discriminator 204 to discriminate the kinds of the synthetic resin materials.

Then, the small film pieces are charged into a melting·solidifying and granulating equipment 205 to subject them to prescribed processing.

Figure 13:
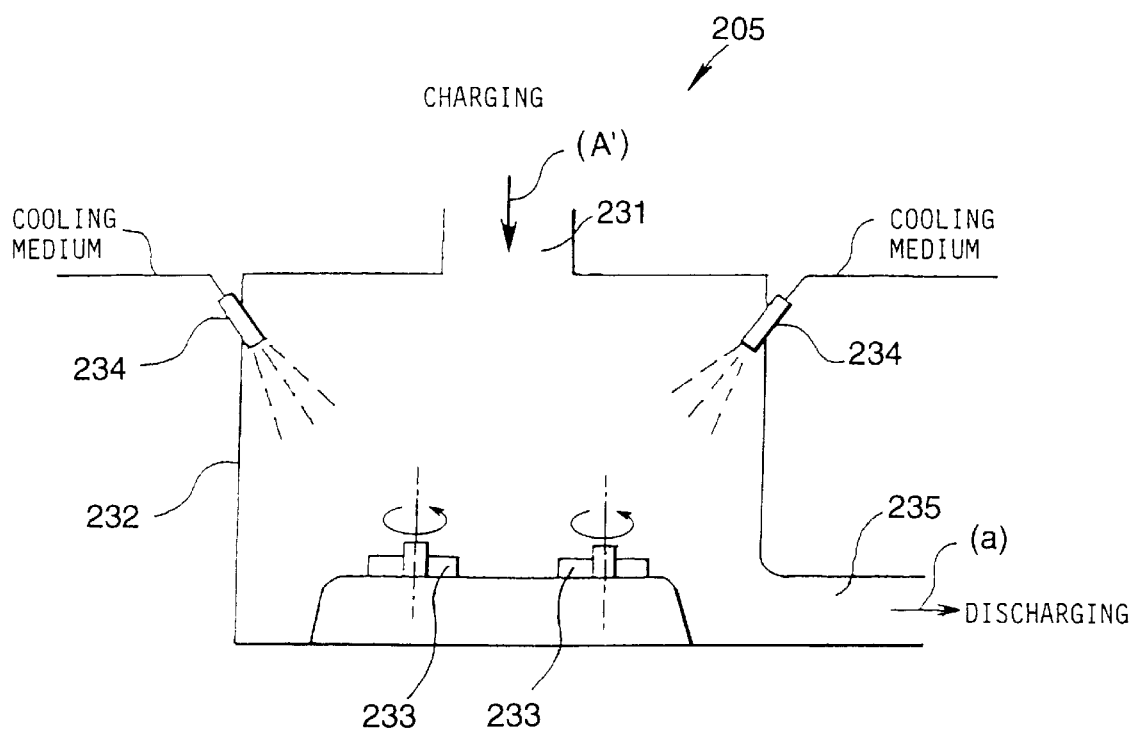
FIG. 13 is a schematic diagram view illustrating the functions of the melting/solidification/granulation unit.

FIG. 13 is a drawing for explaining the function of the melting·solidifying and granulating equipment. The small film pieces are fed into a rotary crusher 233 provided in a crushing chamber 232 from a charging port 231. The small film pieces are crushed small and semi-molten or completely molten by frictional heat. The small film pieces discharged from a pair of the rotary crushers 233 are rapidly cooled down by a cooling medium (for example, water spray) sprayed from a nozzle 234 and contracted and solidified into a granular shape to be discharged from a discharging port 235 in the form of synthetic resin grains (a).

Figure 14:
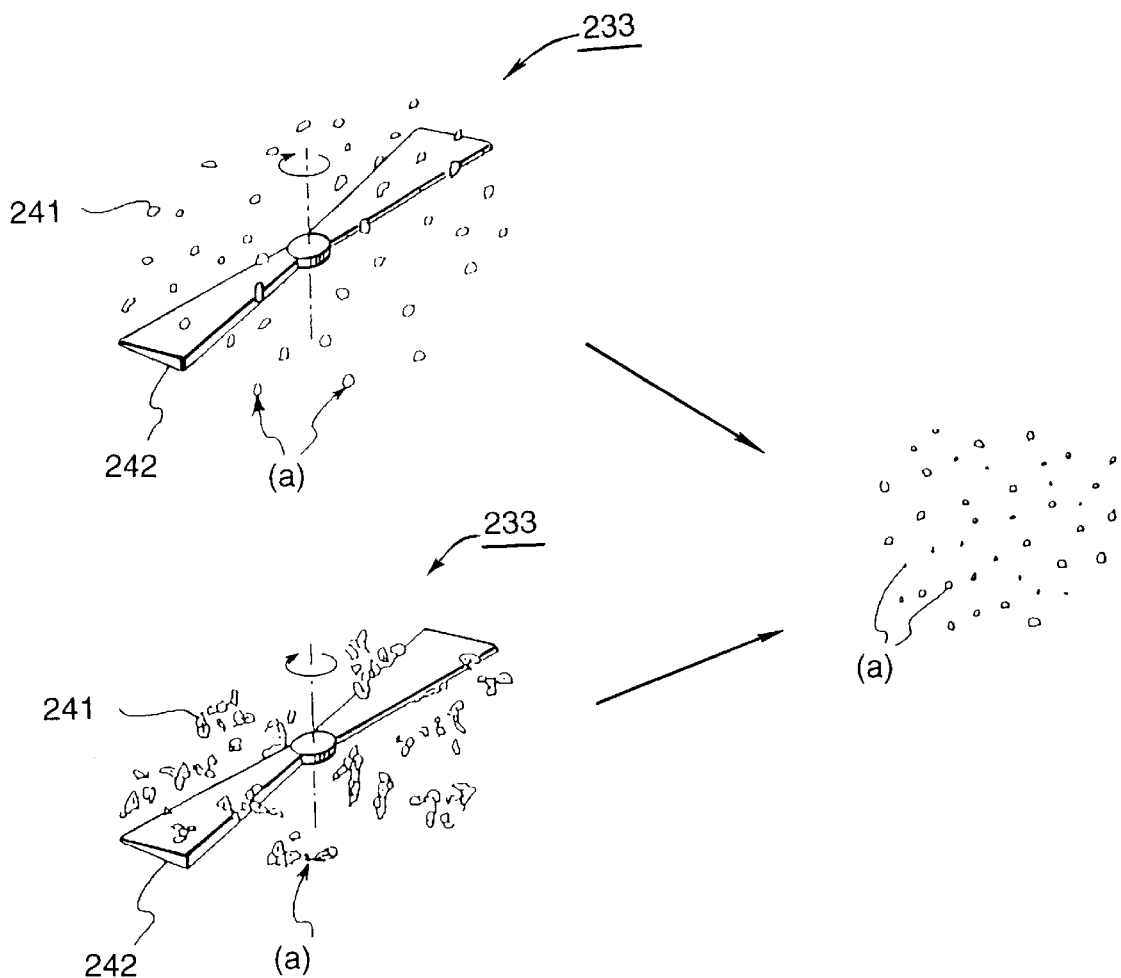
FIG. 14 is a schematic diagram view illustrating the principle of granulation of small synthetic resin pieces by the melting/solidification/granulation unit shown in FIG. 13.

FIG. 14 is a drawing for explaining a principle in which the small film pieces are granulated by crushing small by means of the rotary crusher 233 provided in the melting·solidifying and granulating equipment shown in FIG. 13, heating by frictional heat and soon rapidly cooling down. The small film pieces 241 are cut and crushed by means of a rotary blade 242 rotating at a high rate and cooled down by a cooling fluid, whereby the synthetic resin grains (a) are obtained. FIG. 14 (i) shows the case where the temperatures are elevated by frictional heat in crushing but the small film pieces are scarcely molten or are semi-molten, and FIG. 14 (ii) shows the case where the synthetic resin grains (a) are obtained by melting the small film pieces by frictional heat and cooling them by the cooling fluid.

The case where the synthetic resin grains having a prescribed grain diameter of $D_0$ mm or less as a target grain diameter are obtained shall be considered. As the rotating rate of the rotary crusher 233 and the processing time are increased, the temperatures of the small film pieces are increased and molten, while the maximum size of the crushed small film pieces are decreased as the rotating rate and the processing time are increased. The maximum size reaches the target value $D_0$ mm or less through such the course, wherein the crushing conditions are adjusted so that the temperatures are controlled to a temperature $T_0$ which is lower by a prescribed value than the melting point, and the crushed small film pieces are rapidly cooled down when both the maximum size and the temperatures of the crushed small film pieces satisfy the above conditions.

In the case where the temperature does not reach $T_0$ while the maximum size reaches $D_0$ mm or less, the temperature is controlled so that it is more quickly elevated while suppressing an increase in the crushing rate. In contrast with this, in the case where the maximum size of the small film pieces does not reach $D_0$ mm or less while the temperature of the small film pieces reaches $T_0$, the crushing rate is controlled so that it is more quickly elevated while suppressing an increase in the temperature. Thus, the grain diameter is controlled by melting-solidifying and granulation processing.

The melting-solidifying and granulation processing is effectuated in the manner as described above, and the synthetic resins thus obtained are treated by means of a sieving-separating equipment 206, whereby the synthetic resin grains (a) are obtained. They are stored in a storage tank 207 [hereinabove, step (A)].

The solid synthetic resin materials are roughly crushed by means of a primary crusher 208 and treated in a primary magnetic separator 209 to remove iron scraps. Then, they are finely crushed by means of a secondary crusher 210 and treated in a secondary magnetic separator 211 to remove iron scraps and other foreign matters. Subsequently, the synthetic resin materials tentatively adhered to each other by crushing frictional heat are dispersed by means of a separator 212. The dispersed synthetic resin materials are suitably passed through a material discriminating equipment 213 to analyze the materials of the synthetic resin materials. Then, the synthetic resin materials are treated in a sieving and separating equipment 214 to obtain the synthetic resin grains (a). They are stored in a storage tank 216 [hereinabove, step (B)].

First, the sheet-shaped synthetic resin materials are roughly crushed by means of a primary crusher 217 and treated in a primary magnetic separator 218 to remove iron scraps as is the case with the processing of the solid synthetic resin materials. Then, they are finely crushed by means of a secondary crusher 219 and treated in a secondary magnetic separator 220 to remove iron scraps and other foreign matters. Subsequently, the synthetic resin materials tentatively adhered to each other by crushing frictional heat are dispersed by means of a separator 221, whereby the small sheet pieces ($C_0$) are obtained. The small sheet pieces ($C_0$) have to have a smaller maximum size than the maximum size of the small film pieces described above. This is because when the small sheet pieces are semi-molten or molten by frictional heat generated in the following melting-solidifying and granulation processing to granulate them, too large size causes the frictional heat to be transmitted deeply into the inside of the small sheet pieces to prevent them from being semi-molten or molten and therefore makes it difficult to granulate the small sheet pieces. Then, the synthetic resin materials are suitably passed through a material discriminating equipment 222 to analyze the materials of the synthetic resin materials. Subsequently, the small sheet pieces are charged into a melting-solidifying and granulating equipment 223 to subject them to prescribed processing. In the melting-solidifying and granulation processing, the small sheet pieces are granulated by semimelting or melting and therefore increase in thickness as well as becoming roundish. Then, the synthetic resin materials are treated in a sieving and separating equipment 224 to obtain the synthetic resin grains (b). They are stored in a storage tank 225 [hereinabove, step (C)].

The synthetic resin grains remaining on the sieves in the sieving and separating processing in the steps (A) to (C) can be returned to the respective crushing processings to reuse them.

Figure 15:
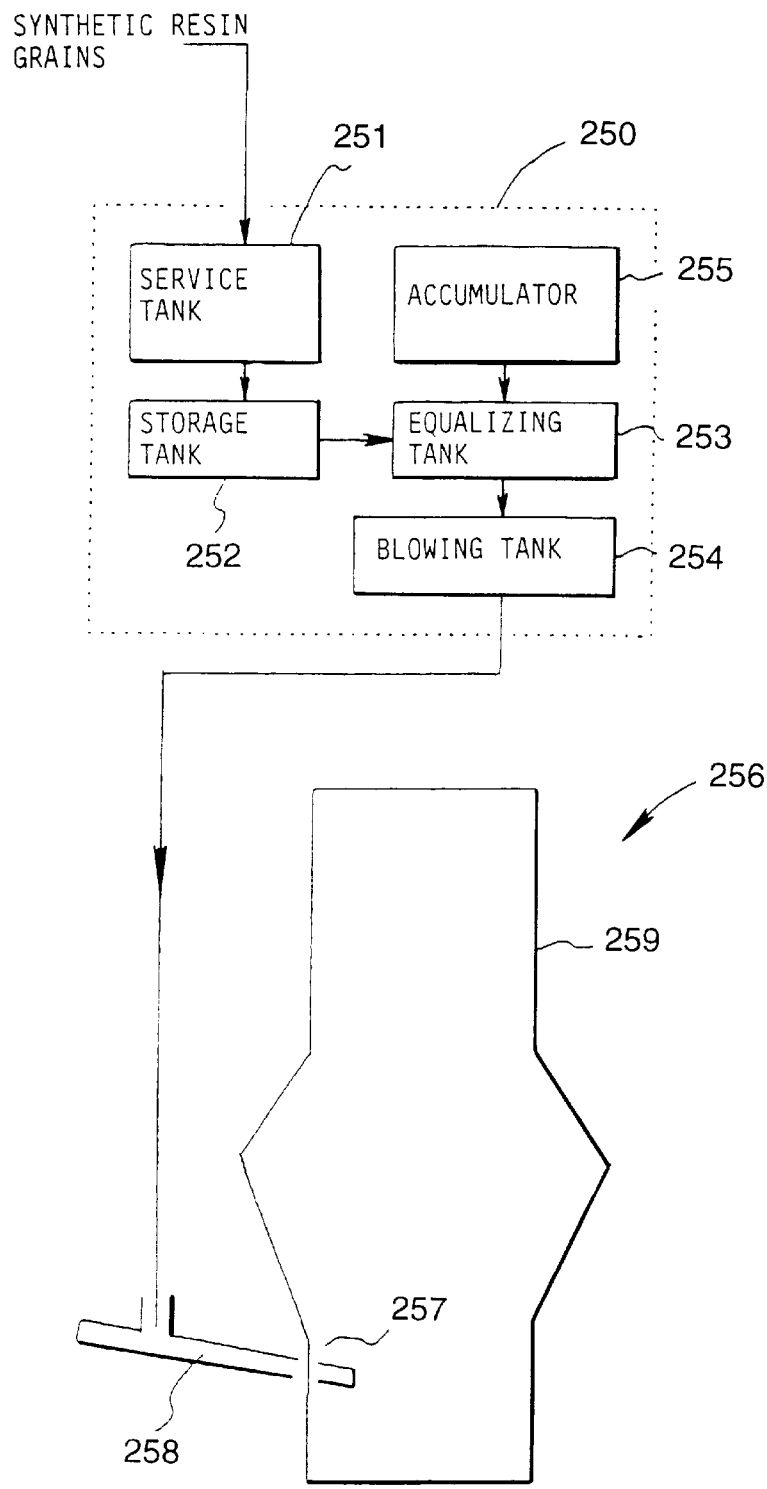
FIG. 15 is a flow sheet of a pneumatic feeding equipment for blowing granulated synthetic resin particles to a blast furnace.

FIG. 15 shows a pneumatically feeding facility 250 for blowing the synthetic resin grains obtained by subjecting the waste synthetic resin materials to granulation processing as described above into a blast furnace.

The synthetic resin grains (a), (b) and (c) are delivered from the respective storage tanks 207, 216 and 225 and suitably blended to be pneumatically fed to a service tank 251. The blended synthetic resin grains are pneumatically transported from the service tank 251 into a storage tank 252 and sent out of a blowing tank 254 via an equalizing tank 253. Then, the synthetic resin grains are blown into a blast furnace 259 from a blowing tube 258 mounted at a tuyere 257 of the blast furnace in a blast furnace facility 256.

Figure 16:
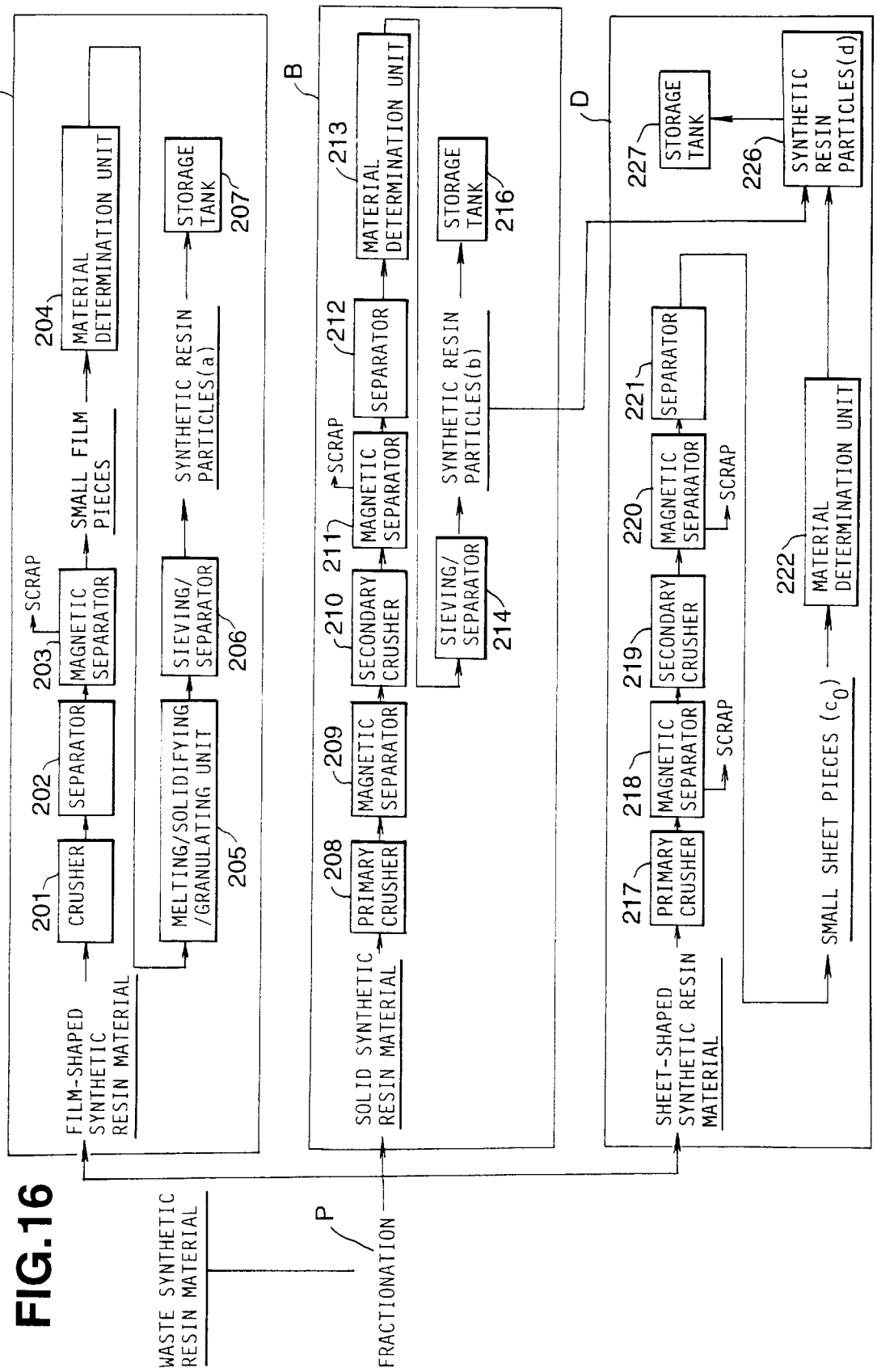
FIG. 16 is a flow sheet illustrating another embodiment of the present invention.

FIG. 16 is a flow sheet showing one example of the embodiment of the present invention. A step (A) and a step (B) are the same as those in FIG. 12 but a step (D) is different from the step (C) described above. That is, in the step (D), the small sheet pieces ($C_0$) prepared in the middle of the step (C) described above are blended with the synthetic resin grains (b) prepared in the step (B) without subjecting the small sheet pieces to melting-solidification and granulation processing to thereby prepare the synthetic resin grains.

EXAMPLES

Next, the present invention shall be explained in further detail with reference to examples.

The synthetic resin grains (a), (b) and (c) prepared by subjecting waste synthetic resin materials to granulation processing based on the pre-processing step shown in FIGS. 12 and 13 were compounded and mixed in a prescribed proportion and then blown into a blast furnace by means of the pneumatically feeding facility shown in FIG. 15 (Example 1). Also, the synthetic resin grains (a), (b) and (c) prepared by subjecting waste synthetic resin materials to granulation processing based on the pre-processing step shown in FIGS. 16 and 13 were compounded and mixed in a prescribed proportion and then blown into the blast furnace by means of the pneumatically feeding facility shown in FIG. 15 (Example 2). In contrast with this, for the sake of comparison, the sheet-shaped synthetic resins were processed in the same manner as in the step (B), and the resulting synthetic resin grains (hereinafter referred to as "synthetic resin grains (e)") were compounded and mixed with the synthetic resin grains (a) and (b) in a prescribed proportion. Then, they were blown into the blast furnace in the same manner as in the above examples (Comparative Example).

The properties of the sheet-shaped synthetic resin materials before and after the granulation processing out of the waste synthetic resin materials used for the respective tests are shown in Table 10.

TABLE 10

|  |  | Example 1 | Example 2 | Comparative Example |
|---|---|---|---|---|
| Before granulation processing | Shape of synthetic resins | Sheet-shaped | Sheet-shaped | Sheet-shaped |
|  | Material | PET resin | PET resin | PET resin |
|  | Thickness | 0.5 mm | 0.5 mm | 0.5 mm |

TABLE 10-continued

|  |  | Example 1 | Example 2 | Comparative Example |
|---|---|---|---|---|
| Granulating method | | Melting solidification and granulation processing after crushing into 6 mm or less | Crushing into 6 mm or less (provided that mixing with other resin grains (b) later) | Only crushing into 6 mm or less |
| Dimensions after granulation processing | Brain diameter | 1.5 mm or less | 6 mm or less | 6 mm or less |
| | Thickness | — | × 0.5 mm | × 0.5 mm |
| Massive grains (b) mixed | Material | — | PE resin | — |
| | Maximum size (grain diameter) | — | 3.2 mm | — |
| | Mixing ratio | — | PET:PE = 2:1 | — |
| Time of stopping blowing due to delivering trouble (hr/d) | | 0.0 | 0.0 | 4.2 |

In every test, sheet-shaped PET resins which were separated in the step (P) and had the same shape and a thickness of 0.5 mm were used as the sheet-shaped synthetic resin materials. In Example 1, the sheet-shaped PET resins were crushed into the small sheet pieces ($C_0$) of 6 mm or less in the step (C) and then subjected to melting-solidification and granulation processing, whereby the synthetic resin grains (c) having a grain diameter of 1.5 mm or less were prepared.

In Example 2, the sheet-shaped PET resins described above were crushed into the small sheet pieces ($C_0$) of 6 mm or less in the step (D) and then blended with massive grains (material: PE resin) which were the synthetic resin grains (b) prepared from the solid synthetic resin materials in the step (B) and had a maximum size of 3.2 mm. The blending proportion of the small sheet pieces ($C_0$) of the PET resin to the 3.2 mm massive grains of the PE resin was set at 2:1. The synthetic resin grains (e) having a maximum size of 6 mm were prepared in the Comparative Example.

Shown together in Table 10 was the time for stopping the blowing of the synthetic resin grains due to problems in delivering them from the tank during the period of a continuous operating test for 2 days. In the Comparative Example, the stopping of the blowing into the blast furnace for 4.2 hr/d was caused due to delivering trouble, but the problems were not brought about at all in any of the examples. The results described above showed the usefulness of the present invention.

It is difficult to handle sheet-shaped synthetic resin materials in pre-processing for blowing waste synthetic resin materials into a vertical metallurgical furnace such as a blast furnace, and therefore no suitable processing methods have so far been available. However, according to the present invention, which has been constituted as described above, the synthetic resin materials can be blown into a vertical furnace such as a blast furnace without exerting adverse effects on the operation thereof. Further, there can be provided a granulating process for waste synthetic resin materials, in which synthetic resin-made waste bottle containers can be processed in all quantities while contributing to a reduction in the blast furnace cost, and therefore industrially useful effects can be brought about.

Embodiment 4

The present inventors continued intensive investigations in order to solve the problems described above.

As a result thereof, the present inventors have come to know the following. That is, synthetic resin-made waste bottle containers have so far been classified by material to crush the classified bottle containers after washing and removing labels and caps. In this case, the synthetic resin grains are liable to be compacted to each other since they are of the same material and shape.

If synthetic resin-made waste bottle containers are subjected simply to crushing processing without classifying them by material, grains having various shapes are formed since the bottle containers which are different in material and thickness are already present. In addition, the edges of crushed pieces are semi-molten by frictional heat in crushing and the shapes thereof are deformed in some materials.

There has been obtained the knowledge that because of the reasons described above, synthetic resin grains prepared by crushing the bottle containers still having labels and caps do not cause hanging in storage tanks and clogging in pipe lines. Provided that since caps are usually made of metals, they exert an influence on abrasion of the blades of a crusher, and therefore it is not necessarily advisable to crush the bottle containers together with the caps.

The present invention has been made based on the knowledge described above, and the constitution of the method for processing synthetic resin-made waste bottle containers according to the present invention is characterized by subjecting the synthetic resin-made waste bottle containers having labels thereon to crushing processing without removing the labels and then blowing the synthetic resin grains prepared by thus crushing the bottle containers into a vertical furnace such as a blast furnace by means of a pneumatically feeding means.

Next, the embodiment of the present invention shall be explained with reference to the drawing.

Figure 17:
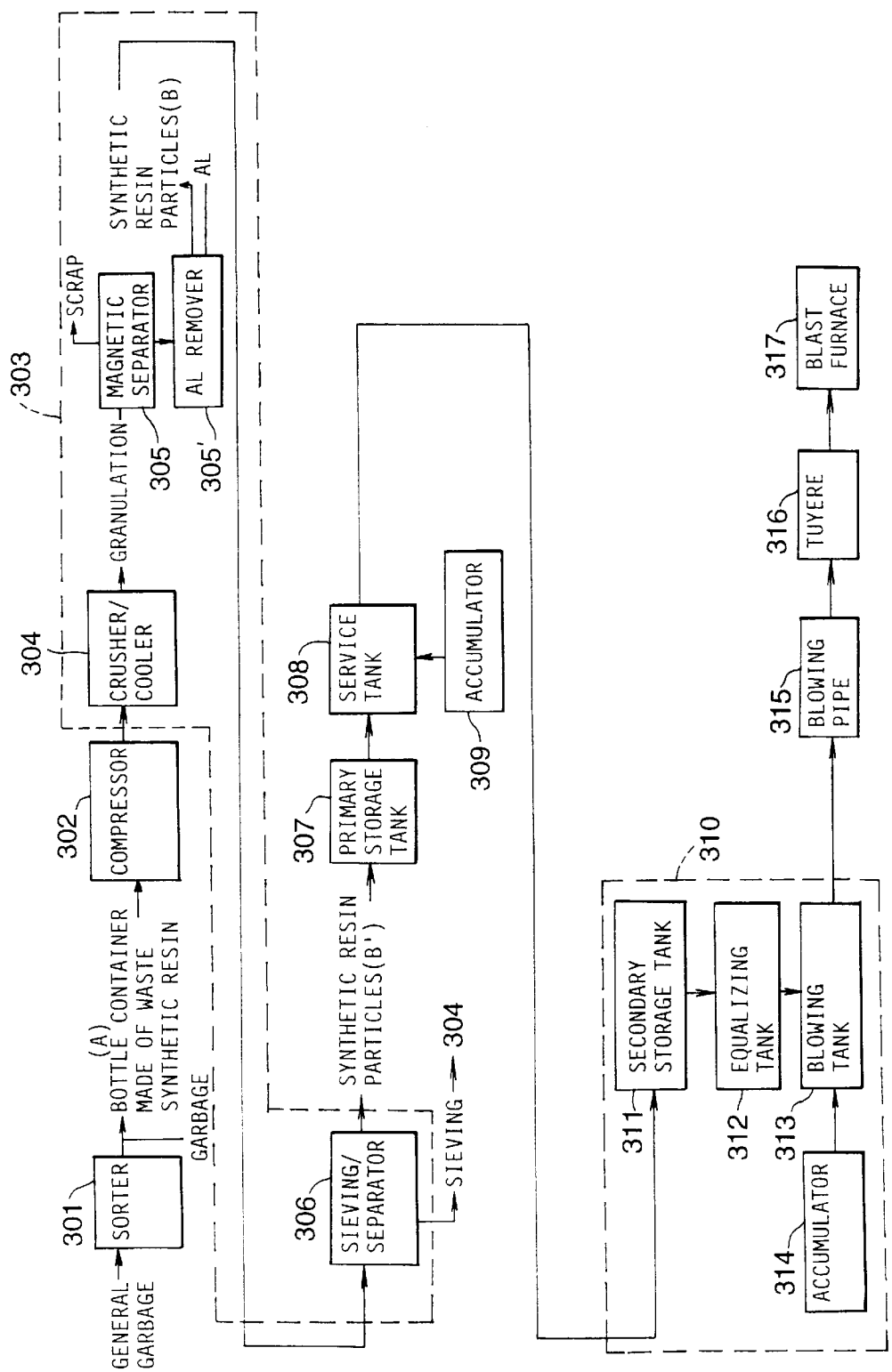
FIG. 17 is a flow sheet illustrating further another embodiment of the present invention.

FIG. 17 is a flow sheet showing one example of the embodiment of the present invention.

General dusts generated in the market are treated in a classifier 301 to classify synthetic resin-made waste bottle containers (A) from the dusts. With respect to the classifying method, commercial equipments are available, and used is, for example, a pneumatic classifier in which flowing dusts are blown off by means of an aerodynamic force making use of different flying distances of the respective dusts. The classified synthetic resin-made waste bottle containers are compressed by means of a compressing equipment 302 to increase the bulk density for the sake of convenience in carrying.

Then, the compressed bottle containers are subjected to prescribed pre-processing to form synthetic resin grains (B') having a prescribed grain diameter. That is, the compressed synthetic resin materials carried to a pre-processing facility 303 is processed by means of a crushing and cooling equipment 304 to granulate them. In this case, the compressed synthetic resin materials, which have been compressed as labels are adhered on the synthetic resin-made bottle containers, are crushed, and therefore as described above, the granulated synthetic resin materials have a shape in which drop-shaped fused grains are adhered to the end face parts of the respective grains. Since crushed pieces of metals are sometimes mixed in, iron scraps are removed by means of the following magnetic separator 305, and aluminum is removed by means of an Al removing equipment 305', whereby the synthetic resin grains (B) are prepared. They are treated in a sieving and separating equipment 306 to control the grain diameters to a prescribed grain diameter or less, and the synthetic resin grains (B') thus prepared are stored in a primary storage tank 307. They are fed into a pneumatically feeding facility 310 via a service tank 308 by means of compressed air supplied from an accumulator 309. The synthetic resin grains (B') fed into the pneumatically feeding facility 310 are transported into a secondary storage tank 311. Then, they are transferred into a blowing tank 313 via an equalizing tank 312 and blown into a blast furnace 317 from the tuyere 316 via a blowing tube 315 by means of high pressure air supplied from an accumulator 314. The blown synthetic resin grains are combusted with the aid of high temperature hot blast 318 blown from the tuyere 316 to generate combustion heat, whereby the matters charged into the blast furnace are heated and molten, and CO and $H_2$ gases are generated to act as a reducing agent for iron ore.

The synthetic resin grains remaining on the sieve after the sieving and separating processing are returned to, for example, the crushing and cooling equipment to reuse them.

In the step described above, only the synthetic resin-made waste bottle containers separated from dusts are not necessarily used, and they may be carried directly into a compressing equipment from super stores and convenience stores. The facilities of from the primary storage tank 307 up to the pneumatically feeding facility 310 are preferably installed in the vicinity of the blast furnace facility to use them also as facilities for blowing other waste synthetic resin materials into a blast furnace.

EXAMPLES

Next, the present invention shall be explained in further detail with reference to examples.

First of all, synthetic resin-made waste bottle containers were classified from general dusts, and a sample was taken from them for investigation and testing to determine a constitutional proportion by material and an average calorific value. The constitutional proportion by material and the average calorific value of the synthetic resin-made waste bottle containers are shown in Table 11.

TABLE 11

| Material | Proportion (wt. %) |
|---|---|
| PET | 66.4 |
| PP + PE | 31.8 |
| PVC | 1.6 |
| Others | 0.2 |
| Total | 100.0 |

As can be seen from the result shown in Table 11, PET accounts for a principal part in terms of a material, and PP and PE follow it. The constitutional proportion of PVC containing halogen is as low as 2 wt % or less. The average calorific value is 6859 kcal/kg, which almost reaches the range of the calorific value of coke used in a blast furnace.

The method of the present invention was tested in the steps shown in the flow sheet shown in FIG. 17. The synthetic resin-made waste bottles described above were compressed as the labels and the caps were adhered thereon to mold them into a rectangular parallepipedic compact having the dimensions of 80×80×80 cm and a bulk density of 0.3 g/cm$^3$, and then the whole amount thereof were crushed and cooled to granulate them. There were removed the metallic caps by means of the magnetic separator and aluminum by means of the Al removing equipment. Further, the granular synthetic resin materials were treated in the sieving and separating equipment to remove the synthetic resin grains having a diameter exceeding 6 mm. Then, the grains were blown into a practical blast furnace from the tuyere by means of the pneumatically feeding equipment according to the flow sheet shown in FIG. 17.

Shown are the blast furnace-operating conditions during a test period in Table 12 and the conditions for blowing the synthetic resin materials into the blast furnace in Table 13. Continuous test operation was carried out for 2 days in the conditions described above.

TABLE 12

| Blast furnace-operating conditions | Iron production | 9000 t/d |
|---|---|---|
| | Coke rate | 447 kg/t-pig |
| | Blast volume | 7260 Nm$^3$/min |
| | Oxygen enrichment ratio | 4 vol. % |
| | Blast temperature | 1200° C. |

TABLE 13

| Synthetic resin material-blowing conditions | Blow amount of synthetic resin material | 62.5 kg/min |
|---|---|---|
| | Blow amount of pneumatic gas | 1200 Nm$^3$/h |
| | Type of pneumatic gas | Air |

As a result thereof, clogging in the storage tanks and the pneumatically feeding pipes by the synthetic resin grains were not caused at all, and the synthetic resin grains could stably be blown into the blast furnace by means of the pneumatically feeding facility. Accordingly, the blast furnace could smoothly be operated. The operating results were by no means inferior as compared with those obtained in conventionally operating a blast furnace without blowing the synthetic resin materials. PVC of 2 wt % was contained in the synthetic resin materials blown, but the result of gas analysis showed that no dioxin was contained in blast furnace exhaust gas.

It has been found from the test results described above that in the case where the synthetic resin-made bottle containers are blown into a blast furnace after subjecting the bottle containers to pre-processing, the synthetic resin grains having a good fluidity can be obtained by subjecting the bottle containers to crushing and cooling processings without removing the labels and the caps from the bottle containers and as a result thereof, the granular synthetic resin materials can stably be blown into the blast furnace by means of the pneumatic feeding facility.

The present invention has been constituted as described above in a method for processing synthetic resin-made waste bottle containers, and therefore dumping sites for disposing them has become unnecessary. Further, in crushing and cooling processing for granulation in blowing them into a vertical furnace such as a blast furnace, either classification and separation thereof by material or distinction thereof by color is unnecessary, and the labels do not have to be removed. In addition, the bottles do not have to be washed. Accordingly, disposal costs for these matters become unnecessary. Since the granular synthetic resin materials can stably be blown into a blast furnace as an alternative for a part of coke, they contribute as well to a reduction in the pig iron-manufacturing cost. The present invention can provide the method for processing the synthetic resin-made waste bottle containers as described above to bring about industrially useful effects.

Embodiment 5

The present inventors continued intensive investigations in order to solve the problems described above and obtained the following knowledge.

Shredder dusts are cotton dust-shaped and have as small bulk density as 0.15 g/cm$^3$ in the beginning of generation thereof. However, clogging in pipe lines and hanging in storage tanks can be prevented by semi-melting and leaving them for cooling down or rapidly cooling after semi-melting to granulate them and increase the bulk density and then pneumatically blowing into a vertical furnace.

On the other hand, shredder dusts are wetted while storing in an outdoor yard to become massive or sticky, which makes handling thereof difficult in the course of carrying. Accordingly, the shredder dusts have to be subjected to pre-processing such as cutting or crushing before pneumatically blowing into a vertical furnace. In this case, the shredder dusts are semi-molten by resulting frictional heat. Also, the shredder dusts are completely molten in certain cases depending on the properties thereof in accepting them. Thus, the shredder dusts can readily be contracted and solidified by semi-melting or melting. Such pre-processing can prevent the pipelines from being clogged in blowing the shredder dusts into a vertical furnace.

The present embodiment is characterized by semi-melting or melting shredder dusts produced in disposing automobiles and home electric appliances by frictional heat generated when cutting or crushing them, contracting and solidifying the shredder dusts thus semi-molten or molten into a granular shape and then pneumatically feeding the shredder dusts contracted and solidified into a granular shape to blow them into a vertical furnace.

Another embodiment is characterized by semi-melting or melting shredder dusts produced in disposing automobiles and home electric appliances by heating after cutting or crushing, contracting and solidifying the shredder dusts thus semi-molten or molten into a granular shape and then pneumatically feeding the shredder dusts contracted and solidified into a granular shape to blow them into a vertical furnace.

Next, the embodiments of the present invention shall be explained with reference to the drawings.

Figure 18:
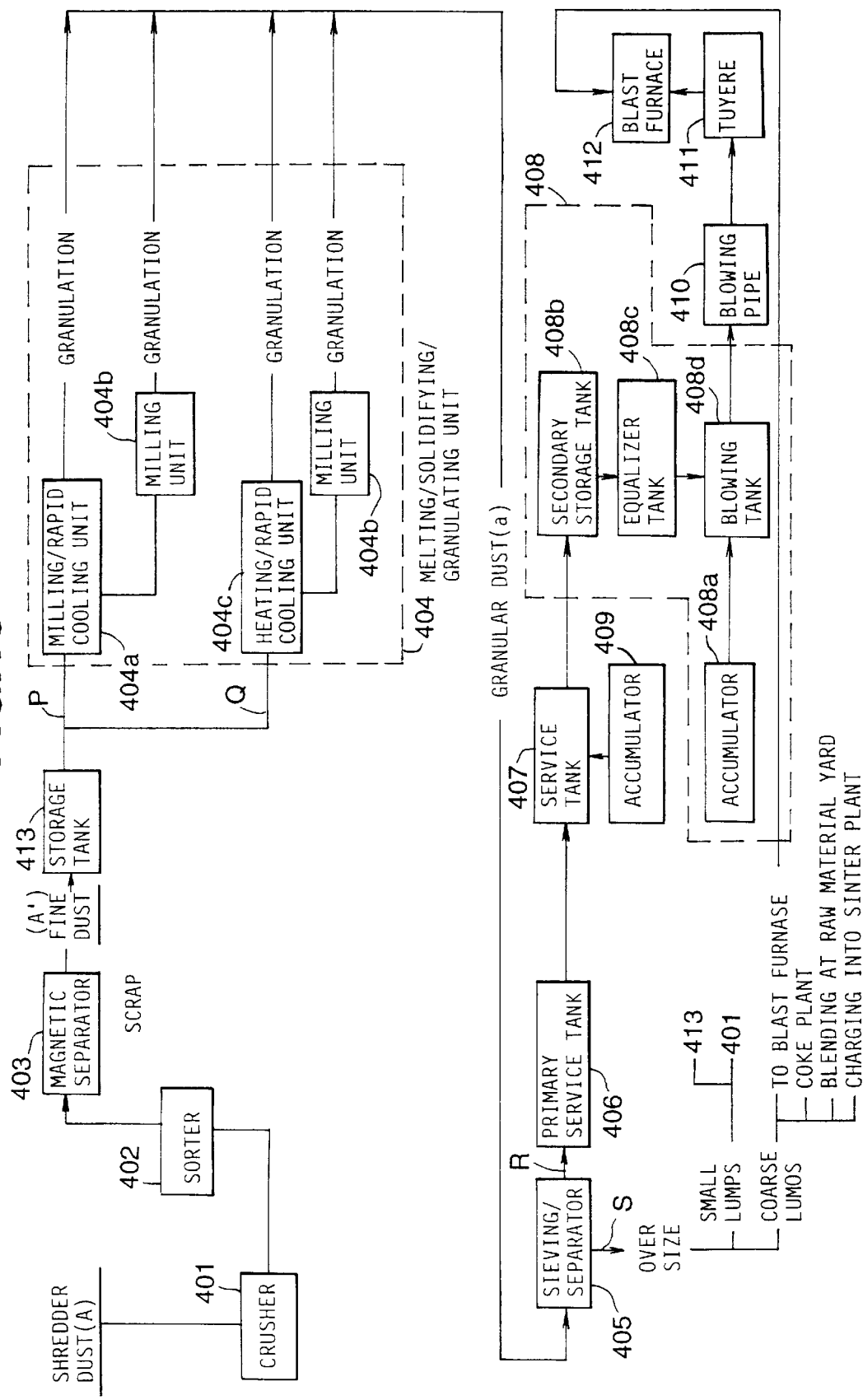
FIG. 18 is a flow diagram illustrating an example of treatment of shredder dust in a shaft furnace in the present invention.

FIG. 18 is a flow chart for explaining one example of the method for feeding shredder dusts into a vertical furnace according to the present invention, wherein shown are facilities and an operational flow for subjecting to pre-processing, dusts (hereinafter referred to as granular dust) obtained by contracting and solidifying the shredder dusts accepted and granulating them into a prescribed grain size and then feeding them into a vertical furnace by means of a pneumatically feeding facility. In FIG. 18, the shredder dusts (A) are carried from a stock yard (not illustrated) and crushed by means of a crushing equipment 401, and when the temperatures of the crushed matters are elevated, they are suitably cooled down. Depending on the shapes of the shredder dusts, they are molded into a stick form by extruding with an extruder (not illustrated) before processing them by means of the crushing equipment 401 and then suitably cooled down. Subsequently, the crushed dusts are loosened by means of a separator 402 to obtain the shredder dusts (hereinafter referred to as "small piece dusts (A')") from which iron scraps have been removed by means of a magnetic separator 403. The small piece dusts (A') are once stored in a storage tank 413 and charged into a melting·solidifying and granulating equipment 404 via a conveyor. Provided that when the shredder dusts can be loosened only by the crushing processing, they may not be passed through the separator 402.

The melting·solidifying and granulating equipment 404 is used for granulating the small piece dusts (A), and depending on the shapes of the small piece dusts (A), they are processed through either one of two routes divided into P and Q. A crushing and rapidly cooling equipment 404a and a crusher 404b are provided in the route P, and a heating and rapidly cooling equipment 404c and a crusher 404b are provided in the route Q. The melting·solidifying and granulating equipment 404 is a leading equipment for contracting and solidifying the shredder dusts to increase the bulk density and granulating them into a prescribed grain size. Accordingly, the processing route and the equipment use manner are determined according to the properties of the small piece dusts (A') staying at a middle stage and the desired shape and size of the granular dusts (a). A typical manner for using the melting·solidifying and granulating equipment 404 shall be explained.

Case 1: the small piece dusts (A') delivered from the storage tank 413 are processed into the granular dusts (a) in the route P, and the following routes are further available:

(1—1) the small piece dusts (A') are processed by means of the crushing and rapidly cooling equipment 404a to be contracted and solidified into the granular dusts (a).

Figure 19:
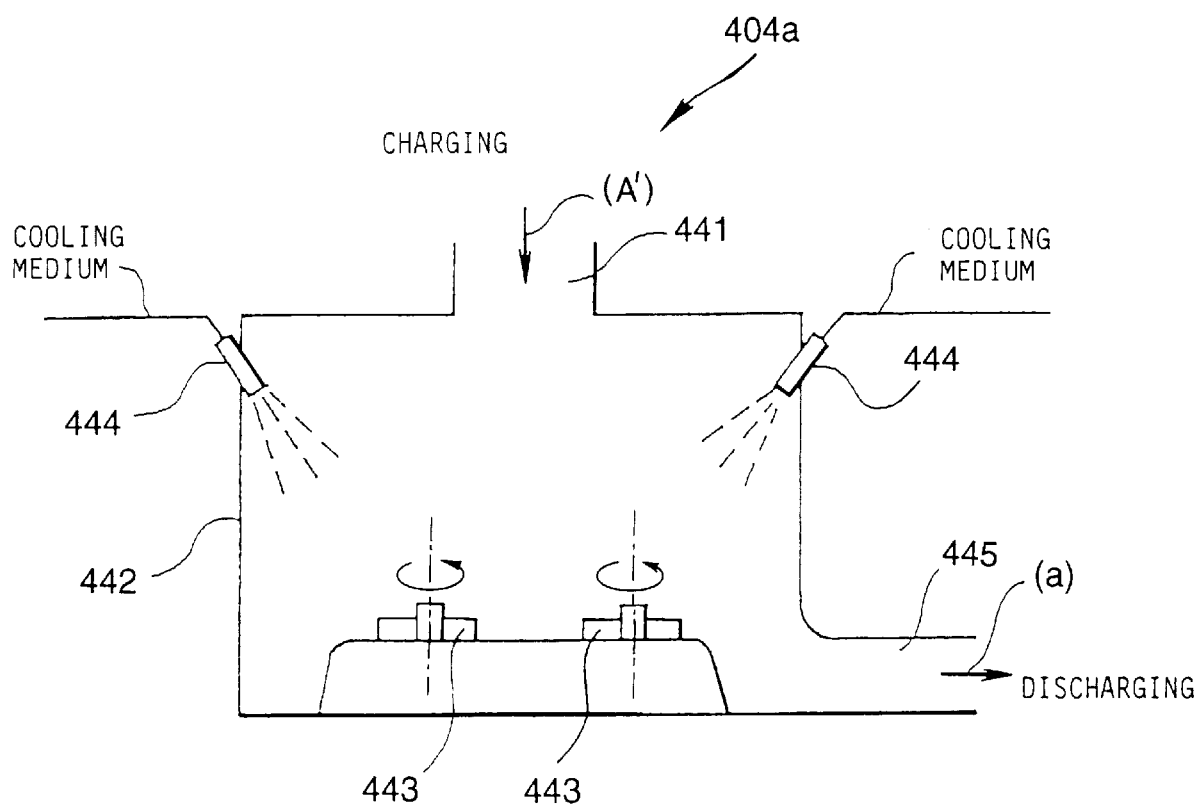
FIG. 19 is a schematic diagram view illustrating a method of causing contraction and solidification for granulation of fine dust by a milling/rapid cooling unit.

FIG. 19 is a drawing for explaining a method for contracting and solidifying the small piece dusts (A') into a granular shape (a) by means of the crushing and rapidly cooling equipment 404a. The small piece dusts (A') are fed into a rotary crusher 443 installed in a crushing chamber 442 from a charging port 441 and crushed small to be semi-molten or completely molten by frictional heat. The granulated dusts discharged from the rotary crusher 443 are rapidly cooled down by means of a cooling medium (for example, water spray) sprayed from a nozzle 444 to be contacted and solidified into a granular shape and discharged from a discharging port 445.

(1-2) The small piece dusts (A') may be discharged after only crushing without rapidly cooling in the crushing and rapidly cooling equipment 404a of [1] described above to be contracted and solidified, and this contracted and solidified dust 446 may be crushed into a prescribed size by means of the crusher 404b.

Figure 20:
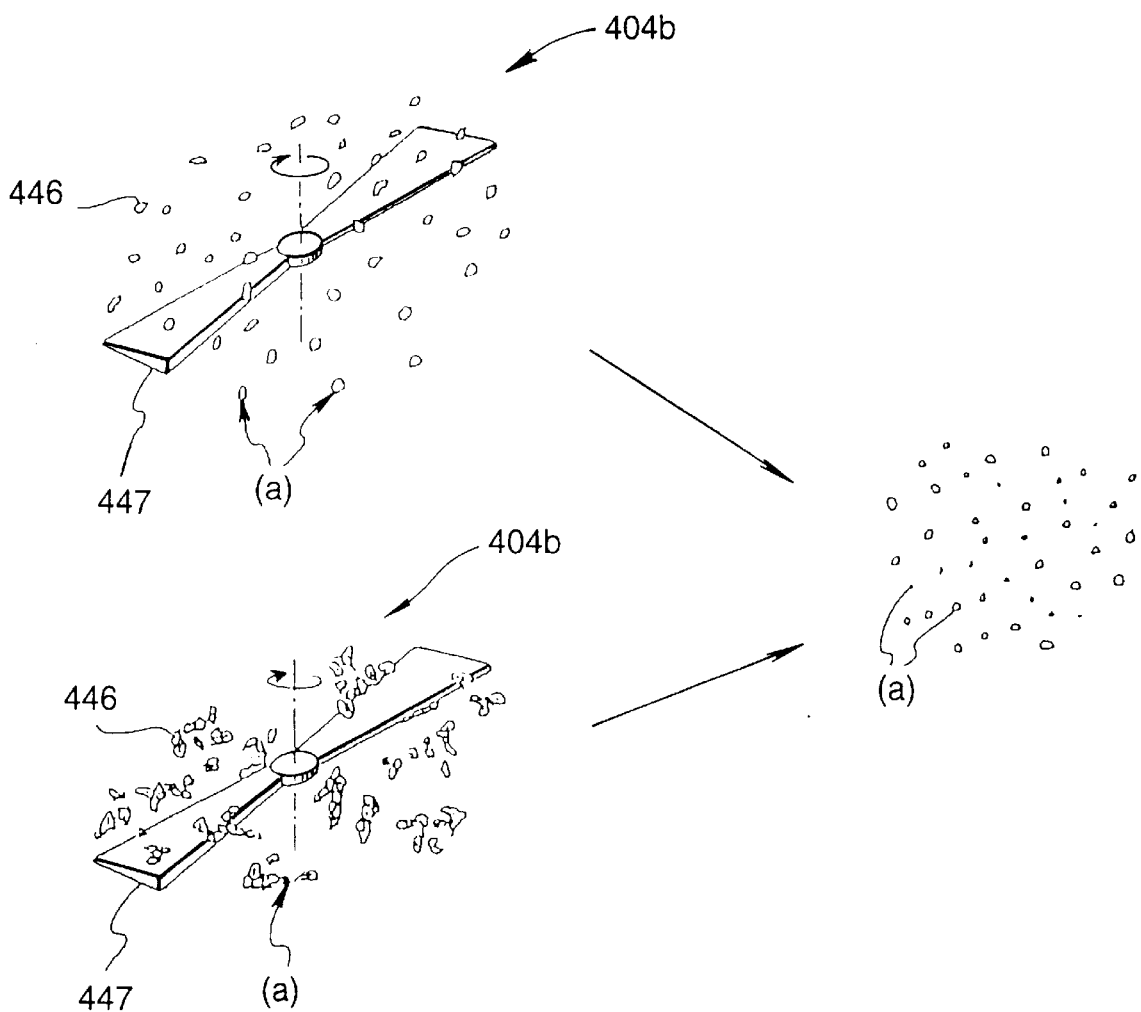
FIG. 20 is a schematic diagram of a method for granulating dust after contraction and solidification by the milling unit.

FIG. 20 is a schematic diagram of a method for granulating the contracted and solidified dusts 446 by means of the crusher 404b. The contracted and solidified dusts 446 are cut and crushed by means of a rotary blade 447 rotating at a high rate and then cooled down in an air flow, whereby the granular dusts (a) are obtained. FIG. 20 (i) shows the case where the temperatures of the granular dusts are elevated by frictional heat produced in crushing but the granular dusts are not molten at al, and FIG. 20 (ii) shows the case where the granular dusts are semi-molten by frictional heat but solidified by a cooling effect exerted by an air flow, whereby the granular dusts (a) are obtained.

(1-3) The granular dusts (a) may further be processed by means of the crusher 404b after processing small piece dusts (A') into the granular dusts (a) in the manner as shown in (1—1) described above.

Case 2: the small piece dusts (A') delivered from the storage tank 413 are processed into the granular dusts (a) in the route Q, and the following routes are further available:

(2-1) the small piece dusts (A') are processed by means of the heating and rapidly cooling equipment 404c to be contracted and solidified into the granular dusts (a).

Figure 21:
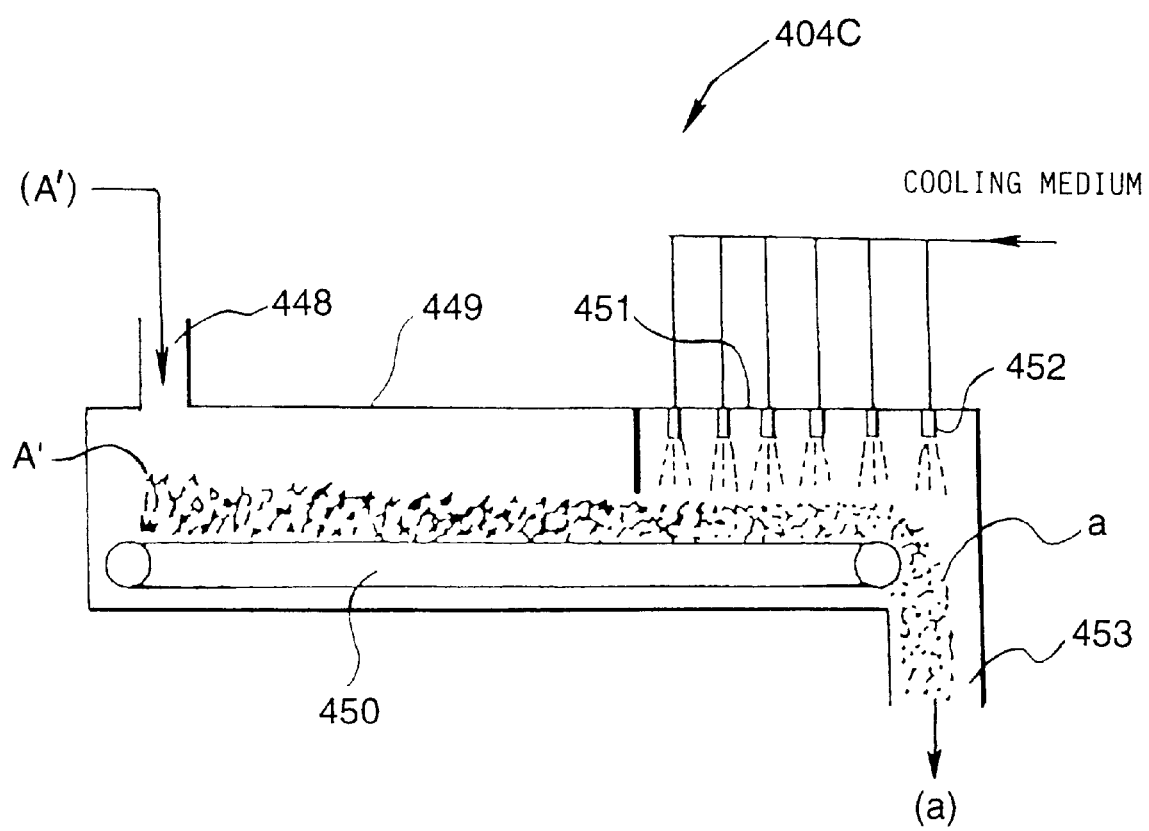
FIG. 21 is a schematic diagram view illustrating a method for causing contraction and solidification for granulation of fine dust by a heating/rapid cooling unit.

FIG. 21 is a drawing for explaining a method for contracting and solidifying the small piece dusts (A') into a granular shape (a) by means of the heating and rapidly cooling equipment 404c. The small piece dusts (A') are fed onto a heating and transporting belt 450 provided in a heating chamber 449 from a charging port 448, and the dusts which have been semi-molten or completely molten by heating are transferred into an adjacent rapidly cooling chamber 451. The dusts are rapidly cooled down here by means of a cooling medium (for example, water spray) sprayed from a nozzle 452 and dispersed. They are contracted and solidified into the granular dusts (a) and discharged from a discharging port 453.

(2—2) The small piece dusts (A') may be discharged after only heating without rapidly cooling them in the heating and rapidly cooling equipment 404c of (2-1) described above to be contracted and solidified, and this contracted and solidified dust 454 may be crushed to a prescribed size by means of the crusher 404b as shown in FIG. 20 (i).

(2-3) The granular dusts (a) may further be processed by means of the crusher 404b after processing small piece dusts (A') into the granular dusts (a) in the manner as shown in (2-1) described above.

It shall be determined based on the following ways of thinking which of the routes described above is selected.

In general, a method which is the most advantageous in terms of cost is the method of (1—1) in Case 1 described above, and therefore this method is targeted for application.

First of all, a prescribed value: $D_0$ mm or less shall be obtained as the target grain diameter of the granular dusts (a). As the rotating rate and the processing time of the rotary crusher 443 are increased, the temperatures of the shredder dusts are elevated, and the shredder dusts are molten. On the other hand, the grain diameters of the crushed dusts are decreased as the rotating rate and the processing time of the rotary crusher 443 are increased. In such course, the crushing conditions are controlled so that the grain diameters reach the target value $D_0$ mm or less and the dust temperatures become a temperature $T_0$ which is lower by prescribed value than the melting point, and when the grain diameter and the temperatures of the dusts satisfy these conditions, the dusts are rapidly cooled down.

In the case where the dust temperatures do not reach $T_0$ while the grain diameter have reached $D_0$ mm or less, the conditions are controlled so that the elevating rate of the dust temperatures is increased while suppressing an increase in the crushing rate. In contrast with this, in the case where the grain diameter do not reach $D_0$ mm or less while the dust temperatures have reached $T_0$, the conditions are controlled so that the crushing rate is accelerated while suppressing the elevating rate of the dust temperatures.

The use of the heating and rapidly cooling equipment 404c in the case 2 is limited fundamentally to emergency such as the case where a difference between the materials in the material constitution of the small piece dusts (A') is large, and a difference between the melting temperatures thereof is large, or the case where the crushing and rapidly cooling equipment 404a can not be used because of under repair.

The present invention is characterized largely by that dusts which are cotton dust-shaped and have a small bulk density, such as shredder dusts are contracted and solidified and granulated by subjecting them to suitable pre-processing as described above and then blown into a vertical furnace such as a blast furnace from the tuyere. Thus, clogging in a pipe line and hanging in a storage tank are not caused, and the vertical furnace can be operated continuously without having problems.

The granular dusts (a) are charged into the sieving and separating equipment 405, and the grains (through sieve) having a grain diameter of less than a prescribed value are stored in a primary storage tank 406 as shown in the route R. The granular dusts (a) having a prescribed grain diameter stored in the primary storage tank 406 are pneumatically transported to a pneumatically feeding equipment 408 via a service tank 407. The pneumatically feeding equipment 408 comprises a secondary storage tank 408b in which the granular dusts (a) are prepared for feeding, an equalizing tank 408c, a blowing tank 408d and a pneumatically feeding accumulator 408a. Then, the granular dusts (a) are blown into a blast furnace 412 from a blowing tube 410 disposed at a tuyere 411 of the blast furnace.

On the other hand, the granular dusts having a grain diameter of the prescribed value or more remaining on the sieve in the sieving and separating equipment 405 described above are further divided into small lumps having a grain diameter of less than the prescribed value and large lumps having a grain diameter of the prescribed value or more. The small lump dusts are returned to the storage tank 413, the roughly crushing and cooling equipment 401 or the melting·solidifying and granulating equipment 404 to reuse them. Meanwhile, the large lump dusts are joined into a raw material-charging line (not illustrated) which is an auxiliary facility of the blast furnace and charged form the top of the blast furnace together with coke, or charged into a coke oven, blended in a material yard or charged into a sintering furnace.

EXAMPLES

Next, the present invention shall be explained in further detail with reference to examples.

Based on the flow chart showing the process of the present invention shown in FIG. 18, a test for blowing shredder dusts into a practical blast furnace from the tuyere after subjecting them to pre-processing and a test operation for charging the processed shredder dusts from the top were carried out over the period of 7 days. The operating conditions of the blast furnace are shown in Table 14.

TABLE 14

| Blast furnace-operating conditions | Iron production | 9000 t/d |
|---|---|---|
| | Coke rate | 447 kg/t-pig |
| | Blast volume | 7260 Nm$^3$/min |
| | Oxygen enrichment ratio | 4 vol. % |
| | Blast temperature | 1200° C. |

According to the flow chart shown in FIG. 18, the shredder dusts (A) were processed by means of the crusher

401. The temperatures of the shredder dusts (A) were elevated to about 120° C. by frictional heat produced by crushing, so that the shredder dusts (A) were semi-molten, and therefore they were cooled down by water. Subsequently, they were treated in the separator 402 and the magnetic separator 403 and then charged into the melting·solidifying and granulating equipment 404. The melting·solidification and granulation was carried out in the route P, and the crushed dusts which were semi-molten by processing with the crushing and rapidly cooling equipment 404*a* were rapidly cooled down and contracted and solidified into a granular shape. Further, the granular solidified dusts were crushed by means of the crusher 404*b* to obtain the granular dusts (a). Then, they were treated in the sieving and separating equipment 405, and the granular dusts having a grain diameter of 6 mm or less were stored in the primary storage tank 406. Subsequently, the granular dusts (a) were pneumatically transported to the pneumatically feeding equipment 408 via the service tank 407 and blown into the blast furnace 412 from the tuyere 411 via the blowing tube 410. The blown granular dusts had a bulk density of 0.35 to 0.45 g/cm$^3$.

The blowing conditions of the granular dusts (a) are shown in Table 15.

TABLE 15

| Shredder dust-blowing conditions | Blow amount of synthetic resin material | 62.5 kg/min |
|---|---|---|
| | Blow amount of pneumatic gas | 1200 Nm$^3$/h |
| | Type of pneumatic gas | Air |

On the other hand, the massive dusts having a grain diameter of 50 mm or more out of the dusts having a grain diameter exceeding 6 mm, which were obtained by treating in the sieving and separating equipment 405 were stored in a prescribed amount and then charged from the top of the blast furnace 412 through the raw material-charging line of the blast furnace 412 together with coke. The massive dusts having grain diameters exceeding 6 mm and less than 50 mm were recycled into the roughly crushing and cooling equipment 401.

The shredder dusts blown had a calorific value of about 3000 kcal/kg and a blown amount of 2.2% in terms of a weight ratio based on the weight of coke. The granulation of the shredder dusts and an increase in the bulk density thereof entirely prevented operating troubles such as clogging in the pipe lines by shredder dusts and hanging in the storage tanks from being brought about during the continuous operation over a period of 7 days, and no change in the operating results of the blast furnace was observed as compared with those in ordinary operation. Further, analyzed were dioxin by a GC-MS method and NO$_x$ by chemiluminescence to find that both were not detected in blast furnace gas.

The present invention has been constituted as described above, and therefore clogging in the pipe lines by shredder dusts and hanging in the tanks are prevented from being caused. In addition, the shredder dusts can be blown into a blast furnace without exerting adverse effects on the operating conditions of the furnace, and the shredder dusts can be disposed without producing dioxin and harmful gas such as NO$_x$. Thus, the method of the present invention for disposing the shredder dusts coming from waste cars and waste home electric appliances in a vertical furnace brings about industrially very useful effects.

Embodiment 6

In order to eliminate the foregoing problems, the present inventors have made many studies with the following findings. To begin with, inspection of the combustion zone out of a peep hole for the tuyere has revealed that upon blowing in the furnace, a synthetic resin material having a large particle diameter remains combustibly swirled in the combustion zone for a prolonged period of time until the resin particles become rather fine, after which the resin material flies outside such zone. In contrast to the synthetic resin material, coal, namely finely grained coal, gets immediately decomposed with heat and finely grained while liberating its volatile components, eventually flying outside the combustion zone.

Thus, when blown into the furnace out of the tuyere, the synthetic resin material and coal show their respective different behaviors in the combustion zone. In regard to the resin material, it has now been found that if the particle diameters are so formed as to delay flying of the resulting resin particles out of a combustion zone, improved combustibility can be attained.

As a result, the present inventors have found the following facets.

In general, end velocity commonly so called is taken to denote the particle velocity in which the screwing force applied to particles moving in a fluid in a gravitational field or a centrifugal field gets balanced with the resisting force of those particles. While the end velocity of a synthetic resin material blown out of a tuyere into a combustion zone is being maintained sufficiently higher than the flow rate of gas discharged out of that zone, the resin material does not fly outside the combustion zone and hence remains still circulated in that zone so that the resin material is made sufficiently combustible with a high combustion ratio.

The present invention has been completed based on the aforementioned findings. The invention pertains to a method wherein pig iron is produced in a vertical furnace by use of a synthetic resin material blown as a heat source out of a tuyere into the furnace, characterized in that such resin material has a particle diameter capable of affording a higher end velocity than the flow rate of gas coming out of a combustion zone. Such specific particle diameter is hereunder referred to as "critical particle diameter".

Here, the critical particle diameter should preferably be decided from the following empirical steps; that is, [1] the flow rate of gas discharged out of a combustion zone is computed depending on the operating conditions of a vertical furnace used, [2] the end velocity of a synthetic resin material in a combustion zone is decided with resort to the physical characteristics (including particle diameters) of the resin material and to the physical characteristics of the combustion zone, and [3] a certain empirical equation is solved which is needed to evidence that such end velocity is greater than the rate of gas flow.

Next, one preferred embodiment of the present invention will be described with reference to the drawings.

Figure 22:
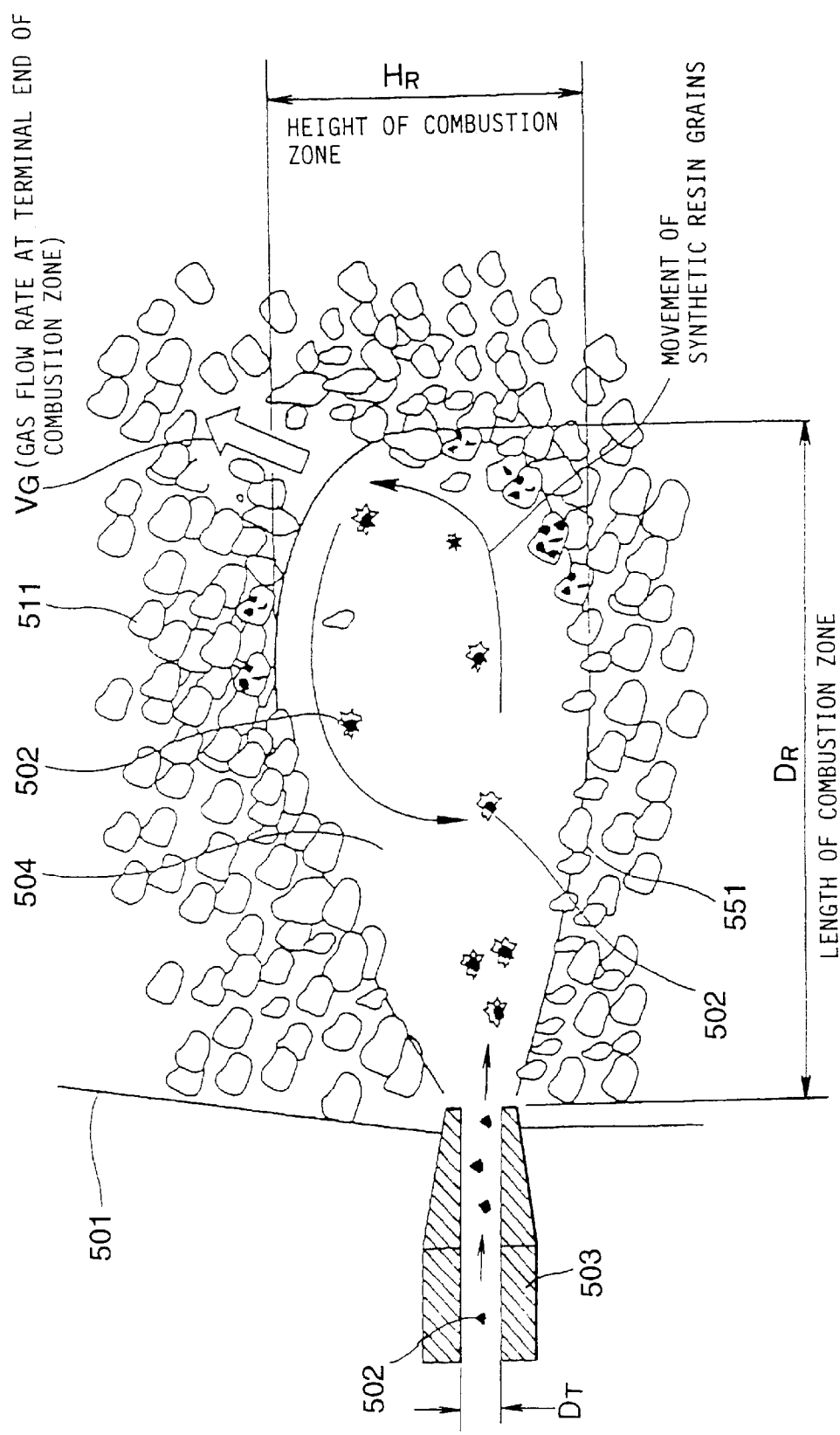
FIG. 22 is a schematic perspective view of the interior of a shaft furnace for illustrating the combustion zone formed at tuyere nose of the shaft furnace used for application of the present invention.

FIG. 22 is a schematic perspective view taken to explain the interior of a vertical furnace wherein a combustion zone has been defined forwardly of a tuyere by charging out of a furnace top heat sources such as iron ore, scrap and the like and coke, by blowing from the tuyere a given oxygen-rich air and a selected synthetic resin material, and subsequently by burning the coke coming down at the tuyere location, thereby bringing such resin material into combustible condition.

In FIG. 22, designated at 501 is an inner wall of a vertical furnace body, at 502 a synthetic resin material, at 503 a tuyere and at 504 a combustion zone. With further respect to the combustion zone 504, D$_R$ refers to the breadth of such zone, $H_R$ to the height of such zone, $V_G$ to the rate of gas flow in a vertical direction at a terminal end of such zone and $D_R$ to the diameter of the tuyere. The width of the the combustion zone is not shown in this figure which, however, has a length $W_R$ in a direction perpendicular to the plane of the figure.

In this embodiment, the flow rate of gas $V_G$ discharged in a vertical direction out of the combustion zone (hereunder referred to as "flow rate of gas in a vertical direction at a terminal end of the combustion zone") and the end velocity $V_p$ of a synthetic resin material in the combustion zone are decided as indicated below.

(1) Flow Rate of Gas in Vertical Direction at Terminal End of Combustion Zone

The flow rate of gas $V_G$ in a vertical direction at a terminal end of the combustion zone is decided by computing the cross-sectional area of such zone from the width $W_R$ of and the height $H_R$ of such zone and further by calculating the void of coke filled.

The length $D_R$ of, the width $W_R$ of and the height $H_R$ of the combustion zone are represented, respectively, by the equations (1), (2) and (3) below.

$$D_R/D_T = C(\rho_g/\epsilon b^3 \rho_p)^{1/2} \cdot (U/(gD_{pc}))^{1/2} \quad (1)$$

$$W_R/D_R = 2 \cot 30 (1 + kD_R/D_T)^{1/2} \quad (2)$$

$$(H_R/D_R)(D_R/D_T) = K\epsilon_b^{3/2} \quad (3)$$

where $D_R$: length of combustion zone (m)
$W_R$: width of combustion zone (m)
$H_R$: height of combustion zone (m)
$D_T$: diameter of tuyere (m)
$D_{pc}$: diameter of coke charged (m)
$\rho_g$: density of blown gas (kg/m$^3$)
$\rho_p$: apparent density of coke (kg/m$^3$)
$\epsilon_b$: void of coke charged when filling (-)
g: gravity acceleration (m/sec$^3$)
U: gas flow at tuyere tip (m/sec)
C: constant
K: constant
k: constant as to spread angle of jet The flow rate of gas $V_G$ in a vertical direction at a terminal end of the combustion zone can be decided by the following equation (4) with the use of $W_R$, $H_R$ and $\epsilon$ decided from the equations (1) to (3).

$$V_G = \{Q(273+T_B)/293\} \times \{1/(1+P_B)\} \times [1/(W_R+H_R)/4)^2 \pi] \times (1/\epsilon^{2/3}) \quad (4)$$

where Q: blast volume (Nm$^3$/sec)
$T_B$: blast temperature (0° C.)
$P_B$: blast pressure (atm)

(2) End Velocity of Synthetic Resin Material in Combustion Zone

The end velocity VP (m/sec), i.e., the particle velocity in which the screwing force of particles of a synthetic resin material in a combustion zone positioned forwardly of a tuyere at a lower portion of a vertical furnace gets balanced with the resisting force applied to those particles, can be computed by the following equations (5-1) and (5-2) with the use of the temperature, gas density, gas viscosity and pressure in the combustion zone and also of the particle diameter and particle density of a synthetic resin material selected.

In the case of 2<Re<500:

$$V_P = \{4g^2(\rho_{p1}-\rho)^2 D_p^3/225/\mu/\rho\}^{1/3} \quad (5-1)$$

In the case of 500<Re<10$^5$:

$$V_P = \{3.03 \, g(\rho_{p1}-\rho)D_p/\rho\}^{1/2} \quad (5-2)$$

where Re: Reynolds number $= D_p V_p \rho/\mu$
$V_P$: end velocity of synthetic resin material (m/sec)
$\rho_{p1}$: particle density of synthetic resin material (kg/m$^3$)
$\rho$: gas density in combustion zone (kg/m$^3$)
$D_p$: particle diameter of synthetic resin material (m)
$\mu$: gas viscosity in combustion zone (N/m)
g: gravity acceleration (m/sec$^3$)

Accordingly, the critical particle diameter, wherein the particles of the synthetic resin material are prevented from flying outside the combustion zone at a location situated forwardly of the tuyere, can be decided by solving a given equation in terms of the particle diameter $D_p$ of the resin material, in which equation the numerical value of the end velocity $V_p$ computed from the equation (5-1) above or or the equation (5-2) above is defined to be greater than that of the flow rate of gas $V_G$ in a vertical direction at a terminal end of the combustion zone computed from the equation (4) above.

On the other hand, it is preferred that the upper limit in particle diameters of the synthetic resin material be below half the internal diameter of transport pipings with adverse clogging of the pipings taken in view.

Suitable synthetic resin materials may be hydrocarbon comounds of a polymeric class such as polyethylene, polypropylene, polystyrene and so on. No particular restriction is placed on the kind of polymeric hydrocarbon compounds.

EXAMPLES

With reference to several examples as regards combustion testing in a combustion zone positioned forwardly of a tuyere and also to the drawings, the present invention will be described hereunder.

Figure 23:
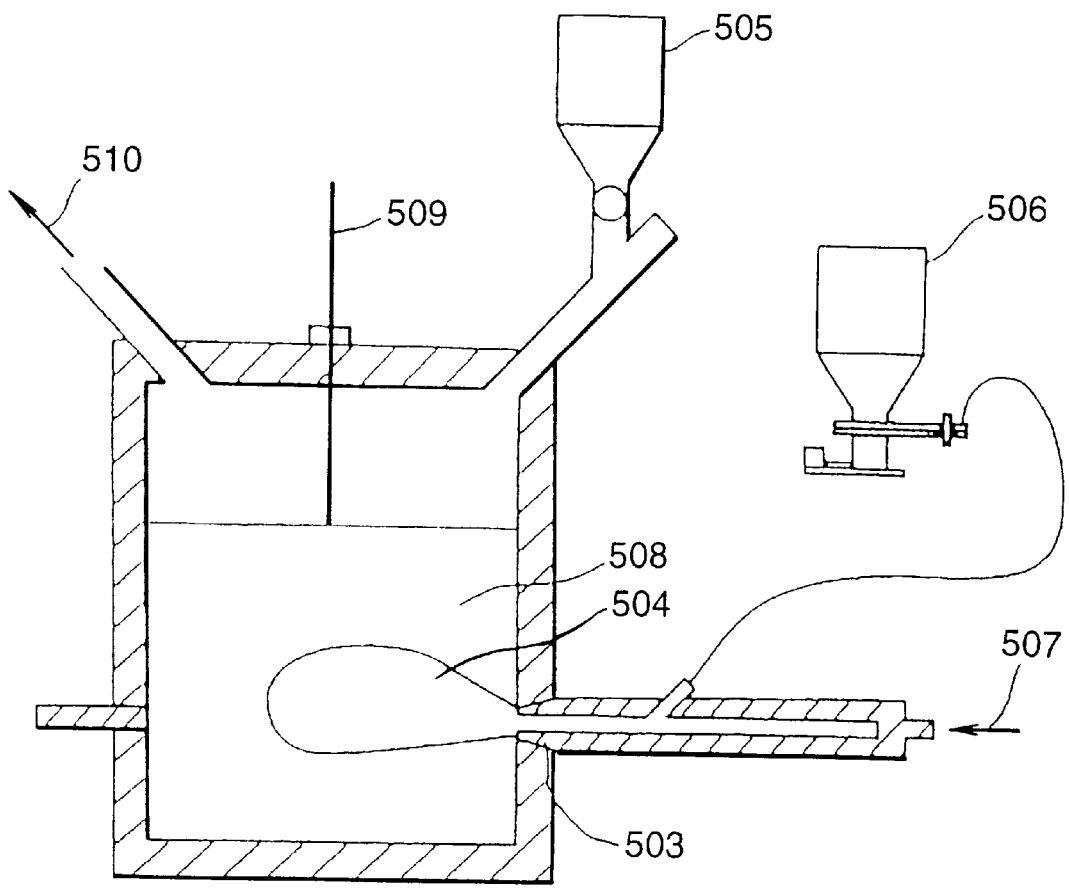
FIG. 23 is a schematic longitudinal sectional view illustrating a typical shaft furnace combustion experimental equipment used for application of a combustion test in the present invention.

FIG. 23 is a schematic view, taken vertically cross-sectionally, of a combustion testing apparatus equipped with a vertical furnace used for combustion testing according to the present invention. In this figure, the reference numeral 503 refers to a tuyere, 504 to a combustion zone, 505 to a coke hopper, 506 to a synthetic resin material hopper, 507 to a blast air, 508 to a coke-filled layer, 509 to a counter rod and 510 to a combustion gas. This test apparatus has been modeled after a blast furnace on a commercial basis.

Table 16 lists major conditions for combustion testing conducted by the use of the abobe test apparatus.

TABLE 16

| | |
|---|---|
| Blast volume (Nm$^3$/hr) | 350 |
| Blast temp. (°C.) | 1200 |
| Blast gas analysis (vol. %) O$_2$ | 77 |
| N$_2$ | 23 |
| Tuyere nose gas flow velocity (m/sec) | 145 |
| Coke particle diameter (mm) | 20 to 30 |
| Void ratio upon charging coke (-) | 0.6 |
| Quantity of blown synthetic resin material (kg/hr) | 30 |
| Synthetic resin material analysis (wt. %) C | 84 |
| H | 14 |

Coke having a particle diameter of 20 to 30 mm and supplied from a coke hopper 505 was charged into a furnace from a top thereof and then adjusted in its height of charge with a counter rod 509 such that the void was set at 0.6. Individually, from a tuyere 503, a blast air of 1,200° C. was blown into the furnace in a blast volume of 350 Nm$^3$/hr and also a synthetic resin material transported from a hopper 506 for such resin material. The resin material was blown in an amount of 30 kg/hr, which amount was reduced to be equilavent to an amount of 90 kg/t of fuel (blast fuel ratio) required for 1 ton of pig iron to be produced in a blast furnace. The flow rate of gas at a tuyere tip was computed to be 145 m/sec. Thus, the coke contained in a coke-filled layer 508 and the blown material were allowed to be vigorously combustible so that a combustion zone 504 was defined forwardly of the tuyere 503.

The following test [1] was first performed.

[1]: Under the test conditions, the diameter of the tuyere 503 was maintained constant at 65 mm, and the particle diameters (hereunder indicated by way of certain typical particle diameters) of the synthetic resin material were varied in a range from 0.6 to 10 mm. In this way, combustion was tested to determine combustion ratios.

The typical particle diameters of the resin material were defined by arithmetic mean values (hereinbelow in like manner).

The combustion ratio α was defined by the equation (6) below, whereby combustion ratios α were calculated (hereinbelow in like manner).

$$\alpha = (A-B)\beta/C \quad (6)$$

where A: consumption of coke (kg/hr) without synthetic resin material blown in

B: consumption of coke (kg/hr) with synthetic resin material blown in

β: carbon content in coke

C: carbon content (kg/hr) in blown synthetic resin material

Portions of the synthetic resin material having failed to become combustible in the combustion zone decompose, at a region above such zone, into constituent hydrocarbons such as ethane, ethylene, ethylene, propylene or the like. For this reason, the combustion ratio was determined separately from the content of hydrocarbons in waste gas collected at an upper part of the furnace was compared to that obtained from the equation (5) (hereinbelow in like manner).

Figure 24:
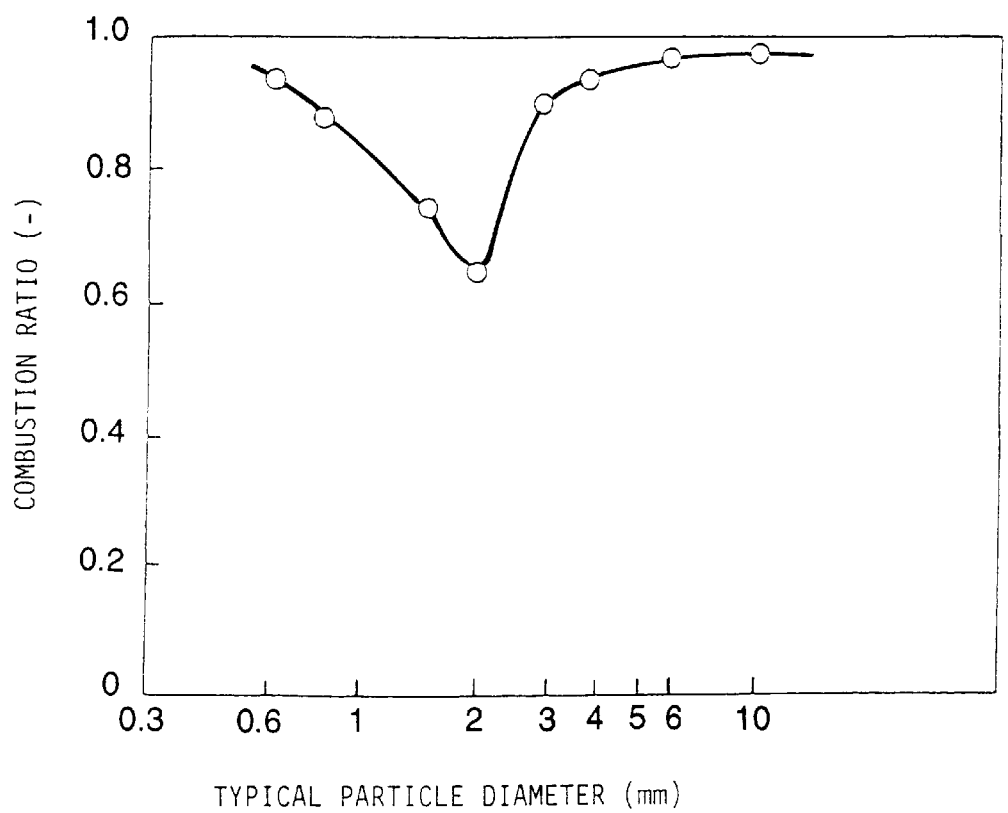
FIG. 24 is a graph illustrating the relationship between the representative particle diameter of the synthetic resin material and the degree of burn-up of the synthetic resin material in the case where the combustion experimental equipment shown in FIG. 23 is used.

The combustion ratios of the synthetic resin material relative to the typical particle diameters thereof, obtained in Test [1] above, are shown in Table 17. The relationship between the combustion ratios and the typical particle diameters are shown in FIG. 24.

TABLE 17

| | Typical particle dia. of synthetic resin material (mm) | Combustion ratio of synthetic resin material (−) |
|---|---|---|
| Example 1 | 10 | 0.96 |
| Example 2 | 6 | 0.95 |
| Example 3 | 4 | 0.91 |
| Example 4 | 3 | 0.89 |
| Example 5 | 1.5 | 0.74 |
| Example 6 | 2 | 0.63 |
| Example 7 | 0.8 | 0.86 |
| Example 8 | 0.6 | 0.94 |

The flow rate of gas in a vertical direction at a terminal end of the combustion zone, which was computed from the combustion testing conditions of [1], was determined to be 7.6 m/sec from the equation (4) above. The critical particle diameter for protecting flying outside the combustion zone was determined to be about 2.4 mm with use of the end velocity of the particles of the resin material obtained from the equation (5-2) above.

On the other hand, FIG. 24 shows a combustion ratio of 0.73 in the case of blowing of a synthetic resin having a typical particle diameter of 2.5 mm.

In FIG. 24, the combustion ratio is extremely small when the typical particle diameter is in the vicinity of 2.0 mm. This would presumably be due to the fact that typical particle diameters below about 2.0 mm lead to increased flying, thus resulting in reduced combustion ratio, and moreover, invite increased specific surface area, hence increased combustion rate. From practical points of view, however, smaller typical particle diameters of a synthetic resin material involve higher crushing cost and lower crushing yield.

Similar reasoning applies to the combustion ratios calculated from the hydrocarbon contents in waste gas collected at an upper part of the furnace.

The following test [2] was then conducted. [2]: Under the test conditions of Table 16, the particle diameter of the synthetic resin material was maintained constant at 2.5 mm, and the diameters of the tuyere were varied in a range from 45 to 120 mm. In this way, combustion was tested to determine combustion ratios.

The results obtained in Test [2] are shown in Table 18. Namely, listed are the flowrates of gas in a vertical direction at a terminal end of the combustion zone and the combustion ratios of the synthetic resin material which were decided when the tuyere diameters were fixed at the given levels. The relationship between the flow rates of gas in a vertical direction at a terminal end of the combustion zone the combustion ratios are shown in FIG. 25.

TABLE 18

| | Tuyere diameter (mm) | Vertical gas flow velocity at end of combustion zone (m/sec) | Degree of burn-up (−) |
|---|---|---|---|
| Example 9 | 100 | 4.8 | 0.93 |
| Example 10 | 120 | 4.0 | 0.96 |
| Example 11 | 80 | 6.1 | 0.86 |
| Example 12 | 65 | 7.6 | 0.77 |
| Comparative Example 1 | 60 | 8.2 | 0.61 |
| Comparative Example 2 | 50 | 10.0 | 0.54 |
| Comparative Example 3 | 45 | 11.2 | 0.50 |

The end velocity of the synthetic resin material was determined to be 7.9 m/sec which was decided with a typical particle diameter of 2.5 mm of the resin material under the conditions of Test [2]. In FIG. 25, when the flow rate of gas in a vertical direction at a terminal end of in the combustion zone is 7.9 m/sec as was in the case with the end velocity determined abive, the combustion ratio of the resin material is about 0.7. It is observed that when the flow rate of gas in a vertical direction at a termina end of in the combustion zone is lower than 7.9 m/sec, the combustion ratio of the resin material is higher than 0.7 and that when the flow rate of gas in a vertical direction at a terminal end of in the combustion zone is higher than 7.9 m/sec, the combustion ratio of the resin material is lower than 0.7.

As is clear clear from this test, there is strongly correlative between the flow rates of gas in a vertical direction at a terminal end of in the combustion zone in which the synthetic resin material is free of flying and the combustion ratios.

With the present invention constructed above, synthetic resin materials can be blown, as a heat source for use in a vertical furnace in pig iron production, in the form of lumps without the need for pulverization. Further, an enhanced combustion ratio is feasible with saved coal and coke. This invention also enables the use of synthetic resin materials that require disposal by incineration and reclamation, thus contributing to a great solution to environmental problems and providing noticeable industrial significance.

Embodiment 7

Figure 26:
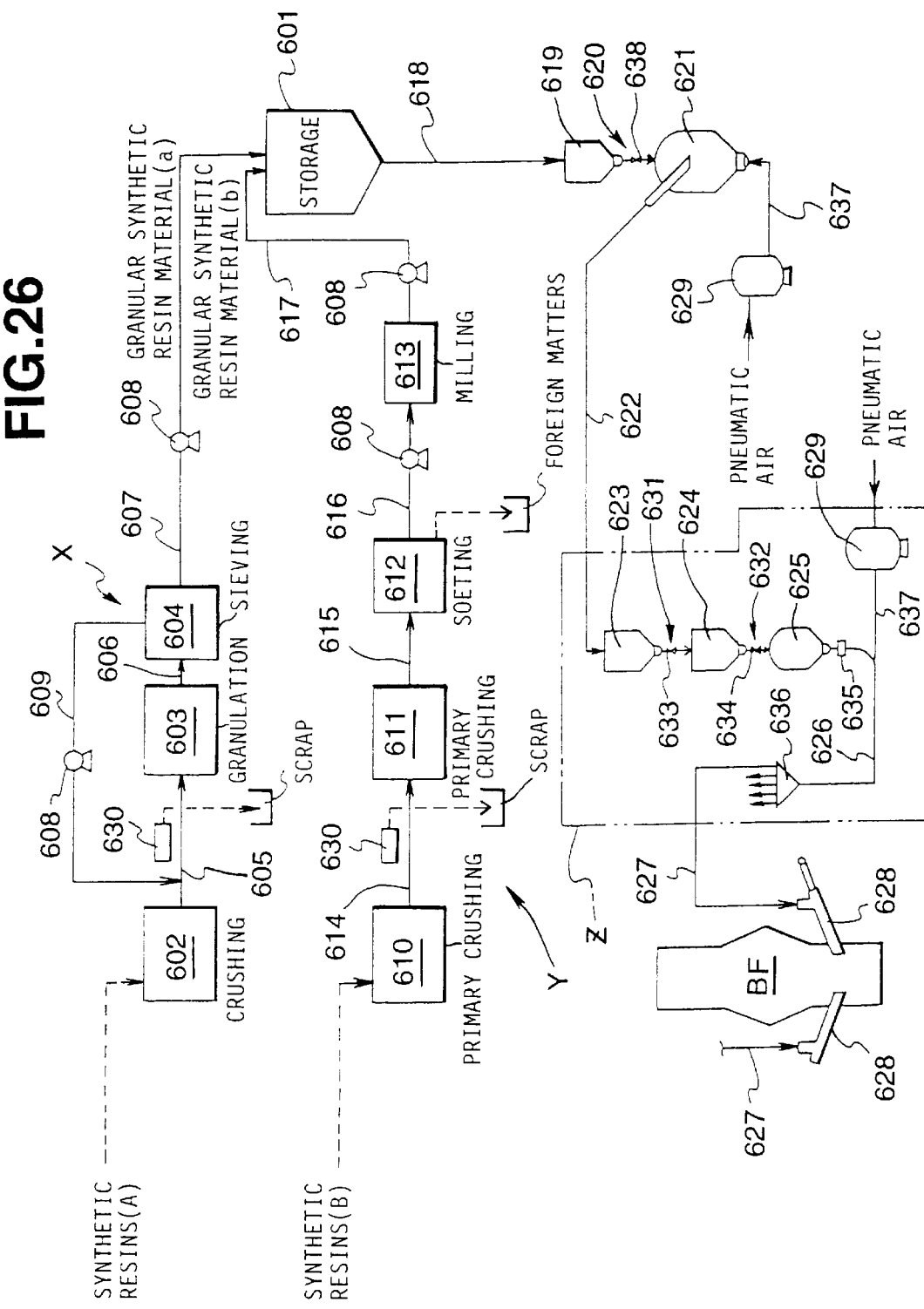
FIG. 26 is a schematic diagram view illustrating an embodiment of the apparatus for blowing a synthetic resin material into a furnace of the present invention.

FIG. 26 illustrates an embodiment of the apparatus for blowing a synthetic resin material of the present invention.

The apparatus for blowing a synthetic resin material of the present invention comprises a processing line X which receives synthetic resins (A) mainly comprising film-shaped synthetic resins and processes the same into a granular synthetic resin material, a processing line Y which receives synthetic resins (B) other than the foregoing synthetic resins (A) and processes the same into a granular synthetic resin material, a primary storage silo 601 into which the granular synthetic resin materials obtained in these processing lines X and Y are charged, and a blowing station Z which pneumatically supplies the granular synthetic resin materials supplied from this primary silo 601 to a blowing port such as a tuyere portion of a blast furnace (the description hereafter will be based on a case where the "blowing port" is the tuyere portion of the blast furnace).

The foregoing processing lines X and Y receive synthetic resins to be used as a fuel as classified into synthetic resins (A) mainly comprising film-shaped synthetic resins and synthetic resins (B) other than the above (i.e., mainly comprising lumpy synthetic resins), and process these synthetic resins into granular synthetic resin materials through steps suitable for the individual resins. For this purpose, the processing line X has a granulating/solidifying unit which processes the synthetic resins (A) into a volume-reduced and solidified granular synthetic resin material through solidification of the synthetic resins (A) melted or semi-melted by heat. The processing line Y has on the other hand a primary crusher with or without additional crushers for crushing the synthetic resins (B).

The construction of the apparatus of the present invention will be described below with reference to FIG. 26. The processing line X has, sequentially from the entry side, a crusher 602 provided as required for crushing (or rough-crushing) the synthetic resins (A), a granulating/solidifying unit 603 for processing the synthetic resins (A) into a volume-reduced granular synthetic resin material (a), and a sieve 604 (for example, a vibrating sieve) for sieving the granular synthetic resin material (a). The synthetic resins (A) are transferred by transfer means 605 from the foregoing crusher 602 to the granulating/solidifying unit 603, and by another transfer means 606 from the granulating/solidifying means 603 to the sieve 604. These transfer means 605 and 606 usually comprise transfer conveyors or gravity-chuting type transfer ducts or transfer pipes. A magnetic separator 630 (attracting scrap by means of a magnet for removal) is provided for removal of scrap in the middle of the transfer means 605. When such a magnetic separator 630 is provided, the transfer means 605 comprises a transfer conveyor in general.

The granular synthetic resin material (a) having a smaller particle diameter after sieving through the sieve 604 is transferred by transfer means 607 to a primary storage silo 601. In this embodiment, the transfer means 607 comprises a pneumatic pipe and a fan 608 provided in the middle thereof. The transfer means 607 may as required be a transfer conveyor or a gravity-chuting type transfer duct or a transfer pipe as in the transfer means 605 and 606. The synthetic resin material having a larger particle diameter after sieving through the sieve 604 is brought back by transfer means 609 to the transfer means 605 on the entry side of the foregoing granulating/solidifying unit 603 and charged again into the granulating/solidifying unit 603. The transfer means 609 as well comprises a pneumatic pipe and a fan 608 provided in the middle thereof, or may comprise a transfer conveyor or the like as required.

This coarse granular synthetic resin material may be sent back to any arbitrary position: for example, between the granulating/solidifying unit 603 and the magnetic separator 630, or on the entry side of the crusher 602 (usually, the transfer line). It may as required be supplied to the processing line Y. When supplying the same to the processing line Y, for example, it may be supplied to any arbitrary position on the entry side of the primary crusher 610, between the primary crusher 610 and the secondary crusher 611, between the secondary crusher 611 and a sorter 612, or between the sorter 612 and the milling unit 613 (usually, the transfer line). The coarse granular synthetic resin material may be removed from the system, and charged directly into another process (for example, top-charging into a blast furnace or a scrap melting furnace, or direct charing into a coke oven or a sintering machine).

When the synthetic resins (A) are crushed by the granulating/solidifying unit 603 described later, crushing by the above-mentioned crusher 602 is not always necessary, not requiring the crusher 602.

The foregoing granulating/solidifying unit 603 has a mechanism which performs a volume-reducing solidification-granulation treatment of the synthetic resins (A) by, for example, any of the following methods (1) to (3):

(1) A method of heating the synthetic resins (A) for melting, then cooling the resultant melt for solidification, and cutting or milling the synthetic resin material after solidification;

(2) A method of cutting or crushing the synthetic resins (A) (cutting or crushing may be accomplished, not in the granulating/solidifying unit, but in the foregoing crusher 602), semi-melting the thus cut or crushed synthetic resin material through heating or by means of frictional heat resulting from the above cutting or crushing, and causing the semi-molten synthetic resin material to contract and solidify into a granular form, or milling the synthetic resin material after contraction and solidification, thereby obtaining a granular synthetic resin material (a);

(3) A method, as a variation of the above method (2), of cutting the synthetic resins (A) with a rotary knife edge rotating at a high speed, or crushing the same, semi-melting the synthetic resin material by frictional heat produced by such cutting or crushing, and then, causing contraction and solidification of the semi-molten synthetic resin material by rapid cooling through water sprinkling or the like into a granular form or milling the same with the above rotary knife edge simultaneously with contraction and solidification, thereby obtaining the granular synthetic resin material (a).

A typical example of the apparatus based on the method (1) comprises means for completely melting the synthetic resins (A), extruding means for extrusion-forming the molten synthetic resins into a linear form or the like, and cutting means for cutting the thus extrusion-formed synthetic resin material. Any of various other processing methods may also be adopted.

In contrast to this, the methods (2) and (3) comprise, not completely melting the synthetic resins (A), causing contraction and solidification thereof through rapid cooling from semi-molten state by spraying a cooling fluid (water or a cooling gas) into a granular form, or milling the same after contraction and solidification into a granular form, thereby obtaining a granular synthetic resin material (a). According to the present inventors' findings, the granular synthetic resin material (a) obtained by the use of the apparatus based on the method (2) or (3) (particularly (3)) are very excellent in fluidity and transferability as compared not only with milled film-shaped synthetic resin material, but also with milled lumpy synthetic resin material, and very excellent in combustion property. Further, it is possible to largely improve transferability and combustion property of the synthetic resin material as a whole by using the same in mixture with a milled lumpy synthetic resin material. It is therefore most suitable to use a granulating/solidifying unit 603 based on the method (2) or (3) above in the fuel blowing apparatus of the present invention.

Figure 28:
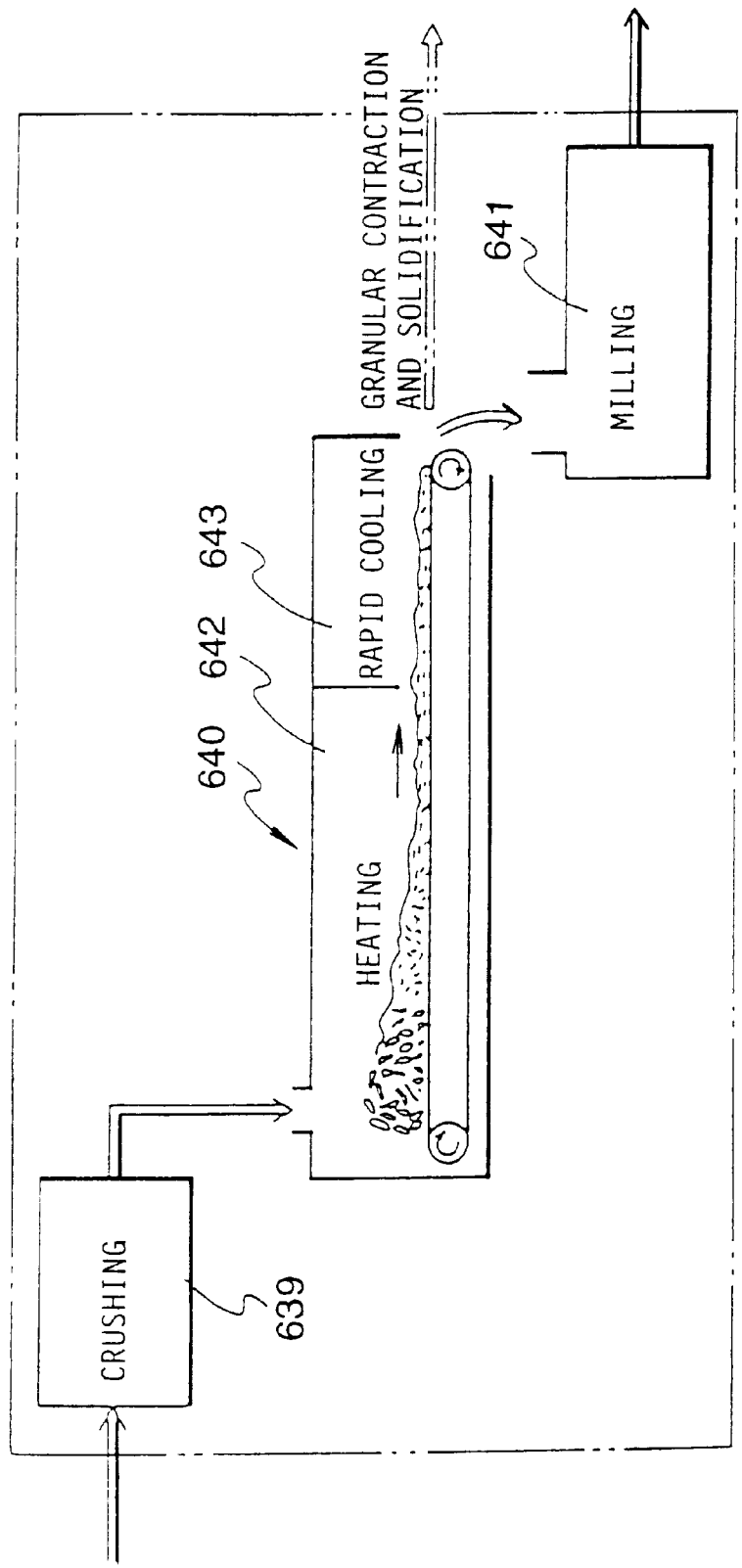
FIG. 28 is a schematic diagram illustrating an embodiment of a granulating/solidifying unit in the apparatus shown in FIG. 26 or 27.

FIG. 28 illustrates a typical configuration of the granulating/solidifying unit 603 performing continuous processing of granular contraction and solidification or contraction-solidification-granulation based on the method (2) above. The granulating/solidifying unit 603 has, sequentially from the entry side of the synthetic resins, a crusher 639, a volume-reducing solidifying unit 640 and a milling unit 641 which is provided as required. The volume-reducing solidifying unit 640 has, from the entry side, a heating chamber 642 and a cooling chamber 643 as well as a transfer unit 644 (such as a transfer conveyor) for continuously transferring the synthetic resins through these heating chamber 642 and cooling chamber 643.

According to this granulating/solidifying unit 603, the synthetic resins (A) are crushed by the crusher 639, and then charged into the volume-reducing solidifying unit 640. In the volume-reducing solidifying unit 640, the synthetic resins (A) are semi-melted by heat (by gas heating, indirect gas heating or electric heating) in the heating chamber 642 while being continuously transferred by the transfer unit 644 through the heating chamber 642 and the following cooling chamber 643, and then contract and solidify through rapid cooling in the cooling chamber 643 by means of water spray. It is possible to cause the synthetic resin material to contract and solidify in a granular form by appropriately selecting a form of crushing of the synthetic resins (A) and a condition of charging thereof into the heating chamber, and thus a granular synthetic resin material (a) is available in the state of contraction and solidification by the application of this method.

According to the method of not causing all or part of the synthetic resin material to contract or solidify, on the other hand, the synthetic resin material after contraction and solidification is charged from the volume-reducing solidifying unit 640 into the milling unit 641, and a granular synthetic resin material (a) is available through milling into a granular form in this milling unit 641.

The thus obtained granular synthetic resin material (a), which is made by causing the crushed film-shaped synthetic resin material to contract and solidify from a semi-molten state into a granular form, or by milling the same after contraction and solidification, is relatively porous as compared with a crushed lumpy synthetic resin material and has a large specific surface area. It has a rounded shape as a whole, not an angular shape as a crushed lumpy synthetic resin material, leading to excellent combustion property and fluidity.

Figure 29:
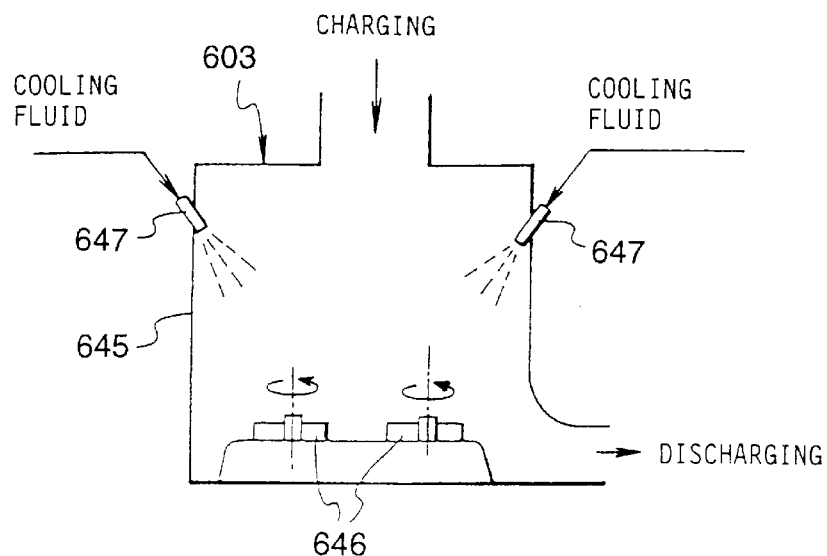
FIG. 29 is a schematic diagram illustrating another embodiment of the granulating/solidifying unit in the apparatus shown in FIG. 26 or 27.
Figure 30:
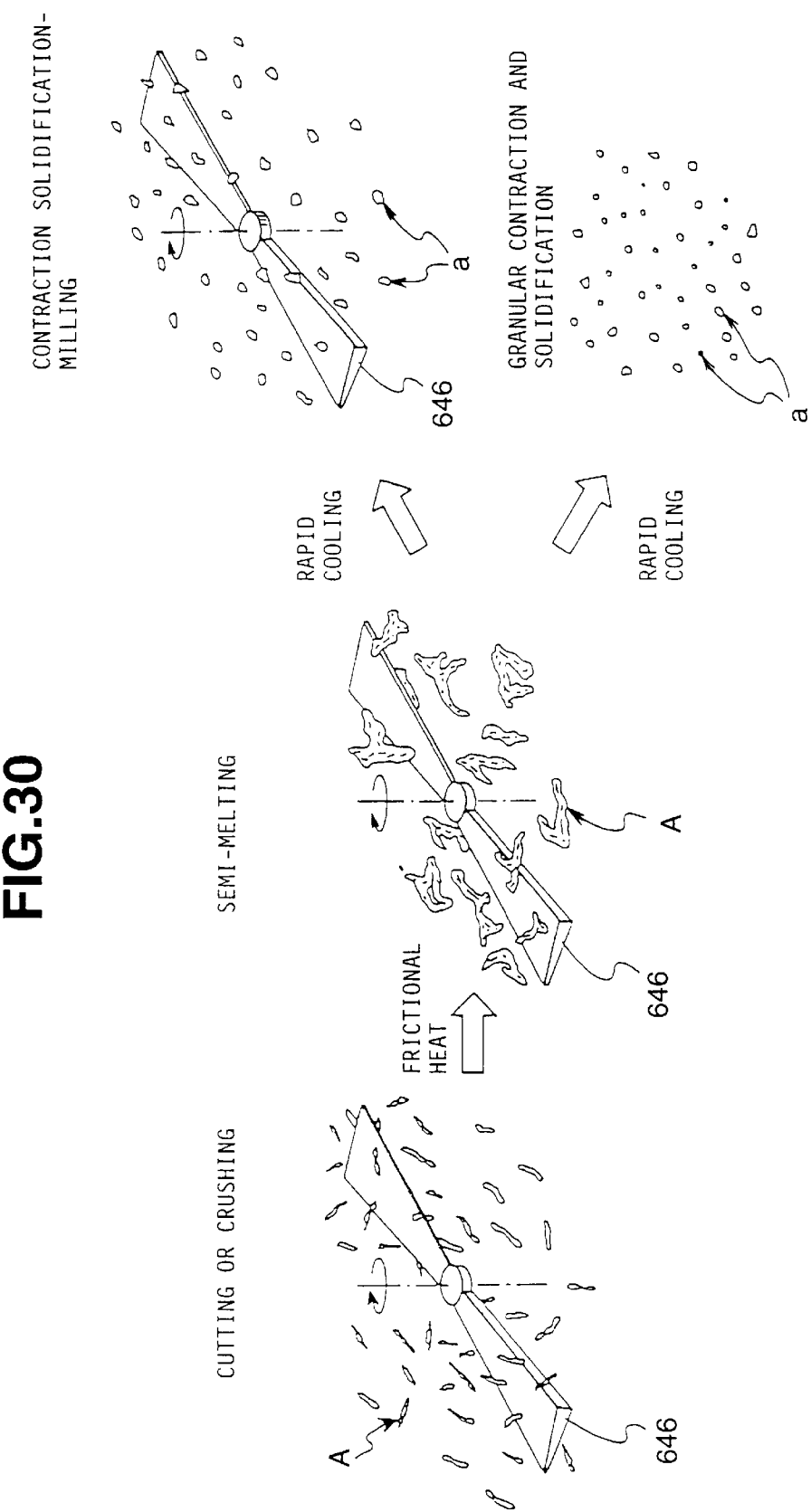
FIG. 30 is a schematic diagram schematically illustrating the principle of contraction/solidification/granulation of synthetic resins by the unit shown in FIG. 29.

FIG. 29 shows an outline of the construction of the apparatus based on the method (3) above, and FIG. 30 schematically illustrates the principle of granular contraction-solidification or contraction/solidification-granulation treatment in this apparatus.

This granulating/solidifying unit 603 comprises a tank 645 into which the synthetic resins (A) are charged, one or more rotary knife edges 646 arranged on the bottom in this tank 645, and rapid cooling means 647 for blowing or spraying a cooling fluid (a liquid such as water or a gas) into the tank 645. According to this granulating/solidifying unit 603, a granular synthetic resin material (a) is obtained by cutting or crushing the synthetic resins (A) charged into the tank 645 with the rotary knife edges 646 rotating at a high speed, semi-melting the synthetic resin material by frictional heat produced by this cutting or crushing, and then, causing the semi-molten synthetic resin material to contract and solidify through rapid cooling from the above-mentioned temperature by means of water spray from the rapid cooling means 647 into a granular form, or applying a milling treatment with the foregoing rotary knife edges 646 simultaneously with contraction and solidification.

The granular synthetic resin material (a) thus obtained comprises a crushed film-shaped synthetic resin material caused to granularly contract and solidify from a semi-molten state or milled after contraction and solidification. As compared with a crushed lumpy synthetic resin material, therefore, it has relatively porous properties with a large specific surface area, exhibiting a rounded shape as a whole, not an angular shape as the crushed lumpy synthetic resin material, resulting in excellent combustion property and fluidity.

This apparatus is to carry out all of crushing (or cutting) of the synthetic resin material, semi-melting, and milling treatment after contraction and solidification (milling is not however required when contraction and solidification are caused by rapid cooling) in a batch manner with the use of a rotary knife edge 646 rotating at a high speed. Therefore, a series of processing steps of "crushing (or cutting)→semi-melting→granular contraction/solidification" or "crushing (or cutting)→semi-melting→contraction and solidification by rapid cooling" are accomplished rapidly within a short period of time. Furthermore, because the synthetic resin material is semi-melted during crushing (cutting) by the rotary knife edge 646 and high-speed stirring and rapidly cooled from this state, there is available a granular synthetic resin material (a) preferable in terms of specific surface area and grain shape. Since crushing (or cutting), semi-melting and milling after contraction and solidification are accomplished solely under the action of the rotary knife edge 646, moreover, this method provides advantages in equipment cost as well as in operating cost.

In the apparatus based on the method (3) as well, it is possible to cause contraction and solidification of the synthetic resin material into a granular form by appropriately selecting a manner of crushing of the synthetic resins (A) and the charging condition thereof relative to the rotary knife edge. The granular synthetic resin material (a) is thus available in the state of contraction and solidification, in this case, substantially without a milling step by means of the rotary knife edge 646 after contraction and solidification. When all or part of the synthetic resin material is not caused to contract and solidify in a granular form, on the other hand, a granular synthetic resin material (a) is available, as described above, through a milling step with the rotary knife edge 646.

The temperature for semi-melting the synthetic resins (A) in the methods (2) and (3) above varies to some extent, depending upon the kind and the shape of the synthetic resins: in terms of the material quality alone, for example, it is within a range of from about 105 to 115° C. for low-density polyethylene, and about 128° C. for medium to low-density polyethylene. An appropriate temperature for semi-melting is selected in response to the kind, the ratio and the form of synthetic resins contained in the synthetic resins (A).

The foregoing processing line Y has, on the other hand, a primary crusher 610 for roughly crushing the synthetic resins (B), a secondary crusher 611 for further finely crushing the synthetic resins (B), a selector 612 for removing foreign matters such as metals, sand and earth from the crushed synthetic resins (B), and a milling unit 613 for milling the synthetic resins (B) after removal of foreign matters into a final particle diameter to obtain a granular synthetic resin material (b).

The synthetic resins (B) are transferred from the primary crusher 610 to the secondary crusher 611 by transfer means 614, and from the secondary crusher 611 to the selector 612 by transfer means 615, respectively. These transfer means 614 and 615 usually comprise transfer conveyor, or gravity-chuting type ducts, or transfer pipes. A magnetic separator 630 (attracting scrap and the like with a magnet for removal) for removing scrap is provided in the middle of the transfer means 614. When such a magnetic separator 630 is provided, the transfer means 614 usually comprises a transfer conveyor.

The synthetic resins (B) or the granular synthetic resin material (b) is transferred from the selector 612 to the milling unit 613 by transfer means 616, and from the milling unit 613 to the primary storage silo 601 by transfer means 617, respectively. In the present configuration, the transfer means 616 and 617 comprise pneumatic feed pipes and fans 608 provided in the middle thereof, or may as required comprise transfer ducts, or gravity-chuting type transfer ducts or transfer pipes, as in the case of the transfer means 614 and 615.

Between the foregoing primary silo 61 and the blowing station Z, there are provided, sequentially from the upstream, a service tank 619 receiving and temporarily storing the granular synthetic resin material supplied from the primary silo 601, and a lift tank 621 receiving the granular synthetic resin material supplied from this service tank 619 and pneumatically supplying the same to the blowing station Z.

The granular synthetic resin material is supplied from the primary storage silo 601 to the service station 619 by transfer means 618. This transfer means 618 comprises, for example, a constant-volume cutting unit and a transfer conveyor, or a gravity-chuting type transfer duct, or a transfer pipe. The granular synthetic resin material is transferred from the service tank 619 to the lift tank 621 by transfer means 620. This transfer means 620 comprises a gravity-chuting type transfer pipe, and a shut-off valve 638 for supply and stoppage of the granular synthetic resin material and holding the gas pressure in the lift tank is provided in the middle of this transfer pipe.

An air supply pipe 637 from an accumulator 629 is connected to the above-mentioned lift tank 621, and pneumatic feeding air is supplied. The granular synthetic resin material in the lift tank 621 is supplied by this pneumatic feeding air through a pneumatic feed pipe 622 to the blowing station Z. The amount of pneumatically fed granular synthetic resin material is controlled by means of the pressure of pneumatic feed air supplied to the lift tank.

The blowing station Z has a multi-stage tank for permitting continuous supply of the granular synthetic resin material to the blast furnace tuyere portion. In this example of configuration, there are provided, sequentially from the upstream, a secondary storage silo 623, an equalizing tank 624 and a blowing tank 625, and the foregoing pneumatic feed pipe 622 is connected to the secondary storage silo 623. The granular synthetic resin material is supplied from the secondary storage silo 623 to the equalizing tank 624 by transfer means 631, and from the equalizing tank 624 to the blowing tank 625 by transfer means 632, respectively. These transfer means 631 and 632 comprise gravity-chuting type transfer pipes, and shut-off valves 633 and 634 for supply and stoppage of the granular synthetic resin material and holding the gas pressure in the equalizing tank 624 and the blowing tank 625 are provided in the middle of these transfer means.

The granular synthetic resin material is pneumatically supplied from the above-mentioned blowing tank 625 to the tuyere portion 628 of the blast furnace BF through the pneumatic feed pipe 626 and pneumatic branch pipes 627 communicating to the individual tuyeres (in the drawing, 636 is a distributor to the individual pneumatic branch pipes 627). A fluidizer 635 for mixing the granular synthetic resin material discharged from the tank and fluidizing the mixture is provided at a position on the exit side of the blowing tank of the pneumatic feed pipe 626. This fluidizer 635 has a function of supply and stoppage of the granular synthetic resin material. An air supply pipe 637 from the accumulator 629 is connected to the pneumatic feed pipe 626 to supply pneumatic air. The amount of pneumatic air for the granular synthetic resin material from the blowing tank 625 is controlled by adjusting the pressure in the blowing tank 625 by means, for example, of pressurizing means not shown, and as required, by adjusting the flow rate of pneumatic gas from the accumulator 629.

Figure 31:
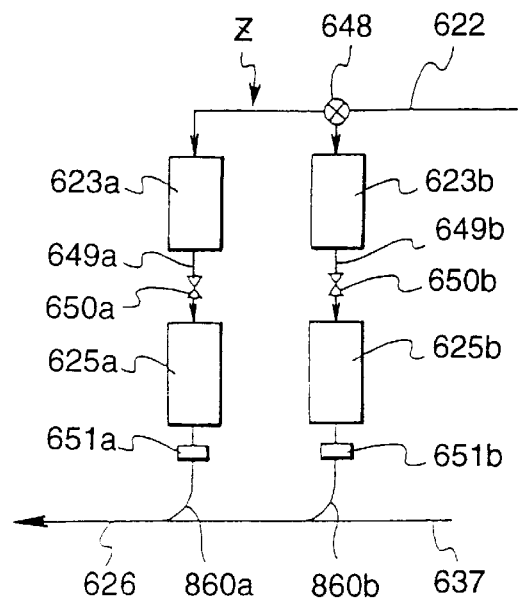
FIG. 31 is a schematic diagram illustrating another configuration of the blowing station in the apparatus shown in FIG. 26 or 27.
Figure 32:
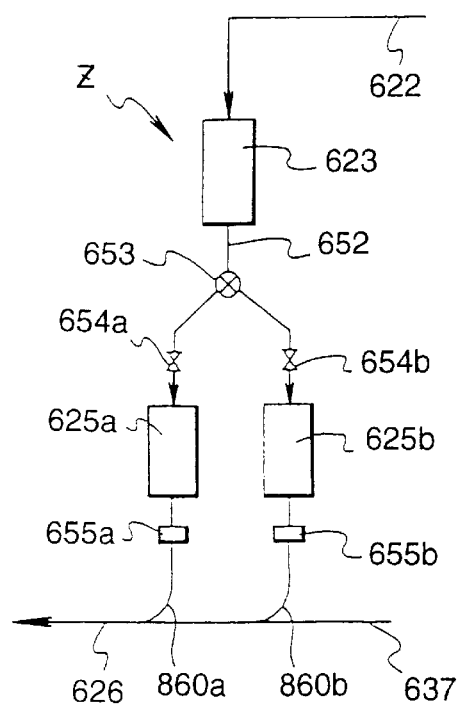
FIG. 32 is a schematic diagram illustrating further another configuration of the blowing station in the apparatus shown in FIG. 26 or 27.

FIGS. 31 and 32 illustrate other examples of configuration of the blowing station Z, respectively. Any of these blowing stations Z has no equalizing tank as shown in FIG. 26, but has a plurality of secondary storage silo blowing tanks or blowing tanks arranged in parallel to permit continuous supply of the granular synthetic resin material to the blast furnace tuyere portion.

In the blowing station Z shown in FIG. 31, secondary storage silos 623*a* and 623*b* are arranged in parallel with blowing tanks 625*a* and 625*b*, respectively, to permit appropriately branched charging of the granular synthetic resin material through a distributor 648 provided in the pneumatic feed pipe 622 to the secondary storage silos 623*a* and 623*b*. The granular synthetic resin material is supplied from the secondary storage silos 623*a* and 623*b* to the blowing tanks 625*a* and 625*b* by transfer means 649*a* and 649*b*, respectively. These transfer means 649*a* and 649*b* comprise gravity-chuting type transfer pipes, and shut-off valves 650*a* and 650*b* for supply and stoppage of the granular synthetic resin material and for holding the gas pressure in the blowing tanks are provided in the middle thereof. Fluidizers 651*a* and 651*b* having the same functions as those of the fluidizer 635 shown in FIG. 26 are provided at positions of the pneumatic branch pipes 860*a* and 860*b* connected to the blowing tanks 625*a* and 625*b*, respectively, on the tank exit side.

In the blowing station Z shown in FIG. 31, three or more sets of secondary storage silo blowing tanks may be provided in parallel.

In the blowing station Z shown in FIG. 32, blowing tanks 625*a* and 625*b* are provided in parallel on the exit side of the secondary storage silo 623 so as to make it possible to supply the granular synthetic resin material from the secondary storage silo 623 by transfer means 652 having a distributor 653 through appropriate branching to the blowing tanks 625a and 625b, respectively. Shut-off valves 653a and 653b for supply and stoppage of the granular synthetic resin material and for holding the gas pressure in the blowing tank are provided in the middle of branch pipes to the individual blowing tanks composing the transfer means 652. Fluidizer shut-off valves 655a and 655b having the same functions as those of the fluidizer 635 shown in FIG. 26 are provided at positions of the pneumatic branch pipes 860a and 860b connected to the blowing tanks 625a and 625b, respectively, on the tank exit side.

In the blowing station Z shown in FIG. 32, three or more sets of blowing tanks may be provided in parallel.

In the example of configuration shown in FIG. 26, each one magnetic separator 630 is provided in each of the processing lines X and Y, whereas a plurality of magnetic separators 630 may be arranged at a plurality of positions of each processing line.

Any crushing method may be used for the various crushers (including the crusher 613) provided in the processing lines X and Y. Apart from the crushing method based only on usual mechanical means, the method known as the freeze crushing method of crushing an object in a frozen state may be adopted.

A yard drying equipment and other incidental facilities of the brought-in synthetic resins are usually provided on the entry side of the processing facilities shown in FIG. 26.

Figure 27:
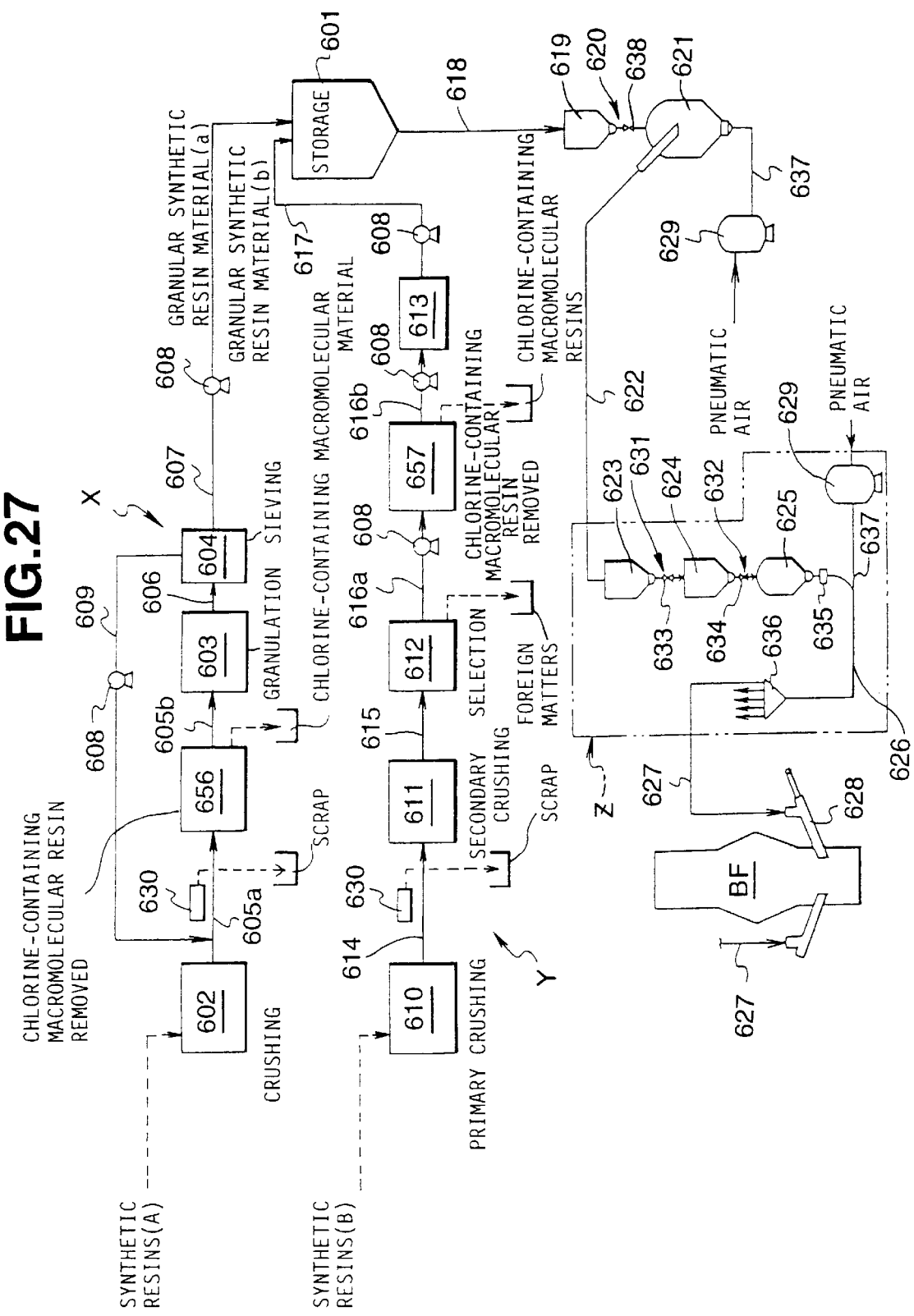
FIG. 27 is a schematic diagram view illustrating another embodiment of the apparatus for blowing a synthetic resin material into a furnace of the present invention.

FIG. 27 shows another example of configuration of the apparatus of the present invention: separators 656 and 657 for separating and removing chlorine-containing macromolecular resin materials such as vinyl chloride from the synthetic resins are provided in the processing lines X and Y.

More specifically, in the processing line X, a separator 656 is provided between the crusher 602 and the granular solidifying unit 603 to separate and remove only chlorine-containing macromolecular resin materials such as vinyl chloride and vinylidene chloride from the synthetic resins (A). Because a chlorine-containing macromolecular resin such as vinyl chloride has a higher specific gravity than the other synthetic resins (specific gravity of polyethylene: 0.91–0.96; specific gravity of polypropylene: about 0.89–0.91; in contrast, specific gravity of vinyl chloride: about 1.16–1.55), chlorine-containing macromolecular resins are separated from the synthetic resins (A) by the specific gravity separation method or the centrifugal separation method using a liquid such as water for the separator 656.

The foregoing separator 656 may be arranged at any arbitrary position in the upstream of the granular solidifying unit 603 in the processing line X.

Figure 33:
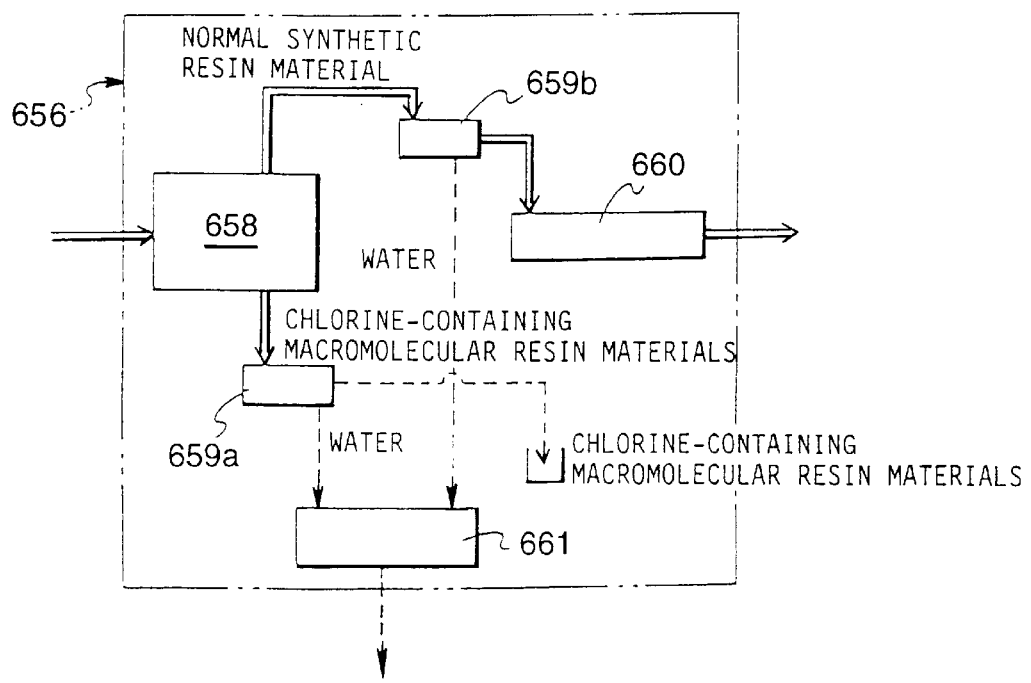
FIG. 33 is a schematic diagram illustrating an embodiment of the separator in the apparatus shown in FIG. 32.

FIG. 33 illustrates an example of configuration of the separator 656 based on the specific gravity separation method. In FIG. 33, 658 is a separating tank filled with water, 659a and 659b are screens for swishing water off the synthetic resin material discharged from the separating tank, 660 is a drier for drying the synthetic resin material after swishing by the screen, and 661 is a water discharge tank for discharging water separated by the screens 659a and 659b.

According to this separator 656, the synthetic resins (A) are charged into the separating tank 658 filled with water, in which the resins are separated into chlorine-containing macromolecular resin materials such as vinyl chloride which precipitate in the tank and the other synthetic resin materials which float up. The separated chlorine-containing macromolecular resin materials in precipitation are discharged outside the tank by appropriate discharging means, separated from water through the screen 659a, and then discharged outside the system. On the other hand, the synthetic resin materials floating up in the tank, other than the chlorine-containing macromolecular resin materials are discharged outside the tank by appropriate means, and after separation from water through the screen 659b, dried in the drier 660, and sent to the next process.

Figure 34:
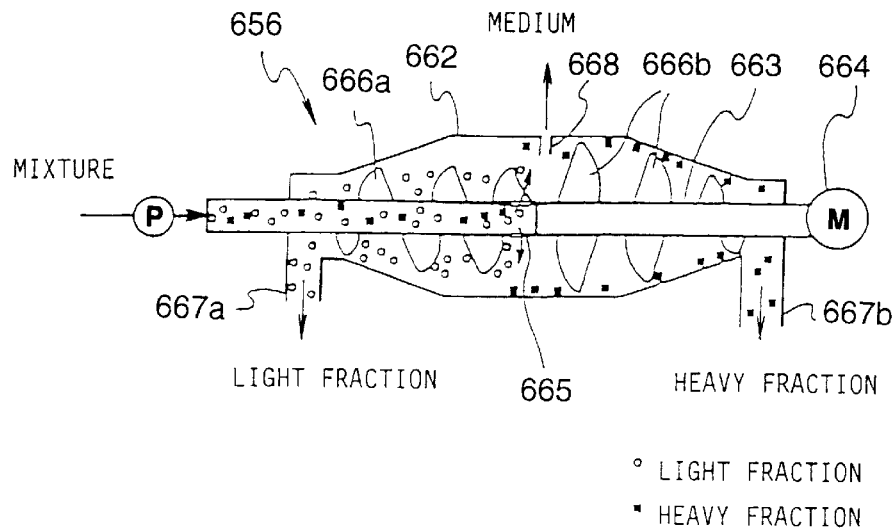
FIG. 34 is a schematic diagram illustrating another embodiment of the separator in the apparatus shown in FIG. 32.
Figure 35:
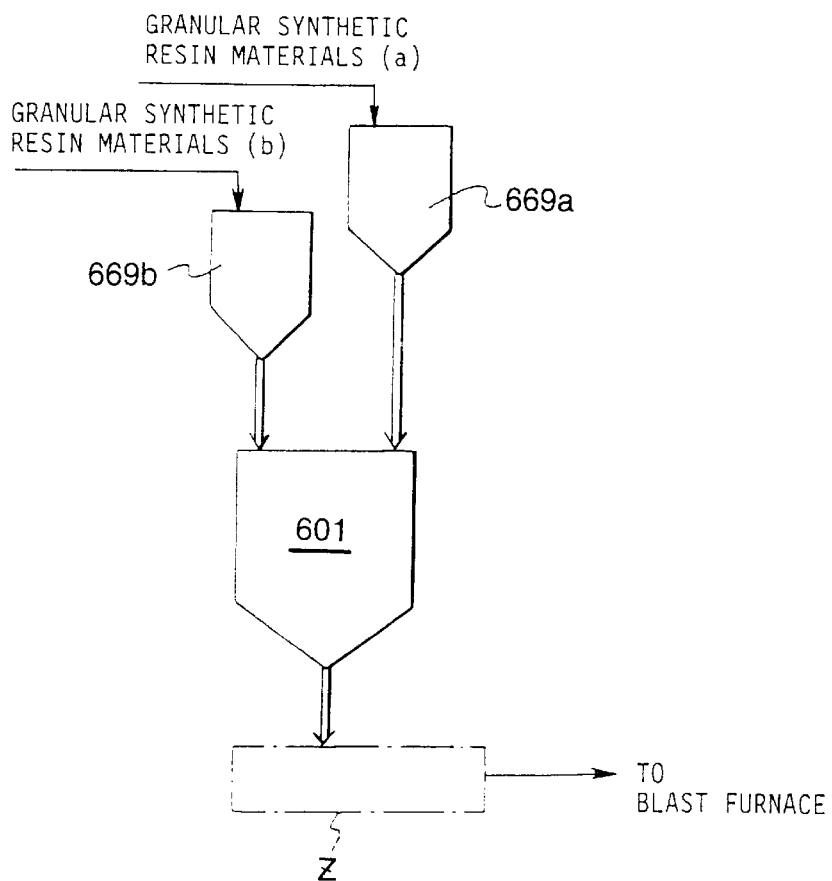
FIG. 35 is a schematic diagram illustrating another embodiment of the storage silo in the apparatus shown in FIG. 26 or 27.

FIG. 34 shows an example of configuration of the separator 656 based on the centrifugal separation method. The separator 656 comprises a hollow and cylindrical or spindle-shaped body 662, an inner cylinder 663 having a screw arranged rotatably in the longitudinal direction in the interior of this body 662, and a motor 664 for rotatably driving the inner cylinder. In this separator, a mixture of synthetic resin materials and a medium such as water is supplied through an end of the inner cylinder 663 rotating at a high speed to the interior thereof. The mixture is discharged to the inner space of the body 662 under the action of centrifugal force from an opening 665 provided substantially at the center in the longitudinal direction of the inner cylinder 663, and is separated, with the specific gravity of the medium as the boundary, into a heavy fraction having a higher specific gravity (chlorine-containing macromolecular resins) and a light fraction having a lower specific gravity (synthetic resins other than chlorine-containing macromolecular resins). That is, only a heavy fraction of the synthetic resin materials is accumulated on the inner wall side of the body 662, resulting in a state in which the light fraction and the heavy fraction are separated from each other in a radial direction of the body 662, under the effect of centrifugal force.

In the inner cylinder 663, a screw 666a for transferring the light fraction is provided in a longitudinal half with the foregoing opening as an approximate boundary, and a screw 666b for transferring the heavy fraction is provided in the other longitudinal half. These screws 666a and 666b have spirals turning in opposite directions, and rotation of the inner cylinder 663 causes the screws 666a and 666b to transfer the synthetic resin material toward the body ends on the respective sides. More specifically, the synthetic resin material in the light fraction is transferred by the screw 666a having shorter blades to an end of the body 662 and discharged from a discharge port 667a. On the other hand, the synthetic resin material of the heavy fraction gathered on the inner wall side of the body 662 is transferred to the other end of the body 662 by the screw 666b having blades extending to the proximity of the inner wall surface of the body 662, and discharged from a discharge port 667b. The medium such as water is discharged from the apparatus through a discharge port 668 provided substantially at the center of the body 662.

According to this apparatus, it is possible to discharge the synthetic resin materials separated into the light and heavy fractions outside the apparatus with the slightest water content.

In the apparatus shown in FIG. 27, the synthetic resins (A) are transferred from the crusher 602 to the separator 656 by transfer means 605a, and from the separator 656 to the granular solidifying unit 603 by transfer means 605b. These transfer means 605a and 605b usually comprise transfer conveyors, or gravity-chuting type transfer ducts, or transfer pipes. A magnetic separator 630 for removing scrap is provided in the middle of the transfer means 605a. When such a magnetic separator 630 is provided, the transfer means 605a usually comprises a transfer conveyor.

In the processing line Y, on the other hand, a separator 657 is provided between the selector 612 and the crusher 613 to separate and remove only chlorine-containing macromolecular resin materials such as vinyl chloride and vinylidene chloride from the synthetic resins (B). The construction and the functions of the separator 657 are the same as those of the foregoing separator 656, thus a separate description thereof is therefore omitted here. The arrangement of the separator 657 in the processing line Y is not limited to that of this embodiment, but it may also be arranged at any arbitrary position in the upstream or downstream of the crusher 613, for example, between the primary crusher 610 and the secondary crusher 711, between the secondary crusher 611 and the selector 612, or on the exit side of the crusher 613.

The synthetic resins (B) are transferred from the selector 612 to the separator 657 by transfer means 616a, and from the separator 657 to the crusher 613 by transfer means 616b, respectively. These transfer means 616a and 616b usually comprise transfer conveyors, or gravity-chuting type transfer ducts or transfer pipes.

All the other aspects in FIG. 27 are the same as those in FIG. 26. The same reference numerals are therefore assigned to the corresponding components, and a detailed description thereof is omitted. Also in this example of the configuration shown in FIG. 27, the coarse granular synthetic resin material as oversize through the sieve 604 may be sent back to any arbitrary position including a position, for example, between the separator 656 and the granular solidifying unit 603, between the magnetic separator 630 and the separator 656, or on the entry side of the crusher 602 (usually the transfer line), and may as required be supplied to the processing line Y. When supplying the same to the processing line Y, it may be supplied to any arbitrary position, for example, on the entry side of the primary crusher 610, between the primary crusher 610 and the secondary crusher 611, between the secondary crusher 611 and the selector 612, or between the selector 612 and the crusher 613 (usually the transfer line). As described above, the coarse granular synthetic resin material may be taken out the system and charged directly into another process (for example, top charging into a blast furnace or a scrap melting furnace, or direct charging into a coke oven or a sintering machine).

Now, treatment of synthetic resins in the apparatus of the present invention and the blowing process thereof into a blast furnace will be described below.

In the apparatus of the present invention, synthetic resins to be used as a fuel as classified into synthetic resins (A) mainly comprising film-shaped synthetic resin materials and other synthetic resins (B) (i.e., mainly comprising lumpy synthetic resin materials) are received by processing facilities, and processed into granular forms suitable as a solid fuel for blowing (or a reducing agent of iron) through different steps on processing lines X and Y, respectively. The synthetic resins (A) may contain synthetic resin material of other forms defective in fluidity or transferability such as foaming plastics, in addition to the film-shaped resin materials.

There is no particular limitation on the film-shaped synthetic resin materials. According to findings confirmed by the present inventors through experiments, however, synthetic resin films having a thickness of up to 100 μm are particularly low in fluidity and transferability. Synthetic resin films having a thickness of up to 100 μm should preferably be classified as synthetic resins (A) within a classifiable range. It is however needless to mention that the present invention is not limited to such classification criteria: in addition to extra-thin materials such as polyethylene films, relatively thick synthetic resins such as those used in PET bottles may be included in the synthetic resins (A). Whether or not classified as synthetic resins (A) depends, in addition to thickness, upon such factors as the chemical composition of the synthetic resin, the material (for example, composite materials containing or not containing substances other than synthetic resins), and the shape.

On the other hand, while the synthetic resins (B) mainly comprises lumpy synthetic resin materials such as plate-shaped ones, this is not a mandatory limitation.

In summary, it suffices to take account of fluidity and transferability of collected synthetic resins, classify ones extremely low in fluidity or transferability in a crushed state at least such as polyethylene films as synthetic resins (A), and classify ones satisfactory in fluidity and transferability as compared with the above such as lumpy plastics as synthetic resins (B), and remaining ones as any of the synthetic resins (A) and (B), considering fluidity and transferability.

When viewing the processing of synthetic resins and the blowing system thereof as a whole, it is not always necessary to strictly classify all film-shaped synthetic resins from among synthetic resins to be supplied as a fuel as the synthetic resins (A) and classify all lumpy synthetic resins as the synthetic resins (B). When considering the nature of waste, such a strict classification is practically difficult. The synthetic resins (A) are allowed to contain lumpy synthetic resins to some extent and the synthetic resins (B) are allowed to contain film-shaped synthetic resins to some extent.

In the processing line X, the synthetic resins (A) are as required crushed (or rough-crushed) by the crusher 602, then charged into the granular solidifying unit 603 by the transfer means 605, and processed into a volume-reducing solidified granular synthetic resin material (a). Scrap mixed in the synthetic resins is removed by the magnetic separator 630 in the middle of the above-mentioned transfer means 605.

In the foregoing granular solidifying unit 603, the synthetic resins (A) are subjected to a volume-reducing solidification/granulation treatment by any of the above-mentioned methods (1) to (3), and there is available the granular synthetic resin material (a). The granular synthetic resin material (a) obtained in the granular solidifying unit 603 is charged by the transfer means 606 into the sieve 604 for sieving, and only particles having a particle diameter of up to a prescribed level (for example, −6 mm) are sent by the transfer means 607 to the primary storage silo 601. Particles of the granular synthetic resin material having a particle diameter of over the prescribed level are sent by the transfer means 609 back to the transfer means 605 on the entry side of the granular solidifying unit 603, and are charged again into the granular solidifying unit 603 together with the synthetic resins (A).

In the case of the apparatus shown in FIG. 32, the synthetic resins (A) are charged into the separator 656 prior to processing in the granular solidifying unit 603, where chlorine-containing macromolecular resin materials such as vinyl chloride and vinylidene chloride are separated and removed. After separation and removal of chlorine-containing macromolecular resin materials in the separator 656, the synthetic resins (A) are charged into the granular solidifying unit 603, where the synthetic resins (A) are processed into a volume-reducing granular synthetic resin material (a), and then sent to the primary storage silo 601 through the sieve 604.

In the processing line Y, on the other hand, the synthetic resins (B) are roughly crushed (for example, to a particle diameter of about 50 mm) in the primary crusher 610, and then charged by the transfer means 614 into the secondary crusher 611 for secondary crushing (for example, to a particle diameter of about 20 mm). From the primary-crushed synthetic resins (B), scrap mixed therein is removed by the magnetic separator 630 in the middle of the above-mentioned transfer means 614.

The secondary-crushed synthetic resins (B) are charged by the transfer means 615 into the selector 612, where foreign matters such as metals, earth and sand are separated and removed by blowing or the like. Then, the synthetic resins (B) are sent by the transfer means 616 to the milling unit 613 (tertiary crusher) for milling into a particle diameter under a prescribed level (for example, −6 mm), thereby obtaining a granular synthetic resin material (b). This granular synthetic resin material (b) is sent by the transfer means 617 to the primary storage silo 601.

In the apparatus shown in FIG. 32, the synthetic resins (B) are charged, prior to milling in the milling unit 613, into the separator 657, where chlorine-containing macromolecular resin materials are separated and removed. After separation and removal of chlorine-containing macromolecular resin materials in the separator 657, the synthetic resins (B) are sent to the milling unit 613 (tertiary crusher) for milling into a particle diameter under a prescribed level (for example, −6 mm), and then sent to the primary storage silo 601.

The mixture of the granular synthetic resin materials (a) and (b) stored in the primary storage silo 601 is supplied by the transfer means 618 and 620 through the service tank 619 to the lift tank 621, pneumatically fed from the lift tank 621 to the blowing station Z, and charged into the secondary storage silo 623.

In the blowing station Z, the granular synthetic resin material is continuously and pneumatically fed from the blowing tank 625 to the tuyere portion of the blast furnace. To carry out such continuous pneumatic feeding, the granular synthetic resin material is previously charged from the secondary silo 623 into the equalizing tank 624 in the closed state of the shut-off valve 634 of the transfer means 632 between the equalizing tank 624 and the blowing tank 625 (upon charging, the shut-off valve 633 of the transfer means 631 is in open state), and at the point when the remaining amount of the granular synthetic resin material in the blowing tank 625 becomes smaller, the shut-off valve 634 of the transfer means 632 is opened in the closed state of the shut-off valve 633 of the transfer means 631 to replenish the blowing tank 625 with the granular synthetic resin material from the equalizing tank 624. By repeating these operations, the remaining amount of the granular synthetic resin material in the blowing tank 625 is ensured, and the granular synthetic resin material can be continuously and pneumatically fed from the blowing tank 625.

When the blowing station Z has a construction as shown in FIG. 31, the granular synthetic resin material supplied through the pneumatic feed pipe 622 from the lift tank 621 side is appropriately distributed by the distributor 648 to the secondary storage silos 623a and 623b, and the blowing tanks 625a and 625b are replenished with the granular synthetic resin material from the secondary storage silos 623a and 623b in response to the remaining amount of the granular synthetic resin material in the blowing tanks 625a and 625b.

The granular synthetic resin material is always pneumatically supplied from any of the blowing tanks 625a and 625b to the tuyere portion of the blast furnace, and the granular synthetic resin material is supplied from the secondary storage silo to the other blowing tank not conducting pneumatic feeding. Upon switching between the blowing tanks 625a and 625b conducting replenishing and pneumatic supply of the granular synthetic resin material, the shut-off valves 650a and 650b of the transfer means 649a and 649b between the secondary storage silos 623a and 623b and the blowing tanks 625a and 625b and the fluidizers 651a and 651b on the exit side of the blowing tanks 625a and 625b are appropriately opening/closing operated.

When the blowing station Z has a construction as shown in FIG. 32, the granular synthetic resin material supplied through the pneumatic feed pipe 622 from the lift tank 621 side is charged into the secondary storage tank 623, and then, appropriately distributed and charged into the blowing tanks 625a and 625b by the distributor 653 provided on the transfer means 652, in response to the remaining amount of the granular synthetic resin material in these tanks 625a and 625b.

The granular synthetic resin material is always pneumatically supplied from any of the blowing tanks 625a and 625b to the tuyere portion of the blast furnace, and the other blowing tank not conducting pneumatic feed is replenished with the granular synthetic resin material from the secondary storage silo 623. Upon switching between the blowing tank 625a and 625b supplying and pneumatically feeding the granular synthetic resin material, the shut-off valves 653a and 653b of the transfer means 652 between the secondary storage silo 623 and the blowing tanks 625a and 625b, and the fluidizers 655a and 655b on the exit side of the blowing tanks 625a and 625b are appropriately opening/closing operated.

In the blowing stations Z having constructions shown in FIGS. 31 and 32 also, as described above, it is possible to continuously and pneumatically supply the granular synthetic resin material from the blowing tanks 625a and 625b to the tuyere portion of the blast furnace.

Pneumatic air is supplied from the accumulator 629 through the air supply pipe 637 to the pneumatic feed pipe 626. Under the effect of this air, the granular synthetic resin material discharged from the blowing tanks 625, 625a and 625b is sent through the pneumatic feed pipe 626 and the pneumatic branch pipe 627 to the plurality of tuyeres 228, and blown into the blast furnace as a fuel.

The above description has covered an example of blowing of the synthetic resin material into the tuyere portion of the blast furnace. In a furnace of any other kind as well, the synthetic resin material is similarly supplied to the blowing portion of synthetic resin material such as tuyere portion, and blown into the furnace.

The amount of supply of the synthetic resins (A) mainly comprising film-shaped synthetic resins and the synthetic resins (B) comprising the other kinds of synthetic resins to the processing facilities varies with time to some extent because of the nature as waste. When taking up a relatively short period of time (for example, from several hours to several tens of hours), only any one kind of synthetic resins is supplied. Therefore, synthetic resins processed and pneumatically sent to the furnace may temporarily be only any one of the combinations synthetic resins (A)—granular synthetic resin material (a) and synthetic resins (B)—granular synthetic resin material (b). It is well possible that only one of granular synthetic resin materials (a) and (b) may temporarily be pneumatically sent to the furnace for some other reason.

As described above, the granular synthetic resin material (a) obtained through granular contraction/solidification or contraction/solidification-granulation by the above-mentioned method (2) or (3) has relatively porous properties with a large specific surface area, and has a rounded shape as a whole, resulting in excellent combustion property and fluidity. By mixing the same with the granular synthetic resin material (b), it is possible to effectively improve combustion property, fluidity and transferability of the granular synthetic resin material as a whole supplied to the furnace. More specifically, in terms of combustion property, when a mixture of the granular synthetic resin material (a) and the granular synthetic resin material (b) is blown into the furnace, the granular synthetic resin material (a) having an excellent combustion property is burnt quickly to cause ignition of the granular synthetic resin material (b), thus largely improving combustion property of the granular synthetic resin material as a whole blown into the furnace.

In terms of fluidity and transferability also, furthermore, inclusion of the granular synthetic resin material (a) excellent in fluidity and transferability and having a rounded shape performs a function of lubricant of improving fluidity of the granular synthetic resin material as a whole, resulting in considerable improvement of fluidity and transferability of the entire granular synthetic resin materials.

EXAMPLES

Figure 36:
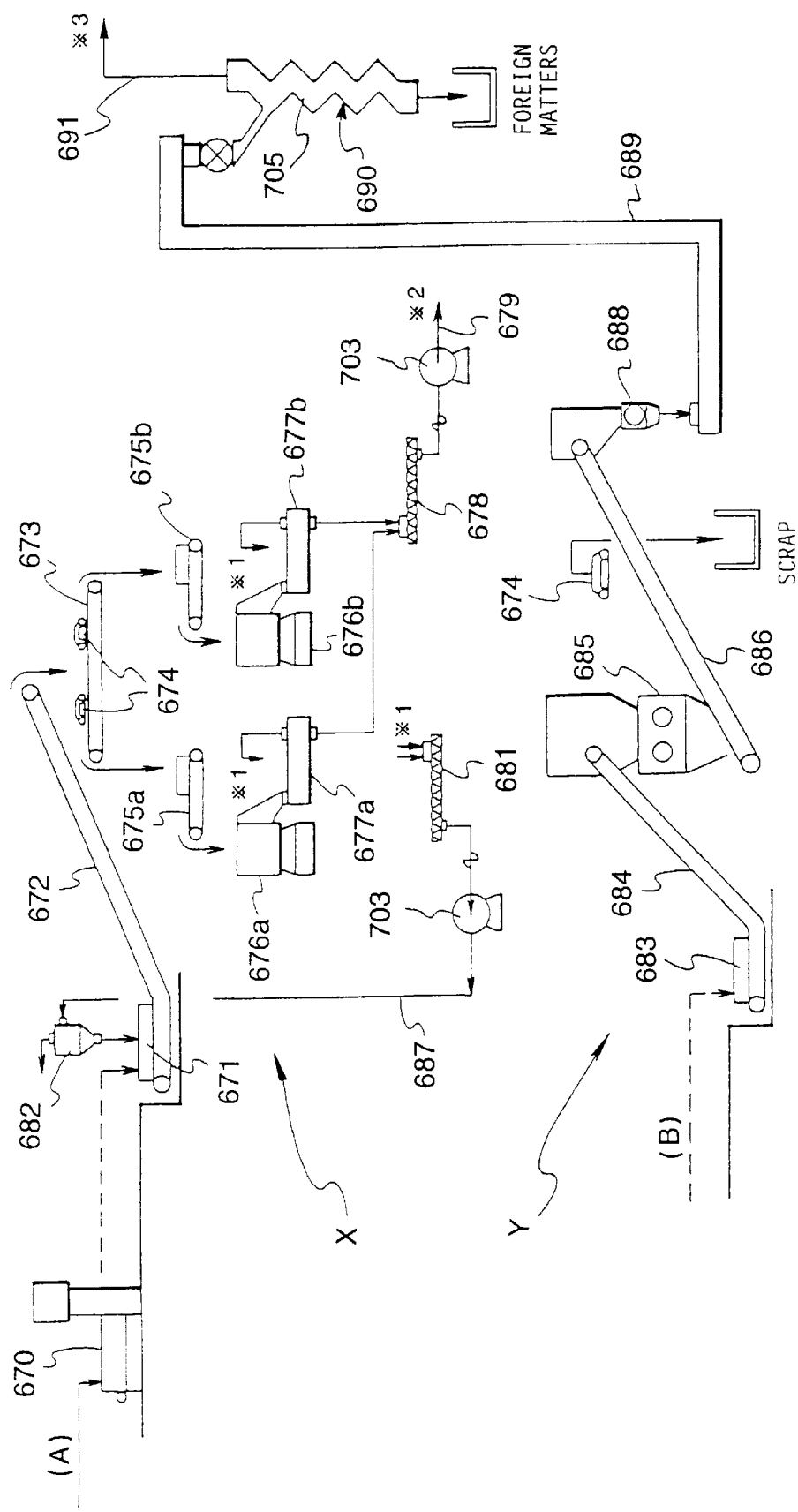
FIG. 36 is a schematic diagram partially illustrating an embodiment of the apparatus for blowing a synthetic resin material into a furnace of the present invention.
Figure 37:
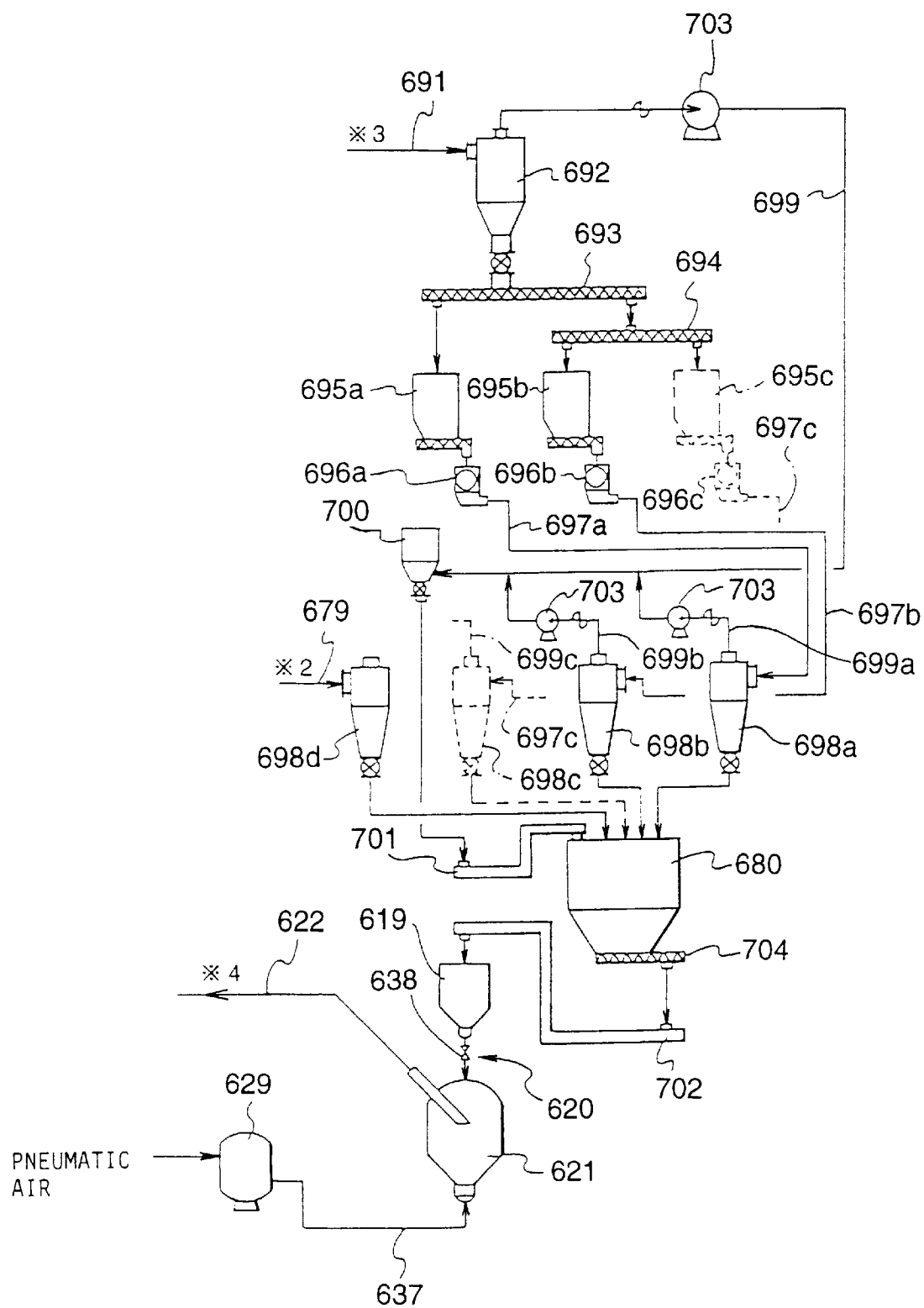
FIG. 37 is a schematic diagram partially illustrating an embodiment of the apparatus for blowing a synthetic resin material into a furnace of the present invention.
Figure 38:
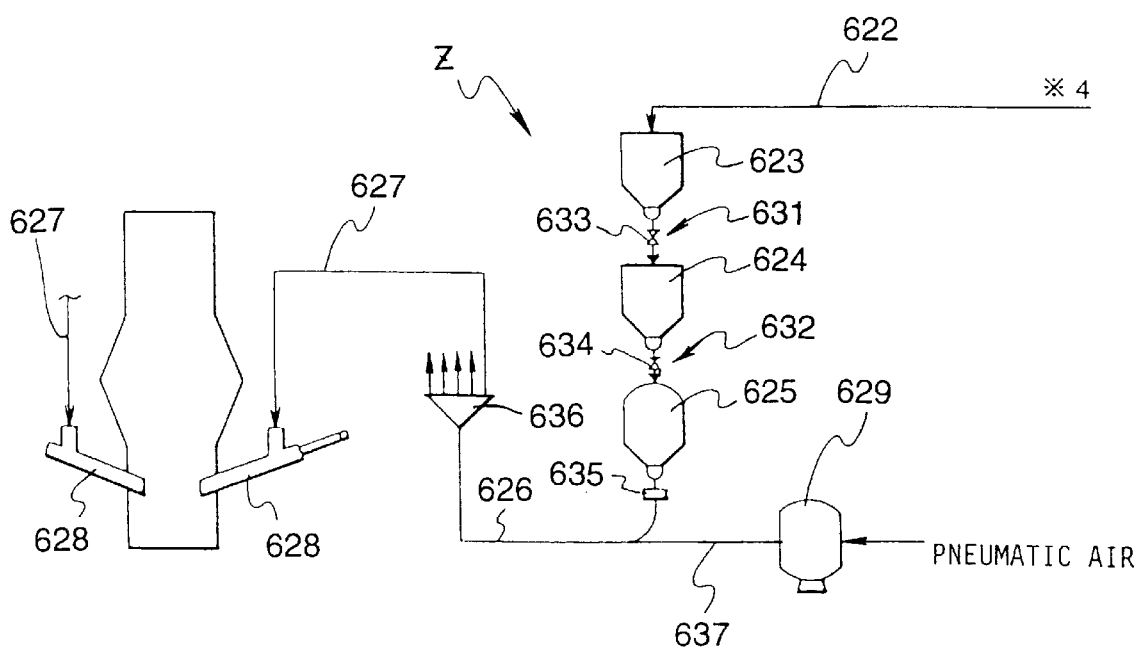
FIG. 38 is a schematic diagram partially illustrating an embodiment of the apparatus for blowing a synthetic resin material into a furnace of the present invention.

FIGS. 36 to 38 illustrate an embodiment of the apparatus of the present invention.

On the entry side of the processing line X, there is provided an upright cutter (offline) for cutting film-shaped synthetic resin materials wound into, for example a roll shape, and separating and removing the roll core from the film. The processing line X has, sequentially from the entry side, a supply conveyor 672 provided with a receiving hopper 671 of the synthetic resins (A) at an end thereof, a plurality of granular solidifying units 676a and 676b which receive the synthetic resins (A) transferred by the supply conveyor 672 through a distribution conveyor 673 capable of being switched over between forward and backward and charging conveyors 675a and 675b, sieves 677a and 677b (vibrating discharge units) for sieving the synthetic resin material processed into a granular form in these granular solidifying units 676a and 676b, an undersize conveyor 678 and a pneumatic feed pipe 679 for transferring the granular synthetic resin material (a) having a small particle diameter as sieved by these sieves 677a and 677b, and a separator 698d for separating the granular synthetic resin material (a) transferred through the pneumatic feed pipe 679 from pneumatic air. The granular synthetic resin material (a) separated by the separator 698d is charged through a transfer pipe into the primary storage silo 680.

In addition, the processing line X has an oversize conveyor 681 and a pneumatic feed pipe 687 for receiving and transferring synthetic resin material having a large particle diameter as sieved by the sieves 677a and 677b, and a separator 682 for separating the synthetic resin material transferred by the pneumatic feed pipe 687 from the pneumatic air and charging the same again into the receiving hopper 671.

The granular solidifying units 676a and 676b have the same construction as that described as to the example of the configuration shown in FIG. 26.

A pair of magnetic separators 674 are arranged above the distributing conveyor 673.

The processing line Y has, on the other hand, sequentially from the entry side, a supply conveyor provided with a receiving hopper 683 of the synthetic resins (B) at an end thereof, a primary crusher 685 for receiving the synthetic resins (B) transferred by the supply conveyor 684 and roughly crushing the same, a transfer conveyor 686 for transferring the synthetic resins (B) rough-crushed in this primary crusher 685 to a secondary crusher, the secondary crusher 688 receiving the synthetic resins (B) transferred by the transfer conveyor 686 and subjecting the same to secondary crushing, a transfer conveyor 689 transferring the synthetic resins (B) crushed in this secondary crusher 688 to a wind selector, the wind selector 690 for removing foreign matters such as earth, sand and metals from the synthetic resins (B) transferred by this transfer conveyor 689, a pneumatic feed pipe 691 for pneumatically feeding the synthetic resins after removal of foreign matters by this wind selector 690, a separator 692 for separating the synthetic resins (B) transferred through this pneumatic feed pipe 691 from pneumatic air, a plurality of cushion tanks 695a to 695c for receiving the synthetic resins (B) discharged from this separator 692 through distributing conveyors 693 and 694, a plurality of crushers 696a to 696c for receiving the synthetic resins (B) supplied from the individual cushion tanks 695a to 695c and crushing the same, pneumatic feed pipes 697a to 697c for transferring the granular synthetic resin material (b) crushed in these crushers 696a to 696c, and separators 698a to 698c for separating the granular synthetic resin material (b) transferred through these pneumatic feed pipes 697a to 697c from pneumatic air. The granular synthetic resin material (b) separated in these separators 698a to 698c is charged through the transfer pipe into a primary storage silo 680.

In the foregoing wind selector 690, the synthetic resins (B) are charged into a longitudinal zigzag path 705 and air is blown into this path 705 from below to above, thereby selecting and separating the synthetic resins from the other foreign matters. The synthetic resins (B), which are light in weight, rise through the path 705 by wind force and are discharged into the pneumatic feed pipe 691, whereas heavy foreign matters such as earth, sand and metals drop, on the other hand, through the path 705 and are discharged to below the path.

The foregoing distributing conveyors 693 and 694 and the plurality of cushion tanks 695a to 695c have a function of adjusting the number of operating crushers 696a to 696c and the supply amount of synthetic resins to the crushers 696a to 696c. For example, when the supply amount of the synthetic resins (B) to the processing line Y is relatively small, only some of the plurality of crushers 696a to 696c are operated by supplying the synthetic resins (B) only to some of the plurality of cushion tanks 695a to 695c by means of the distributing conveyors 695 and 694. When the supply amount of the synthetic resins (B) to the processing line Y is large, on the other hand, all the crushers 696a o 696c are operated by supplying the synthetic resins (B) to all the cushion tanks 695a to 695c by means of the distributing conveyors 693 and 694. When the supply amount of the synthetic resins (B) is excessive relative to the capacity of the crushers 696a to 696c, furthermore, the cushion tanks 695a to 695c perform the role of temporarily storing the synthetic resins (B).

Because, in the processing line Y, crushing or milling of lumpy synthetic resins is conducted, pneumatic air after transfer of the crushed or milled synthetic resin material contains much fine dust of synthetic resin material. A configuration for processing such pneumatic air comprises pipings 699 and 699a to 699c for transferring the pneumatic air separated in the separators 692 and 698a to 698c to a dust collector, the dust collector 700 collecting synthetic resin dust from the pneumatic air transferred from these pipes, and an under-collector conveyor 701 which includes transfer means for transferring the collected synthetic resin dust and charging the same into the primary storage silo 680.

A magnetic separator 674 is arranged in the middle of the foregoing transfer conveyor 686.

A constant-volume cutter 704 is provided in the primary storage silo 680: the granular synthetic resin material cut from this constant-volume cutter 704 is supplied through the transfer conveyor 702 to the service tank 619.

As the construction in the downstream of the service tank 619 (including the blowing station Z) is the same as that shown in FIG. 26, the same reference numerals are assigned to the corresponding components, and a detailed description is omitted here.

In the drawing, 703 is a fan provided in each of the pneumatic feed pipes.

Figure 39:
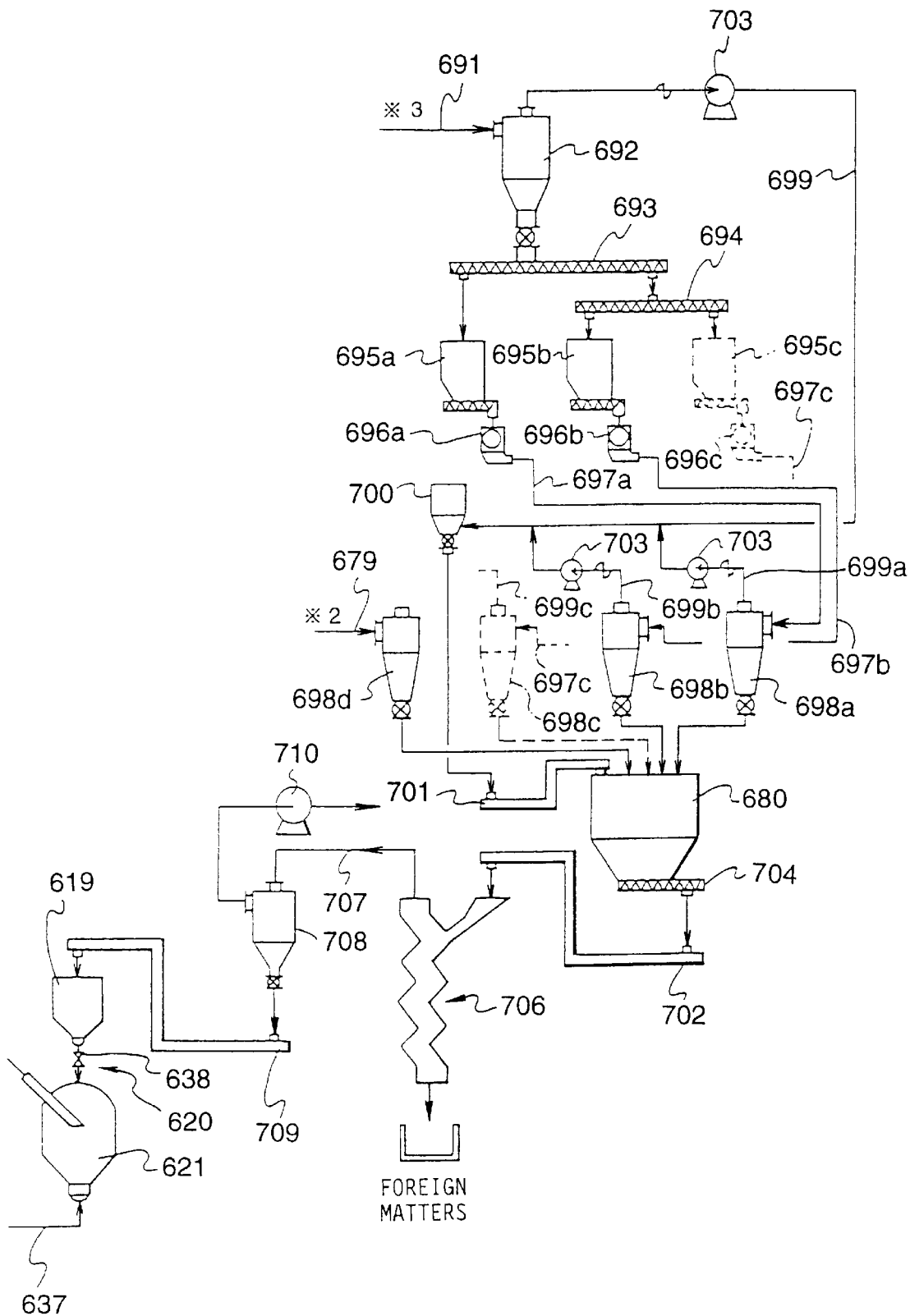
FIG. 39 is a schematic diagram partially illustrating another embodiment of the apparatus for blowing a synthetic resin material into a furnace of the present invention.

FIG. 39 shows another embodiment of the apparatus of the present invention: a secondary wind selector 706 is provided between the primary storage silo 680 and the service tank 619 so as to permit removal of foreign matters which could not be removed by the wind selector 690 in the upstream. The granular synthetic resin material cut from the constant-volume cutter 704 of the primary storage silo 680 is supplied to this secondary wind selector 706 through the transfer conveyor 702.

The basic construction of the foregoing secondary wind selector 706 is the same as that of the above-mentioned wind selector 690. A pneumatic feed pipe 707 for pneumatically feeding the synthetic resins (B) after removal of foreign matters in the secondary wind selector 706, a separator 708 for separating the synthetic resins (B) transferred through this pneumatic feed pipe 707 from pneumatic air, and a transfer conveyor 709 for transferring the synthetic resins (B) discharged from this separator 708 to the service tank 619.

In FIG. 39, 710 is a fan for pneumatic feeding.

Now, the processing steps of the synthetic resins in the apparatus of the above-mentioned embodiment.

The synthetic resins (A) are as required cut in an offline upright cutter 670, then charged into the receiving hopper 671 on the entry side of the processing line X, charged into the granular solidifying units 676a and 676b through the supply conveyor 672, the distributing conveyor 673 and the charging conveyors 675a and 675b, where the synthetic resins (A) are processed into a volume-reduced and solidified granular synthetic resin material (a). Scrap mixed in the synthetic resins is removed in the middle of the foregoing distributor 673 by means of the magnetic separator 674.

The granular synthetic resin material (a) obtained from the granular solidifying units 676a and 676b is charged into the sieves 677a and 677b for sieving. Only ones having a particle diameter under a prescribed level (for example, −6 mm) are transferred through the under-sieve conveyor 678 and the pneumatic feed pipe 679 to be separator 698b, and after separation from pneumatic air in this separator 698b, charged into the primary storage silo 680. The granular synthetic resin materials having a particle diameter of over the prescribed level are transferred through the over-sieve conveyor 681 and the pneumatic pipe 687 to the separator 682, and after removal from pneumatic air, brought back to the receiving hopper 671 on the entry side, and charged again, together with the synthetic resins (A), into the granular solidifying units 676a and 676b.

The synthetic resins (B) are charged, on the other hand, into the receiving hopper 683 on the entry side of the processing line Y, and then charged into the primary crusher 685 through the supply conveyor 684 for rough crushing (for example, to a particle diameter of about 50 mm). Then, the synthetic resins (B) are charged into the secondary crusher 688 by the transfer conveyor 636 for secondary crushing (for example, to a particle diameter of about 20 mm). Scrap mixed in the synthetic resins (B) subjected to primary crushing is removed by the magnetic separator 674 in the middle of the above transfer conveyor 686.

The secondary-crushed synthetic resins (B) are charged by the transfer conveyor 689 into the wind selector 690, where foreign matters such as earth, sand and metals are separated and removed by wind selection. The synthetic resins (B) after this selection are pneumatically sent through the pneumatic feed pipe 691 to the separator 692, where the resins are separated from pneumatic air, then charged into the cushion tanks 695a to 695c through the distributing conveyors 693 and 694, and then sent to the individual milling units 696a to 696c (tertiary crushers) for milling to a particle diameter under a prescribed level (for example, to −6 mm), thereby obtaining the granular synthetic resin material (b). This granular synthetic resin material (b) is sent through the pneumatic feed pipes 697a to 697c to the separators 698a to 698c for separation from pneumatic air, and then charged into the primary storage silo 680.

Pneumatic air separated in the separators 692 and 698a to 698c is sent through the pipings 699 and 699a to 699c to the dust collector 700 for collection of synthetic resin dust, and the collected synthetic resin dust is charged by the under-collector conveyor 701 into the primary storage silo 680.

The mixture of the granular synthetic resin materials (a) and (b) stored in the primary storage silo 680 is supplied by the constant-volume cutter 704 and the transfer conveyor 702 through the service tank 619 to the lift tank 621, and pneumatically sent from this lift tank 621 to the blowing station Z. The subsequent steps are the same as those described as to the construction shown in FIG. 26.

In the apparatus shown in FIG. 39, the mixture of the granular synthetic resin materials (a) and (b) stored in the primary storage silo 680 is supplied by the constant-volume cutter 704 and the transfer conveyor 702 to the secondary selector 706 for separation and removal of foreign matters by wind selection, pneumatically sent through the pneumatic feed pipe 707 to the separator 708 for separation from pneumatic air, supplied through the transfer conveyor 709 and the service tank 619 to the lift tank 621, and pneumatically sent from this lift tank 621 to the blowing station Z.

Operational Example 1

Synthetic resins (A) mainly comprising film-shaped synthetic resin materials in an amount of 2.5 tons/hr and synthetic resins (B) mainly comprising lumpy synthetic resin materials in an amount of 5 tons/hr were supplied to a processing/blowing apparatus of synthetic resins as shown in FIG. 26 to process the same into a granular synthetic resin materials (a) and (b), which were then pneumatically supplied to the tuyere portion of a blast furnace, and were blown, together with grained coal, through the tuyere portion into the furnace. Conditions for processing and supply of the synthetic resins and operating conditions of the blast furnace are as follows.

(a) Processing Conditions of Synthetic Resins
(a-1) Synthetic Resins (A)

After rough crushing, synthetic resins were processed through a contraction/solidification/granulation treatment by the following method (3) into a granular synthetic resin material (a) having a particle diameter of under 6 mm, and the same was transferred to the primary storage silo.

(a-2) Synthetic Resins (B)

After primary crushing, synthetic resins were processed through secondary crushing and milling into a granular synthetic resin material (b) having a particles diameter of under 6 mm, and the same was transferred to the primary storage silo.

(b) Pneumatic Feed Conditions of Granular Synthetic Resin Material

The mixture of the granular synthetic resin materials (a) and (b) charged into the primary storage silo was cut out in batches of a constant volume, transferred to the blowing station, pneumatically supplied to the tuyere portion of a blast furnace from the blowing station under the following conditions, and blown into the furnace.

Pneumatic gas: air
Blowing flow rate of pneumatic gas: 1,300 $Nm^3/hr$
Amount of blown granular synthetic resin material: 7.5 tons/hr
Solid/gas ratio: 4.5 kg/kg
(c) Blast furnace operating conditions
Iron production: 9,000 tons/day
Coke rate: 447 kg/t · pig
Tuyere: Amount of blown granular synthetic resin material: 20 kg/t · pig
    Amount of blown grained coal: 100 kg/t · pig
    Blast volume: 7,260 $Nm^3/min$
    Oxygen enrichment ratio: 4%
    Blast temperature: 1,000° C.

Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

Operational Example 2

Synthetic resins (A) mainly comprising film-shaped synthetic resin materials in an amount of 2.8 kg/hr and synthetic resins (B) mainly comprising lumpy synthetic resin materials in an amount of 5.6 kg/hr were supplied to a processing/blowing experimental apparatus of synthetic resins as shown in FIG. 27 to process the same into a granular synthetic resin materials (a) and (b), which were then pneumatically supplied to the tuyere portion of an experimental blast furnace, and were blown, together with grained coal, through the tuyere portion into the furnace. Conditions for processing and pneumatic supply of the synthetic resins and operating conditions of the blast furnace were the same as in the Operational Example 1.

Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

In this Operational Example, polyvinyl chloride materials accounted for about 3% of the synthetic resins supplied to the processing lines X and Y, and about 99% of these polyvinyl chloride could be separated and recovered in the separator. Top gas was sampled throughout the entire period of operation for analysis of the chemical composition of the gas: almost no HCl was detected.

Operational Examples 3–6

Synthetic resins (A) mainly comprising film-shaped synthetic resin materials in an amount of 2.5 tons/hr and synthetic resins (B) mainly comprising lumpy synthetic resin materials in an amount of 5.0 tons/hr were supplied to a processing/blowing apparatus of synthetic resins shown in the flowchart of FIG. 26 under the conditions for the Operational Examples 3 to 6 shown in Table 19 to process the same into granular synthetic resin materials (a) and (b). As shown in Table 19, the processed synthetic resin materials contained, in addition to thermoplastic resins such as polyethylene and polypropylene, polyethylene terephthalate (PET), ABS resin, and polyvinyl chloride (PVC), and contained other resins including thermosetting resins such as urethane resin and phenol resin, plasticizers such as diethylphthalate, hard flammable agents such as trimethyl phosphate and 2.3-dibromopropyl, resins added with glass fiber, calcium carbonate, alumina and clay, and various other additives. Earth and sand adhering to the synthetic resins were also contained (this is also the case with the Operational Examples 7 to 16 described later). The processing conditions of synthetic resins were the same as those in the Operational Example 1.

After processing, the resultant granular synthetic resin materials (a) and (b) were mixed in the primary storage silo, then pneumatically supplied to the tuyere portion of a blast furnace from the blowing station, and blown into the furnace through a blowing lance (25 mm dia.) for waste plastics. Pneumatic feed conditions of the granular synthetic resin materials were as follows. Operating conditions of the blast furnace are shown in Table 20.

Pneumatic gas: air
Flow rate of blown pneumatic gas: 650 to 2,600 $Nm^3/hr$
Amount of blown granular synthetic resin materials: 3.75 to 15.0 tons/hr
Solid/gas ratio: 4.5 kg/kg Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

Operational Example 7

Synthetic resins (A) mainly comprising film-shaped synthetic resin materials in an amount of 1.5 tons/hr and synthetic resins (B) mainly comprising lumpy synthetic resin materials in an amount of 6.6 tons/hr were supplied to a processing/blowing apparatus of synthetic resins shown in the flowchart of FIG. 26 under the conditions shown in Table 21 to process the same into granular synthetic resin materials (a) and (b). After mixing in the primary storage silo, these granular synthetic resin materials (a) and (b) were pneumatically sent from the blowing station to the blast furnace and blown into the furnace (flow rate of blown pneumatic gas: 1,300 $Nm^3/hr$). Processing conditions of synthetic resins were the same as those of the Operational Example 1, and pneumatic feed conditions of the processed granular synthetic resin materials were the same as those of the Operational Examples 3 to 6. Operating conditions of the blast furnace are shown in Table 22.

Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

Operational Example 8

Synthetic resins (A) mainly comprising film-shaped synthetic resin materials in an amount of 3.0 tons/hr and synthetic resins (B) mainly comprising lumpy synthetic resin materials in an amount of 4.5 tons/hr were supplied to a processing/blowing apparatus of synthetic resins shown in the flowchart of FIG. 26 under the conditions shown in Table 21 to process the same into granular synthetic resin materials (a) and (b). After mixing in the primary storage silo, these granular synthetic resin materials (a) and (b) were pneumatically sent from the blowing station to the blast furnace and blown into the furnace (flow rate of blown pneumatic gas: 1,300 Nm$^3$/hr). Processing conditions of synthetic resins were the same as those of the Operational Example 1, and pneumatic feed conditions of the processed granular synthetic resin materials were the same as those of the Operational Examples 3 to 6. Operating conditions of the blast furnace are shown in Table 22.

Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

Operational Example 9

Synthetic resins (A) mainly comprising film-shaped synthetic resin materials in an amount of 5.0 tons/hr and synthetic resins (B) mainly comprising lumpy synthetic resin materials in an amount of 2.5 tons/hr were supplied to a processing/blowing apparatus of synthetic resins shown in the flowchart of FIG. 26 under the conditions shown in Table 21 to process the same into granular synthetic resin materials (a) and (b). After mixing in the primary storage silo, these granular synthetic resin materials (a) and (b) were pneumatically sent from the blowing station to the blast furnace and blown into the furnace (flow rate of blown pneumatic gas: 1,300 Nm$^3$/hr). Processing conditions of synthetic resins were the same as those of Operational Example 1, and pneumatic feed conditions of the processed granular synthetic resin materials were the same as those of the Operational Examples 3 to 6. Operating conditions of the blast furnace are shown in Table 22.

Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

Operational Example 10

Synthetic resins (A) mainly comprising film-shaped synthetic resin materials in an amount of 1.50 tons/hr and synthetic resins (B) mainly comprising lumpy synthetic resin materials in an amount of 2.25 tons/hr were supplied to a processing/blowing apparatus of synthetic resins shown in the flowchart of FIG. 26 under the conditions shown in Table 23 to process the same into granular synthetic resin materials (a) and (b). After mixing in the primary storage silo, these granular synthetic resin materials (a) and (b) were pneumatically sent from the blowing station to the blast furnace and blown into the furnace (flow rate of blown pneumatic gas: 1,300 Nm$^3$/hr). Processing conditions of synthetic resins were the same as those of Operational Example 1, and pneumatic feed conditions of the processed granular synthetic resin materials were the same as those of the Operational Examples 3 to 6. Operating conditions of the blast furnace are shown in Table 24.

Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

Operational Example 11

Synthetic resins (A) mainly comprising film-shaped synthetic resin materials in an amount of 4.50 tons/hr and synthetic resins (B) mainly comprising lumpy synthetic resin materials in an amount of 6.75 tons/hr were supplied to a processing/blowing apparatus of synthetic resins shown in the flowchart of FIG. 26 under the conditions shown in Table 23 to process the same into granular synthetic resin materials (a) and (b). After mixing in the primary storage silo, these granular synthetic resin materials (a) and (b) were pneumatically sent from the flowing station to the blast furnace and blown into the furnace (flow rate of blown pneumatic gas: 1,930 Nm$^3$/hr). Processing conditions of synthetic resins were the same as those of Operational Example 1, and pneumatic feed conditions of the processed granular synthetic resin materials were the same as those of the Operational Examples 3 to 6. Operating conditions of the blast furnace are shown in Table 24.

Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

Operational Example 12

Synthetic resins (A) mainly comprising film-shaped synthetic resin materials in an amount of 5.5 tons/hr and synthetic resins (B) mainly comprising lumpy synthetic resin materials in an amount of 9.5 tons/hr were supplied to a processing/blowing apparatus of synthetic resins shown in the flowchart of FIG. 26 under the conditions shown in Table 23 to process the same into granular synthetic resin materials (a) and (b). After mixing in the primary storage silo, these granular synthetic resin materials (a) and (b) were pneumatically sent from the blowing station to the blast furnace and blower into the furnace (flow rate of blown pneumatic gas: 2,600 Nm$^3$/hr). Processing conditions of synthetic resins were the same as those of Operational Example 1, and pneumatic feed conditions of the processed granular synthetic resin materials were the same as those in the Operational Examples 3 to 6. Operating conditions of the blast furnace as shown in Table 24.

Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

TABLE 19

| | OPERATIONAL EXAMPLE 3 | | OPERATIONAL EXAMPLE 4 | | OPERATIONAL EXAMPLE 5 | | OPERATIONAL EXAMPLE 6 | |
|---|---|---|---|---|---|---|---|---|
| | FILM-SHAPED *1 | LUMPY *2 | FILM-SHAPED *1 | LUMPY *2 | FILM-SHAPED *1 | LUMPY *2 | FILM-SHAPED *1 | LUMPY *2 |
| Properties (%) | | | | | | | | |
| Polyethylene | 71.00 | 92.00 | 76.00 | 53.50 | 65.00 | 29.00 | 51.00 | 33.00 |
| Polypropylene | 24.00 | 4.50 | 11.00 | 26.00 | 28.00 | 28.00 | 32.00 | 23.00 |
| Polystyrene | 5.00 | 0.50 | 7.00 | 13.00 | 3.00 | 31.50 | 11.00 | 23.00 |
| PET | 0.00 | 0.00 | 2.00 | 2.00 | 3.00 | 1.50 | 0.00 | 1.50 |
| ABS | 0.00 | 0.00 | 1.00 | 1.00 | 0.00 | 0.00 | 0.00 | 1.50 |
| PVC | 0.00 | 0.00 | 3.00 | 0.00 | 0.00 | 1.50 | 1.00 | 2.50 |
| Other resins | 0.00 | 0.00 | 0.00 | 0.00 | 1.00 | 4.00 | 2.00 | 9.50 |
| Inorganic | 0.00 | 3.00 | 0.00 | 4.50 | 0.00 | 4.50 | 3.00 | 6.00 |
| Heat value of synthetic resin material charged into furnace (kcal/kg) | 10697 | | 10215 | | 9924 | | 9565 | |

*1: Synthetic resins mainly comprising film-shaped synthetic resins supplied (A)
*2: Synthetic resins mainly comprising lumpy synthetic resins supplied (B)

TABLE 20

| | Operational ex. 3 | Operational ex. 4 | Operational ex. 5 | Operational ex. 6 |
|---|---|---|---|---|
| Iron production (t/day) | 9000 | 9000 | 9000 | 9000 |
| Blast temp. (° C.) | 1000 | 1000 | 1000 | 1000 |
| Blast volume (Nm³/t · pig) | 1075 | 1075 | 1075 | 1074 |
| Coke rate (kg/t · pig) | 395 | 396 | 396 | 399 |
| Grained coal ratio (kg/t · pig) | 100 | 100 | 100 | 100 |
| Synthetic resin ratio (kg/t · pig) | 20 | 20 | 20 | 20 |

TABLE 21

| | OPERATIONAL EXAMPLE 7 | | OPERATIONAL EXAMPLE 8 | | OPERATIONAL EXAMPLE 9 | |
|---|---|---|---|---|---|---|
| | FILM-SHAPED *1 | LUMPY *2 | FILM-SHAPED *1 | LUMPY *2 | FILM-SHAPED *1 | LUMPY *2 |
| Properties (%) | | | | | | |
| Polyethylene | 71.00 | 71.00 | 66.50 | 45.67 | 47.00 | 48.50 |
| Polypropylene | 24.00 | 14.00 | 13.00 | 29.67 | 28.00 | 23.50 |
| Polystyrene | 5.00 | 5.00 | 8.00 | 13.00 | 18.00 | 16.50 |
| PET | 0.00 | 0.00 | 2.00 | 3.67 | 3.00 | 1.50 |
| ABS | 0.00 | 0.00 | 1.00 | 1.00 | 0.00 | 0.00 |
| PVC | 0.00 | 2.50 | 2.50 | 0.00 | 1.00 | 2.50 |
| Other resins | 0.00 | 2.50 | 5.00 | 3.33 | 3.00 | 3.00 |
| Inorganic | 0.00 | 5.00 | 2.00 | 3.67 | 0.00 | 4.50 |
| Heat value of synthetic resin material charged into furnace (kcal/kg) | 10194 | | 9990 | | 9941 | |

*1: Synthetic resins mainly comprising film-shaped synthetic resins supplied (A)
*2: Synthetic resins mainly comprising lumpy synthetic resins supplied (B)

TABLE 22

| | Operational ex. 7 | Operational ex. 8 | Operational ex. 9 |
|---|---|---|---|
| Iron production (t/day) | 9000 | 9000 | 9000 |
| Blast temp. (° C.) | 950 | 950 | 925 |
| Blast volume (Nm³/t · pig) | 1104 | 1104 | 1120 |
| Coke rate (kg/ t · pig) | 403 | 405 | 409 |
| Grained coal ratio (kg/t · pig) | 100 | 100 | 100 |
| Synthetic resin ratio (kg/t · pig) | 20 | 20 | 20 |

TABLE 23

|  | OPERATIONAL EXAMPLE 7 | | OPERATIONAL EXAMPLE 8 | | OPERATIONAL EXAMPLE 9 | |
| --- | --- | --- | --- | --- | --- | --- |
|  | FILM-SHAPED *1 | LUMPY *2 | FILM-SHAPED *1 | LUMPY *2 | FILM-SHAPED *1 | LUMPY *2 |
| Properties (%) | | | | | | |
| Polyethylene | 66.00 | 71.00 | 62.00 | 43.67 | 41.50 | 45.45 |
| Polypropylene | 24.00 | 14.00 | 13.00 | 26.33 | 26.50 | 19.39 |
| Polystyrene | 8.00 | 4.67 | 8.00 | 13.00 | 18.00 | 16.42 |
| PET | 0.00 | 0.00 | 4.20 | 2.20 | 3.60 | 4.23 |
| ABS | 0.00 | 0.00 | 1.00 | 1.00 | 0.00 | 3.16 |
| PVC | 1.00 | 1.00 | 2.50 | 3.33 | 2.50 | 1.71 |
| Other resins | 1.00 | 2.67 | 7.30 | 5.13 | 6.40 | 1.03 |
| Inorganic | 0.00 | 6.67 | 2.00 | 5.33 | 1.50 | 8.61 |
| Heat value of synthetic resin material charged into furnace (kcal/kg) | 10238 | | 9674 | | 9480 | |

*1: Synthetic resins mainly comprising film-shaped synthetic resins supplied (A)
*2: Synthetic resins mainly comprising lumpy synthetic resins supplied (B)

TABLE 24

|  | Operational ex. 10 | Operational ex. 11 | Operational ex. 12 |
| --- | --- | --- | --- |
| Iron production (t/day) | 9000 | 9000 | 9000 |
| Blast temp. (° C.) | 1000 | 1000 | 1000 |
| Blast volume (Nm³/t · pig) | 1071 | 1077 | 1080 |
| Coke rate (kg/t · pig) | 408 | 388 | 378 |
| Grained coal ratio (kg/t · pig) | 100 | 100 | 100 |
| Synthetic resin ratio (kg/t · pig) | 10 | 30 | 40 |

Operational Examples 13 to 16

Synthetic resins (A) mainly comprising film-shaped synthetic resin materials and synthetic resins (B) mainly comprising lumpy synthetic resin materials were supplied to a processing/blowing apparatus of synthetic resins shown in the flowchart of FIG. 27 under the conditions shown in Tables 25 and 26 for the Operational Examples 13 to 16 to process the same into granular synthetic resin materials (a) and (b).

After mixing in the primary storage silo, these processed granular synthetic resin materials (a) and (b) were pneumatically sent from the flowing station to the blast furnace, and blown into the furnace through a waste plastic blowing lance (25 mm dia.). Processing conditions of synthetic resins were the same as those of Operational Example 1, and pneumatic feed conditions of the processed granular synthetic resin materials were the same as those of the Operational Examples 3 to 6. For the individual Operational Examples 13 to 16, the amount of processed and furnace-supplied synthetic resins, and properties thereof are shown in Tables 25 and 26, and operating conditions of the blast furnace are shown in Table 27.

Blowing of the above-mentioned granular synthetic resin materials into the furnace was carried out for seven days. As a result, the blast furnace operation itself showed no trouble, and there occurred almost no supply trouble such as clogging of the cutting portion of the storage silo or in the pneumatic feed pipe system of the granular synthetic resin materials.

Top gas was sampled throughout the entire period of operation for analysis of the chemical composition of the gas: almost no HCl was detected.

TABLE 25

|  | OPERATIONAL EXAMPLE 13 | | | OPERATIONAL EXAMPLE 14 | | |
| --- | --- | --- | --- | --- | --- | --- |
|  | Supplied synthetic resins | | | Supplied synthetic resins | | |
|  | FILM-SHAPED *1 | LUMPY *2 | Total after treatment | FILM-SHAPED *1 | LUMPY *2 | Total after treatment |
| Quantity supplied (t/hr) | 2.83 | 5.57 | 7.50 | 3.21 | 5.21 | 7.50 |
| Properties (%) | | | | | | |
| Polyethylene | 71.00 | 66.00 | 75.86 | 51.00 | 46.20 | 53.52 |
| Polypropylene | 11.00 | 14.00 | 14.45 | 27.50 | 29.50 | 32.12 |
| Polystyrene | 2.00 | 4.00 | 3.59 | 2.00 | 6.80 | 5.47 |
| PET | 0.00 | 0.00 | 0.00 | 1.50 | 1.00 | 1.34 |
| ABS | 0.00 | 0.00 | 0.00 | 2.00 | 0.00 | 0.86 |
| PVC | 11.00 | 11.00 | 1.04 | 8.60 | 11.50 | 0.95 |
| Other resins | 0.00 | 2.00 | 1.49 | 2.40 | 2.00 | 2.42 |
| Inorganic | 5.00 | 3.00 | 3.57 | 5.00 | 3.00 | 3.43 |

TABLE 25-continued

|  | OPERATIONAL EXAMPLE 13 | | | OPERATIONAL EXAMPLE 14 | | |
|---|---|---|---|---|---|---|
|  | Supplied synthetic resins | | | Supplied synthetic resins | | |
|  | FILM-SHAPED *1 | LUMPY *2 | Total after treatment | FILM-SHAPED *1 | LUMPY *2 | Total after treatment |
| Heat value of synthetic resin material charged into furnace (kcal/kg) | | 10354 | | | 10146 | |

*1 Synthetic resins mainly comprising film-shaped synthetic resin (A)
*2 Synthetic resins mainly comprising lumpy synthetic resin (B)

TABLE 26

|  | OPERATIONAL EXAMPLE 15 | | | OPERATIONAL EXAMPLE 16 | | |
|---|---|---|---|---|---|---|
|  | Supplied synthetic resins | | Total after | Supplied synthetic resins | | Total after |
|  | FILM-SHAPED *1 | LUMPY *2 | treatment | FILM-SHAPED *1 | LUMPY *2 | treatment |
| Quantity supplied (t/hr) | 3.15 | 5.21 | 7.49 | 4.20 | 4.70 | 7.50 |
| Properties (%) | | | | | | |
| Polyethylene | 43.20 | 41.30 | 46.47 | 39.50 | 33.00 | 42.06 |
| Polypropylene | 23.40 | 27.60 | 28.87 | 22.40 | 28.50 | 30.07 |
| Polystyrene | 9.50 | 11.20 | 11.67 | 9.10 | 11.20 | 11.83 |
| PET | 1.50 | 1.00 | 1.33 | 1.50 | 1.00 | 1.47 |
| ABS | 3.40 | 0.00 | 1.39 | 3.40 | 1.20 | 2.34 |
| PVC | 8.60 | 9.80 | 0.77 | 12.40 | 14.80 | 1.20 |
| Other resins | 4.80 | 6.10 | 5.98 | 6.10 | 7.30 | 7.55 |
| Inorganic | 5.60 | 3.00 | 3.52 | 5.60 | 3.00 | 3.47 |
| Heat value of synthetic resin material charged into furnace (kcal/kg) | | 9915 | | | 9795 | |

*1 Synthetic resins mainly comprising film-shaped synthetic resin (A)
*2 Synthetic resins mainly comprising lumpy synthetic resin (B)

TABLE 27

|  | Operational ex. 13 | Operational ex. 14 | Operational ex. 15 | Operational ex. 16 |
|---|---|---|---|---|
| Iron production (t/day) | 9000 | 9000 | 9000 | 9000 |
| Blast temp. (° C.) | 1000 | 1000 | 1000 | 1000 |
| Blast volume (Nm³/t · pig) | 1074 | 1076 | 1077 | 1077 |
| Coke rate (kg/t · pig) | 395 | 395 | 396 | 398 |
| Grained coal ratio (kg/t · pig) | 100 | 100 | 100 | 100 |
| Synthetic resin ratio (kg/t · pig) | 20 | 20 | 20 | 20 |

Operational Example 17

Synthetic resins (A) mainly comprising film-shaped synthetic resin materials in an amount of 14.6 kg/hr and synthetic resins (B) mainly comprising lumpy synthetic resin materials in an amount of 29.2 kg/hr were supplied to a processing/blowing apparatus of synthetic resins shown in the flowchart of FIG. 26 to process the same into granular synthetic resin materials (a) and (b). After mixing in the primary storage silo, these granular synthetic resin materials (a) and (b) were pneumatically sent from the blowing station to a scrap melting experimental furnace (shaft furnace) and blown, together with grained coal through tuyeres into the furnace. In this Operational Example, a scrap melting experimental furnace (inner volume: 2.5 m³, iron production: 10 tons/day) having burners at a plurality of tuyeres of the furnace body was used. Grained coal PC and granular synthetic resin material SR were blown from a solid fuel blowing port and at the burner radial center or in the proximity thereof from the combustion burners of the tuyeres, and oxygen at the room temperature was blown from an oxygen blowing port b therearound. Simultaneously, steam was blown as a coolant for adjusting temperature.

Processing and supply conditions of synthetic resins and operating conditions of the scrap melting experimental furnace are shown below.

(a) Processing Conditions of Synthetic Resins Same as in the Operational Example 1

(b) Pneumatic Feed Conditions of Granular Synthetic Resin Material

The mixture of granular synthetic resin materials (a) and (b) charged in the primary storage silo is cut out from the silo in batches of a constant volume, transferred to the blowing station. The granular synthetic resin materials were pneumatically sent from the blowing station to tuyeres of a blast furnace under the following conditions and blown into the furnace.

Pneumatic gas: air
Flow rate of blown pneumatic gas: 7.6 Nm³/hr Amount of blown granular synthetic resin material:
43.8 kg/hr
Solid/gas ratio: 4.5 kg/kg
(c) Operating conditions of scrap melting experimental furnace
Iron production: 10 tons/day
Coke rate: 265 kg/t · pig
Converter slag ratio: 121 kg/t · pig
Silica ratio: 5 kg/t · pig
Tuyere: Amount of blown granular synthetic resin material 105 kg/t · pig
    Amount of blown grained coal: 175 kg/t · pig
    Amount of blast oxygen: 206 Nm³/t · pig
    Amount of steam: 7 Nm³/t · pig Blowing of the above-mentioned granular synthetic resin materials into the furnace was carried out for seven days. As a result, the scrap melting experimental furnace operation itself showed no trouble, and there occurred almost no supply trouble such as clogging of the cutting portion of the storage silo or in the pneumatic feed pipe system of the granular synthetic resin materials.

In this Operational Example, polyvinyl chloride materials accounted for about 3% of the synthetic resins supplied to the processing lines X and Y, and about 99% of these polyvinyl chloride could be separated and recovered in the separator. Top gas was sampled throughout the entire period of operation for analysis of the chemical composition of the gas: almost no HCl was detected.

Operational Example 18

Magnetic cards and the like rejected as defective products or waste (including combination cards such as cards using paper, and cards incorporating ICs as storage medium) were supplied to a processing/blowing apparatus of synthetic resins shown in the flowchart of FIG. 26, then after processing, pneumatically fed to a blast furnace and blown into the furnace.

Magnetic cards, which are used for diverse and various purposes, are broadly divided into the following two kinds in terms of thickness:

(1) Thickness of at least 0.5 mm: cash card, various identification cards;

(2) Thickness under 0.5 mm: telephone card, ticket, various prepaid cards.

Results of investigation through previous tests suggest that, for the foregoing magnetic cards, cards having a thickness of under 0.5 mm, if simply crushed, form scaly flakes. When applied with pressure in a tank of the pneumatic feed system, flakes adhere with each other, eliminating voids. This leads to loss of slip between crushed pieces and of aeration, resulting in easy occurrence of supply troubles such as scaffolding. In this Operational Example, therefore, cards of (2) above having a thickness of under 0.5 mm were classified as synthetic resins (A) mainly comprising film-shaped synthetic resin materials, and cards of (2) above having a thickness of at least 0.5 mm were classified as synthetic resins (B) mainly comprising lumpy synthetic resin materials. These cards were processed in a processing/blowing apparatus of synthetic resins shown in the flowchart of FIG. 26 into granular synthetic resin materials (a) and (b).

After processing, the granular synthetic resin materials (a) and (b) were mixed in the primary storage silo, and pneumatically supplied from the blowing station to the blast furnace, and blown into the furnace through a waste plastics blowing lance (25 mm dia.).

Processing and pneumatic feed conditions of synthetic resins and blast furnace operating conditions were as follows.

(a) Processing Conditions of Synthetic Resins Same as in the Operational Example 1.

(b) Pneumatic Feed Conditions of Granular Synthetic Resin Material

The mixture of the granular synthetic resin materials (a) and (b) charged into the primary storage silo were cut out from the silo in batches of a constant volume, transferred to the blowing station. Granular synthetic resin materials were pneumatically sent to the tuyres of the blast furnace from the blowing station under the following conditions, and blown into the furnace. Pneumatic gas: air
Amount of blown pneumatic gas: 1,200 Nm³/hr
Amount of blown granular synthetic resin material: 62.5 kg/min Solid/gas ratio: 2.4 kg/kg (c) Operating Conditions of Blast Furnace
Iron production: 9,000 tons/day
Blast volume: 7,260 Nm³/min
Oxygen enrichment ratio: 4%
Blast temperature: 1,200° C.
Coke rate: 447 kg/t.pig
Amount of blown grained coal: 100 kg/t.pig
Amount of blown granular synthetic resin material: 10 kg/t.pig Blowing of these granular synthetic resin materials was carried out for two days. As a result, the blast furnace operation itself showed no trouble, and there occurred almost no supply trouble such as clogging of the cutting portion of the storage silo or in the pneumatic feed pipe system of the granular synthetic resin materials.

Operational Example 19

Only polyethylene terephthalate resin (PET) bottles were selected from among plastic bottles collected as waste, which were processed under conditions (a) and (b) below, pneumatically sent to the blast furnace, and blown into the furnace. Selection of PET bottles were conducted by means of a material determination unit (made by Toa Denpa Kogyo Co., Ltd.) or by manual operation.

In the Operational Example (a), PET bottles were supplied only to the processing line Y of the processing/blowing apparatus of synthetic resins shown in the flowchart of FIG. 26, totally crushed in the form with caps and labels attached thereon to a particle diameter under 6 mm (however, metal caps were removed after crushing), pneumatically sent to the blast furnace, and blown into the furnace.

In the Operational Example (b), PET bottles were supplied only to the processing line X of the processing/blowing apparatus of synthetic resins shown in the flowchart of FIG. 26, processed with caps and labels attached thereto into a granular synthetic resin material having a particle diameter of under 6 mm (however, metal caps were removed after crushing), pneumatically supplied to the blast furnace, and blown into the furnace.

Processing and pneumatic feed conditions of synthetic resins and blast furnace operating conditions in the Operational Examples (a) and (b) are shown below.

(a) Processing Conditions of Synthetic Resins
    Operational Example (a): Same as in (a-2) in the Operational Example 1.
    Operational Example (b): Same as in (a-1) in the Operational Example 1.

In each of the Operational Examples (a) and (b), the granular synthetic resin materials charged in the primary storage silo were cut out in batches of a constant volume from the silo, transferred to the blowing station, pneumatically sent from the blowing station under the following conditions to tuyeres of the blast furnace, and blown into the furnace.
Pneumatic gas: air
Amount of blown pneumatic gas: 1,200 Nm$^3$/hr
Amount of blown granular synthetic resin material: 62.5 kg/min Solid/gas ratio: 2.4 kg/kg
(c) Blast Furnace Operating Conditions
Iron production: 9,000 tons/day
Blast volume: 7,260 Nm$^3$/min
Oxygen enrichment ratio: 4%
Blast temperature: 1,200° C.
Coke rate: 447 kg/t.pig
Amount of blown grained coal: 100 kg/t.pig
Amount of blown granular synthetic resin material: 10 kg/t.pig The foregoing operation was carried out for two days. As a result, in the Operational Example (a), the amount of the granular synthetic resin material blown into the blast furnace was not stabilized (there were pulses in the amount of blowing), and the blowing stopping time reached even 4.6 hr/day in average. As a result of investigation, instability of this amount of blowing is caused by a defective cutting of the granular synthetic resin materials from the tank of the pneumatic feed system. More specifically, crushing chips (scaly flakes) of the granular synthetic resin material when pressure is applied in the tank of the pneumatic feed system adhere to each other, eliminating voids, slip between crushed chips and aeration. This causes scaffolding or other supply troubles.

In the Operational Example (b), on the other hand, there occurred no supply trouble of the granular synthetic resin materials as in the Operational Example (a), and no hindrance in the blast furnace operation itself.

According to the blowing apparatus of synthetic resin materials of the present invention, as described above, synthetic resins such as plastics can be provided as a fuel or an iron reducing agent to be blown into a blast furnace or a scrap melting furnace, irrespective of the form thereof. This permits quantity treatment and effective use of waste synthetic resins, and further, considerable reduction of the fuel cost in a blast furnace or the like. It is also possible to effectively improve fluidity, transferability and combustion property of synthetic resins supplied to a furnace, and to appropriately supply synthetic resins as a fuel or an iron reducing agent into the furnace without causing any trouble in the furnace operation. A problem caused by chlorine-containing macromolecular resins such as polyvinyl chloride contained in synthetic resins is never posed, and synthetic resins can be supplied as a fuel or an iron reducing agent to be blown into a blast furnace.

Embodiment 8

To solve the foregoing problems, the present inventors have made intensive research and gained those findings which will follow.

First of all, upon inspection of the combustion zone out of a peep hole for the tuyere, coal blown into the furnace via the tuyere, i.e., finely grained coal, has been found to immediately thermally decompose with the escape of its volatile components so that the coal gets minutely sized, eventually flying out of the combustion zone. By contrast with the coal, a synthetic resin material of a large particle diameter is retained in a combustively swirling manner in the combustion zone for an extended period of time, and this swirling retention continues until the particle size becomes fine to some extent. It is required that, in order to attain enhanced combustion ratio, the synthetic resin material be brought into completely combustive condition in shortened time while it is being retained as stated above. To this end, it has been found that the synthetic resin material needs to have a proper specific surface area as described hereunder.

As mentioned above, when blown into the furnace out of the tuyere, the synthetic resin material and coal show their respective different behaviors in the combustion zone. With regard to a synthetic resin material to be blown into the blast furnace, it has been found that the combustion ratio can be improved by setting the specific surface area in a certain appropriate range since such resin material has conditions adapted to be easily retentive in the combustion zone.

The present invention, which has been completed based on the aforementioned findings, is concerned with a method of the production of a pig iron by blowing a synthetic resin material into a vertical furnace out of a tuyere thereof, characterized in that such resin material has an average specific surface area of 50 m$^2$/kg or above.

The synthetic resin material for use in the invention may contain particles of smaller than 1 mm in particle diameter in a proportion of more than 5% by weight and an average specific surface area of 25 m$^2$/kg or above. Alternatively, the synthetic resin material may have foamed particles in a proportion of more than 3% by weight and an average specific surface area of 20 m$^2$/kg or above.

Preferred examples of the present invention will now be described with reference to the drawings.

Figure 40:
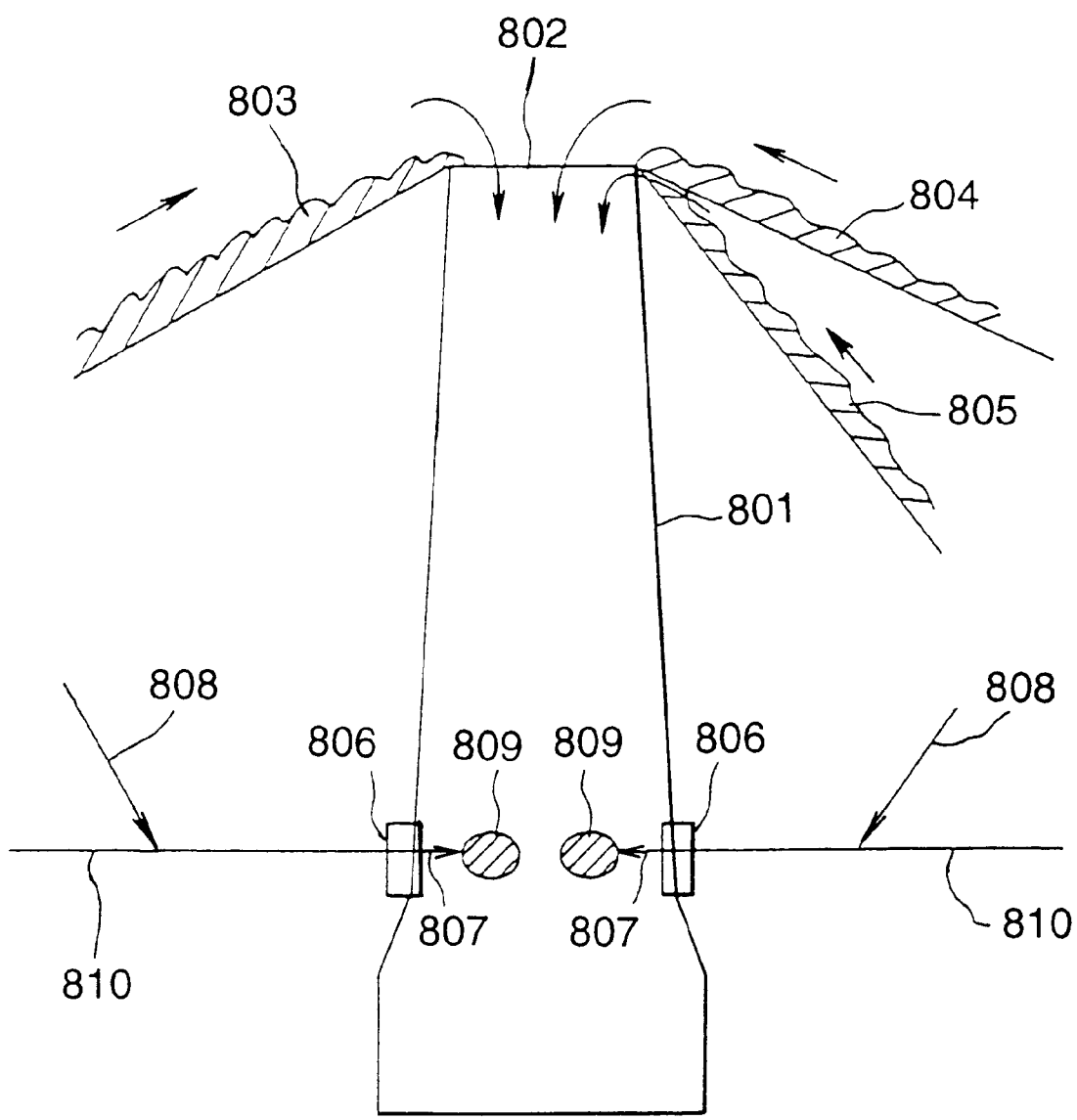
FIG. 40 is a schematic diagram illustrating an embodiment of the present invention.

FIG. 40 is a schematic view explanatory of a certain preferred example of the present invention. Iron ore 803, iron sources such as scrap 804 and the like and coke 805 are charged from a top 802 of a blast furnace 801, while a high-temperature oxygen-rich air 807 and a given synthetic resin material 808 are blown into the furnace out of tuyeres 806 located at a bottom of the furnace. The synthetic resin material 808 is effectively subjected to combustion in combustion zones 809 generated internally of the furnace 801 and forwardly of the tuyeres 806. The synthetic resin material 808 is blown halfway into an oxygen-rich air feed conduit 810.

The combustion ratio of a synthetic resin material in a combustion zone can be enhanced by increasing the resin material in respect of its average specific surface area. Average specific surface areas exceeding 50 m$^2$/kg enable the resultant synthetic resin material to afford a combustion ratio at a good level. It is to be noted here that the specific surface area is variable with the shape of synthetic resin materials used. A synthetic resin material, derived for instance from contraction and solidification in which a starting synthetic resin material is heated into a semi-molten state and then solidified by quenching, is preferred because it provides an irregular shape having resin particles aggregated and hence shows a large specific surface area. In the case of blowing of such resin material into the combustion zone, a resin portion having a large specific surface area (finely grained or irregularly shaped resin portion) begins first with combustion (hereunder called "preceding combustion"), whereas a coarsely grained resin portion undergoes thermal decomposition and then proceeds to combustion. As a result, the synthetic resin material thus blown into the combustion zone is improved in regard to its combustion ratio on the whole.

Additionally, a synthetic resin material containing a resin portion of smaller than 1 mm in particle diameter is highly effective for preceding combustion. In this instance, such resin portion needs to be contained in a proportion of more than 5% by weight. To gain improved combustion ratio, the whole synthetic resin material may be set at 25 m²/kg or above in average specific surface area.

More effective preceding combustion and hence enhanced combustion ratio are attainable from mixture of a foam-shaped resin in place of the granular equivalent. The reason behind this is that the foam-shaped resin is porous on its outer surface. In such case, the foam-shaped resin maybe added in a proportion of more than 3% by weight with the whole synthetic resin material set at 20 m²/kg or above.

Suitable synthetic resin materials may be hydrocarbon compounds of a polymeric class such as polyethylene, polypropylene, polystyrene and so on. No particular restriction is placed on the kind of polymeric hydrocarbon compounds.

Further, suitable synthetic resin materials of a foam shape may be foamed products such as of foamed polyethylene, foamed polystyrene and the like that have been in common use as food packages or as heat insulators, but the kind of foamed products is not limiting. In the case where foam-shaped resin materials are blown into a vertical furnace, they may be used singly or in combination with finely grained coal.

EXAMPLES

With reference to the following examples, the present invention will be further described below in greater detail.

Figure 41:
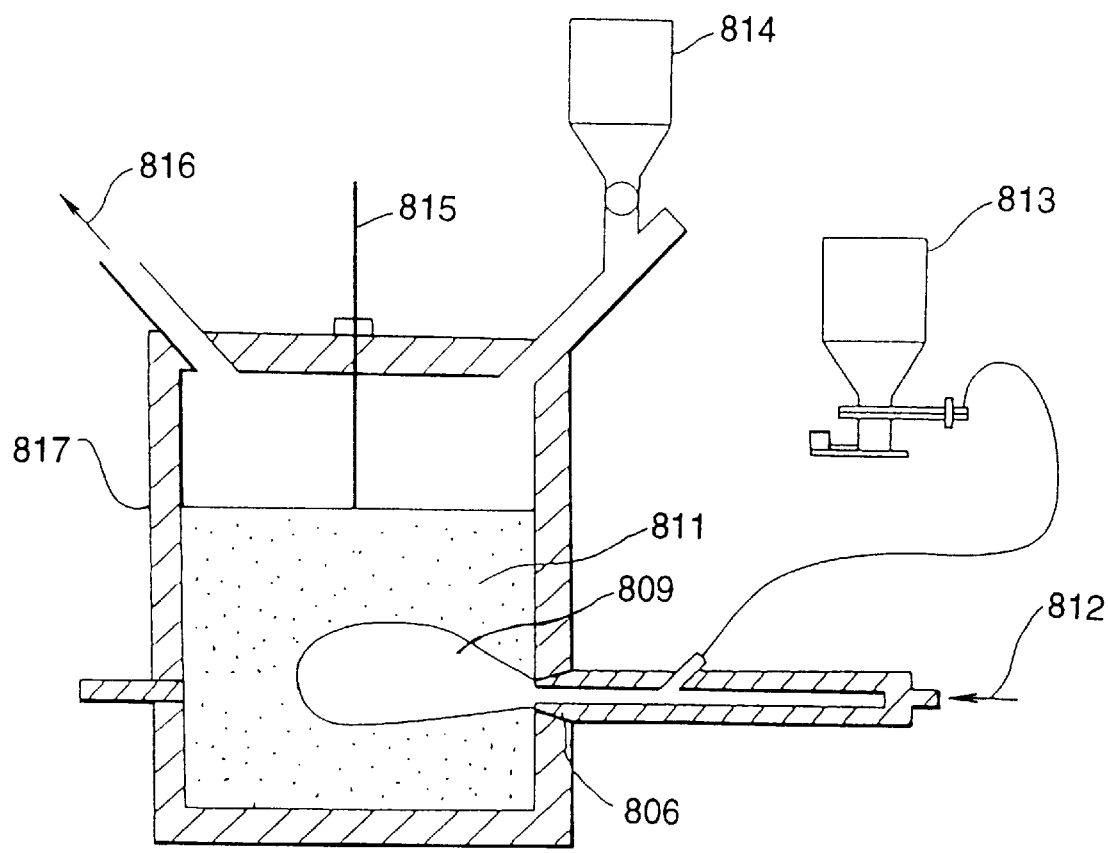
FIG. 41 is a schematic longitudinal sectional view illustrating a shaft furnace combustion experimental apparatus used for application of a combustion test in the present invention.

FIG. 41 is a schematic view, taken vertically cross-sectonally, of a combustion testing apparatus equipped with a vertical furnace and employed for carrying out the method of the present invention where a synthetic resin material is blown into the furnace. The testing apparatus shown here simulates an actual blast furnace with a tuyere designated at 806, a combustion zone at 809, a coke-filled layer at 811, a hot air at 812, a synthetic resin material hopper at 813, a coke hopper at 814, a counter rod at 815, a combustion gas at 816 and a furnace body at 817.

In Table 28 are shown major conditions set for combustion testing with use of the above testing apparatus.

Coke of 20 to 30 mm in particle diameter was supplied from the coke hopper 814 and charged out of a furnace top into the furnace, and the filling level of coke was adjusted to hold a void at 0.6 by means of the counter rod 815. On the other hand, a hot air 813 of 1,200° C. was blown in an amount of 350 Nm³/hr into the furnace out of the tuyrere 806, while a synthetic resin material was conveyed from the synthetic resin material hopper 813 and blown into the furnace. The amount of such resin material blown was 30 kg/hr, which amount was equivalent to 90 kg/ton reduced from the blow amount of a fuel (blow ratio of a fuel) required for 1 ton of pig iron to be produced by use of a blast furnace. The flow rate of a gas at a tip of the tuyere 806 was computed to be 145 m/sec. Thus, both the coke present in the coke-filled layer 811 and the synthetic resin material so blown were made vigorously combustible with eventual generation of a combustion zone 809 at a forward region of the tuyere 806.

Two different synthetic resin materials available usually as wastes were selectively used. One such waste had a smaller specific surface area (type A), and the other arose from contraction and solidification and had a larger specific surface area (type B). The specific surface areas were measured by means of a gas absorption method such as BET or the like.

With use of the combustion testing apparatus stated above, measurement was made of the combustion ratios as to synthetic resin materials. The combustion ratio α of such a resin material was defined by the following equation and computed therefrom.

$$\alpha = \{(A-C)\beta/C\} \times 100$$

where A is the coke consumption (kg/hr) where a synthetic resin material is not blown in, B is the coke consumption (kg/hr) where a synthetic resin material is blown in, β is the carbon content in coke, and C is the carbon content in a synthetic resin material blown in (kg/hr).

Tests [1] to [3] indicated below were conducted based upon the above stated methods.

Test [1]

The combustion ratios of synthetic resin materials were examined with the specific surface areas varied. The test results are shown in Table 29 below.

As evidenced by the results of Table 29, the combustion ratios of Examples 1 to 4 falling within the scope of the present invention are noticeably excellent as compared to those of Comparative Examples 1 to 5 deviating in scope from the invention.

Test [2]

The combustion ratios of synthetic resin materials were checked with variations as concerns the particle diameters of fine resin particles, the contents of a portion of such fine resin particles and the average specific surface areas of synthetic resin materials in their entirety. The test results are shown in Table 30 below.

The results of Table 30 demonstrate that if even one of the three parameters named above is outside the scope of the present invention, the resulting synthetic resin material is responsible for decreased combustion ratio, say below 75%, and that all such parameters having satisfied the scope of the invention lead to a good combustion ratio as large as above 88%.

Test [3]

The combustion ratios of synthetic resin materials were checked with variations as concerns the contents of foam-shaped resin materials and the average specific surface areas of synthetic resin materials in their entirety. The test results are listed in Table 31.

The results of Table 31 reveal that a departure of even either one of the two parameters from the scope of the present invention invites a combustion ratio as small as below 72% and that both of the parameters having met with the scope of the invention bring about a combustion ratio as large as above 90%.

With the present invention constituted as described hereinabove, a synthetic resin material when used as a heat source for a vertical furnace in the production of pig iron can be rendered combustively to a markedly great degree and with savings in coal and coke. Another advantage is that waste synthetic resin materials, wasted heretofore by incineration and reclamation, suit as an auxiliary fuel for use in vertical furnaces, contributing eventually to a great solution to environmental pollution. Thus, the present invention is industrially significant.

TABLE 28

| | |
|---|---|
| Blast volume (Nm³/hr) | 350 |
| Blast temp. (° C.) | 1200 |
| Blast gas analysis (vol. %) | |
| O₂ | 77 |
| N₂ | 23 |
| Tuyere nose gas flow velocity (m/sec) | 145 |
| Coke particle diameter (mm) | 20 to 30 |
| Void ratio upon charging coke (·) | 0.6 |
| Quantity of blown synthetic resin material (kg/hr) | 30 |
| Synthetic resin material analysis (wt. %) | |
| C | 84 |
| H | 14 |

Embodiment 9

Continued research have been made by the present inventors so as to eliminate the problems discussed above.

In general, synthetic resins are composed of hydrocarbons and, when blown into a blast furnace, are completely decomposed into C and H atoms at a region adjacent to a tuyere, which atoms act cooperatively as a reducing agent. Consequently, the larger number of C and H atoms per unit blow weight, the synthetic resin material is greater in its heat value and more effective as a reducer. Both reducing and heating capabilities, therefore, are adjudged in terms of heat value. For that reason, synthetic resin materials hitherto disposed can be used to advantage by incorporating a suitable amount of a low-reduction low-heat value resin material into a high-reduction high-heat value counterpart.

TABLE 29

| | | Example 1 | Example 2 | Example 3 | Example 4 | Comp. Ex. 1 | Comp. Ex. 2 | Comp. Ex. 3 | Comp. Ex. 4 | Comp. Ex. 5 |
|---|---|---|---|---|---|---|---|---|---|---|
| Synthetic resin material | Type | B | B | B | A = 50 wt. % B = 50 wt. % | A | A | A | A | A |
| | Particle diameter (mm) | 6 mm or less | 8 mm or less | 10 mm or less | 6 mm or less | 6 mm or less | 10 mm or less | 6 to 10 mm or less | 8 to 10 mm or less | 10 to 12 mm or less |
| | Average specific surface area (m²/kg) | 88.0 | 67.0 | 54.0 | 55.0 | 20.6 | 17.7 | 15.1 | 11.8 | 9.5 |
| Combustion ratio of synthetic resin material (%) | | 94 | 91 | 82 | 90 | 70 | 49 | 35 | 26 | 18 |

TABLE 30

| | | Example 4 | Example 5 | Example 6 | Example 7 | Comp. Ex. 6 | Comp. Ex. 7 | Comp. Ex. 8 | Comp. Ex. 9 |
|---|---|---|---|---|---|---|---|---|---|
| Synthetic resin material -1 | Particle diameter (mm) | 6 mm or less | 8 mm or less | 10 mm or less | 10 mm or less | 10 mm or less | 10 mm or less | 10 mm or less | 8 mm or less |
| | Average specific surface area (m²/kg) | 32.5 | 25 | 17.7 | 17.7 | 17.7 | 17.7 | 17.7 | 25 OK? |
| | Proportion (wt. %) | 95 | 95 | 95 | 90 | 97 | 99 | 90 | 70 |
| Synthetic resin material -2 | Particle diameter (mm) | 1 mm or less | 1 mm or less | 1 mm or less | 1 mm or less | 1 mm or less | 0.5 mm or less | 3 mm or less | 5 mm or less |
| | Average specific surface area (m²/kg) | 212 | 212 | 212 | 212 | 212 | 300 | 90 | 35 |
| | Proportion (wt. %) | 5 | 5 | 5 | 10 | 3 | 1 | 10 | 30 |
| Average specific surface area of synthetic resin material (m²/kg) | | 42 | 35 | 28 | 38 | 24 | 20 | 25 | 28 |
| Combustion ratio of synthetic resin material (%) | | 97 | 95 | 88 | 96 | 70 | 54 | 62 | 73 |

TABLE 31

| | | Example 8 | Example 9 | Example 10 | Example 11 | Example 12 | Comp. Ex. 10 | Comp. Ex. 11 |
|---|---|---|---|---|---|---|---|---|
| Synthetic resin material -1 | Particle diameter (mm) | 10 mm or less | 10 mm or less | 8 mm or less | 6 mm or less | 10 mm or less | 10 mm or less | 10 mm or less |
| | Average specific surface area (m²/kg) | 17.7 | 17.7 | 25 | 32.5 | 17.7 | 17.7 | 17.7 |
| | Proportion (wt. %) | 90 | 95 | 95 | 95 | 97 | 99 | 99.5 |
| Synthetic resin material -2 | Particle diameter (mm) | 10 mm or less | 10 mm or less | 10 mm or less | 10 mm or less | 10 mm or less | 10 mm or less | 10 mm or less |
| | Average specific surface area (m²/kg) | 154 | 154 | 154 | 154 | 154 | 154 | 154 |
| | Proportion (wt. %) | 10 | 5 | 5 | 5 | 3 | 1 | 0.5 |
| Average specific surface area of synthetic resin material (m²/kg) | | 31 | 24 | 33 | 39 | 22 | 19 | 18 |
| Combustion ratio of synthetic resin material (%) | | 94 | 92 | 96 | 97 | 90 | 72 | 56 |

In order to prepare a composite synthetic resin material flowing from intermixing a plurality of different resin materials as stated above, it is made necessary that waste synthetic resin materials be first sorted according to their qualities and then be determined in regard to their heat values and that the resin materials be admixed such that the heat value of each such resin material is rendered beyond a given level as measured by a predetermined equation for proportional intermixing.

The present invention has been completed w th the above findings taken in view. In this Embodiment, a method can be effected in which synthetic resin materials are blown into a metallurgical furnace.

In the operation of a metallurgical furnace wherein a plurality of types of synthetic resin materials are blown out of a tuyere, the qualities of those resin materials can be determined by a given determination method, and their heat values are determined from the results of such quality determination when the resin materials are observed free from impurities such as paper, fabric, metal and so on. In the case of inclusion of those impurities, the heat values are actually measured by such determination method. If the qualities are not determinable by the above given determination method, then the heat values are subject to actual measurement with use of such determination method. Subsequently, two or more synthetic resin materials are intermixed according to the heat value of each such resin material, which heat value is determinable by the foregoing method in which a mixture of two or more different types of synthetic resin materials shows a given heat value. The resin materials thus mixed are blown into the furnace out of the tuyere.

A preferred form in which the present invention is implemented will be further described with reference to the drawings.

Figure 42:
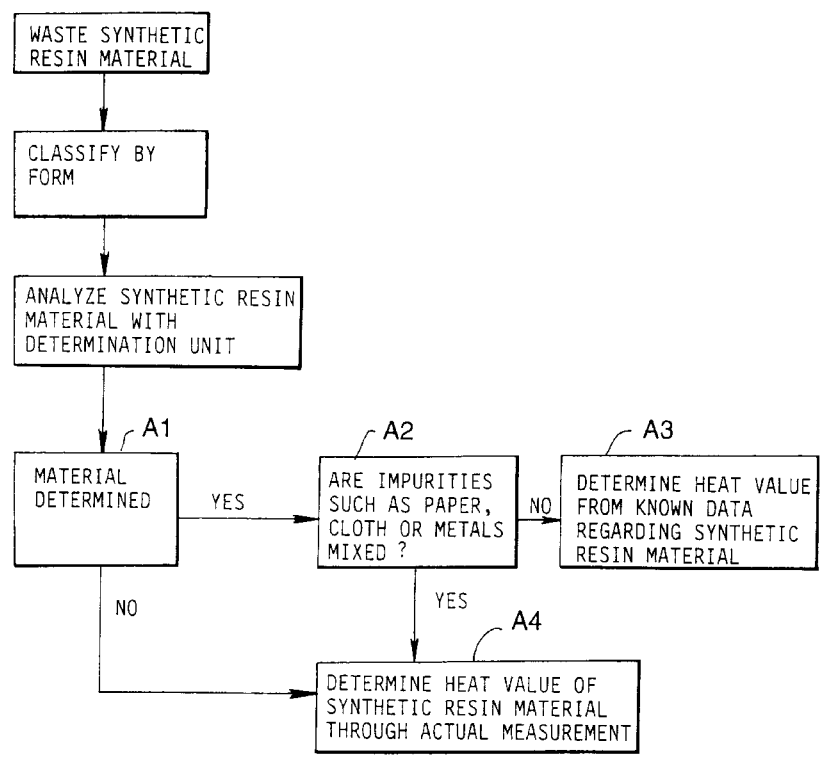
FIG. 42 is a flowchart illustrating the relationship between material determination and impartment of a heat value for the synthetic resin material to be blown into a metallurgical furnace in the present invention.

FIG. 42 is a flow diagram showing the relationship between the quality determination and the heat value determination concerning synthetic resin materials to be blown into a metallurgical furnace in the practice of the present invention. Waste synthetic resin materials are sorted into ones composed predominantly of film-like resins (hereunder called "film-shaped synthetic resin material") and ones composed mainly of plate-like, bolt-like and other molded forms (hereunder called "solid synthetic resin materials"), followed by analysis of the sorted resin materials on a quality determining apparatus. Synthetic resin materials determined at A1 to be certain of their qualities are passed on to A2 to inspect impurities held in meshed, bonded or otherwise attached condition, such as paper, fabric and/or metal. A synthetic resin material found free of impurities is determined in its heat value from among those heat values previously known with respect to the qualities as determined.

Even if its quality can be determined, a synthetic resin material when found involved in impurities at a stage of A2 is actually measured in regard to its heat value by a given method at a stage of A4 and determined as such. This is because the impurities produce a decline in heat value. A synthetic resin material when found undeterminable of its quality for some reasons at a stage of A1 are also measured at A4 for determination of its heat value. The method of measuring the heat values of synthetic resin materials may be effected as stipulated for example by JIS M8814.

The synthetic resin materials having their respective heat values determined through the above noted methods include such having a lower heat value than coke. One important feature of the present invention lies in making it possible to effectively utilize those resin materials which, owing to the lower heat values than coke, have not heretofore been used for blowing into a blast furnace or a metallurgical furnace. In this case, the resin materials of a lower heat value are mixed in an appropriate proportion with those resin materials having a higher heat value than coke and having been blown into the furnace with the result that the resulting composite resin material shows a given heat value. This intermixing is so made as to satisfy the following equations (11) and (12).

$$(a\alpha + b\beta + c\gamma + \ldots)/100 \geq Q \tag{11}$$

$$\alpha + \beta + \gamma + \ldots 100 \tag{12}$$

where a, b, c, . . . are the heat values of synthetic resin materials of qualities A, B, C, . . . (kcal/kg), $\alpha$, $\beta$, $\gamma$, . . . are the the mixing proportions of synthetic resin materials of qualities A, B, C, . . . (% by weight), and Q is the heat value of coke recognized typical for use in practical operation.

Next, the process stage where the qualities of synthetic resin materials are determined in the associated production line should be chosen at a location in which the resin materials are sorted according to the qualities determined are conveniently controlled in their cut amounts at a predetermined process stage between the receipt of waste synthetic resin materials and the blowing of the same into a blast furnace or a metallurgical furnace. The best possible location, therefore, should be decided with particular regard to the kind of and the sequence of apparatus to be installed between the apparatus for receiving waste synthetic resin materials and the apparatus for blowing the same into the furnace.

Figure 43:
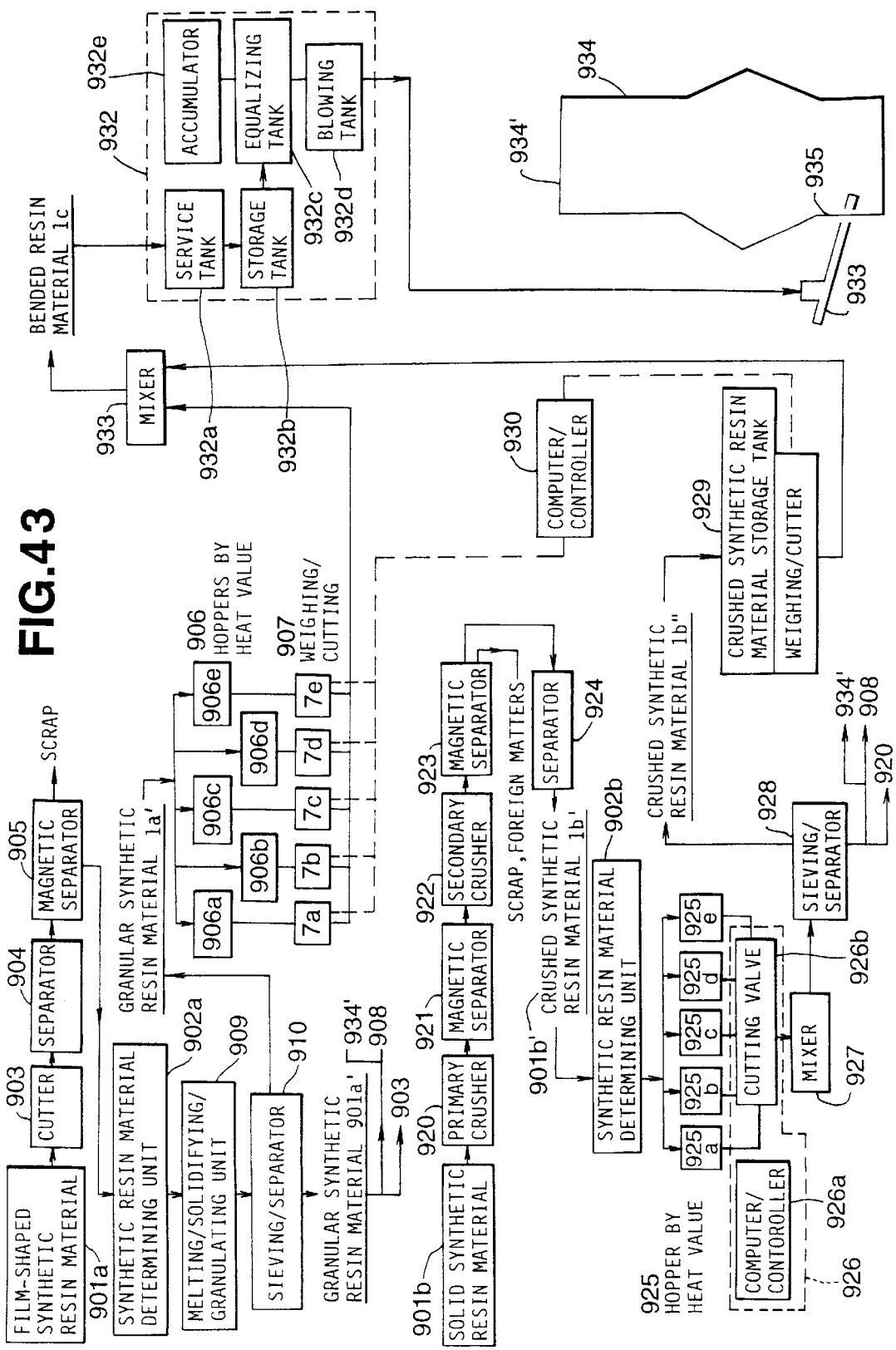
FIG. 43 is a flow sheet which a typical layout for blowing a synthetic resin material into a metallurgical furnace in the present invention.

FIG. 43 illustrates an example of an equipment layout for blowing synthetic resin materials into a metallurgical furnace in the practice of the present invention. Film-shaped and solid synthetic resin materials after being received are pretreated and mixed with those resin materials of different qualities in a predetermined proportion so that a composite synthetic resin material is prepared to have a heat value suitable for blowing into a blast furnace or a metallurgical furnace.

A film-shaped synthetic resin 901a transferred from a stock yard (not shown), is cut to a given shape into pseudo-bonded form due to frictional heat exerted by cutting, whereby film-shaped resin pieces are prepared in superposed relation to each other and then separated from each other by use of a separator 904. The film-shaped resin pieces so separated are treated with a magnetic selector 905 to thereby remove iron dust and so on and thereafter passed through a quality determining apparatus 902a so as to determine the kind of such resin pieces.

The quality determining apparatus 902a is provided with a quality detector and a feeding conveyor. A probe attached to the detector travels, for a given time, in synchronism with the film-shaped resin pieces being continuously transported at a given speed on the conveyor, thereby analyzing the qualities of such resin pieces situated at a spot region of the probe on the conveyor. Thereafter, the resin pieces are determined in respect of their heat values from the results of quality determination thereof (see FIG. 42), followed by charging of the resin pieces in a melting/solidifying/granulating apparatus 909 and by subsequent treatment of the same as previously determined.

The synthetic resin material 901a' granulated by means of the melting/solidifying/granulating apparatus 909 is allowed to pass through a sieve and a separator 910, and those resin portions having a smaller particle diameter than the predetermined level are successively stored in heat value-sorted hoppers 906a, 906b, 906c, . . . Here, the heat values of the granular synthetic resins stored in those hoppers are assumed to be $p_1$, p2, p3, . . . (kcal/kg) Those resin portions having a higher particle diameter than the predetermined level are classified into large-grained resins and small-grained resins. The large-grained resins are again put into the cutting apparatus 903, whereas the small-grained resins are fed together with coke into the furnace 934 out of a furnace top 934', or put outside the system of this Embodiment for charge in a coke furnace, for charge in a sintering furnace or for intermixing with lime.

The granular synthetic resin material 901a' stored in the heat value-sorted hopper 906 is mixed, in a subsequent process stage, with a given proportion of a crushed resin material derived from predetermined treatment of the solid resin material 901b and stored in a crushed synthetic resin material tank 929.

On the other hand, the solid resin material 901b is crushed coarsely by a primary crusher 920 and treated with use of a primary magnetic selector 921 to thereby remove iron dust and the like, followed by finely crushing of the coarse resins with a secondary crusher 922 and by subsequent treatment of the fine resins with a secondary magnetic selector 923 so as to remove iron dust and other foreign matter. The synthetic resins pseudo-bonded through frictional heat generated by crushing are separated by means of a separator 924 into separated crushed synthetic resins material 901b' which are then analyzed as to their qualities by passage through the quality determining apparatus 902b. Like the first-mentioned determining apparatus 902a, the quality determining apparatus 902b is provided with a quality detector and a feeding conveyor. A probe attached to the detector travels, for a given time, in synchronism with the crushed resins being continuously transported at a given speed on the conveyor, thereby analyzing the qualities of such crushed resins situated on the conveyor. The determining apparatus 902a may also be used here, where desired, in place of the last-mentioned determining apparatus 902b.

Subsequently, the heat values of the cut synthetic resins are determined by the above stated method as the result of quality determination (see FIG. 42). The resin cuts are stored in heat value-sorted hoppers 925a, 925b, 925c, . . . Of the cut synthetic resins stored in these hoppers, those cuts of larger and smaller heat values than the predetermined level are taken out and admixed together in a mixing apparatus 926 in the following way.

To obtain the heat value n (kcal/kg) of a mixture of resin cuts n (kcal/kg), the heat values thereof $q_1$, $q_2$, $q_3$, . . . (kcal/kg) and the mixing proportions thereof $\beta_1$, $\beta_2$, $\beta_3$, . . . (% by weight) should be set to meet with the following equations (13) and (14) and besides should be based on the balance expected from the storage volume and target demand of each of the cut synthetic resins and on the heat volumes of the latter. This is performed by means of a control counter 926a.

$$(q_1\beta_1+q_2\beta_2+q_3\beta_3+\ldots)/100=n \tag{13}$$

$$\beta_1+\beta_2+\beta_3+\ldots=100 \tag{14}$$

where n is, for example, a constant heat value above 7,500 kcal/kg of coke. A cutting valve 926b works upon receipt of signals coming out of the counter 926a, automatically cutting the cut resins into a mixer 927 that mixes the same, and the resulting mixture passes through a sieve and a separator 928. Those resins having a cut diameter up to the predetermined level are stored in a cut resin storage tank 929, whereas those resins having a cut diameter larger than the predetermined level, like the granular resins mentioned above, are classified into large cuts and small cuts. The large resin cuts are returned back to the cutting apparatus 903, and the small resin cuts are fed together with coke out of the furnace top 934', or put outside the system of this Embodiment for charge in a coke furnace, for charge in a sintering furnace or for mixing with lime.

In such way, in the hoppers 906a, 906b, 906c, . . . and the tank 929, the synthetic resin materials are stored which have been sorted according to the heat values of $p_1$, $p_2$, $p_3$, . . . (kcal/kg) and n (kcal/kg), respectively. These resin materials are then mixed to prepare a composite resin material for blowing into a blast furnace or a metallurgical furnace as a substitute for coke. In this instance, the synthetic resin materials should be mixed such that the heat value of the resulting mixture is made greater than that of coke generally typified for practical operation. In order to ensure this requirement, the mixing is automatically performed by means of weighing/cutting apparatus 907 and 929a and in accordance with the instructions of a control counter 930 so that the following equations (15) and (16) are observed.

$$\{(p_1x_1+p_2x_2+p_3x_3+\ldots)/100+ny/100=Q \tag{15}$$

$$(x_1+x_2+x_3+\ldots)+y=100 \tag{16}$$

where $p_1$, $p_2$, $p_3$, . . . are the heat values of granular synthetic resin materials (kcal/kg), $x_1$, $x_2$, $x_3$, . . . are the proportions of the granular synthetic resin materials (% by weight), n is the heat value of a composite synthetic resin material containing resin cuts only (kcal/kg), y is the proportion of a composite synthetic resin material containing resin cuts, and Q is the heat value of coke typified for practical operation.

Both the granular synthetic resin material 901a' and the cut synthetic resin material 901b'' thus prepared are admixed by use of a mixer 931.

The resultant composite synthetic resin material, composed of a resin material of a smaller heat value and that of a larger heat value, is conveyed to pneumatic equipment 932 and blown into the blast furnace 934 out of the tuyrene 935 via a blow pipe 934. In the pneumatic equipment, a synthetic resin material 901c is pneumatically fed into a service tank 932a, a storage tank 932b, a pressure equalization tank 932c and a blowing tank 932d in that order and eventually blown into the furnace 934 by the action of air pressure applied by an accumulator 932e.

When placed in a storage yard and exposed to rainfall, film-shaped synthetic resin materials 901a and solid synthetic resin materials 901b involve increased moisture content, apparently causing decreased heat value. Rises in moisture content are remarkably true of urethanes and paper-included resin materials. As for the film-shaped resin materials 901a, any moisture content can be removed at a step of melting/solidification/granulation. However, the solid resins 901b are conveyed as wetted from a primary crushing step to a step where they are pneumatically fed for blowing into a blast furnace with the result that transport faults such as clogged pipe frequently take place somewhere between both of the process steps. In addition, the solid resin material includes halogen-containing resins such as polyvinyl chloride and the like, thus posing the problem that halogen is corrosive with respect of associated equipment. The halogen also tends to react with $H_2O$ under certain conditions, particularly in waste gas recovering conduits, eventually giving rise to objectionable acid corrosion.

With those problems in view, the present inventors have made further studies and found that composite synthetic resin materials should have a moisture content of not larger than 8% by weight and that the content of halogen in such a synthetic resin material should not exceed 3% by weight. The present invention has been contrived to meet with these requirements. More advantageously, the moisture and halogen contents should be simultaneously satisfied as specified above.

EXAMPLES

The present invention will be further described in more detail with reference to the following examples. Tests indicated below were conducted with use of the quality determination method and the heat value evaluation method, both methods being shown in FIG. 42, and the equipment layout for blast furnace operating conditions shown in FIG. 43. In the case with Example 4, a vertical testing furnace modeled after a blast furnace was used in place of the blast furnace of FIG. 43.

Example 1

In a practical blast furnace, the present invention was tested under the blast furnace operating conditions and synthetic resin material blowing conditions shown in Table 32. Film-shaped resin materials 901a and solid resin materials 901b were subjected to quality determination by means of the quality determining apparatus 902a and 902b. The resin materials 901a and 901b were free from impurities such as paper, fabric and metal. Quality determination revealed that the film-shaped resin material 901a was composed of polyethylene and polyacetal, and the solid resin material 901b was made up of polyurethane and PET. The heat values of such resins were identified from the commonly known data to be 11,000 kcal/kg for polyethylene, 3,000 kcal/kg for polyacetal, 6,500 kcal/kg for polyurethane and 5,000 kcal/kg for PET. After quality determination, the resin materials were treated as given below.

The polyethylene and polyacetal of the film-shaped resin material 901a were separately treated through the melting/solidifying/granulating apparatus 909 into granular resins 901a' which were thereafter stored in the heat volume-sorted hoppers 906a and 906b.

On the other hand, the polyurethane and PET of the solid resin material 901b were determined in regard to their heat values and stored respectively in the heat value-sorted hoppers 925a, 925e, followed by cutting of both resins in a proportion of 60.0% by weight to 40.0% by weight and by subsequent mixing of the same. The heat value of the mixed cut resin material was determined to be 5,900 kcal/kg. This resin material was then sieved, separated and adjusted in its particle diameter to be below 6 mm, after which it was stored in the cut synthetic resin material storage tank 929.

Next, 55.0% by weight of the polyethylene and 20.0% by weight of the polyacetal contained in the granular resin material 901a' were admixed in a mixer 931 with 25.0% by weight of the cut resin material in which the polyurethane and PET had been mixed with each other so that a composite synthetic resin material was prepared and then pneumatically fed into the service tank 932e. The composite synthetic resin material so obtained was determined to be 8,125 kcal/kg with regard to its heat value.

The composite synthetic resin material 901c thus pretreated was blown into the blast furnace by means of the pneumatic equipment 932. The proportions of the resins in such resin material are shown in Table 33 as measured upon lapse of time after preparation of the resin material.

TABLE 32

| Blast furnace-operating conditions | Iron production | 9000 t/d |
| --- | --- | --- |
| | Coke rate | 447 kg/t-pig |
| | Blast volume | 7260 Nm³/min |
| | Oxygen enrichment ratio | 4 vol. % |
| | Blast temperature | 1000° C. |
| Blowing conditions | Blow amount of synthetic resin material | 60 kg/min |
| | Blow amount of pneumatic gas | 1200 Nm³/min |
| | Type of pneumatic gas | Air |

TABLE 33

| | Calorific value (Kcal/Kg) | Proportion (wt. %) |
| --- | --- | --- |
| Polypropylene | 11000 | 55 |
| Polyurethane | 6500 | 15 |
| PET | 5000 | 10 |
| Polyacetal | 3000 | 20 |
| Composite synthetic resin material | 8125 | 100 |

The above operation of Example 1 was continuously run for 2 consecutive days. Noticeably excellent results have been produced which are favorably comparable to the results obtained from a usual blast furnace operation where no synthetic resin material is used.

Example 2

Also in a practical blast furnace, the present invention was tested under the blast furnace operating conditions and synthetic resin material blowing conditions shown in Table 32. Film-shaped resin materials 901a and solid resin materials 901b were subjected to quality determination by means of the quality determining apparatus 902a and 902b.

The film-shaped resin material 901a was free from impurities such as paper, fabric and metal and was of a polypropylene formation. The heat value of such resin was determined to be 11,000 kcal/kg from the commonly known data. After being subjected to melting/solidification/granulation treatment, the resin material was sieved, separated and adjusted in its particle diameter to be less than 6 mm so that a granular synthetic resin material 901e was prepared and stored in the heat value-sorted hopper 907.

The solid resin material 901b was found to be composed of polyurethane, ABS and PET. The polyurethane was determined to be 6,500 kcal/kg in its heat value in light of the known data and then stored in the heat value-sorted hopper 925a. It was observed that upon secondary crushing and subsequent treatment with the separator 924, ABS and PET even in the form of crushed resin materials 901b' were involved in such inclusions as paper and fabric. Prior to storage in the heat value-sorted hopper 925b, 925c such resins were sampled and measured with respect to their heat values according to JISM8814. The paper-included ABS showed a heat value of 4,500 kcal/kg and the fabric-included PET of 3,500 kcal/kg. These resins were stored in the hoppers 925b, 925c. From their respective hoppers, the polyurethane, paper-included ABS and fabric-included PET were taken out in a proportion of 33.3% by weight, 22.2% by weight and 44.5% by weight, respectively, so as to prepare a composite cut synthetic resin material 901b" of 4,722 kcal/kg in heat value. This resin material after being sieved and separated was adjusted in its cut diameter to be below 6 mm and stored in the resin material tank 929.

Thereafter, a granular polypropylene material 901a" was mixed in an amount of 55.0% by weight with 45.0% by weight of a cut resin material 901b'' composed of a paper-included ABS and a fabric-included PET, and the resultant synthetic resin material 901c was pneumatically fed into the service tank 932a. The heat value of the resin material 901c was 8,175 kcal/kg.

The synthetic resin material 901c derived from pretreatment as stated above was blown into the furnace 934 by means of the pneumatic equipment 932. The proportion of the resins in the resin material 901c was counted as shown in Table 34.

TABLE 34

|  | Calorific value (Kcal/Kg) | Proportion (wt. %) |
|---|---|---|
| Polypropylene | 11000 | 55 |
| Polyurethane | 6500 | 15 |
| Paper-included ABS | 4500 | 10 |
| Fabric-included PET | 3500 | 20 |
| Composite synthetic resin material | 8175 | 100 |

Those resin portions of a particle diameter or cut diameter in the range of 6 to 35 mm were charged together with coke out of the furnace top. Those resin portions having a particle diameter or cut diameter greater than 35 mm were returned back to the cutting apparatus 903 or the primary crusher 920 for reuse.

The above operation of Example 2 was continuously run for 2 consecutive days. Noticeably excellent results have been produced which are favorably comparable to the results obtained from a usual blast furnace operation with use of no synthetic resin material.

Example 3

In a practical blast furnace, the present invention was tested under the blast furnace operating conditions and synthetic resin material blowing conditions shown in Table 32. All of the lots tested here were induced from solid synthetic resin materials 901b. One lot of them was considerably wetted due to rainfall, and analysis reveald that the water content was as high as about 40% by weight. Since this wet lot was conveyed as it was into process steps subsequently to the primary crusher 920, the associated conduits and tanks might undergo clogging. Thus, separate drying was done up to a water content of 5% by weight or below.

Each of the lots was treated as determined, and by inspection on the synthetic resin material determining apparatus 902b, the lot was found to be composed of polyprolylene, polyurethane, paper-included ABS and fabric-included PET. The paper-included ABS was subjected to drying to drop the water content. The resins were mixed as shown in Table 35, and the heat value of the composite synthetic resin material 901c was set at 8,375 kcal/kg and the moisture content at 0.9% by weight.

The composite synthetic resin material 901c was pretreated as stated above, and those resin portions of less than 6 mm in cut diameter were blown into the furnace 934 by use of the pneumatic equipment 932.

TABLE 35

|  | Calorific value (Kcal/Kg)[1] | Proportion (wt. %)[2] | Moisture content (wt. %)[2] |
|---|---|---|---|
| Polypropylene | 11000 | 50 | 0.1 |
| Polyurethane | 6500 | 20 | 0.2 |
| Paper-included ABS | 4500 | 15 | £5 |
| Fabric-included PET | 3500 | 10 | 0.2 |
| Composite synthetic resin material | 8375 | 100 | 0.9 |

[1]Free from moisture
[2]After removal of rainwater by drying

The above operation of Example 3 was continuously run for 2 consecutive days. Noticeably excellent results have been produced which are favorably comparable to the results obtained from a usual blast furnace operation where no synthetic resin material is used.

Example 40

Testing was directed to blowing into a metallurgical furnace of halogen-containing synthetic resin materials such as polyvinyl chloride (Examples 4-1 to 4-3). A combustion testing apparatus modeled after the blast furnace of FIG. 43 was put to use here. Synthetic resin materials were pretreated in the same manner as in Example 1 and with the use of the equipment of FIG. 2. However, all of the resin materials blown into the furnace were those previously identified in respect of their qualities. Inclusions such as paper, fabric and metal were absent, and wetting was free.

Table 36 illustrates the test furnace operating conditions and resin material blowing conditions for testing of the halogen-containing resin materials. The tests consisted of Examples 4-1 to 4-3, and Example 4-1 incorporated polyethylene and polyvinyl fluoride, Example 4-2 did polyethylene and polyvinyl chloride, and Example 4-3 did polyethylene and a bromine-containing printed circuit board. The halogen contents were set at 3% by weight.

Table 37 lists the details of resin material blowing conditions for Examples 4-1 to 4-3 along with the heat values of composite resin materials. The resin materials were all of a solid type with a cut diameter of not larger than 6 mm.

TABLE 36

| Conditions of testing furnace | Blast temperature | 1200° C. |
|---|---|---|
|  | Oxygen concentration | 21 vol. % |
|  | Tuyere nose gas flow velocity | 149 m/sec |
|  | Coke diameter | 25~40 mm |
| Blowing of synthetic resin material | Blow amount (polyethylene + halogen-containing synthetic resin) | 62.5 kg/min |
|  | Synthetic resin material diameter | below 6 mm |

TABLE 37

|  |  | Example 4-1 | Example 4-2 | Example 4-3 |
|---|---|---|---|---|
| Blowing of synthetic resin materials | Halogen-containing synthetic resin material | Polyvinyl chloride | Polyvinyl fluoride | Printed-wiring board |
|  | Breakdown of synthetic resin material (kg/min) | Polyethylene 59.2 Polyvinyl Chloride 3.3 | Polyethylene 57.9 Polyvinyl fluoride 4.6 | Polyethylene 35.7 Printed-wiring board 26.8 |
|  | [Total] | [62.5] | [62.5] | [62.5] |

TABLE 37-continued

|  | | Example 4-1 | Example 4-2 | Example 4-3 |
|---|---|---|---|---|
|  | Halogen atom | Cl | F | Br |
|  | Halogen content in synthetic resin material | 56 wt. % | 41 wt. % | 7 wt. % |
|  | Amount of blown halogen | 1.8 kg/min | 1.9 kg/min | 1.9 kg/min |
| Heat value | | 4300 Kcal/Kg | 1900 Kcal/Kg | 2400 Kcal/Kg |

Analysis of waste gases having come out of the test furnace revealed hydrogen chloride, hydrogen fluoride and hydrogen bromide which had invited nothing hazardous to environmental protection and also acid corrosion of the associated equipment. Besides, sufficient iron melting was attainable as desired.

The following facets have now been found from the results of these Examples.

[1] Though having hitherto been useless for blowing into a blast furnace, synthetic resin materials of a smaller heat value are applicable to adequate operation of such furnace so long as they are capable of maintaining a heat value at a given level by incorporation with similar resin materials of a larger heat value.

[2] For blowing into a blast furnace, waste synthetic resin materials can be substituted for coke when their mixing proportions are suitably selected in terms of heat values as parameters. Such a resin material is also useful as a reducing agent for iron ore. Namely, the waste synthetic resin materials can be recycled as starting materials for blast furnace operation.

[3] When decreased in their water contents to be less than about 8% by weight, composite synthetic resin materials can be employed without clogged pneumatic pipes caused during blowing operation in a blast furnace.

[4] When their halogen contents are so selected as to be not more than about 3% by weight, composite synthetic resin materials can be blown into a blast furnace without involvement in acid corrosion of the corresponding equipment and also in environmental pollution under the influence of halogenated hydrogens by-produced as waste furnace gases.

With the present invention constructed as specified above, synthetic resin materials of a smaller heat value can be increased up to a desired level of heat values by incorporation with those of a larger heat value. The smaller heat value-resin materials are also effective as a reducing agent. Thus, such smaller heat value-resin materials are acceptable for blowing into a blast furnace as in the case with the larger heat value-resin materials in common use, and hence, are useful as a substitue fuel for coke. In addition and advantageously, the smaller heat value-resin materials hitherto disposed by incineration and reclamation can be effectively utilized with consequential contribution to enhanced environmental protection. As a result, the method of the present invention of blowing synthetic resin materials into a metallurgical furnace is of great industrial significance.

Embodiment 10

A first method is directed to the operation of blowing synthetic resin materials into a blast furnace, wherein use was made of a coarsely grained synthetic resin material resulting from adding 3 to 20% by weight of a fine resin material having a maximum particle diameter smaller than 2 mm relative to the total weight of a coarse resin material containing more than 50% by weight of particles of a particle diameter larger than 10 mm.

A second method is directed to the operation of blowing synthetic resin materials into a blast furnace, wherein use was made of a coarsely grained synthetic resin material resulting from adding 3 to 20% by weight of a reduced grained iron ore having a maximum particle diameter smaller than 2 mm and a pre-reduction ratio of 50 to 90% relative to the total weight of a coarse resin material containing more than 50% by weight of particles of a particle diameter larger than 10 mm.

A third method is directed to the operation of blowing synthetic resin materials into a blast furnace, wherein use was made of a coarsely grained synthetic resin material resulting from adding 2 to 20% by weight of a finely grained coal having a maximum particle diameter smaller than 2 mm relative to the total weight of a coarse resin material containing more than 50% by weight of particles of a particle diameter larger than 10 mm.

A fourth method is directed to the operation of blowing synthetic resin materials into a blast furnace, wherein use was made of a coarsely grained synthetic resin material resulting from adding 1 to 20% by weight of a paraffin having a maximum particle diameter smaller than 2 mm relative to the total weight of a coarse resin material containing more than 50% by weight of particles of a particle diameter larger than 10 mm.

In the practice of the present invention, the coarsely grained synthetic resin material is specified to be such containing more than 50% by weight of particles of a particle diameter larger than 10 mm. This is attributable to the fact that when the particle diameter is smaller than 10 mm, or when the content of particles having a particle diameter larger or smaller than 10 mm is below 50%by weight, the associated pipes cannot be protected to a noticeable extent against abrasion that would be caused during operation of a blast furnace. However, particle diameters beyond 30 mm are rather excessive and hence unfeasible with particular regard to the diameter of pipings used.

In the first method, maximum particle diameters smaller than 2 mm as concerns the fine resin material render the resulting particles less angularly or virtually spherical, eventually decreasing abrasion of the mating pipes that would arise from pneumatic feeding of such resin material. Addition of 3 to 20% by weight of the fine resin material to the coarse resin material enables the pipes to be cushioned against impact fatigue tending to occur by the action of the coarse resin material, thus protecting the pipes from becoming abrasive.

The proportion of the fine resin material should not depart from the above specified range. Below 3% by weight is less effective to cushion the pipes against impact exerted by the coarse resin material. Above 20% by weight is extremely costly to prepare a fine resin material.

The second method is concerned with blowing a coarsely grained synthetic resin material into a blast furnace, characterized in that a coarsely grained synthetic resin material is used which results from adding 3 to 20% by weight of a reduced grained iron ore having a maximum particle diameter smaller than 2 mm and a pre-reduction ratio of 50 to 90% relative to the total weight of a coarse resin material containing more than 50% by weight of particles of a particle diameter larger than 10 mm. Such iron ore, like the resin material, should be smaller than 2 mm in its maximal particle diameter so that the iron ore becomes less angular and rather spherical. Moreover, the reduced iron ore derived by pre-reduction is of the same material as in the corresponding pipes and, upon addition in an amount of 3 to 20% by weight, is capable of cushioning impact applied by the coarse resin material during pneumatic feeding thereof onto the pipes, thereby preventing the latter from wear. The pre-reduction ratio of the reduced grained iron ore should range from 50 to 90%. Less than 50% leads to an excessive amount of unreduced iron ore grains, resulting in a large deviation from the material of the pipes and hence failing to sufficiently protect the pipes against abrasion. Conversely, more than 90% produces a reduced grained iron ore only in an expensive manner.

The reduced sintered ore should also be added in the above specified range of proportions. Below 3% by weight is less effective in cushioning the pipes against impact exerted by the coarse resin material. Above 20% by weight leads to increased cost in producing a reduced sintered ore.

With respect to the third method, the finely grained coal is less angular and virtually spherical when its maximum particle diameter is smaller than 2 mm as is in the resin material, and hence, is less abrasive relative to the associated pipings during pneumatic feeding thereof. When added in an amount of 2 to 20% by weight, such coal protects the pipes against impact abrasion exerted by the coarse resin material.

The proportion of the finely grained coal should be met as specified hereinabove. Below 2% by weight is less effective for cushioning the pipes against impact induced from the coarse resin material, whereas above 20% by weight is responsible for costly preparation of a finely grained coal.

Turning to the fourth method, the paraffin is less angular and rather spherical when its maximum particle diameter is smaller than 2 mm as is in the resin material, and hence, is less abrasive relative to the associated pipes during pneumatic feeding thereof. When added in an amount of 1 to 20% by weight, the paraffin protects the pipes from impact wear caused by the coarse resin material.

The proportion of the paraffin should be held in the above specified range. Less than 1% by weight is not sufficient to cushion the pipes against impact induced from the coarse resin material, and more than 20% by weight is costly to prepare a paraffin.

Certain preferred forms of the method according to the present invention will now be described with reference to the drawings.

Figure 44:
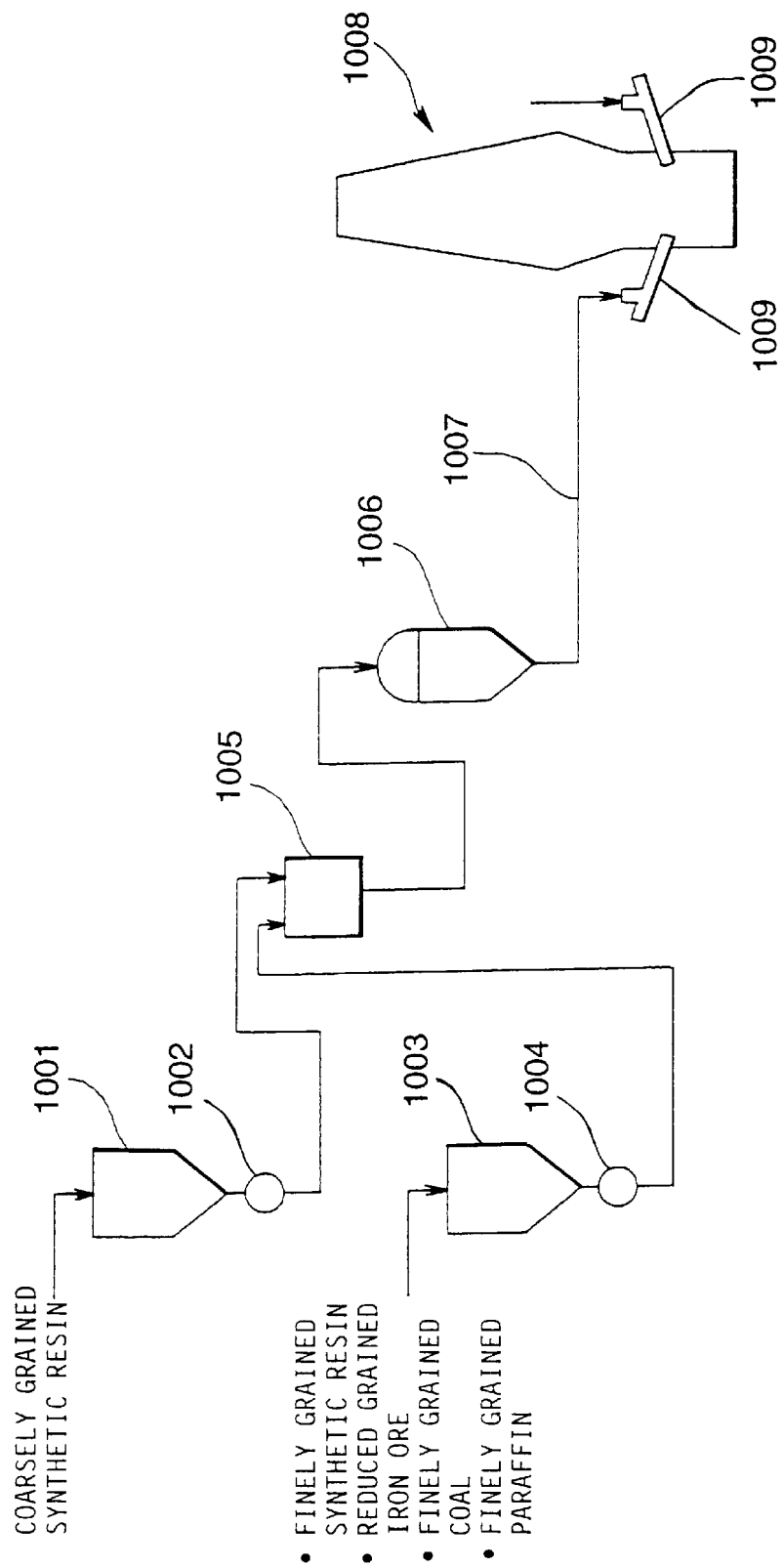
FIG. 44 is a schematic drawing illustrating the method of the present invention.

FIG. 44 is a flow diagram taken to explain the method of the present invention. Designated at 1001 is a first hopper for receiving a coarsely grained synthetic resin, at 1002 a cutting apparatus for cutting a constant quantity of the resin accommodated in the first hopper, at 1003 a second hopper for receiving a finely grained synthetic resin, a reduced grained iron ore and the like that are used to prevent pipes against abrasion caused by pneumatic transport of the coarse resin and at 1004 a cutting apparatus for cutting a constant quantity of each of the abrasion-preventing materials from the second hopper. A mixer is designated at 1005 for uniformly intermixing the coarse resin taken out of the cutting apparatus 1002 and the abrasion-preventing materials taken out of the cutting apparatus 1004. A drum mixer, for example, may be used as that mixer. Designated at 1006 is a blowing apparatus, at 1007 an air supply conduit, at 1008 a blast furnace and at 1009 blowing lances.

A first form of method is illustrated below.

Accommodated in the first hopper 1001 ia a coarsely grained synthetic resin having a maximal particle diameter of 30 mm. Through the cutting apparatus 1002, such coarse resin is taken out in an amount desired to be blown into the blast furnace. In the second hopper 1003, a finely grained synthetic resin is accommodated which has a maximal particle diameter smaller than 2 mm. The fine resin is taken out through the cutting apparatus 1004 in an amount preset with respect to the amount of the coarse resin to be taken out. The amount of the fine resin to be taken out is set to range from 3 to 20% by weight.

The coarse and fine resins so taken out are conveyed into the mixer 1005 where they are uniformly mixed with each other. The resultant mixture is transferred into the blowing apparatus 1006, from which the mixture is then pneumatically transported via the air supply conduit 1007 and blown through the blowing lances 1009 into the blast furnace 1008.

A second form of method is illustrated below.

The same coarse resin as in the first form of method is accommodated in the first hopper 1001 and cut out of the cutting apparatus 1002 in an amount needed to be blown in. In the second hopper 1003, a reduced grained iron ore is accommodated which has a maximal particle diameter smaller than 2 mm and a pre-reduction ratio of 50 to 90%. The iron ore is taken out through the cutting apparatus 1004 in an amount preset with respect to the amount of the coarse resin to be taken out. The amount of the iron ore to be taken out is set to range from 3 to 20% by weight.

Subsequent process steps are as in the case with the first form of method.

A third form of method is illustrated below.

The same coarse resin as in the first form of method is accommodated in the first hopper 1001 and cut out of the cutting apparatus 1002 in an amount needed to be blown in. In the second hopper 1003, a finely grained coal is accommodated which has a maximal particle diameter smaller than 2 mm. The coal is taken out through the cutting apparatus 1004 in an amount preset with respect to the amount of the coarse resin to be taken out. The amount of the coal to be taken out is set to range from 2 to 20% by weight.

Subsequent process steps are as in the case with the first form of method.

A fourth form of method is illustrated below.

The same coarse resin as in the first form of method is accommodated in the first hopper 1001 and cut out of the cutting apparatus 1002 in an amount needed to be blown in. In the second hopper 1003, a paraffin is accommodated which has a maximal particle diameter smaller than 2 mm. The paraffin is taken out through the cutting apparatus 1004 in an amount preset with respect to the amount of the coarse resin to be taken out. The amount of the paraffin to be taken out is set to range from 1 to 20% by weight.

The fine synthetic resin, reduced grained iron ore and paraffin were exemplified as the abrasion-preventing materials, Paper, woodmeal and fabric are also suitably useful as the abrasion-preventing materials in the present invention so long as they are by nature soft and generally spherical in shape.

EXAMPLES

Testing was run to blow into a blast furnace a coarsely grained resin having a maximum particle diameter of 30 mm under a set of operating conditions indicated below. As for a comparative example wherein an abrasion-preventing material had been omitted, and the first to fourth forms of method, checking was made of whether air supply conduits had involved holes. Each of the tests run for one month.

Operating Conditions iron production: 9,000 t/d
blast amount: 7,260 Nm³/min
blast temperature: 1,000° C.
coke volume: 447 kg/t-pig The test results are shown in Table 38. The comparative example caused holes twice over in the conduit, entailing shutdown for 10 hours. The first to fourth forms of method have proved free from holes and hence conducive to desirable effects flowing from addition of abrasion-preventing materials.

are sent as "return ore" back to a sintering stage. The particle diameters of return ores are variable with the interoffice specifications of steel mills. A return ore leads to delayed rate of gas flow and hence acts to diminish flown waste resin material. Thus, no particular restriction is imposed upon the maximum particle diameter of a small-grained sintered ore used in combination with a waste resin material. On the other hand, the minimum particle diameter of a small-grained sintered ore used for that purpose should be chosen to such a size that the sintered ore itself is not flown due to an upwardly emitting furnace gas stream. With a 4,000 m3-capacity blast furnace postulated as a usual blast

TABLE 38

|  |  | Comparative ex. | Present Invention 1 | Present Invention 2 | Present Invention 3 | Present Invention 4 |
|---|---|---|---|---|---|---|
| Coarse-grained synthetic resin | Particle diameter range (mm) | 10–30: 60% | 10–30: 60% | 10–30: 60% | 10–30: 60% | 10–30: 60% |
|  | Blow amount (kg/min) | 62.5 | 51.3 | 51.3 | 51.3 | 51.3 |
| Fine-grained synthetic resin | Maximum particle diameter (mm) |  | 2 |  |  |  |
|  | Proportion (%) |  | 18 |  |  |  |
| Reduced iron ore particle | Maximum particle diameter (mm) |  |  | 2 |  |  |
|  | Pre-reduction ratio (%) |  |  | 75 |  |  |
|  | Proportion (%) |  |  | 18 |  |  |
| Finely divided coal | Maximum particle diameter (mm) |  |  |  | 2 |  |
|  | Proportion (%) |  |  |  | 18 |  |
| Paraffin | Maximum particle diameter (mm) |  |  |  |  | 2 |
|  | Proportion (%) |  |  |  |  | 18 |
| Shutdown due to piping replacement (hr/month) |  | 10 | 0 | 0 | 0 | 0 |

Embodiment 11

Gases generated in a blast furnace are discharged out of a top of the furnace and at an average flow rate usually in the order of 0.9 to 1.2 m/sec. In charging a waste synthetic resin material into the furnace out of the top thereof, the resin material when sized to be smaller than a certain level gets flown outside the furnace because of a gas stream emitted upwardly from the furnace top. Hence, it may be thought that the waste resin material is so prepared as to exceed a certain critical size to withstand flying against the gas stream and to initiate fluidization. Use of a waste resin material meeting such requirement, however, invites not only extensive remolding of the existing charging apparatus and impossible uniform mixing with other starting materials to be charged, but also low combustion, thus impairing stable blast furnace operation.

For that reason, it is preferred that waste resin materials be limited to a certain range of sizes.

To clear up those problems, several sorts of means are considered feasible. That is to say, [1] a waste resin material is mixed with a different starting material having a by far greater bulk density than does the former, [2] the particle diameter of such great bulk density-starting material is rendered relatively small and hence highly resistant to a gas stream, coupled with decreased rate of gas flow, and [3] the resulting mixture is charged into a region on a stock line of a blast furnace (uppermost surface of a layer of starting materials charged in the furnace), which region is maintained in a minimized rate of gas flow, whereby a small bulk density-resin material charged out of the furnace top is hardly flown outside under the influence of a gas stream.

Small-grained sintered ore has been studied as suited for [1] and [2] above. A sintered ore for use as a starting material in a blast furnace has a bulk density of 2.87 g/cm³ that is by far higher than that of a waste resin material, 0.3 g/cm³. A sintered ore is used with a particle diameter within a given range, and those ore portions of a smaller particle diameter furnace, the particle diameter of a sintered iron ore is calculated to be 1.5 mm, which particular diameter is one required for the iron ore to fluidize at a higher rate than the rate of gas flow on a stock line in the furnace. Namely, a sintered ore of a particle diameter smaller than 1.5 mm gets flown outside at the furnace top, and hence, should be larger than 1.5 mm in particle diameter for mixing with a waste resin material and then for charging into the furnace out of the top thereof.

The advantages noted below have been gained upon use of a return ore as a small-grained sintered ore for incorporation with a waste resin material.

(i) The small-grained sintered ore is useful as it is, as a starting material for blast furnace operation, without the need for return to a sintering stage, and (ii) such sintered ore is heated and reduced through combustion of a waste resin material, and therefore, saved coke volume is also attainable.

In regard to those standpoints, the present inventors have conducted the following tests with the results given below.

One test was made to grasp the effects which the size of a waste resin material produces on the amount thereof having been flown outside a top of a blast furnace owing to a gas stream emitted from the furnace. By use of a blast furnace having an iron production capacity of 10,000 t/day, a mixture of a waste resin material and a small-grained sintered ore was charged via a distributing chute from a bell-free charging apparatus located at a top of the furnace. Charging was effected with a target region defined on a stock line (internal radius of the furnace: 5.5 m) and on a concentric circle having a radius of 3.5 m as measured around the centerline of the furnace.

In this test, with the particle diameter $d_{ss}$ of a small-grained sintered ore set for convenience at 5 mm as an upper limit, use was made of a sintered ore having a $d_{ss}$ of 1.5 to 5 mm and a particle size distribution of 3.6 mm in average particle diameter, and of a waste resin material having a size (long diameter) within a range of 25 to 150 mm and divided into four different levels (25, 30, 100 and 150 mm). When the weight Wp of the waste resin material and the weight Wss of the small-grained sintered ore were assigned, the proportion α of the waste resin material was expressed as α=Wp/(Wp+Wss). Examination was made at four levels (0.1, 0.2, 0.3 and 0.4) in a range of 0.1 to 0.4. The amount of the waste resin material flown was measured from the amount of such resin material collected on a gas filter, and the fly ratio was defined by the equation, {(fly weight of waste resin material)/(charge weight of waste resin material)}×100 (%).

Figure 48:
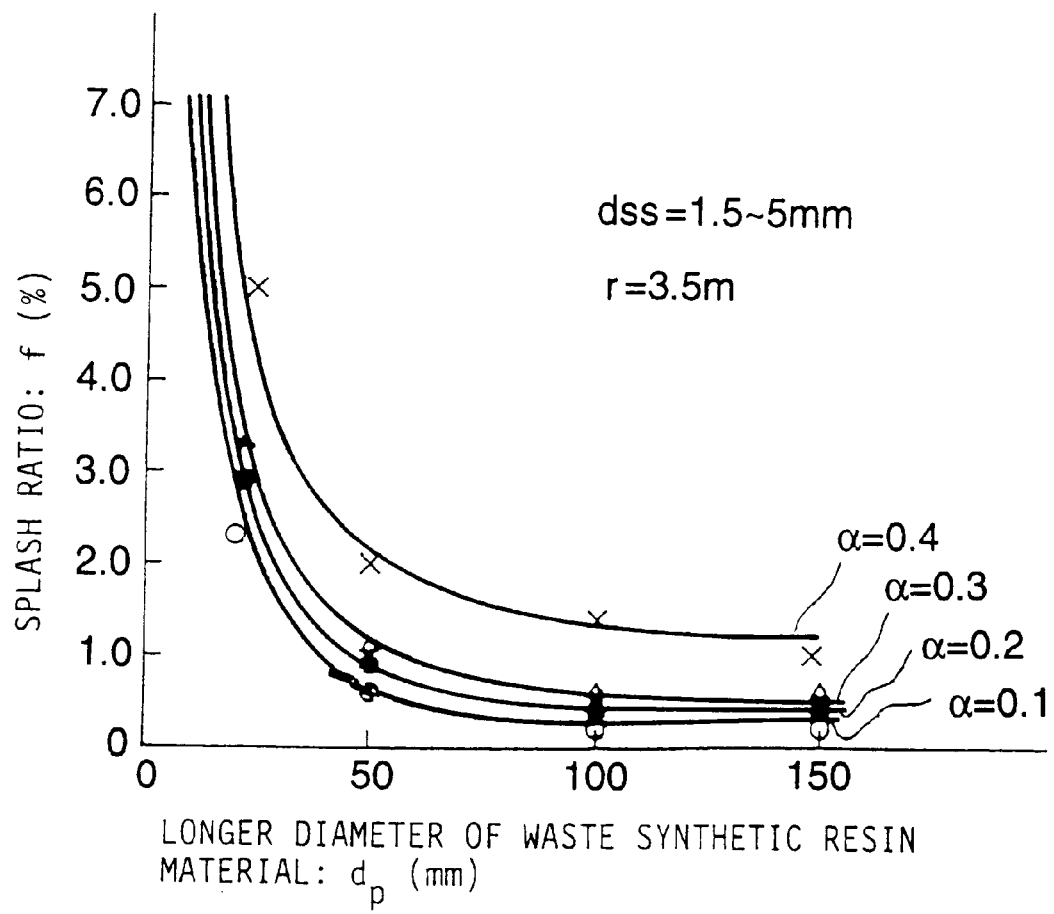
FIG. 48 is a graph illustrating the relationship between the longer diameter of a waste synthetic resin material and splash ratio for each level of the ratio of the waste synthetic resin material.

The test results obtained above are shown in FIG. 48 in which the relationship between the long diameter dp of and the fly ratio f of the waste resin material is plotted against each varying proportion α of the waste resin material. As is clear from FIG. 48, the smaller the long diameter of the waste resin material is, the fly ratio for {(flyweight/charge weight)×100 (%)} becomes higher. Large diameters smaller than 50 mm show a sharp decline in fly ratio, and this means that the long diameter of the waste resin material should preferably exceed 50 mm. Long diameters larger than 100 mm, however, are responsible for poor combustion. Accordingly, the long diameter of the waste resin material should preferably be in the range of 50 to 100 mm.

Next, the following description is directed to the effects which the charge region of a mixture of a waste resin material and a small-grained sintered ore on a stock line brings about on the fly ratio of the waste resin material.

With use of the aforementioned furnace, the relationship was examined between the region where the above mixture was charged radially of the furnace and the fly ratio f of the waste resin material under the conditions with a long diameter dp of 50 to 100 mm of and an average particle diameter $d_{ss}$ mean of 3.0 to 4.0 of the small-grained sintered ore, and with a proportion α of 0.2 of the waste resin material. The test results are shown in FIG. 49.

Figure 49:
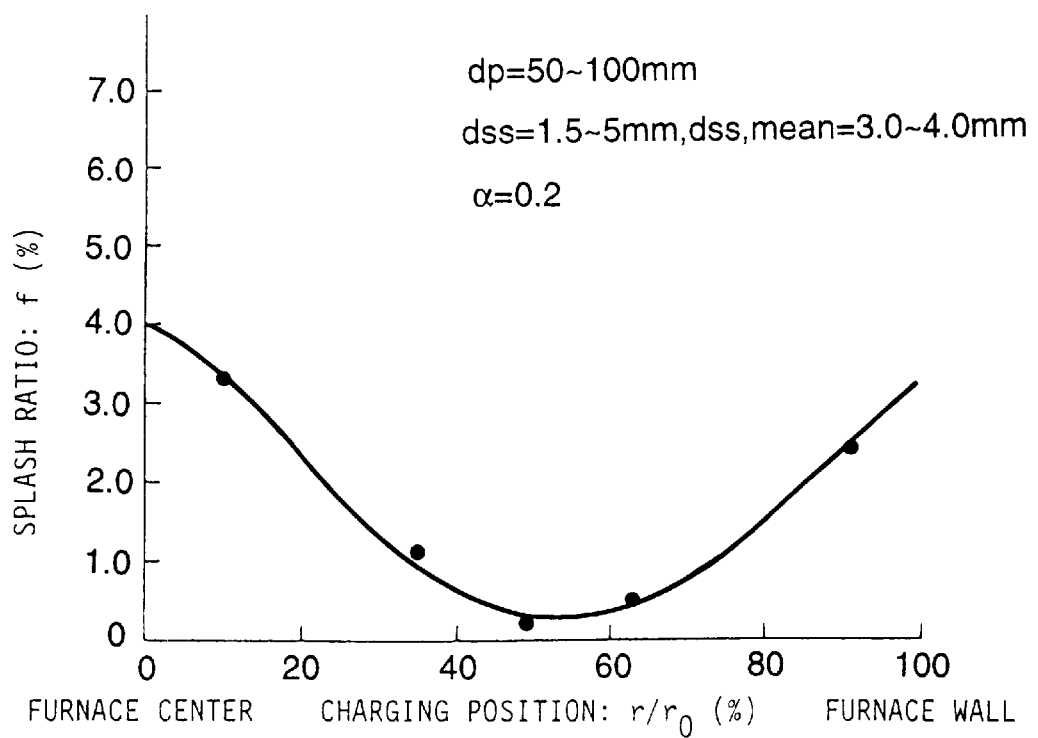
FIG. 49 is a graph illustrating the relationship between the charging position of the mixture in the furnace radial direction and the splash ratio f.

The results of FIG. 49 show that when the above mixture was charged into a localized region of 30 to 80% directed radially toward an inner peripheral wall of the furnace as measured around the centerline thereof, the fly ratio f of the waste resin material becomes smaller. Charging in a localized region of 40 to 70% is more effective for a decline in fly ratio. Thus, waste resin materials are useful with utmost efficiency. The localized region noted here is a circular region having a width of 2.5 m defined around the furnace centerline.

The larger the size is, the waste resin material is less reactive and less compatible with the small-grained sintered ore in the furnace. Stable blast furnace operation requires for a waste resin material to be combustive and distributive as uniformly as possible in the furnace. Greater long diameters of the waste resin material than 120 mm lead to insufficient uniformity in mixing with a small-grained sintered ore. Besides, use of a waste resin material in a large amount results in deteriorated stability of blast furnace operation. Smaller long diameters than 100 mm should be observed to obviate those problems.

With the foreging findings taken in view, it is preferred that a waste synthetic resin material to be charged into a blast furnace out of a top thereof have a long diameter of 50 to 100 mm, and a small-grained sintered ore to be charged in combination therewith have a particle diameter up to 100 mm.

The present invention bases its completion on the above findings. A first method of the invention wherein a waste resin material is charged into a blast furnace out of a top thereof, characterized by the steps of preparing a waste resin material as a starting material for blast furnace operation, of preparing a small-grained sintered ore as a starting material for blast furnace operation, of mixing the resin material and sintered ore of the first two steps to thereby make up a mixture thereof, and of feeding such mixture into a charging apparatus disposed at the furnace top and then charging such mixture from the charging apparatus onto a surface of a layer of previously charged starting materials and into a localized region defined in an intermediate portion between a centerline of and an inner wall of the furnace.

A second method is subordinate to the first method and is characterized in that the waste resin material has a long diameter of 50 to 100 mm, the sintered ore has a particle diameter of not smaller than 1.5 mm, and the above intermediate portion between the furnace centerline and the furnace wall is a region defined in a range of 30 to 80% relative to an internal diameter of the furnace and directed from the furnace centerline toward the furnace wall.

The present invention will be further described with reference to the drawings.

Figure 45:
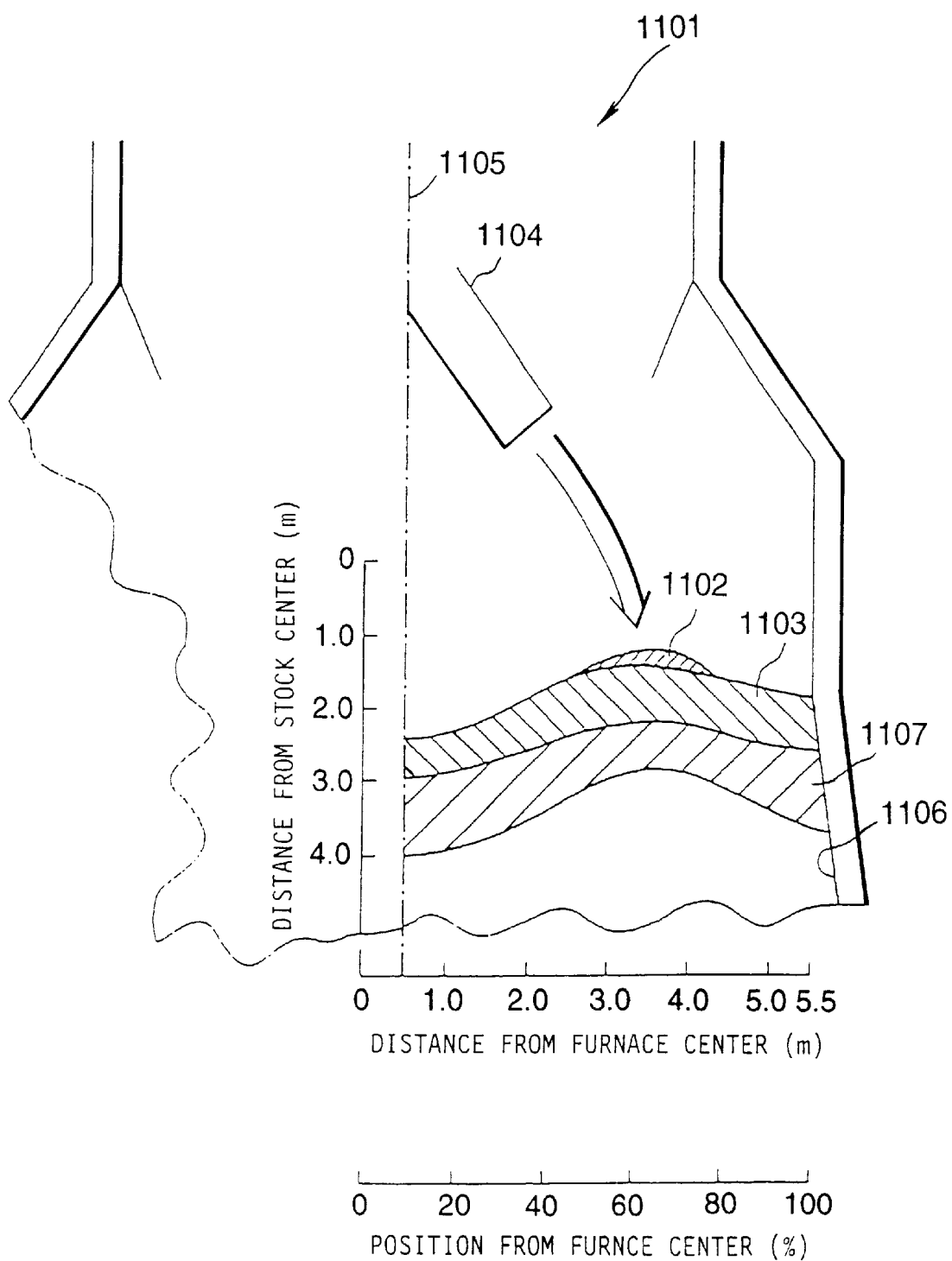
FIG. 45 is a schematic longitudinal sectional view of the furnace top of the blast furnace, illustrating a state in which a mixture of a waste synthetic resin material and fine granular sinter is charged onto the surface of the ore layer, showing an embodiment of the present invention.

FIG. 45 is a schematic view, taken vertically cross-sectionally, of a preferred form of the method according to the present invention, wherein details as regards a top of a blast furnace are illustrated. A mixture 1102 of a waste synthetic resin material and a small-grained sintered ore is shown charged out of a furnace top 1101 onto a surface of an ore layer 1103. After being crushed and sieved into a given size, the waste resin material and sintered ore are mixed in a mixer (not shown) and then charged from a distributing apparatus 1104 located at the furnace top 1101.

The waste resin material to be used is from 50 to 100 mm in long diameter, and the sintered ore is 1.5 to 100 mm in particle diameter. In the illustrated method, the particle diameter of the sintered ore is set at 5 mm as an upper limit. However, the upper limit in particle diameters of a return ore obtainable during preparation of a sintered ore depends usually on the conditions set for producing the sintered ore. Such upper limit may be decided according to the maximum particle diameter of the return ore. In the practice of the present invention, no limitation needs to be imposed on the upper limit in particle diameters of the sintered ore. The target region of charge is adjusted by means of the distributing chute 1104 and defined by an intermediate portion between the furnace centerline 1105 and the furnace wall 1106 (region defined in a range of 30 to 70% and directed radially from the furnace centerline toward the furnace wall, this region being referred to herein as "intermediate region").

During adequate operation of a blast furnace, a rate of gas flow is originally lower in the intermediate region between the furnace centerline and the furnace wall than in other regions within the furnace. Those materials of small bulk densities such as a waste synthetic resin material, therefore, may be charged into the intermediate region so that they are rendered less susceptible to flying. In addition, when the waste resin material is charged in combination with a small-grained sintered ore having a larger bulk density than the former, a rate of gas flow in the intermediate region is made low by the action of the sintered ore with the result that the waste resin material can be protected from flying. Low rates of gas flow, however, result in delayed ore reduction. Despite this adverse effect, a waste resin material having a long diameter in the order of 50 to 100 mm is more reactive than coke as a reducing agent from physical and chemical standpoints. The carbon atom present in the waste resin material is capable of activating a reaction of $C+CO_2=2CO$, thus compensating for slow ore reduction.

In blast furnace operation performed under such conditions as with a constant reacting weight of total solution loss, a waste resin material when charged in the system produces decreased coke volume. Replacement of part of coke with a waste synthetic resin material also brings about decreased reacting weight of coke in an equivalent weight of the waste resin material having reacted to gasify, eventually preventing coke from getting deteriorated in respect of hot strength.

Figure 46:
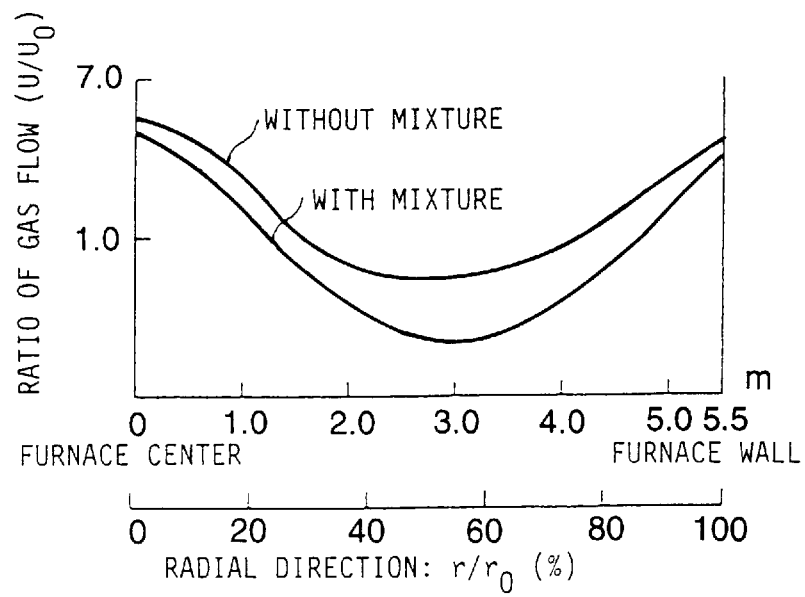
FIG. 46 is a graph illustrating the distribution of gas flow velocity in the furnace radial direction for each of the cases with and without the mixture in the intermediate zone charged from the furnace top.

In FIG. 46, rates of gas flow distributed in a radial direction in the furnace are compared with respect to the cases where a mixture of a waste synthetic resin material and a small-grained sintered ore was charged out the furnace top and the cases where no such mixture was charged. The ordinates shows, on a logarithmic scale, the ratio $U/U_0$ between a rate of gas flow U on a stock line and a rate of gas flow $U_0$ in an empty tower. Upon checking of FIG. 46, it can be observed that the rate of gas flow is decreased to a markedly great extent in the intermediate region as a result of charging of a mixture of a waste resin material and a small-grained sintered ore. Accordingly, such mixture charged in the intermediate region prevents the small bulk density-waste resin material from becoming flown.

Figure 47:
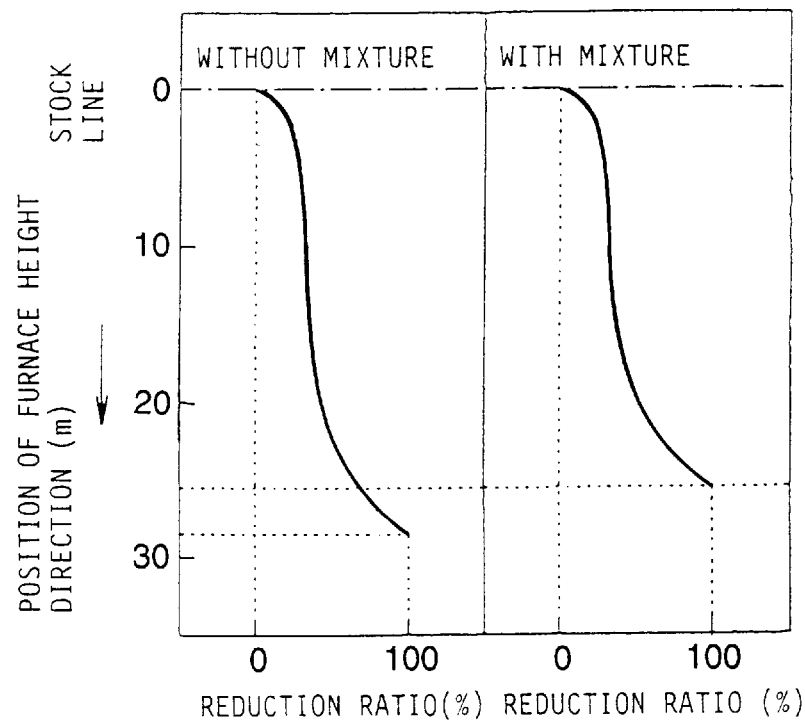
FIG. 47 is a distribution curve of the ore reduction ratio in the furnace height direction during operation for each of the cases with and without the mixture in the intermediate zone charged from the furnace top.

FIG. 47 shows a distribution curve concerning ore reduction ratios relative to the heights within the furnace as determined during operation in the cases where the above mixture was charged out of the furnace top and where such mixture was omitted. As evidenced by FIG. 47, a mixture of a synthetic waste resin material and a small-grained sintered ore when charged in the intermediate region promotes ore reduction, and hence, the waste resin material acts effectively on ore to be reduced.

EXAMPLES

The present invention will be further described with reference to examples and to FIG. 45.

By use of a blast furnace having an iron production capacity of 10,000 t/day and a radius of 5.5 m on a stock line, a mixture 1102 of a waste resin material and a small-grained sintered ore was charged out of the furnace top 1104 through an auxiliary bell distributing chute 1105 mounted on the top of the furnace. In such instance, the charge region was preset at a concentric circle having a radius of 3.5 m as measured around the furnace centerline 1106.

Table 39 lists the long diameter dp of and the bulk density Pp of the waste resin material used, the particle diameter $d_{ss}$ of the sintered ore used, the proportion α of the waste resin material, the particle diameter dc of the coke used and the particle diameter ds of the sintered ore. Operation was run for 30 days with use of the waste resin material in an amount of 130 t/day. In such case, the rate of gas flow $U_0$ in an empty tower was 1.1 m/sec. For comparative purposes, operation (usual operation) was also run which was done in the same manner as in the example of the present invention except that no waste resin material was charged.

TABLE 39

|  |  | Example | Comparative example |
|---|---|---|---|
| Waste synthetic resin material | Long particle diameter $d_P$ (mm) | 100 | — |
|  | Bulk density $\rho_P$ (g/cm³) | 0.3 | — |
| Small-granular | Particle diameter $d_{SS}$ (mm) | 3 | — |

TABLE 39-continued

|  |  | Example | Comparative example |
|---|---|---|---|
| sintered ore | Bulk density $\rho_{SS}$ (gcm³) | 2.87 | — |
| Proportion Weight of waste synthetic resin material/ (Weight of waste synthetic resin material + Weight of small-granular synthetic resin material) |  | 0.2 | — |
| Charged coke | Particle diameter $d_C$ (mm) | 50 | 50 |
| Charged sintered ore | Particle diameter $d_S$ (mm) | 15 | 15 |

The operational results are shown in Table 40.

TABLE 40

|  | Example | Comparative example |
|---|---|---|
| Productivity of molten pig iron (T/day) | 10000 | 10000 |
| Coke rate (kg/) | 560 | 570 |
| Melting temp. of pig iron (° C.) | 1510 | 1510 |
| Proportion of waste synthetic resin material (kg/molten pig iron T) | 10 | 0 |

In the example of the present invention, the fly ratio f of the waste resin material could be held at below 1.0% throughout the operation. Coke volume has been found improved in the operation of that example. Furthermore, stable furnace operation is also attainable with freedom from adverse effects produced on the operation and equipment.

What is claimed is:

1. A method for blowing a synthetic resin material into a furnace, comprising the steps of:
   (a) processing film-shaped synthetic resins into a first granular resin material;
   (b) crushing and processing non-film-shaped synthetic resins into a second granular synthetic resin material;
   (c) pneumatically transporting said first granular synthetic resin material and said second granular synthetic material to a furnace; and
   (d) blowing said pneumatically fed first granular synthetic material and second granular resin material into the furnace.

2. The method according to claim 1, wherein said step of processing the film-shaped synthetic resins into the first granular synthetic resin material comprises:
   melting or semi-melting the film-shaped synthetic resins by heat to provide the synthetic resins in, respectively, a molten or semi-molten state; and
   solidifying the molten or semi-molten synthetic resins.

3. The method according to claim 1, wherein said step of processing the film-shaped synthetic resins into the first granular synthetic resin material comprises:
   heating and melting the film-shaped synthetic resins to provide molten film-shaped synthetic resins;
   cooling and solidifying the molten film-shaped synthetic resins to provide a solidified film-shaped synthetic resins; and
   cutting or crushing the solidified synthetic resins.

4. The method according to claim 1, wherein said step of processing the film-shaped synthetic resins into the first granular synthetic material comprises:
   cutting or crushing the film-shaped synthetic resins;
   semi-melting the cut or crushed film-shaped synthetic resins to provide a semi-molten synthetic resin material; and rapidly cooling the semi-molten synthetic resin material to cause the the semi-molten synthetic resin material to contract and solidify into a granular shape, thereby obtaining the first granular synthetic resin material.

5. The method according to claim 4, wherein said step of semi-melting comprises heating the cut or crushed film-shaped synthetic resins.

6. The method according to claim 4, wherein said step of semi-melting comprises the cut or crushed film-shaped synthetic resins being semi-melted by frictional heat resulting from the cutting or crushing.

7. The method according to claim 1, wherein said step of processing the film-shaped synthetic resins into the first granular synthetic resin material comprises:
    cutting or crushing the film-shaped synthetic resins;
    semi-melting the cut or crushed film-shaped synthetic resins to provide a semi-molten synthetic resin material;
    rapidly cooling the semi-molten synthetic resin material, thereby causing contraction and solidification of the semi-molten synthetic resin material; and
    milling the contracted and solidified synthetic resin material.

8. The method according to claim 7, wherein said step of semi-melting comprises heating the cut or crushed film-shaped synthetic resins.

9. The method according to claim 7, wherein said step of semi-melting comprises semi-melting the the cut or crushed film-shaped synthetic resins by means of frictional heat.

10. The method according to claim 1, wherein said step of processing the film-shaped synthetic resins into the first granular synthetic resin comprises:
    cutting or crushing the film-shaped synthetic resins by means of a rotary knife rotating at a high speed;
    semi-melting the film-shaped synthetic resins under the effect of frictional heat resulting from the cutting or crushing to provide a semi-molten synthetic resin material; and
    rapidly cooling the semi-molten synthetic resin material to cause contraction and solidification of the semi-molten synthetic resins into a granular shape.

11. The method according to claim 1, wherein said step of processing the film-shaped synthetic resins into the first granular synthetic resin material comprises:
    cutting or crushing the film-shaped synthetic resins by means of a rotary knife rotating at a high speed;
    semi-melting the film-shaped synthetic resins under the effect of frictional heat resulting from the cutting or crushing; and
    milling the semi-molten synthetic resins with an edge of the rotary knife and the rotary knife rotating at a high speed, while rapidly cooling the semi-molten synthetic resins to cause contraction and solidification of the semi-molten synthetic resins into a granular shape.

12. The method according to claim 1, wherein the step of blowing said first granular synthetic resin material and said second granular synthetic resin material into the furnace comprises:
    mixing the first granular synthetic resin material and the second granular synthetic resin material to provide a resultant mixture; and
    blowing the resultant mixture into the furnace.

13. The method according to claim 12, wherein the step of mixing the first granular synthetic resin material and the second granular synthetic resin material comprises mixing the first granular synthetic resin material at a ratio of at least 0.1 relative to the sum of the first granular synthetic resin material and the second granular synthetic resin material.

14. The method according to claim 1, wherein said first granular synthetic resin material and said second granular synthetic resin material have a bulk density of at least 0.3 and an angle of repose of up to 40° C., wherein the angle of repose is a base angle when the first granular synthetic resin material or the second granular synthetic resin material is dropped on a horizontal plane surface.

15. The method of claim 1 further comprising:
    separating and removing a chlorine-containing macromolecular resin material from the film-shaped synthetic resins, the film-shaped synthetic resins after separation and removal of the chlorine-containing macromolecular resin material being processed into a granular synthetic resin material in step (a); and
    after step (b), separating and removing the chlorine-containing macromolecular resin material from the non-film-shaped synthetic resins.

16. The method according to claim 1, wherein:
    (i) said step of processing the film-shaped synthetic resins comprises:
        crushing the film-shaped synthetic resin material into film pieces; and
        applying a melting and solidification/granulating treatment to said film pieces, thereby preparing first synthetic resin particles;
    (ii) said step of processing the non-film-shaped synthetic resins comprises:
        crushing the solid synthetic resin material, thereby preparing second synthetic resin particles;
    crushing a sheet-shaped synthetic resin material, thereby preparing sheet pieces having a maximum size smaller than the maximum size of the film pieces; and
    applying a melting and solidification/granulating treatment to said sheet pieces, thereby preparing third synthetic particles.

17. The method according to claim 1, wherein:
    (i) said step of processing the film-shaped synthetic resins comprises:
        crushing the film-shaped synthetic resin material into film pieces; and
        applying a melting and solidification/granulating treatment to said film pieces, thereby preparing first synthetic resin particles;
    (ii) said step of processing the non-film-shaped synthetic resins comprises:
        crushing solid synthetic resin material, thereby preparing second synthetic resin particles;
        crushing a sheet-shaped synthetic resin material which is an intermediate form between the film-shaped synthetic resin material and the solid synthetic resin material, thereby preparing sheet pieces having a maximum size smaller than the maximum size of the film pieces; and
        mixing the second synthetic resin particles into said sheet pieces, thereby preparing third synthetic resin particles.

18. The method according to claim 1, wherein said step of processing the film-shaped synthetic resins comprises crushing waste synthetic resin bottle containers, thereby preparing synthetic resin particles.

19. The method according to claim 1, wherein said step of processing the non-film-shaped synthetic resins comprises:
    supplying resin-containing shredder dust produced upon disposal of an automobile or a home electrical appliance; cutting or crushing said shredder dust;

cutting or crushing said shredder dust;

semi-melting or melting said cut or crushed shredder dust by means of frictional heat produced upon cutting or crushing to provide a semi-molten or molten shredder dust; and causing the semi-molten or molten shredder dust to contract and solidify into granules.

20. The method according to claim 19, wherein the step of causing contraction and solidification into granules comprises rapidly cooling, and simultaneously granulating, the semi-molten or molten shredder dust.

21. The method according to claim 1, wherein the step of processing the non-film-shaped synthetic resins comprises:

supplying resin-containing shredder dust produced during disposal of an automobile or a home electrical appliance;

cutting or crushing said shredder dust to provide a crushed shredder dust;

heating the crushed shredder dust to semi-melt or melt the crushed shredder dust to provide a semi-molten or molten shredder dust; and causing the semi-molten or molten shredder dust to contract and solidify into a granular form.

22. The method according to claim 21, wherein said step of causing contraction and solidification into a granular form comprises rapidly cooling the semi-molten or molten shredder dust and at the same time granulating the shredder dust.

23. The method according to claim 1, wherein said blowing of the granular synthetic resin material into the furnace is accomplished by blowing particles of the granular synthetic resin material having a particle diameter to result in a terminal velocity of the particles higher than the flow velocity of gases discharged from a combustion zone formed at a tuyere nose in a lower part of the furnace.

24. The method according to claim 23, wherein said particle diameter is determined by:

determining the flow velocity of gases discharged from the combustion zone with the use of operating conditions of the furnace;

determining the terminal velocity of the particles of the synthetic resin material in the combustion zone with the use of physical property values of the granular synthetic resin material and physical property values of the combustion zone; and determining the particle diameter from a formula whereby said terminal velocity is higher than said gas flow velocity.

25. A method for charging a synthetic resin material into a blast furnace having a furnace center, a furnace wall and an inside radius of $r_0$ between the furnace center and the furnace wall, comprising:

(a) preparing a synthetic resin material having a particle length of 50 mm to 100 mm as a blast furnace burden raw material;

(b) preparing a granular sinter having a particle diameter of 1.5 mm to 5 mm as a blast furnace burden raw material;

(c) preparing a mixture of the synthetic resin material and the granular sinter; and (d) charging said mixture into an intermediate zone in the blast furnace, said zone being within a range of from 30% to 80% of the inside radius as measured from the center toward the furnace wall of the blast furnace.

* * * * *